US006628279B1

United States Patent
Schell et al.

(10) Patent No.: US 6,628,279 B1
(45) Date of Patent: Sep. 30, 2003

(54) SYSTEM AND METHOD FOR THREE-DIMENSIONAL MODELING

(75) Inventors: Brad Schell, Boulder, CO (US); Joe L. Esch, Boulder, CO (US); John E. Ulmer, Thornton, CO (US)

(73) Assignee: @Last Software, Inc., Boulder, CO (US)

( * ) Notice: Subject to any disclaimer, the term of this patent is extended or adjusted under 35 U.S.C. 154(b) by 165 days.

(21) Appl. No.: 09/716,957

(22) Filed: Nov. 22, 2000

(51) Int. Cl.$^7$ .............................................. G06T 17/00
(52) U.S. Cl. ...................................................... 345/420
(58) Field of Search ................................ 345/419, 427, 345/420, 642, 441, 848, 849, 852, 952, 953, 955, 964

(56) References Cited

U.S. PATENT DOCUMENTS 6,448,964 B1 * 9/2002 Isaacs et al. ................. 345/419

* cited by examiner

*Primary Examiner*—Almis R. Jankus
(74) *Attorney, Agent, or Firm*—McDermott, Will & Emery

(57) ABSTRACT

A three-dimensional design and modeling environment allows users to draw the outlines, or perimeters, of objects in a two-dimensional manner, similar to pencil and paper, already familiar to them. The two-dimensional, planar faces created by a user can then be pushed and pulled by editing tools within the environment to easily and intuitively model three-dimensional volumes and geometries.

27 Claims, 159 Drawing Sheets

SYSTEM AND METHOD FOR THREE-DIMENSIONAL MODELING

FIELD OF THE INVENTION

The present invention relates to three-dimensional object modeling and more particularly to a computer implemented system and method for three-dimensional design and modeling.

BACKGROUND OF THE INVENTION

Computer aided design, drafting and modeling have been some of the most important applications utilizing computers since their inception. The early computer aided design (CAD) applications were used to simplify the creation of two-dimensional models of design objects. The creation of architectural drawings and electronic circuit layouts were just a few of these early applications.

The benefits realized by two-dimensional computer drafting applications are significantly multiplied when such an application adds the capability to model geometries in three dimensions. Typical computer applications that provide 3D modeling capabilities have been complex and required significant user training.

Although the benefits of 3D modeling have been clearly proven, as a general rule, it is still a greatly underutilized tool. In some professions, for instance mechanical design, the use of 3D modeling is fairly prevalent, but in many fields it has not had wide spread adoption. Even though several different approaches to modeling have been introduced over the years, many of which are very powerful, they traditionally have been difficult for design professionals to master. This is because they often require a technical/mathematical aptitude and an understanding of an extensive amount of tools, terminology and modeling paradigms that are unfamiliar to non-technical users.

Another barrier to adoption of 3D modeling by design professionals has been the complaint that the applications do not lend themselves well to experimenting with different design scenarios. As a general rule, the quick, "what if" types of modifications a designer would like to play with are very difficult, or awkward, to implement with most 3D applications. This stifles creativity because the user must devote a comparatively large amount of energy and time driving the technology as compared to focusing on the creative design task. Consequently, designers in many firms continue to use the traditional pen and paper to communicate designs to technicians who are responsible for translating the design into 3D computer models.

In summary, the approaches being offered on the market today traditionally have steep learning curves that do not enable the casual or less-technical users to realize the advantages of 3D computer modeling. In addition, most 3D applications do not lend themselves to quick, non-precise modifications of the model that makes them poor conceptual design tools.

SUMMARY OF THE INVENTION

There is a common consensus in the industry that 3D modeling must be made more intuitive and easier to use than what is currently being offered, particularly for less highly trained individuals. These and other needs are addressed by the present invention that provides an intuitive three-dimensional modeling environment, in part, by adopting an approach similar to the two-dimensional pen-and-paper drawing method that most people are familiar with.

Create Edges in 3D Space to Form 3D Model

In order to make the invention more intuitive the software enables the user to simply define the edges of the desired form in 3D space to create a 3D surface model. The software recognizes when these edges form a closed planer shape and will construct, a two-dimensional "face" based upon and bounded by these edges. A "face" can be thought of as the mathematical equivalent of skin filling the area between the defining edges. The edges can be drawn in any order or orientation. This basic ability to just draw the edges of the desired model is a process that is very similar to drawing with pen and paper and substantially reduces the learning curve.

Drawing Aids

Specifying the two endpoints of the edge in 3D space creates edges. In order to help simplify this problem, a variety of inferencing aids and features are presented to help the user successfully locate endpoints in 3D .

Color-coded axis (red, green, blue) are used to indicate the X,Y, Z directions in 3D space. When constructing an edge, if drawn parallel to one of the primary axis, the edge will be displayed with the color of the parallel axis.

The 3D inferencing feature, which allows geometric constructions to be infered, permits the user to set the endpoint of the line being constructed to be an equal distance from the axis, in effect enabling endpoints and other geometry to be aligned with known points in the model. Inferencing also enables the user to specify a line segment "A" as a reference, while defining a new edge "B", and be alerted with color and tool tips when the current-segment (B) is parallel or perpendicular to "A".

The user is automatically notified when the endpoint of an edge being defined is on an existing face in the model. By default, when the cursor is over a face the endpoint being defined is drawn on that face. Thus to draw edges on a face, the user simply has to move the cursor over that face. This feature can also be used to indicate when a non-coplanar edge being created intersects a face, in effect, providing real-time intersection feedback.

The user is given cursor color and tool tip feedback as to when the cursor is on relevant points of an existing edge-end points and mid points. If the cursor is over an intersection, those are also indicated, whether that intersection is between multiple edges or between an edge and a face.

The tape measure tool is provided that allows users to measure distances like a real-world tape measure does. It is also used for creating construction lines between two points and construction lines parallel to existing edges. Construction lines are lines that can be referenced when drawing or placing geometry in the model.

The protractor tool is provided for measuring angles between edges and creating construction lines at desired angles and locations.

The invention allows the input of exact displacements and dimensions. In general, any operation that involves the user specifying a distance or displacement can be achieved by specifying the distance with mouse input or by indicating a direction and then manually entering a distance.

The eraser tool behaves more like a real world eraser. With the eraser tool active, the user moves it across entities to be erased highlighting them first then completing the erase by letting go of the left mouse button. As edges are erased, connecting faces are also eliminated simulating the process carried out on paper.

Face Splitting/Healing

Edges that form a closed planer shape will cause a face to be formed. As a general rule, if additional coplanar-edges are introduced entirely within, or intersecting the edges of, an existing face, any additional closed shapes that are created by the combination of new edges or existing edges will cause the original face to be split accordingly.

If edges are removed, the application will "heal" or join independent faces where possible and remove faces that are no longer surrounded by edges

Push/Pull

Another aspect of the invention allows a designer to manipulate a model by pushing and pulling on faces of the model. Using the push/pull operation, a designer can extrude 2D geometry into 3D , change the size of existing 3D geometry, or introduce new faces to change the shape of existing 3D geometry. The user is given real-time feedback while pushing or pulling geometry. This immediate feedback is very helpful in the design process.

The result of pushing or pulling a face is that the face will be moved in a given direction. If there are faces connected to edges of the face being moved whose normals are perpendicular to the move direction, those faces will be stretched (possibly with new edges inserted) so that they remain connected to the original face. If there are faces connected to the face being moved whose normals are not perpendicular to the move direction; new faces are inserted between them and the original face. If there are edges of the face being moved with no other faces attached; new faces are created at those edges. While some aspects of the push/pull operation are similar to an extrude, its ability to introduce new edges when needed: and modify existing geometry where it can makes it unique.

If a face is coincident with other faces in the model after being moved, then the face will be merged with the geometry at the new location. One result of this is that a user can use the push/pull operation to make holes or cuts in a model by pushing the face until it is coincident with some other geometry.

Movements are done in real-time to enable a user to see the current effect of an operation and to easily set the desired movement.

Move

This tool allows existing geometry to be moved or copied by first selecting the desired geometry then specifying a base point and displacement. More uniquely, it allows the user to move connected edges, faces or vertices in a fashion that preserves planar faces while maintaining the connections between attached geometry. For example, this would allow the user to move the bottom edge of a cube away from the face to form a sloped edge on the cube. Or it would allow the user to "move" a face of the cube in the plane of that face to form a parallelepiped. As a more sophisticated example, the 2D projection of a roof with connected ridges and valleys could be transformed into a 3D model by selecting and moving the ridges of the roof up in the vertical direction.

Components

Within many modeling environments, repetitive elements are routinely employed. For example, in an architectural setting, particular windows and doors may occur multiple times in a given model. Many design environments provide libraries of these objects along with the ability for users to create their own objects and store them in similar libraries. Often users find the process of orienting and positioning these elements to be difficult or cumbersome with existing modeling applications. "Smart" modeling systems, such as object based architectural applications, will often provide "smart parts" that have intelligent behavior properties associated with them. These smart parts are attractive to the user because they generally are easy to position and they know how to interact with the model. For instance, a "window" part may know that it can only reside in vertical "wall" elements and once placed, the opening it defines should be "cut" in the wall. Furthermore, if the wall is moved the window will move with it.

The disadvantage of the smart modeling systems is that generally the behavior characteristics of each object must be created with complex programming steps. Accordingly, one aspect of the present invention relates to a method and software for creating a component within a three-dimensional model that allows a non-programmer user to easily and simply define and specify re-usable, intelligent objects that can be created in-place within a model and then be re-used in that same model or another model.

In addition to providing user defined smart behavior of components, a powerful rotation mechanism is present in the application's components. With the Move tool active, the user can simply move the cursor over any component and a bounding box of the component is displayed. The bounding box is an imaginary rectangular box that contains the component and has its faces aligned with the primary axes. As the cursor is moved over the different faces of the bounding box, rotation grips are displayed. If the user moves the cursor over one of the rotation grips, then the protractor is displayed and the user simply clicks the mouse to being rotation. The component is rotated in real-time about the mid-point of the bounding box as the user moves the cursor. A second mouse click by the user specifies the amount of rotation. As an alternative, the desired number of degrees of rotation can be entered via a keyboard or other similar input device. This mechanism makes positioning and orienting components in three-dimensional space intuitive and easy for an average user.

Rotate

By default, all components have a built in mechanism that allows them to be rotated by simply moving the cursor over "rotation grips" on the faces of a component's bounding box. The application also enables rotation of any selection of geometry in the scene regardless of whether or not that geometry is a component. The Rotate feature incorporates the Protractor tool in its operation. The user first orients the protractor on the desired plane by moving the cursor over that plane, then the protractor's location is positioned on a desired rotation point by a first mouse click. A second click by the user defines the orientation of the protractor and the last step is to move the cursor to cause the desired rotation of the selected geometry about the desired rotation point. Like rotation grips on components, this mechanism is very intuitive and easy to execute for the average user. The Rotate tool has the advantage that a user can define the point of rotation and, while defining the rotation, the user can reference known locations in the scene in order to make alignment of various scene geometries easier.

SUMMARY

The proposed invention eliminates many of the barriers to 3D modeling by adopting a modeling paradigm that is comfortable to most design professionals—drawing with pen and paper. The invention contains a small set of powerful tools that, where possible, mimic their real world counterparts to make the application more intuitive and easy to learn. The ability to push and pull faces, edges and vertices in order to create or alter 3D geometry enables the user to modify and construct models in new powerful ways. Most design professionals are very fluent at creating 2D projections from 3D forms, as a result the invention is addressing means of easily converting 2D projections into 3D models by allowing faces and edges to be "pushed or pulled" to create 3D forms. The invention enables the user to define their own components and to specify the behavior of those components in the model. Components can be easily oriented in three-dimensional space with built in rotation grips. The rotate tool enables intuitive rotation, of any geometry in a scene about a desired point. The invention allows the user to work in a real-time hidden line or shaded mode, it allows the user to work in a perspective mode and it will cast real-time shadows. These features all contribute to making the application easier to use and better suited to design. The invention enables the user to make easy and quick modifications to a design which makes the application a powerful tool in the early conceptual design portions of a project, yet it is powerful enough to allow early designs to be refined into complete, detailed models.

Accordingly, one aspect of the present invention relates to a method and software for three-dimensional modeling. In accordance with the methodology of this aspect input is received relating to a number of edges that form a closed perimeter and lie in a common plane, a two-dimensional shape based on and bounded by these edges is defined, and, in response to additional input the two-dimensional shape is extruded to form a three-dimensional figure based on this additional input.

A further aspect of the present invention relates to a method and software for three-dimensional modeling in which a three-dimensional model, that includes a number of edges, is maintained and input relating to the definition of a new edge is received. In response to this input, a set of edges that lie in the same plane as the new edge is selected and from these selected edges, those edges that form a closed perimeter are further selected to define a two-dimensional shape based on and bounded by the further selected edges. In response to receiving input indicating a push/pull operation, the two-dimensional shape is extruded to form a three-dimensional figure.

Another aspect of the present invention relates to a method and software for a creating a three-dimensional figure from a two-dimensional planar surface in which the interior region of the two-dimensional planar surface is selected and, based on input from a user's movement of a cursor control device, the interior region is extruded into a third dimension, thereby creating a three-dimensional figure.

An additional aspect of the present invention relates to a method and software for creating a three-dimensional figure from a two-dimensional planar surface. In accordance with the methodology of this aspect, a push/pull tool is selected by providing a first mouse operation, such as a mouse click; an interior region of the two-dimensional planar surface is selected by providing a second mouse operation, such as a mouse click; and the interior region is extruded into a third dimension by moving the cursor-with a mouse operation, such as a mouse drag.

Accordingly, one aspect of the present invention relates to a method and software for creating a component within a three-dimensional model in which a set of elements is selected within the model, behavioral properties that control the interaction between the selected elements and a model are specified, and the component is created based on the selected elements and the specified behavioral properties.

An additional aspect of the present invention relates to a method and software for creating a component in a three-dimensional model. Within the methodology of this aspect, a set of model components are selected based on received input, other input is received that specify a plurality of behavioral properties, a component is created based on the selected elements and at least one of the specified behavioral properties, and then the component is stored in a persistent storage repository.

Many additional aspects of various embodiments of the present invention enhance, often synergistically, its intuitive nature. These aspects include measuring tools that can be used to determine the length of elements within a model; component creation tools that facilitate the creation of a re-usable component; protractor tools that can be used to determine the angle of edges within a model; and help messages and visual cues that inform a user when different lines are perpendicular or parallel, are aligned with system axes, or are aligned with other points of interest within the scene.

Additional needs, advantages, and novel features of the present invention will be set forth in the description that follows, and in part, will become apparent upon examination or may be learned by practice of the invention. The features and advantages of the invention may be realized and obtained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and system for designing and modeling three-dimensional objects are described herein. In the following description, for purposes of explanation, numerous specific details are set forth in order to provide a thorough understanding of the present invention. It will be apparent, however, to one of ordinary skill in the art that the present invention may be practiced without these specific details. In other instances, well-known structures and devices are shown in block diagram form in order to avoid unnecessarily obscuring the present invention.

An exemplary software application is presented herein to facilitate the description and disclosure of the merits, features and principles of the present invention. Many of the described structures and details of this software application are provided simply to assist with the understanding of the-present invention and are not intended to be construed as absolute requirements of the present invention. For example, color is often presented herein as a way to distinguish different screen elements for a graphical designer; obviously, other visually distinguishing methods such as line thickness, line color, or line type are all viable alternatives. Similarly, input from a mouse is typically described herein but other computerized input methods are equally useful. Alternatives such as these are within the skill of ordinary artisans in this field and are contemplated within the scope of the present invention even if not explicitly identified throughout the description which follows.

Exemplary Design of A House

Figure 1:
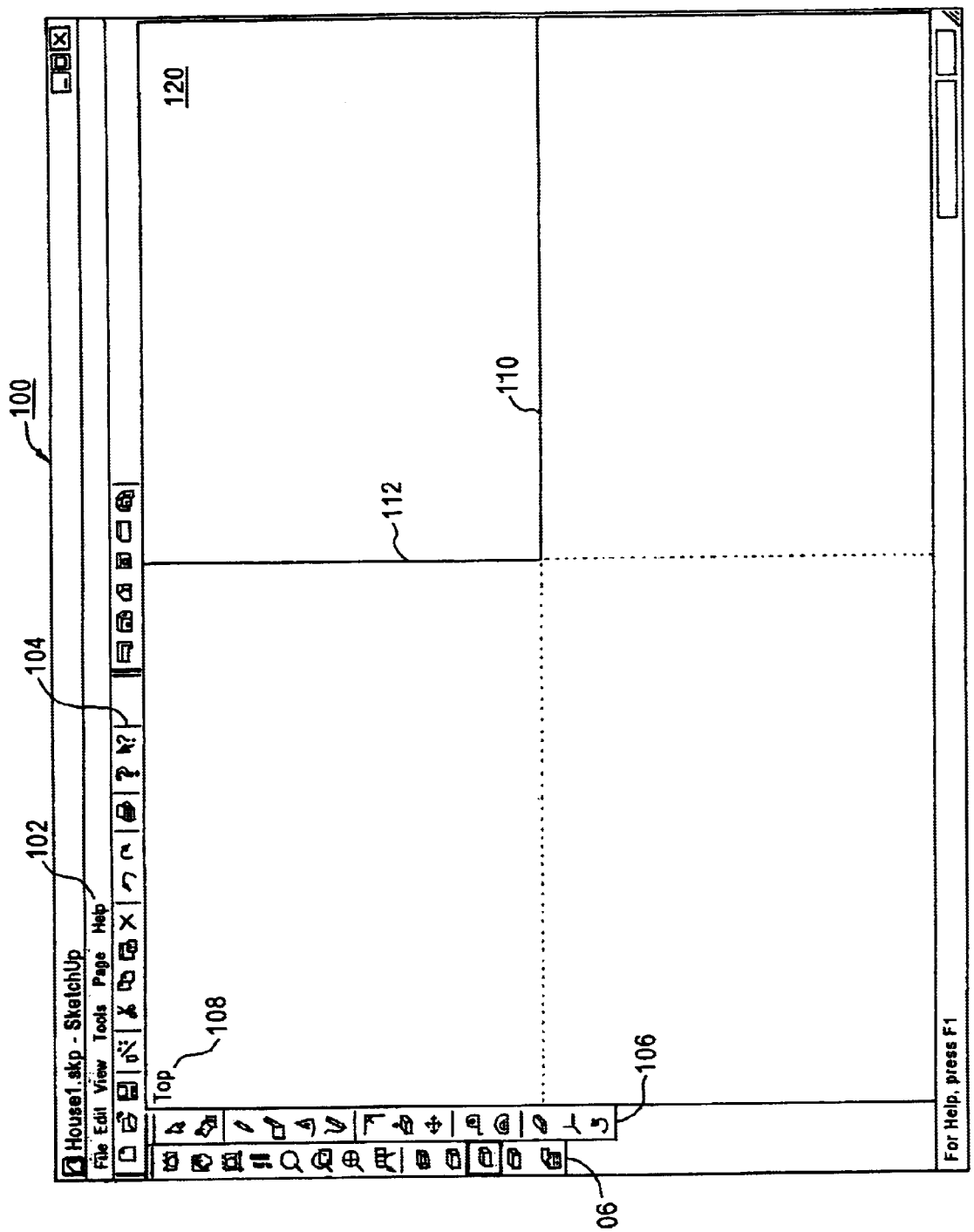
FIG. 1 illustrates a screen shot of an exemplary three-dimensional design and modeling application environment.

FIG. 1 depicts an exemplary screen shot 100 of a software application that implements a graphical design and modeling environment in accordance with one embodiment of the present invention. To present a graphical user interface (GU) that is comfortable to users, textual 102 and iconized 104 menu bars are included along the top of the screen that provide a variety of options to a user. Some of the options are standard in GU applications such as file access commands (e.g. open, save, and save as), and help instructions. Along the left edge of the window are two columns of icons 106 that represent tools useful for graphically designing and modeling objects in two and three dimensions. The basics of some of these tools are familiar to users of computer aided design (CAD) applications and other graphical design and modeling applications. So, rather than providing an exhaustive listing of every tool and its behavior, the tools and their behavior are presented by way of example, with particular focus on those tools and aspects that are new to users. Also, by way of example and not by limitation, a sequential description of graphically designing a house is presented below as a working example of one embodiment of the present invention.

A screen window 120 displays a view into a virtual design and modeling world. In the top left corner of the window 120 is an indication 108 of the view of the world that is being presented to the user. Axes 110 and 112 are also presented to the user to provide visual clues regarding the orientation of the world and the objects within it. As described later, there is also a third axis. The axes 110 and 112 can be different colors, such as red for the horizontal axis 110 and green for the vertical axis 112, to provide additional visual cues. These, as well as many features herein described, are provided to assist the user in the design process and can be individually and selectively disabled by the user.

Drawing in Three-dimensional Space

Figure 2A:
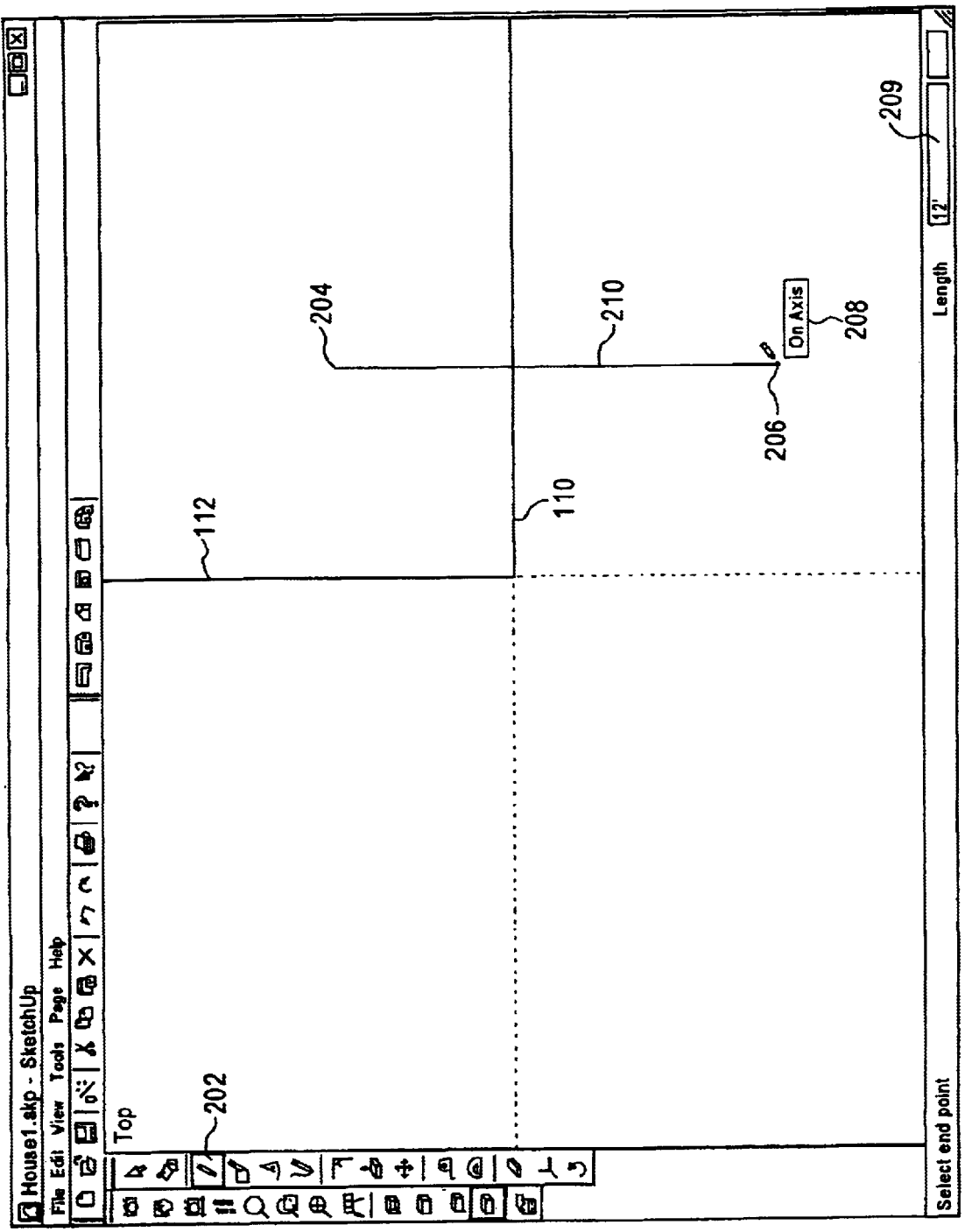
FIGS. 2A–2G illustrate a sequence of screen shots in which a users draws a edges in the exemplary environment of FIG. 1.

FIG. 2A illustrates the use of the pencil icon 202, or tool, to draw the base of the house, starting with a line 210. As known by many users, the tool 202 is selected by either clicking on it or choosing it from a drop-down menu. Upon selecting the tool 202, the user draws a line by clicking at one endpoint 204 and dragging the mouse, or controlling another input device, to move a cursor towards a second endpoint 206. A number of visual cues can be used to provide the user with feedback regarding the line 210 being drawn. A pop-up information window 208, or hint, can appear, informing a user that the line 210 is parallel to the vertical axis 112; similarly, when the line 210 is parallel to the vertical axis 112, the line could turn to the color of the axis (e.g., green) and to another color (e.g., black) when the line 210 is not parallel.

Figure 2B:
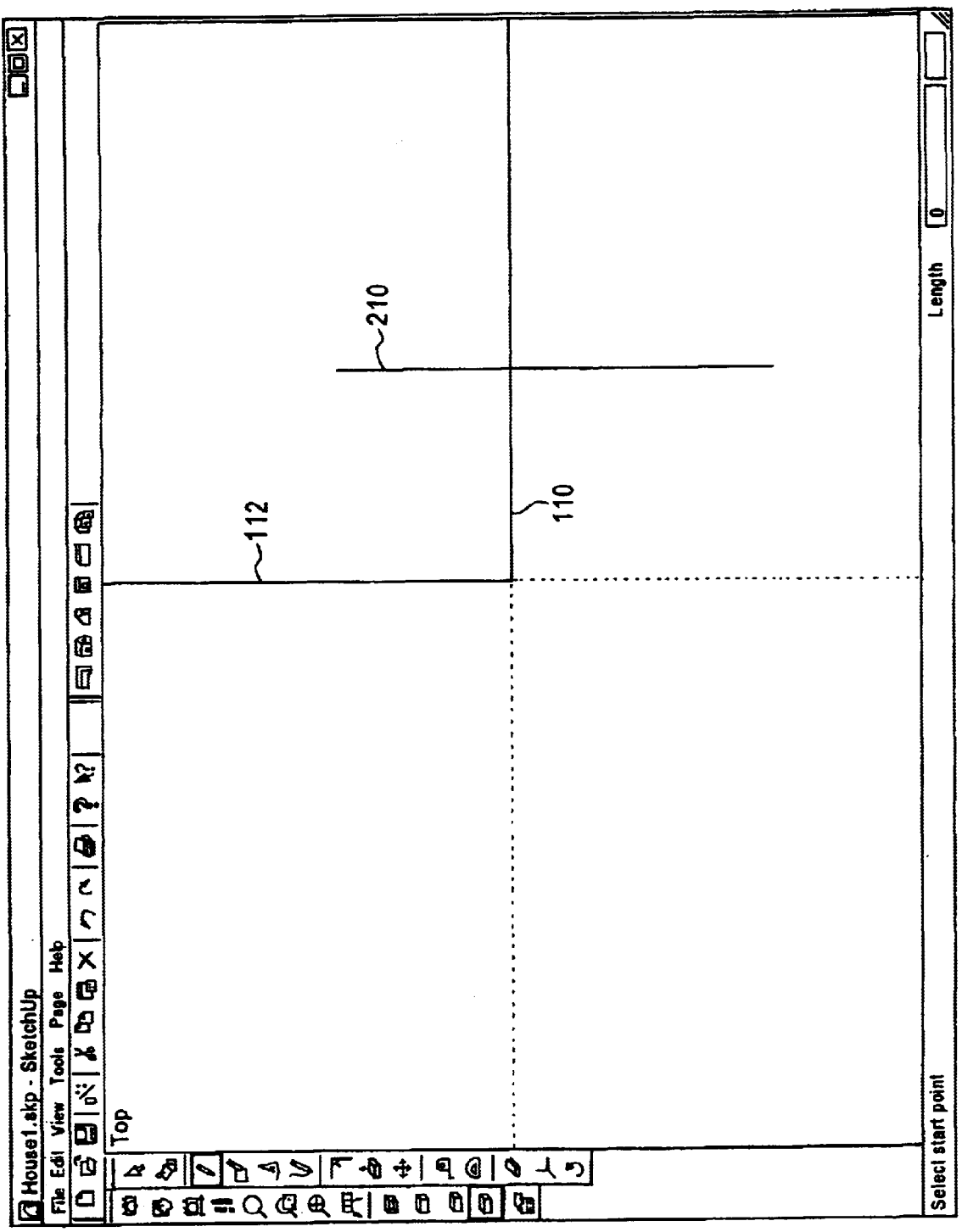

Also depicted in FIG. 2A, at the bottom right corner of the screen, is a dialog box 209 that informs a user of the length of the line 210 as the line is being drawn. In this example, one outside wall of the house has a length of 12'. When the user notices the window 210 displays 12', the intended length of the line 210, then clicking the mouse, for example, will end the drawing operation and create the line 210, as shown in FIG. 2B.

Figure 2C:
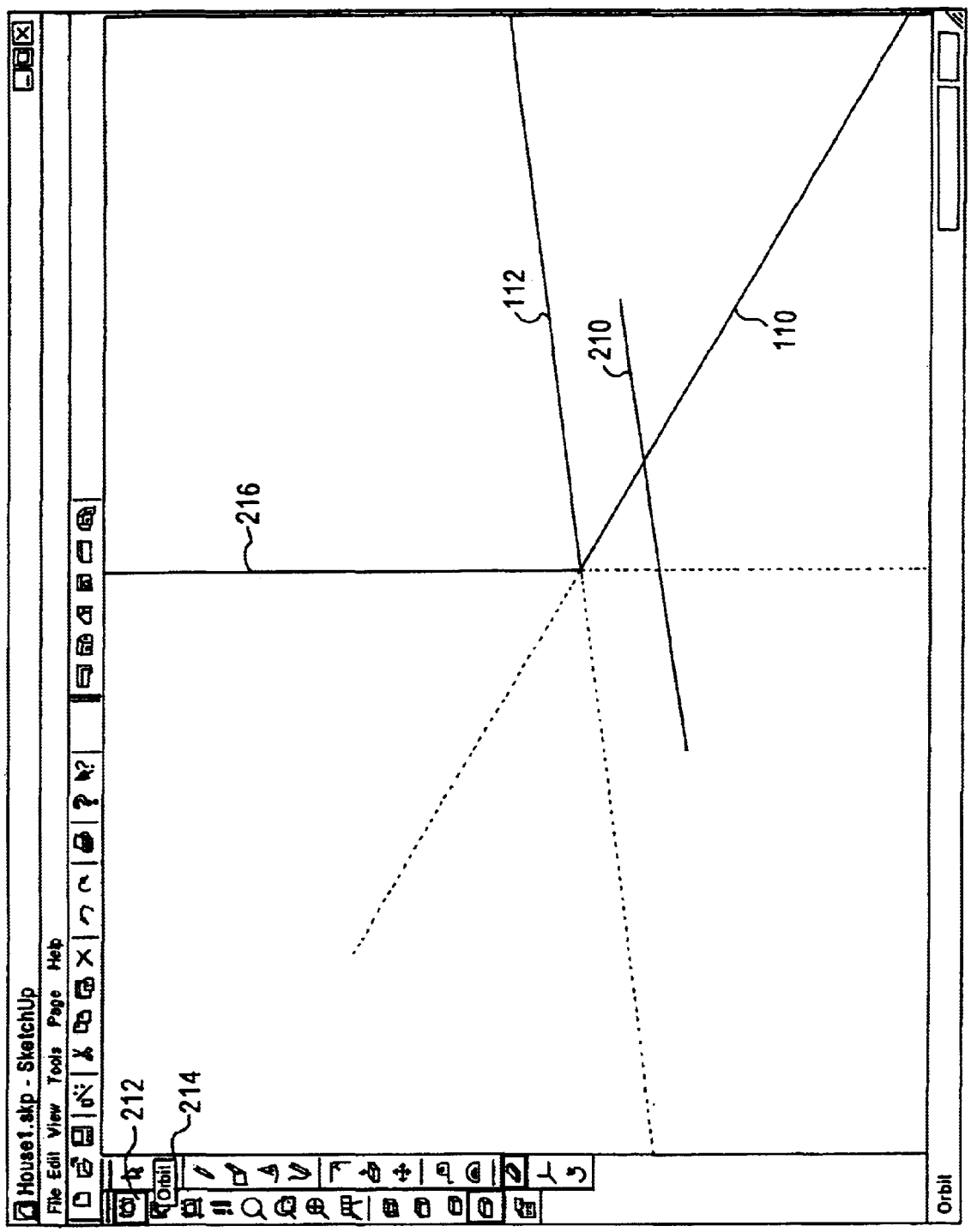
Figure 2D:
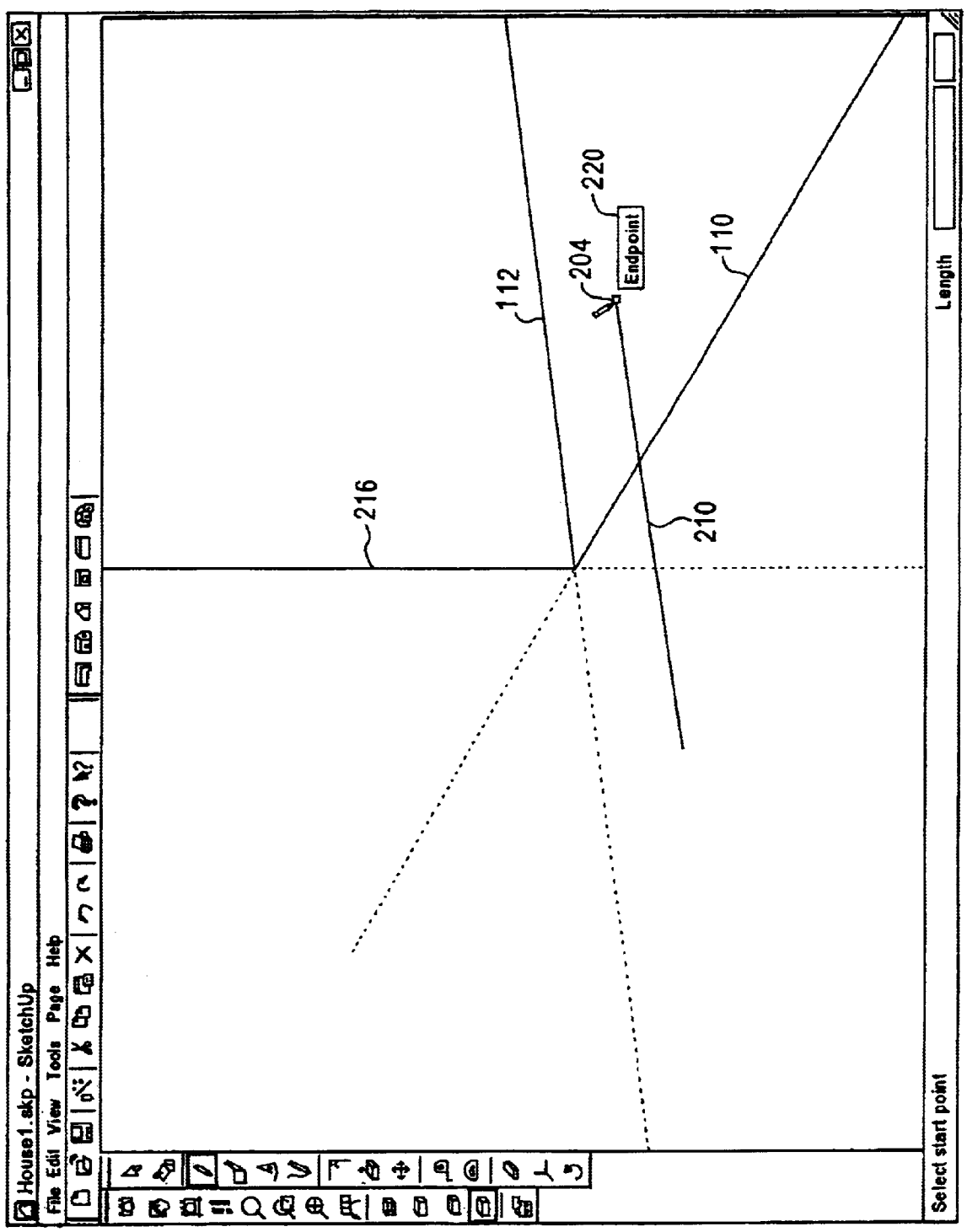

FIG. 2C illustrates the effect of using an orbit tool 212 common to many visual modeling applications. A user can select the orbit tool 212 and then manipulate the orientation of the world into three dimensions. By activating the orbit tool 212, for example by a mouse click, and then dragging the mouse within the display window, the orientation of the user's view into the display window 120 can be modified. A pop-up cue 214 can be provided to augment each icon with a textual label that further identifies the particular tools. After use of the orbit tool 212 is complete, the line 210, in FIG. 2D, is shown from a different perspective. As depicted, the z-axis 216 becomes visible and is preferably distinguishable from the other axes 110 and 112, such as by being blue in color. In the earlier figures, this z-axis 216 would have been coming out of the paper.

Figure 2E:
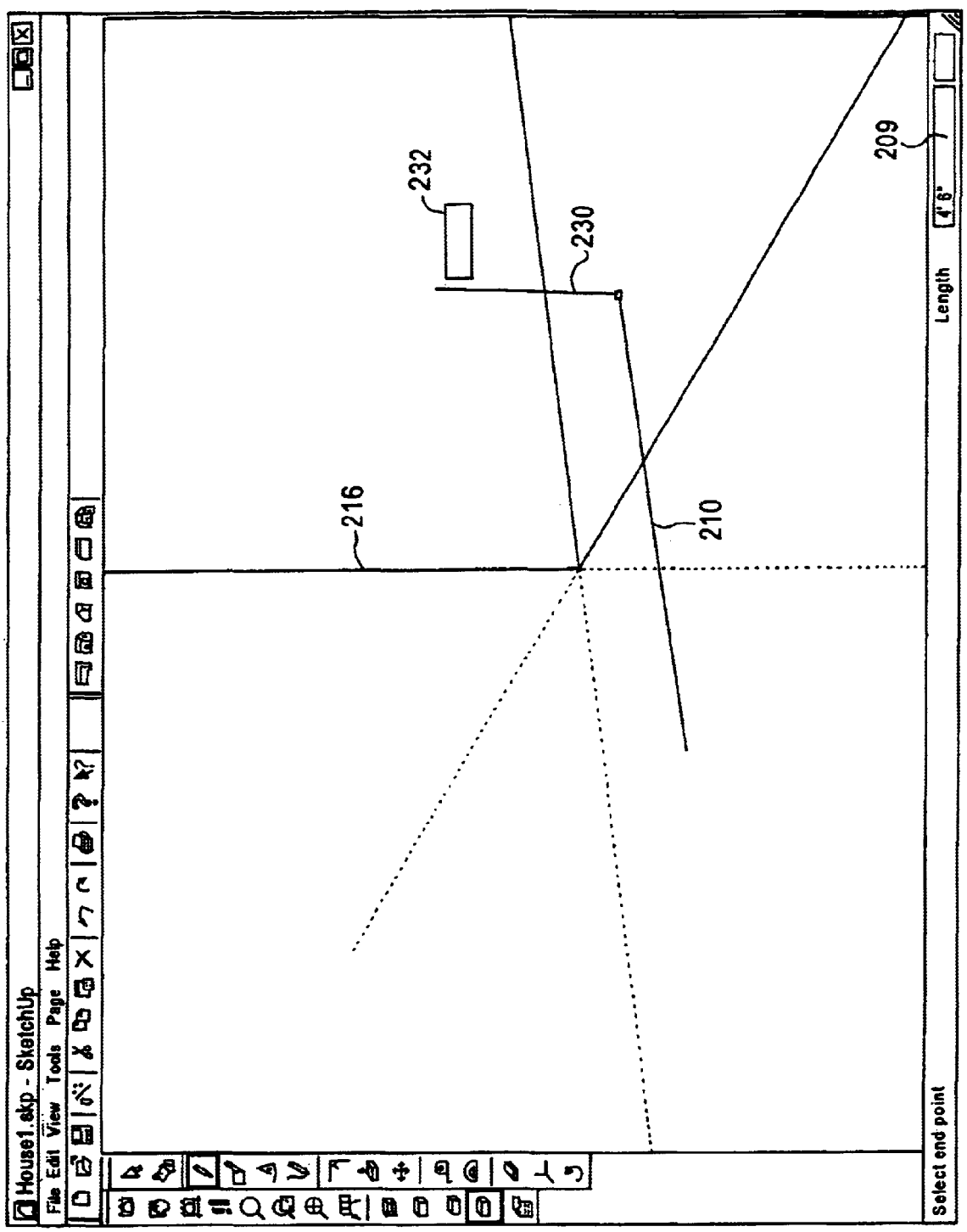

After the line segment 210 is complete, the user may want to connect a second line segment to the first line segment 210. Referring to FIG. 2D, when the user moves a cursor to start the second line, a pop-up cue 220 can appear, informing the user that the cursor is positioned at the endpoint 204 of the line 210. Another method of providing this feedback is to change the color (e.g., cyan) of the endpoint 204 when the cursor is located over it. Turning now to FIG. 2E, the user creates the line 230 using similar methods to those used to create the line 210, but the visual cues provided to the user would be in reference to the z-axis 216, rather than the y-axis 112. For example, when the line 230 is parallel to the z-axis 216, a cue 232 is displayed and the color of the line 230 changes to that of the parallel z-axis 216 (e.g., blue). Although, projected onto two-dimension for purposes of display, the line 216 can be freely drawn in three dimensions, as illustrated, with the visual cues being used to ensure that the line 216 is drawn as intended. As depicted in FIG. 2E, the line 232 is drawn in the z direction, parallel to the z-axis.

Figure 2F:
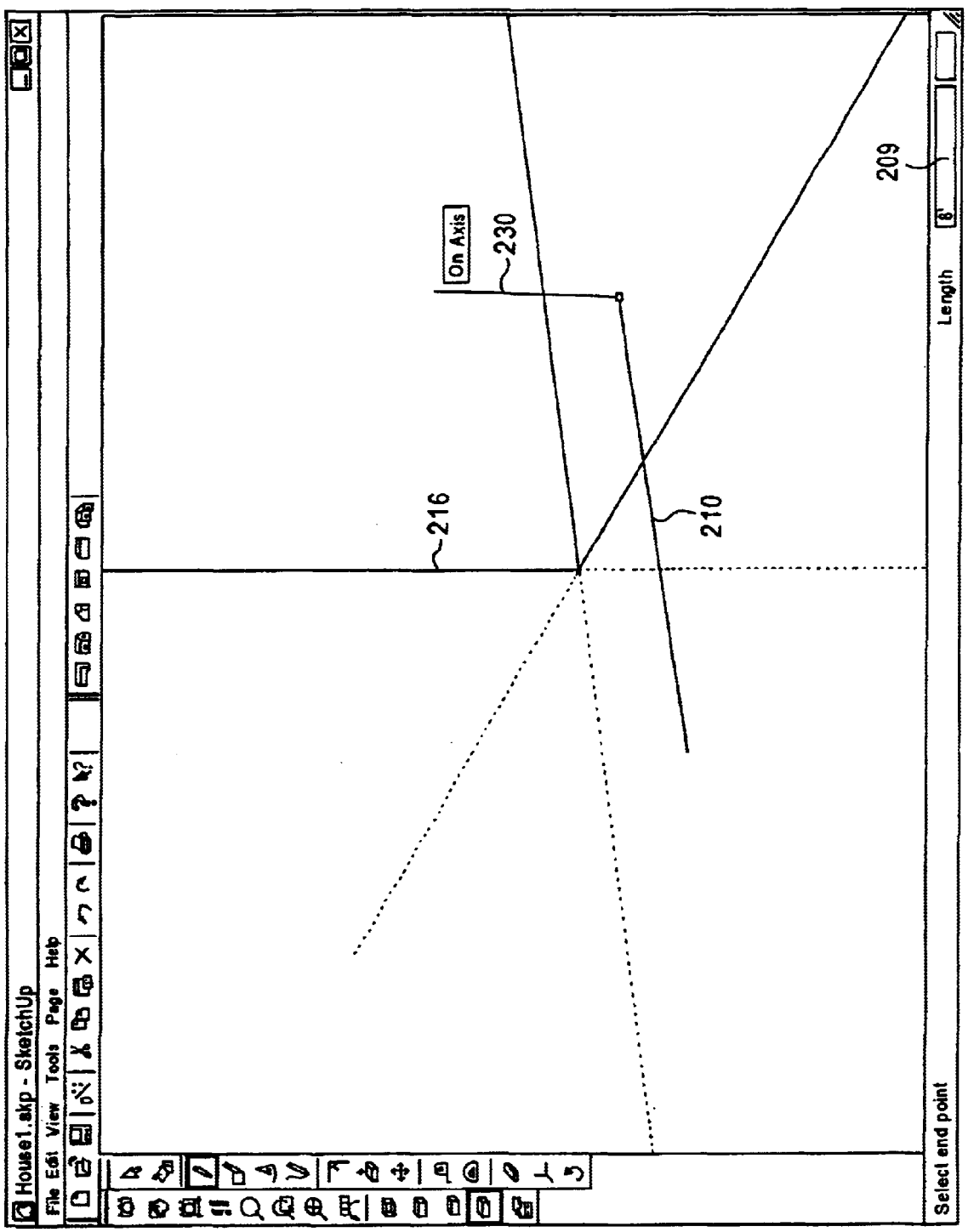
Figure 2G:
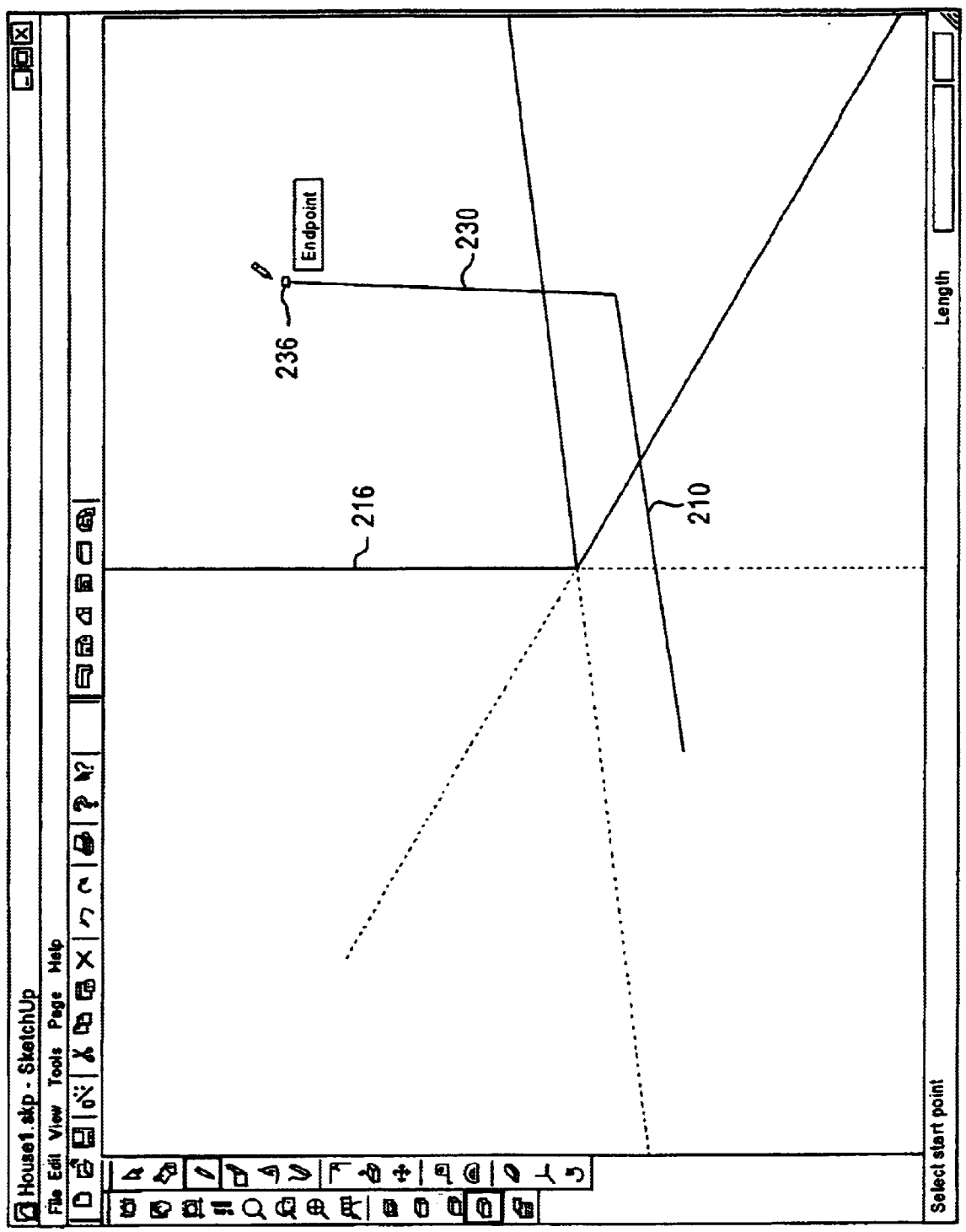

Alternative, and quicker, methods of drawing line segments are also provided. Using one such abbreviated method, a user can simply click on an endpoint, move the cursor to the next endpoint, click (to complete the first line and start the second line), and then move again to the next endpoint and click (thereby completing the second line and starting the third line), and repeating these steps as needed. Alternative methods for drawing a line of the intended length are also provided. In FIG. 2E, a user can release the mouse during the drawing of the line 230 when the length of the line, shown in window 209, is 4'6". The user can then type in, or otherwise enter "8"' to specify the intended length of the line 230. The entered dimension, as shown if FIG. 2F, replaces the previous real-time dimension displayed in the window 209. When the entering of data is completed, for example by pressing the RETURN key, the line 230 is drawn to its specified length, as shown in FIG. 2G. Also, as depicted in FIG. 2G, the cursor is positioned at the endpoint 236, ready to begin a new line.

Two-dimensional Surface Faces

Figure 3A:
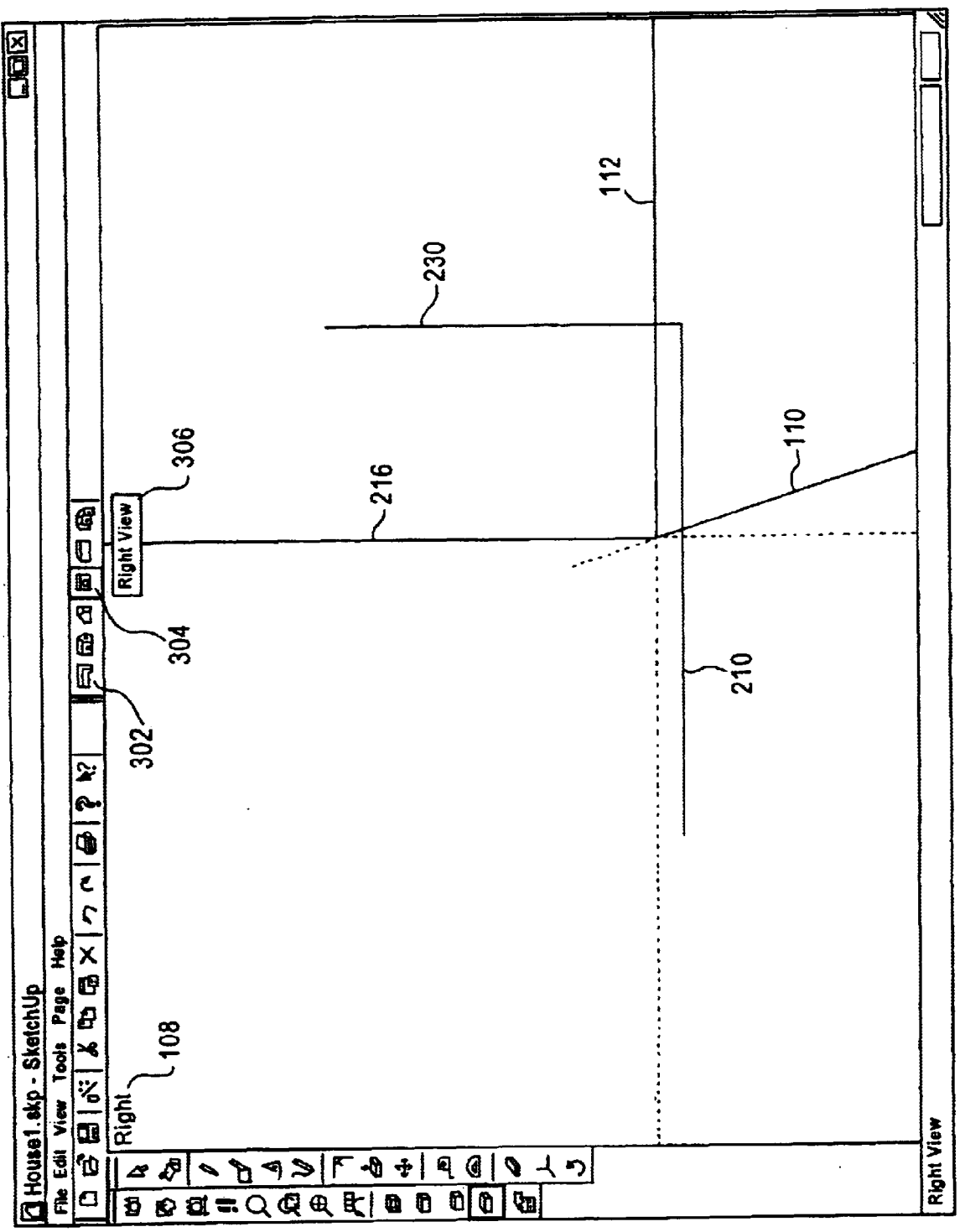
FIGS. 3A–3M illustrates a sequence of screen shots in which a user completes a closed planar shape in three dimensions and the visual indication that the shape has become a two-dimensional surface face, according to one embodiment of the present application environment.

As indicated by the term "Right" in the top left corner of the display, the two lines 210, and 230 are depicted in FIG. 3A in the "Right" view, one of various possible standard views. Icon menu area 302 provides different icons to allow a user to select from the different standard views, such as top, bottom, left, right, front, back, and isometric. A user can alternatively select any of these views from pull-down menu items (not shown) as well. In FIG. 3A, the "Right View" is selected as indicated by the highlighted icon 304 and the pop-up box 306.

Figure 3B:
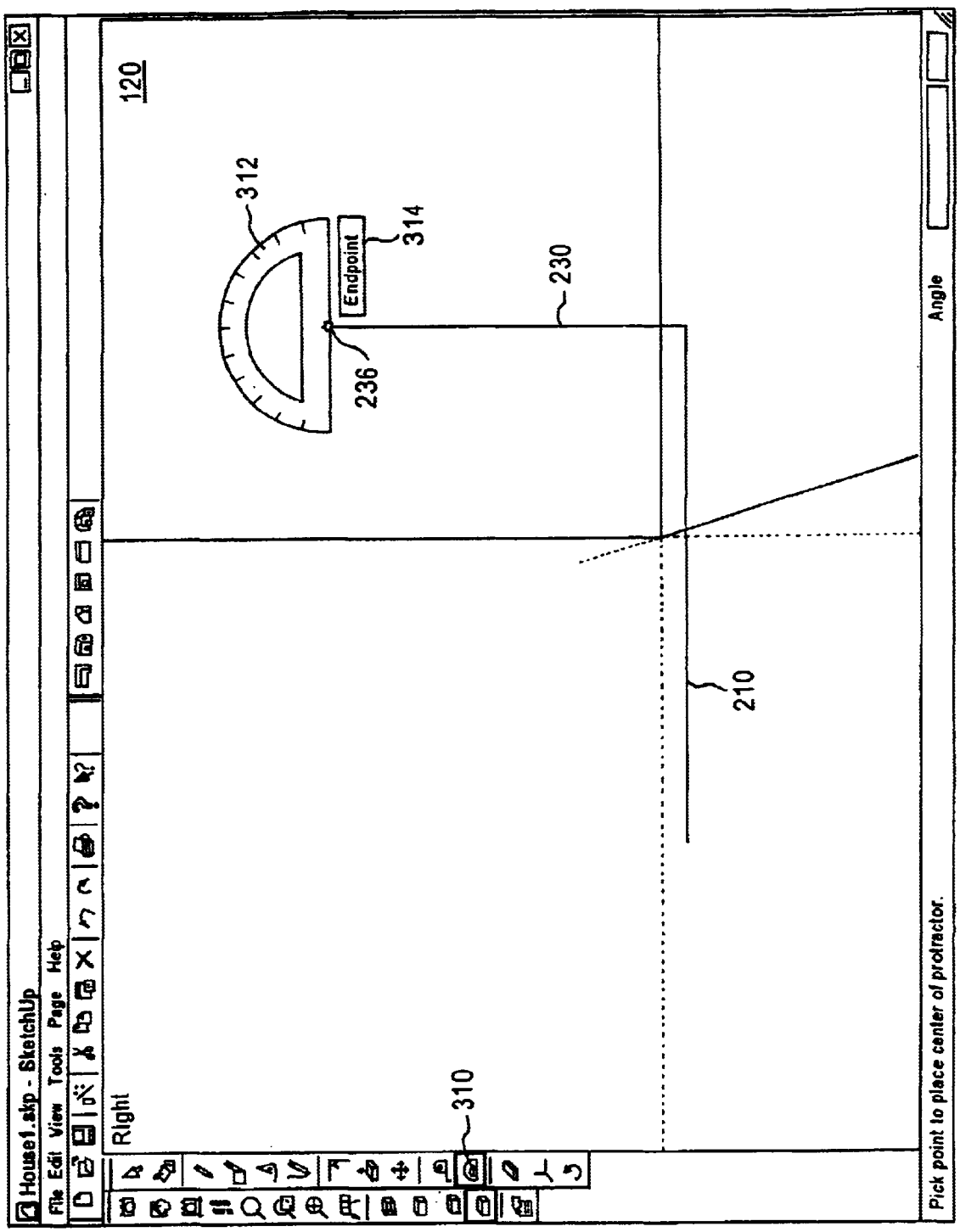
Figure 3C:
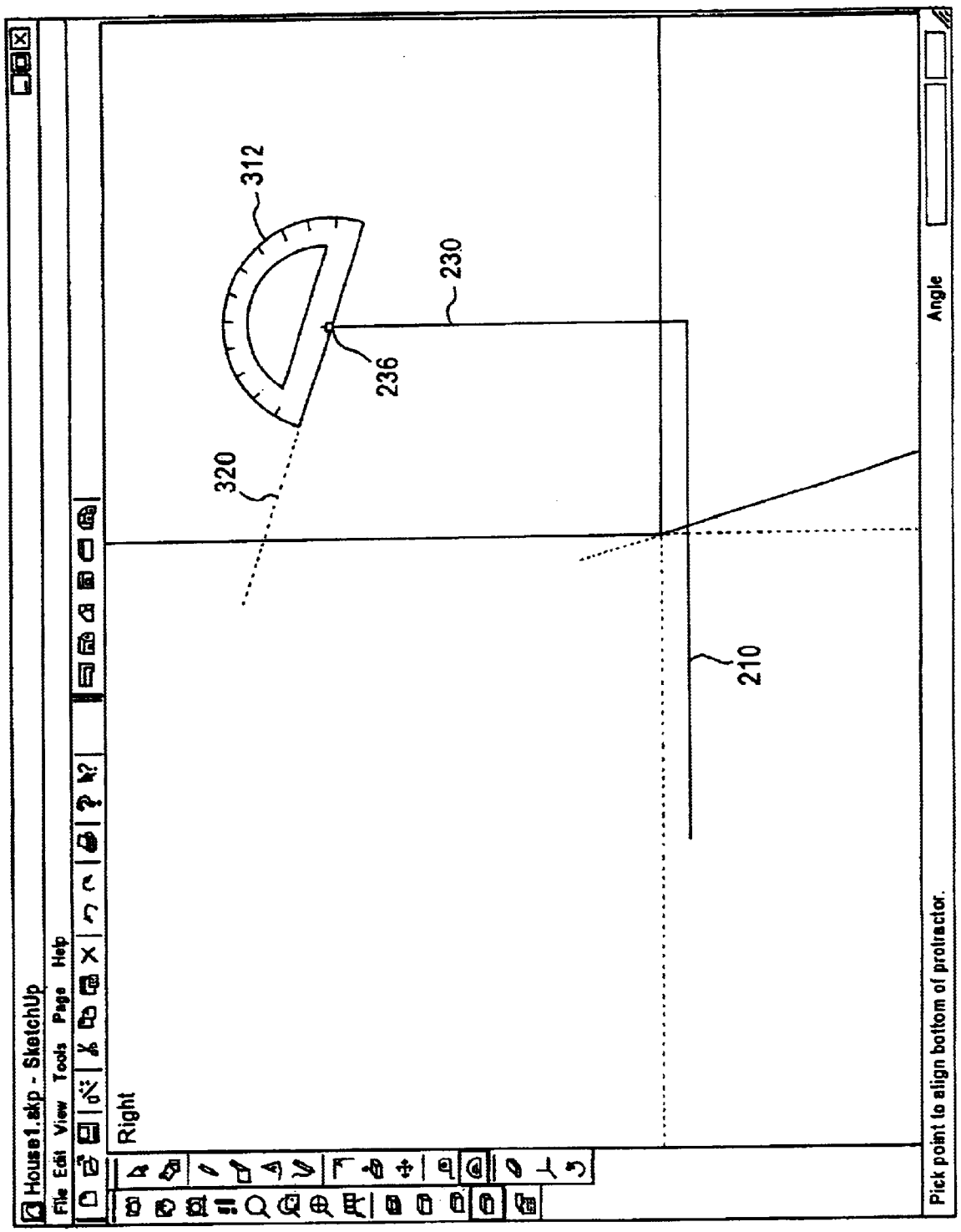
Figure 3D:
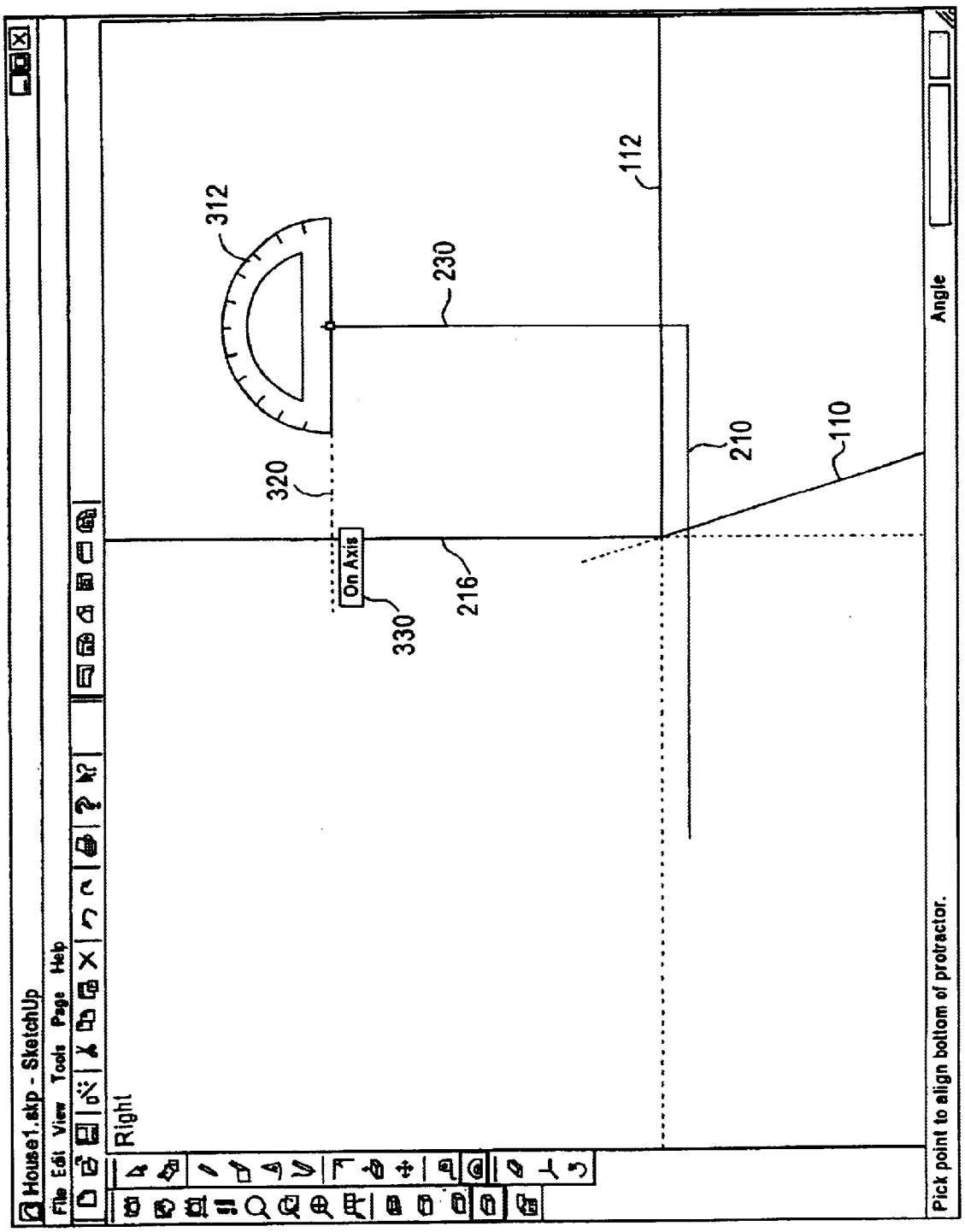
Figure 3E:
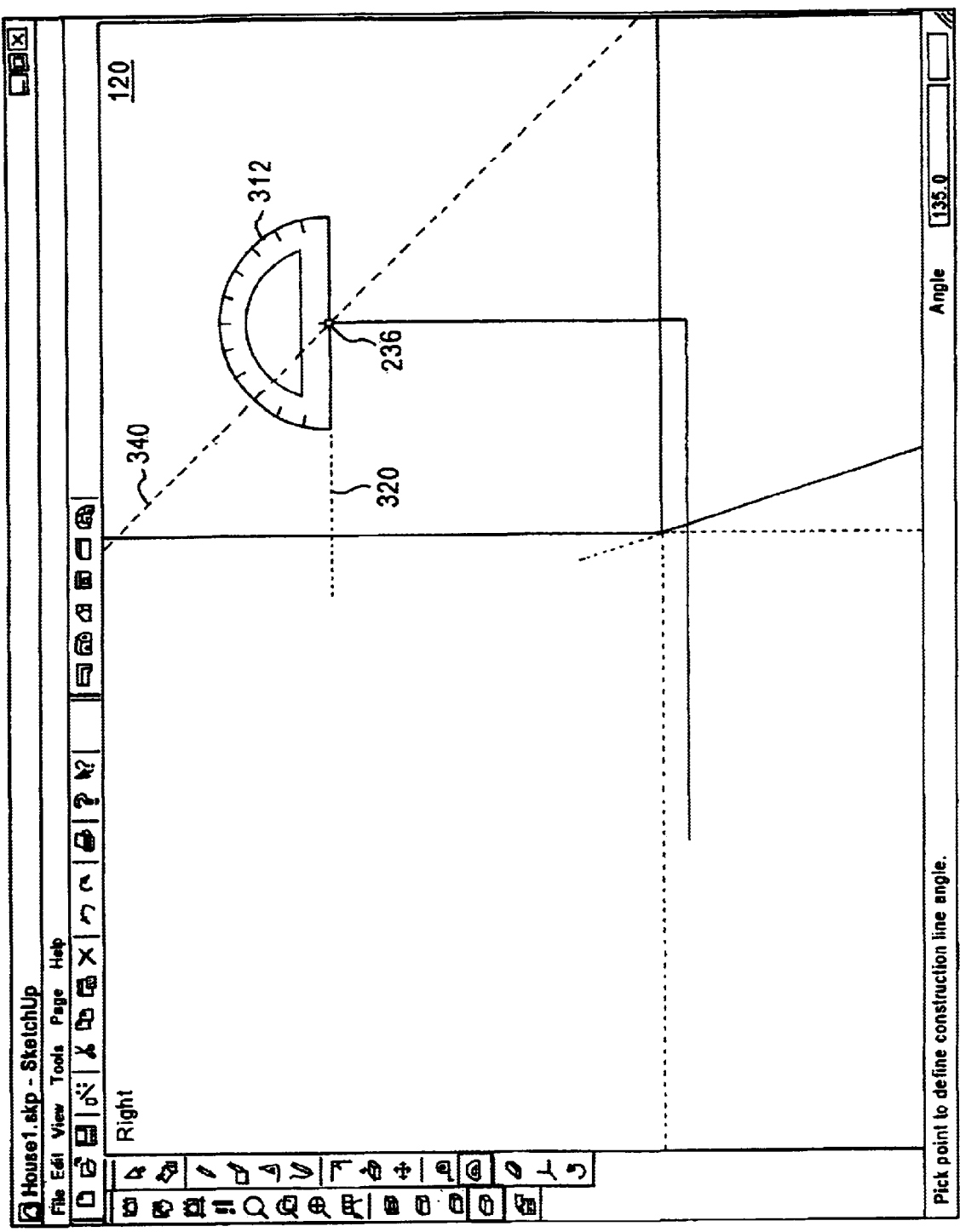

To facilitate drawing of lines at precise angles, a protractor tool is provided. When the protractor tool icon 310 is selected, as shown in FIG. 3B, a protractor 312 is displayed in the window. The user can position the protractor by moving the mouse, or other input device, until the center of the bottom of the protractor 312 is positioned as intended; the protractor 312 is anchored to a location, for example, by clicking a mouse button. The pop-up display box 314 provides an indication that the protractor 312 is located on the endpoint 236. After the protractor 312 is anchored, the protractor 312 is rotated about the anchor point 236 by moving a mouse or other input device. A phantom line 320, as shown in FIG. 3C, is provided to assist a user in proper orientation of the protractor 312. When the protractor 312 is oriented parallel to the y-axis 112, a pop-up display box 330 so indicates. A user then can click the mouse button again to anchor the orientation of the protractor 312, as shown in FIG. 3D. Once the protractor 312 is properly positioned and oriented, as user can then create a phantom line 340, as shown if FIG. 3E, corresponding to a particular angle through the endpoint and anchor point 236. The phantom line 340 is fixed at the anchor point 236 and rotates according to movements of a user's input device. When the phantom line 340 is properly positioned, the user can click the mouse, for example, and fix the phantom line 340 in the display screen as shown in FIG. 3F.

Figure 3F:
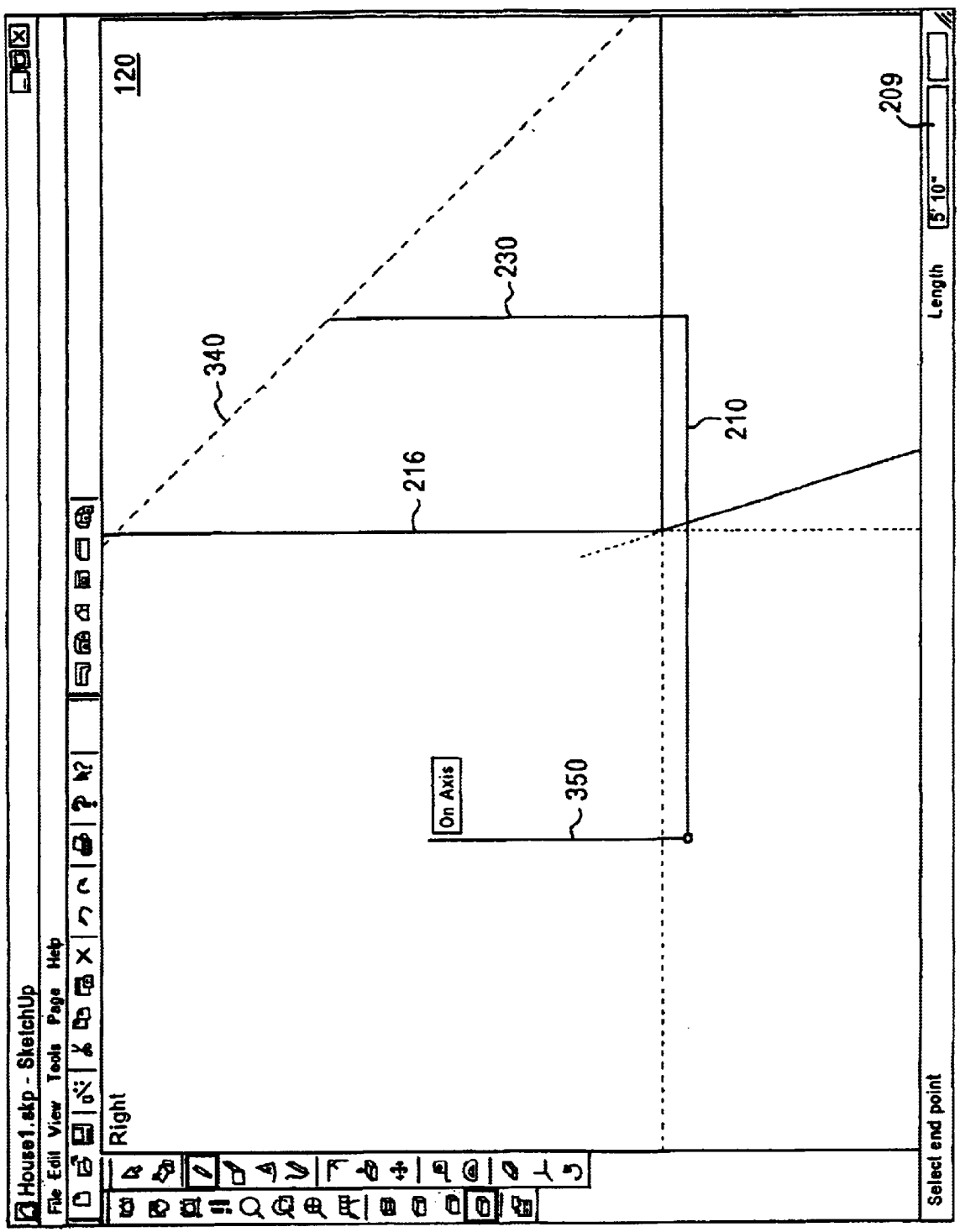

As depicted in FIG. 3F, the user can continue drawing a vertical edge of the house by drawing line 350.

Figure 3G:
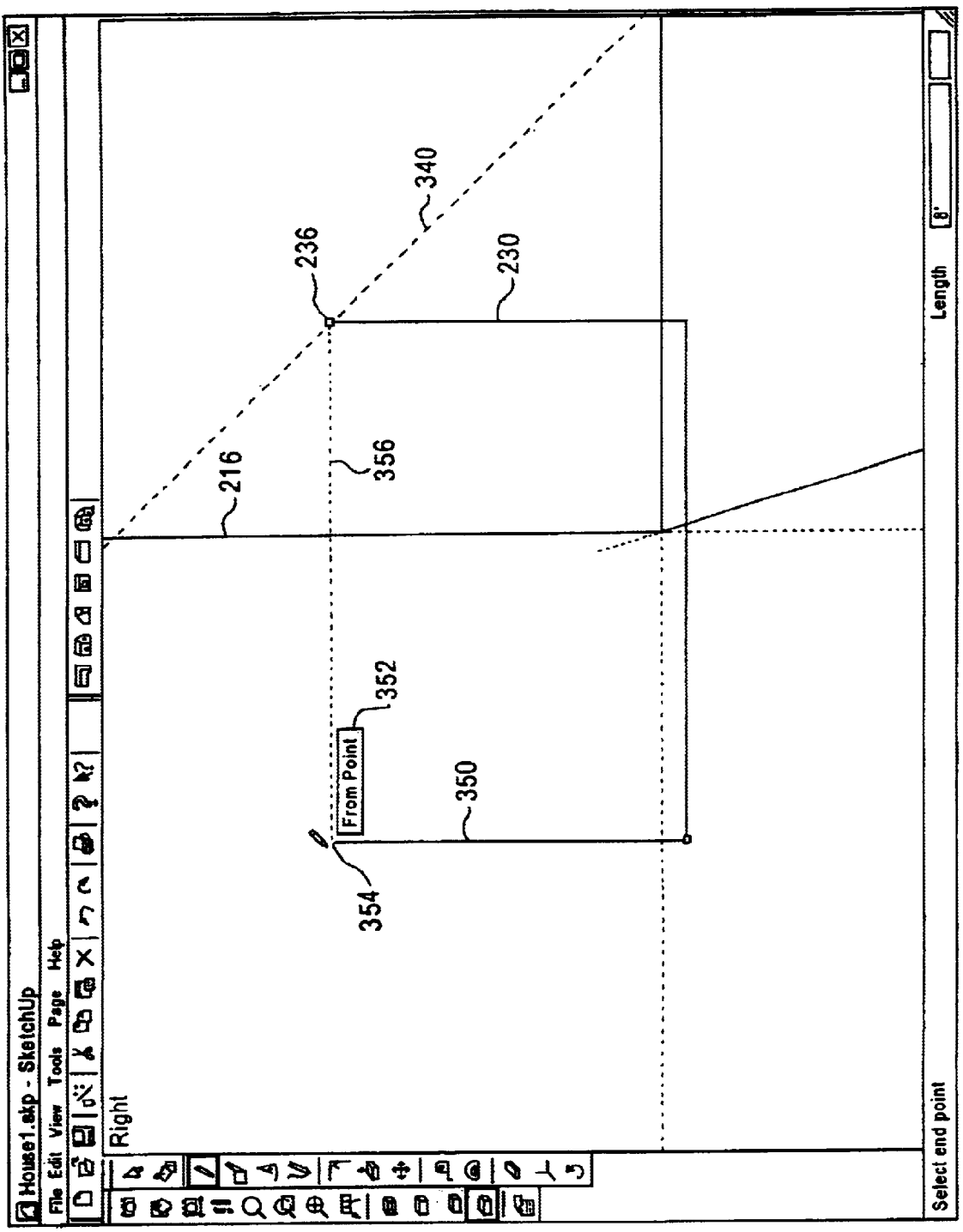

While the drawing of the line 350 is taking place, the length window 209 reports the line's current length (as shown, at 5'10"). When the user arrives at the endpoint 354, in FIG. 3G, a dotted line 356, or other cue 352, can become visible to inform the user that the endpoint 354 aligns with another endpoint 236. When the cursor position 354 is detected to be the same height on the z-axis 216 as the endpoint 236, the application infers that the user is intending to draw the line 350 at the same length as the previous line 230 and automatically displays the dotted line 356. With the help of the dotted line 356, a user can then properly position the endpoint 354 of the line 350 as intended. If the user is not actually intending to draw the line 350 equal in length to the line 230, then the visual cues 352 and 356 disappear from the screen when the cursor is moved from the endpoint 354.

Figure 3H:
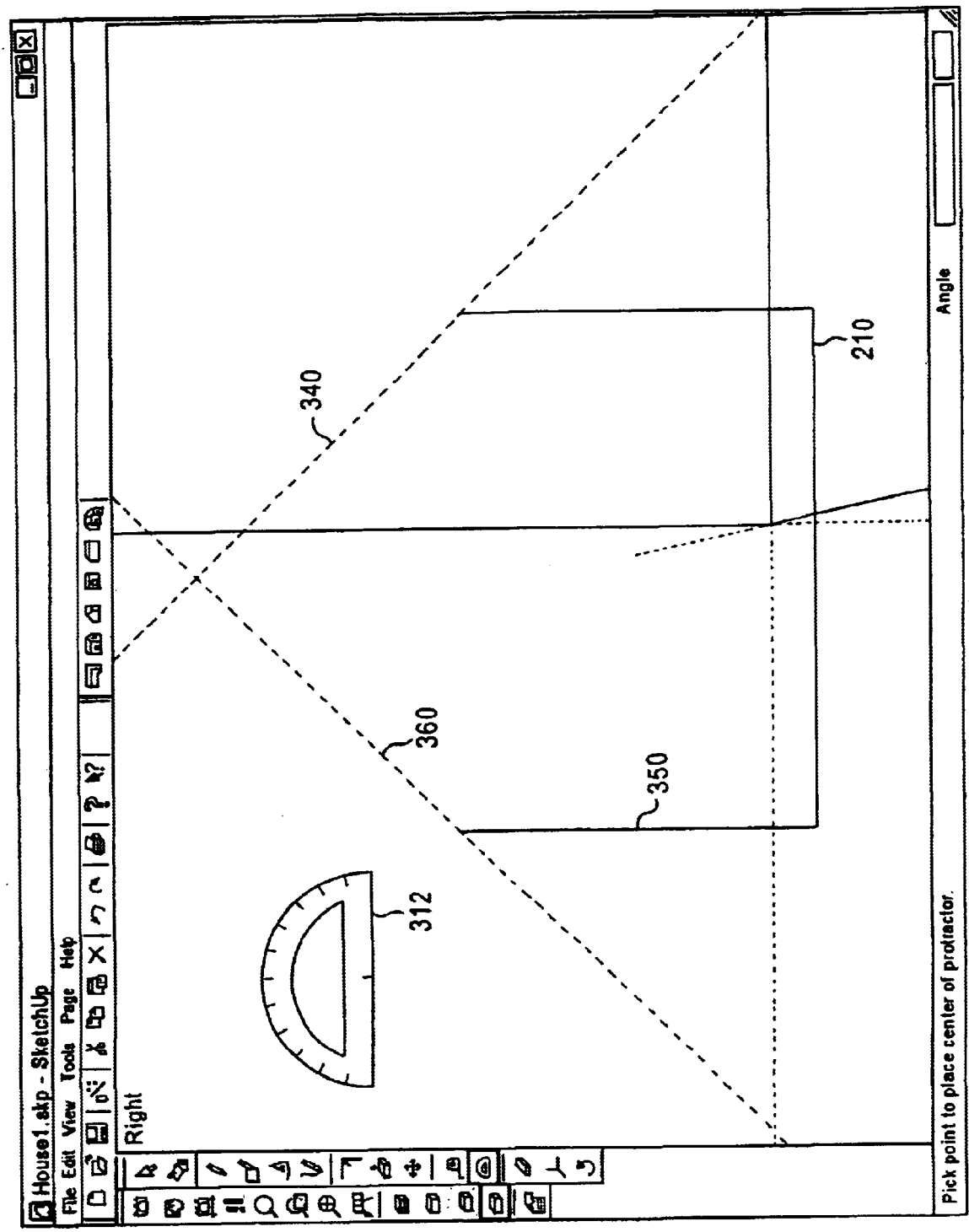
Figure 3I:
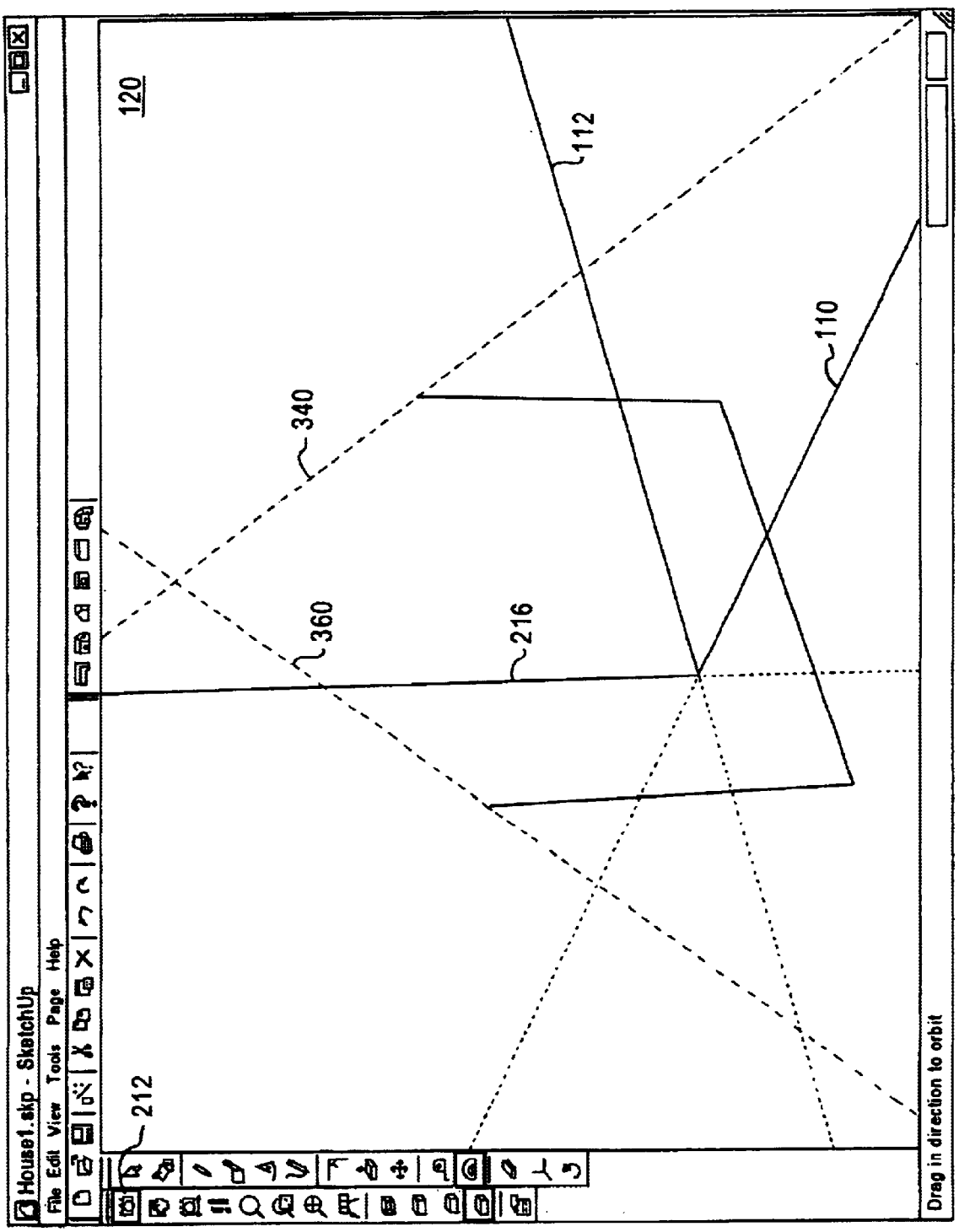

FIG. 3H illustrates the drawing of an angled construction line 360 at a complementary angle to line 340, using the protractor 312 as described previously. Line 240 and 360 intersect over the midpoint of the line 210. Using the orbit tool 212, the orientation of the display window 120 is modified to result in the view illustrated in FIG. 3I.

Figure 3J:
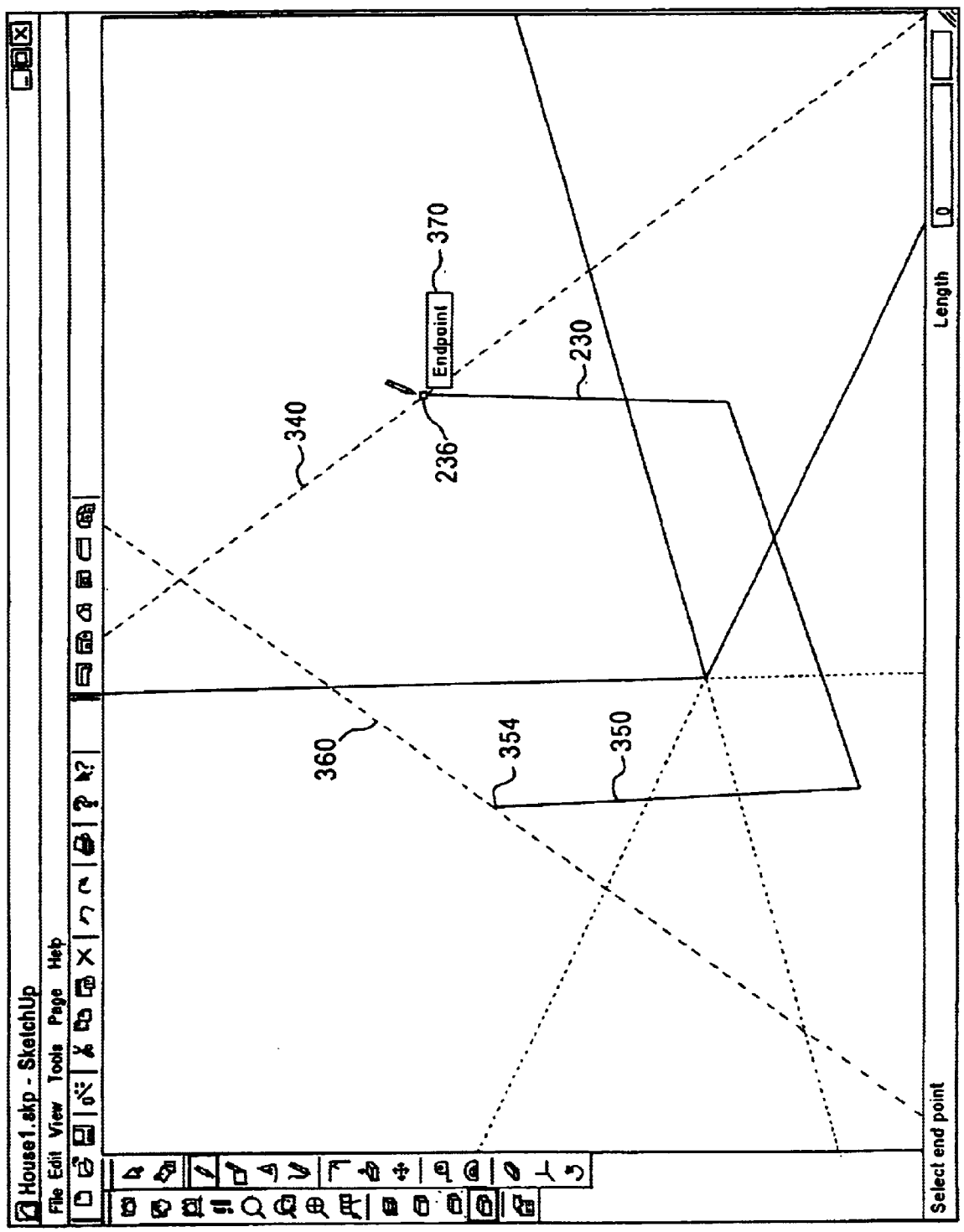
Figure 3K:
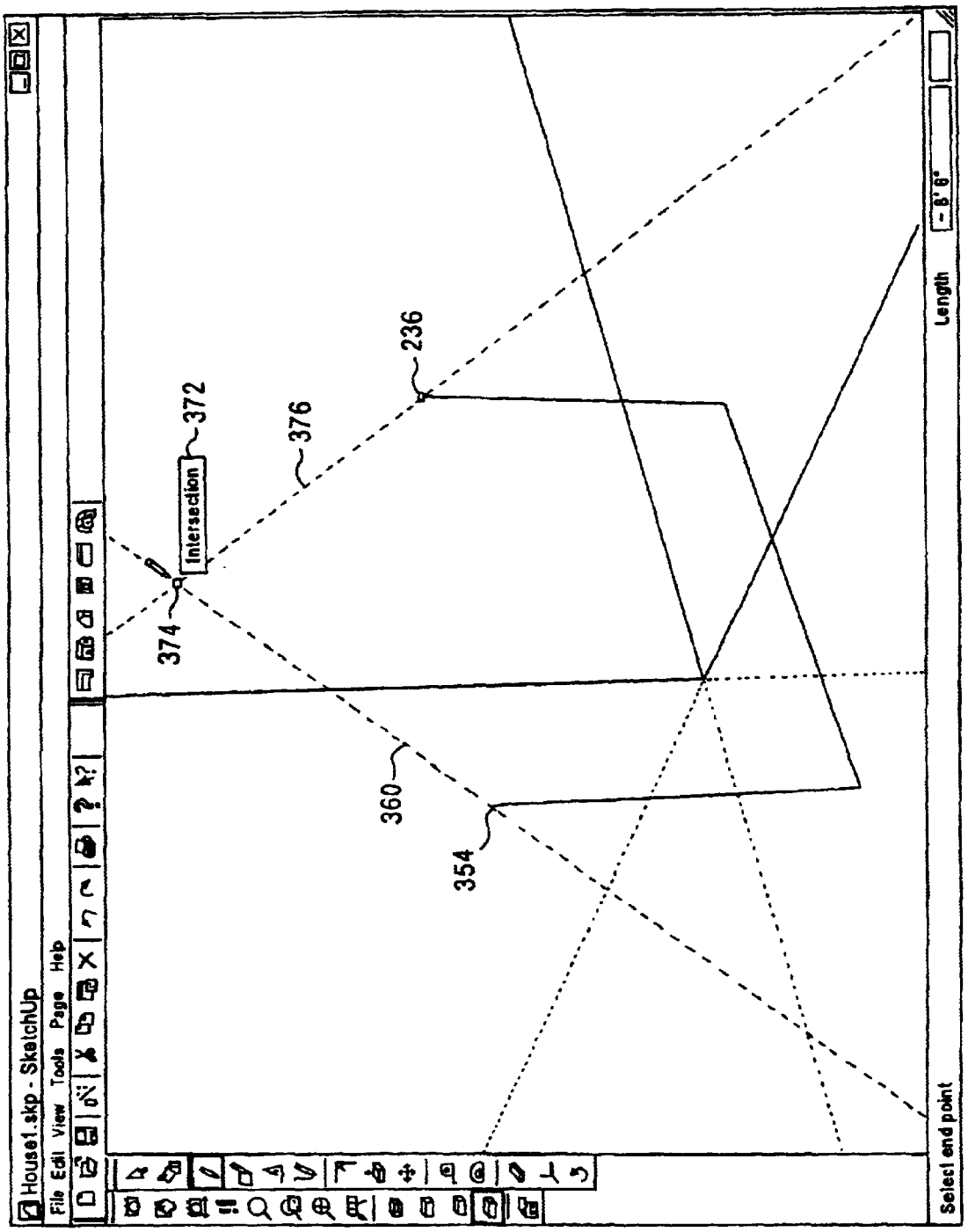
Figure 3L:
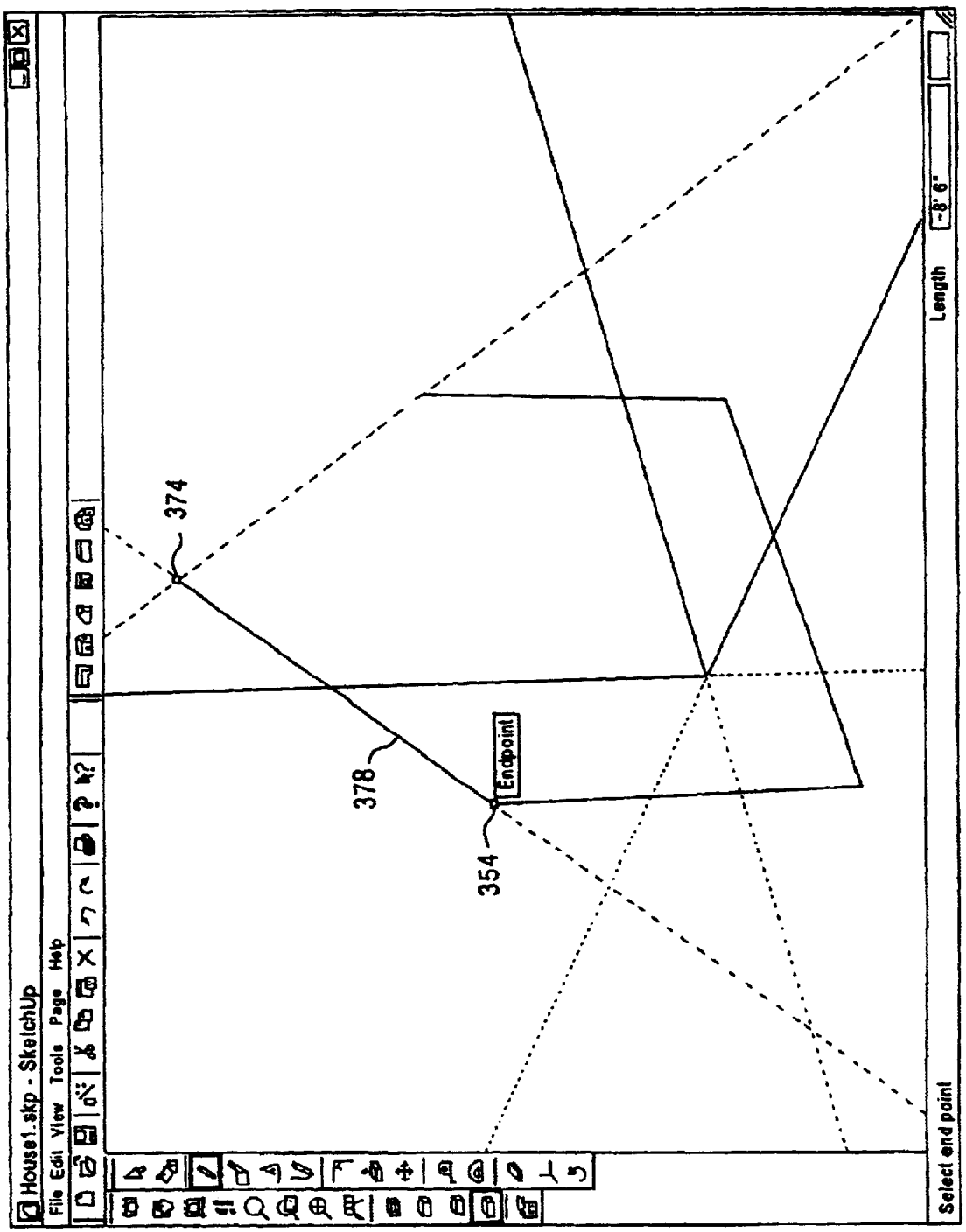

FIGS. 3J through 3L illustrate a sequence of line drawings that utilize the construction lines 340 and 360 to create the roof lines of the exemplary house. The pop-up cue 370, as depicted in FIG. 3J, provides an indication to a user that the pencil tool 202 is positioned over the endpoint 236. From the endpoint 236, a user can follow the construction line 340 until the intersection point 374 is reached, as shown in FIG. 3K. When the cursor is positioned at the intersection point 374, a visual cue 372 is displayed. The user can then continue drawing towards the endpoint 354 by following the construction line 360 to create the line 378 (see FIG. 3L).

Figure 3M:
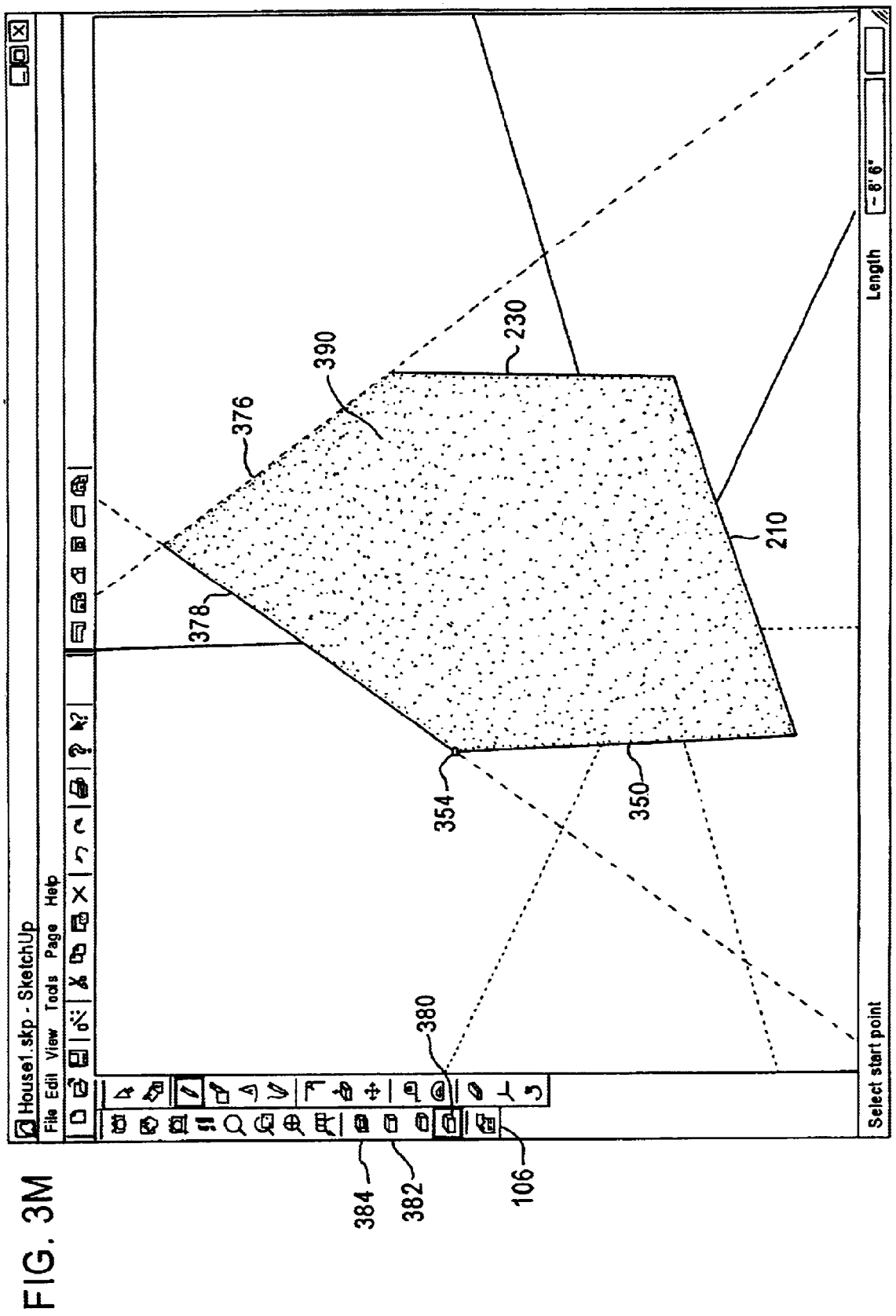

The previous drawings, however, illustrate the sequence of drawing the different lines in a particular order; the visual clues and cues and other features do not rely on how the line segments are connected, which can be accomplished in any order. Upon completion of the line 378 as by clicking on the endpoint 354, as depicted in FIG. 3M, the front of the house 390 is created and may change color. Near the bottom of column 106, the icon 380 is shown in an activated state, e.g., pushed down and highlighted. The icon 380 selects how objects are depicted to the user; in particular, this icon 380 indicates a shaded-with-pattern view mode. Icons for other depiction modes include wire-frame 380, hidden-line 382, etc. With the shaded-with-pattern view selected, the house front 390 changes color when completed.

The change in color is a visual clue that the house front 390 is now considered by the system as more than simply five line segments but as a integral two-dimensional shape. The present graphical design and modeling application determines the five lines 210, 230, 376, 378 and 350 form a closed shape and all reside in the same plane. With these constraints being met, these independent features are converted into a shape, which can be a face, of a yet to be determined, three-dimensional object. One way of interpreting this is to think of the house front 390 as having skin placed across it. In this way, an object can be drawn in a familiar, two-dimensional way and then automatically be-transformed into a face of a three-dimensional object that can be manipulated as more fully described below.

Detecting Two-dimensional Faces

Within a graphical design and modeling environment, the elements of the model are typically stored within a computer system's memory. Storing the descriptions of vertices, edges and faces, as objects with respect to a global coordinate system is usually adequate for effective storage of the graphical elements, regardless of their complexity. Edges can include pointers or other references to attached vertices, and a vertex can also include references to all the edges and faces connected thereto.

Figure 4:
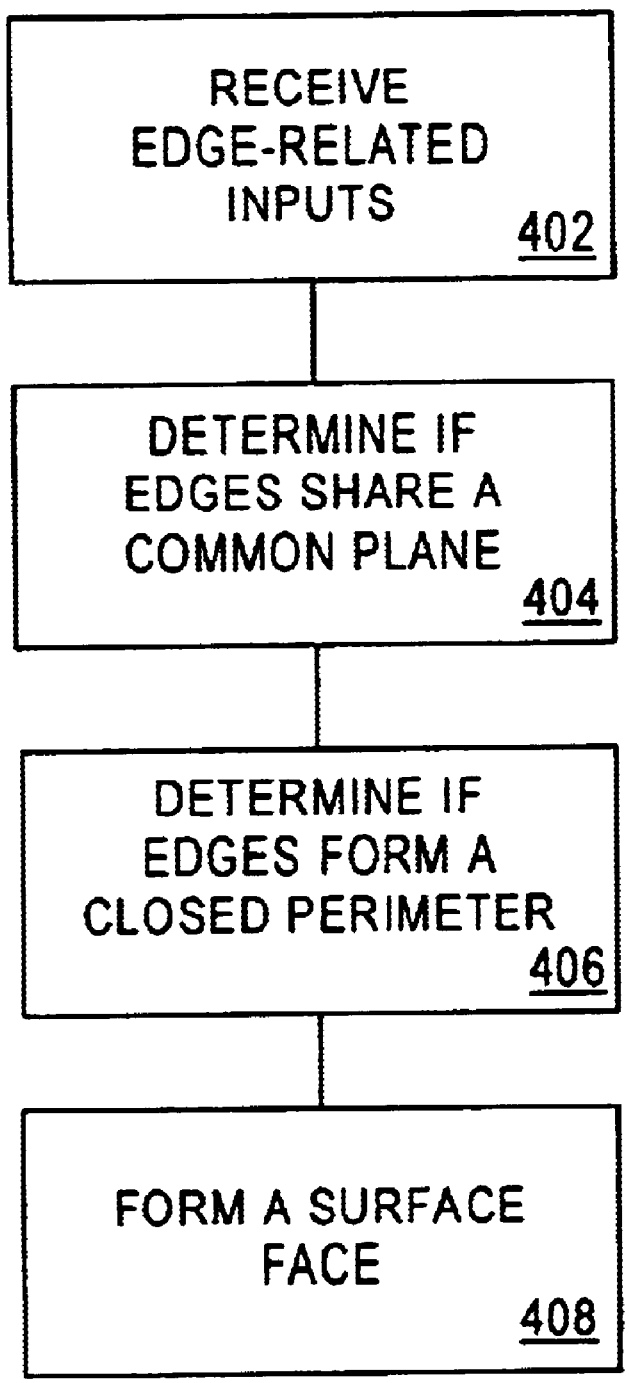
FIG. 4 illustrates a flowchart for the creation of a two-dimensional surface face according to certain embodiments of the present invention.

The flowchart of FIG. 4 illustrates the operation of one embodiment of creating a surface face from a plurality of multiple edges. In determining whether or not a face should be created from individual edges, the input edges are re-evaluated in response to an edge-related editing operation, such as drawing line segment 378, (step 402).

Next, a depth-first search is performed to locate connected edges that share a common plane (step 404). In one embodiment, when traversing a plane and a vertex is reached with multiple edges, the left-most co-planar edge is selected to find the most compact shape. A list of visited edges and vertices can be maintained to avoid endless looping. If the result of the search returns back to the first line segment, then the perimeter is considered closed (step 406).

In step 408, the coplanar edges that form a closed perimeter are associated together, along with the plane bounded by this perimeter (i.e., a skin), to form a surface face (e.g., house front 390). As seen later, this surface face can be manipulated to form three-dimensional volumes and geometries.

In addition to the drawing of new edges, edge-related inputs can also include the erasing of existing edges from a model. When an interior edge is erased from between separate surface faces, the surface faces are combined into a new, single surface face, if the remaining edges form a closed shape and lie in a common plane.

The Erase Tool

Figure 5A:
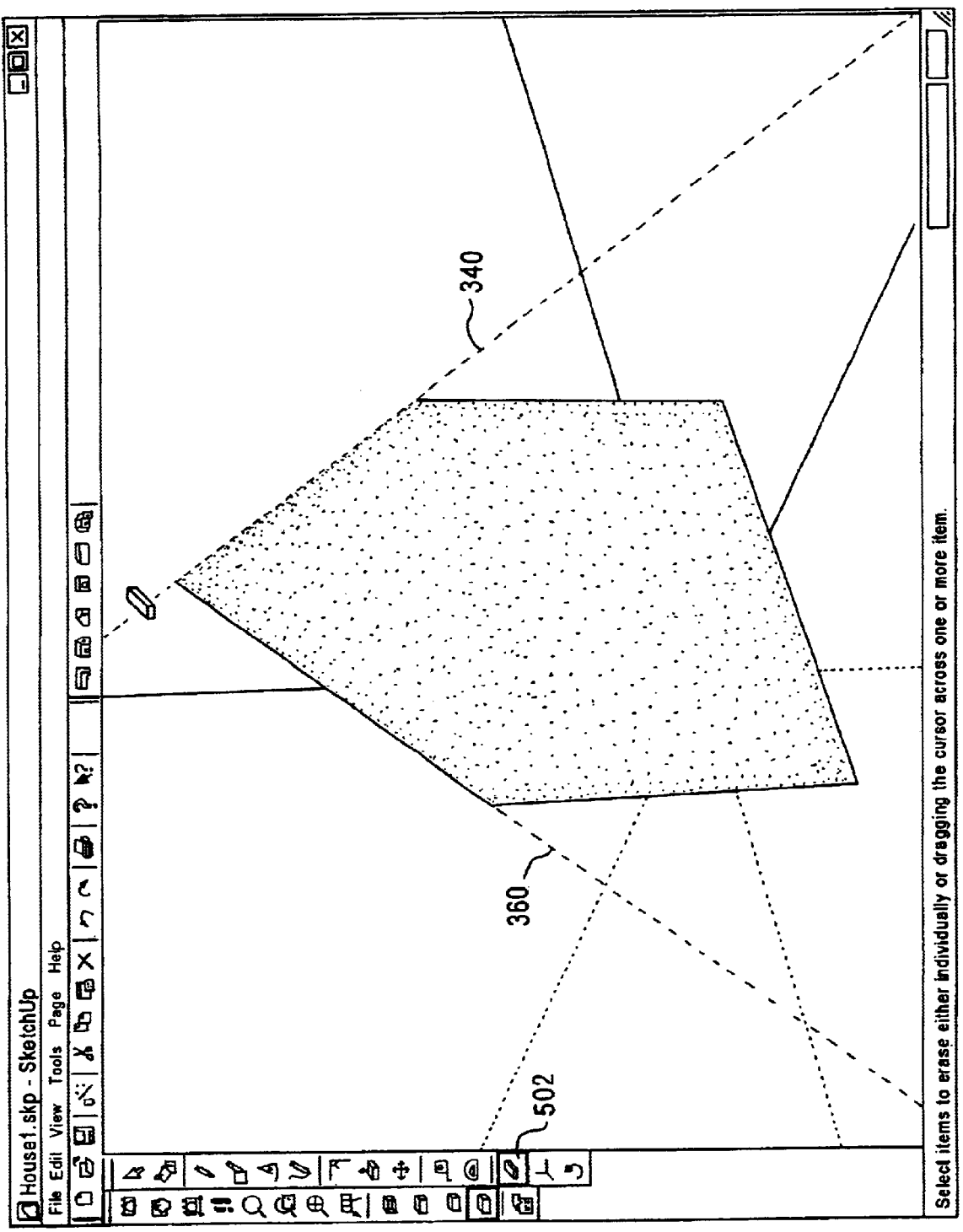
FIGS. 5A and 5B illustrate a sequence of screen shots in which a user operates an erase tool.
Figure 5B:
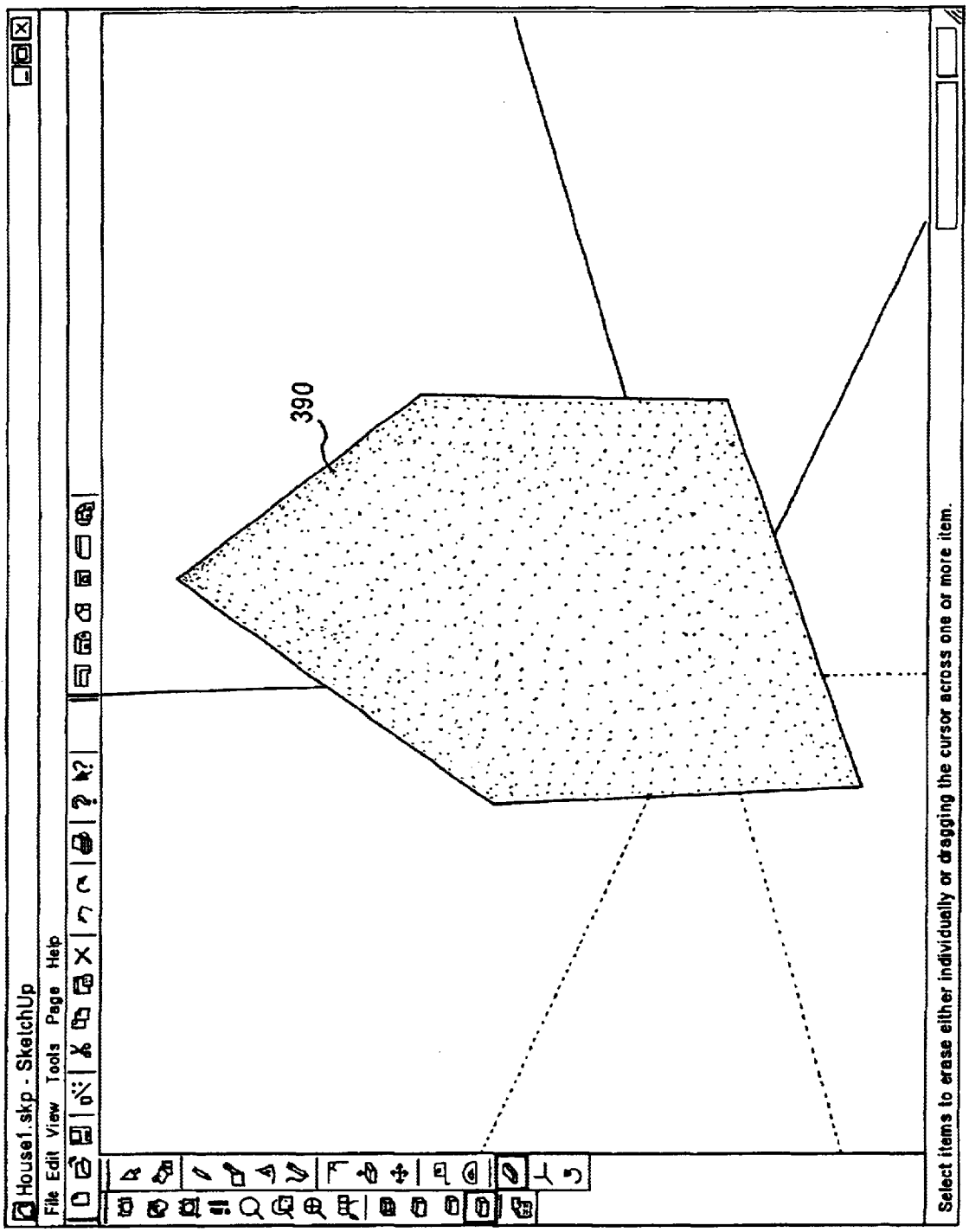

FIGS. 5A and 5B illustrate the use of the erase tool 502. The erase tool 502 provides positive feedback to a user of the particular objects that will be erased if the erase operation is completed. The erase tool 502 can be used to highlight the construction lines 340 and 360, the intended objects for deletion. Once the erase tool 502 is selected, a user can move the cursor over the object and, for example, hold down the left mouse button; doing so causes the object to be highlighted so that the user can predict the effect of the erase operation. Releasing the held mouse button causes the erase operation to complete; while pressing the ESC key, or other predetermined key, causes the erase operation to be aborted. FIG. 5B illustrates the effect of completing the erase operation started in FIG. 5A.

Inferancing Aids When Drawing in Three-dimensions

The present graphical design and modeling system allows a user to draw edges, lines and other features using tools familiar to a designer and to do so freely within three-dimensional space. Unlike many other modeling programs, the present application environment allows these constructions to be accomplished very efficiently without the need to understand a variety of different complicated tools and concepts. The sequence of FIGS. 6A–6S illustrate how a user can draw various objects in three-dimensions in any order, and the tools and features that are available to help the user, within the present graphical design and modeling application.

Figure 6A:
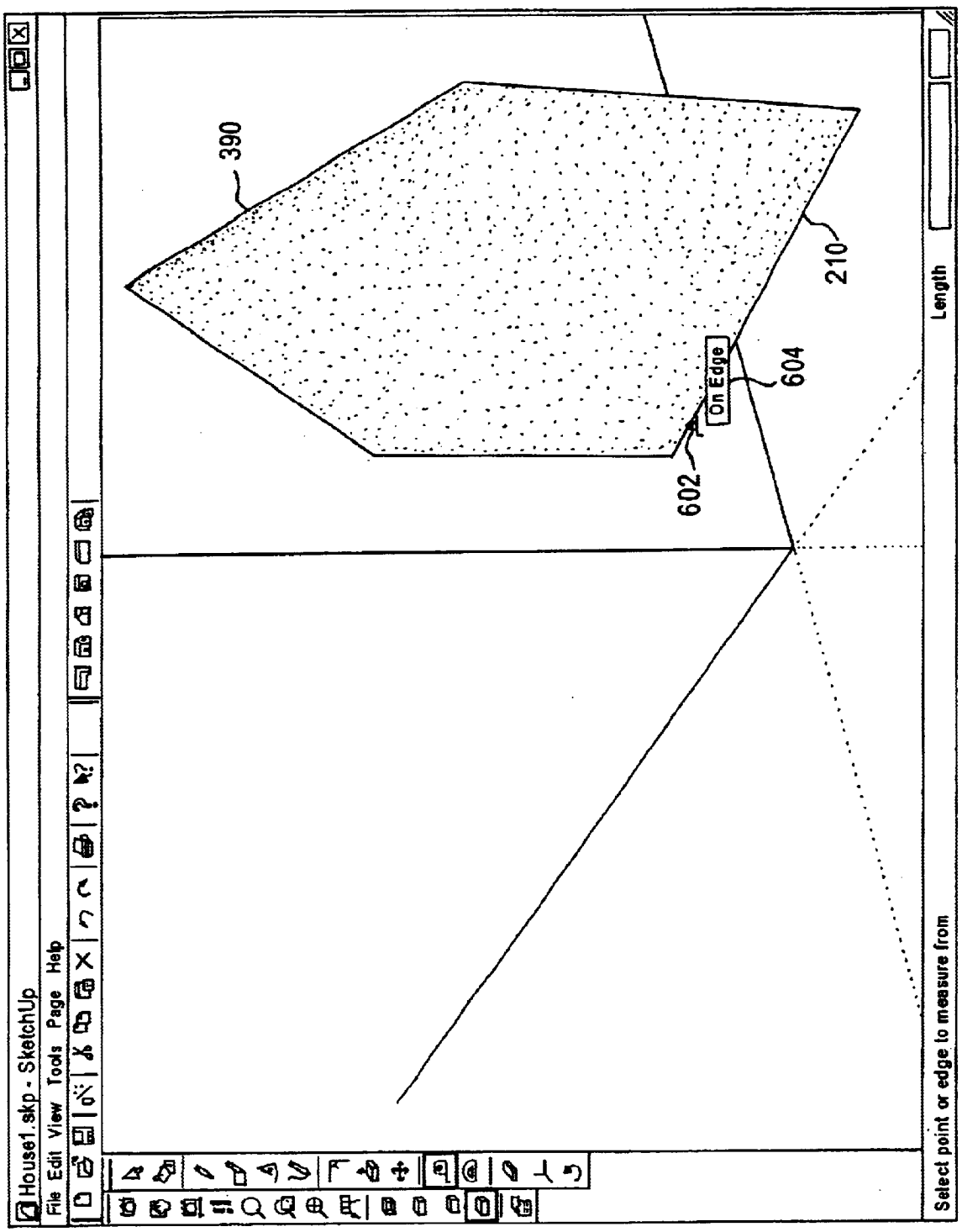
FIGS. 6A–6S illustrate a sequence of screen shots in which a user completes the outline of an exemplary house with the aid of visual inferencing and edge positioning cues according to embodiments of the present invention.
Figure 6B:
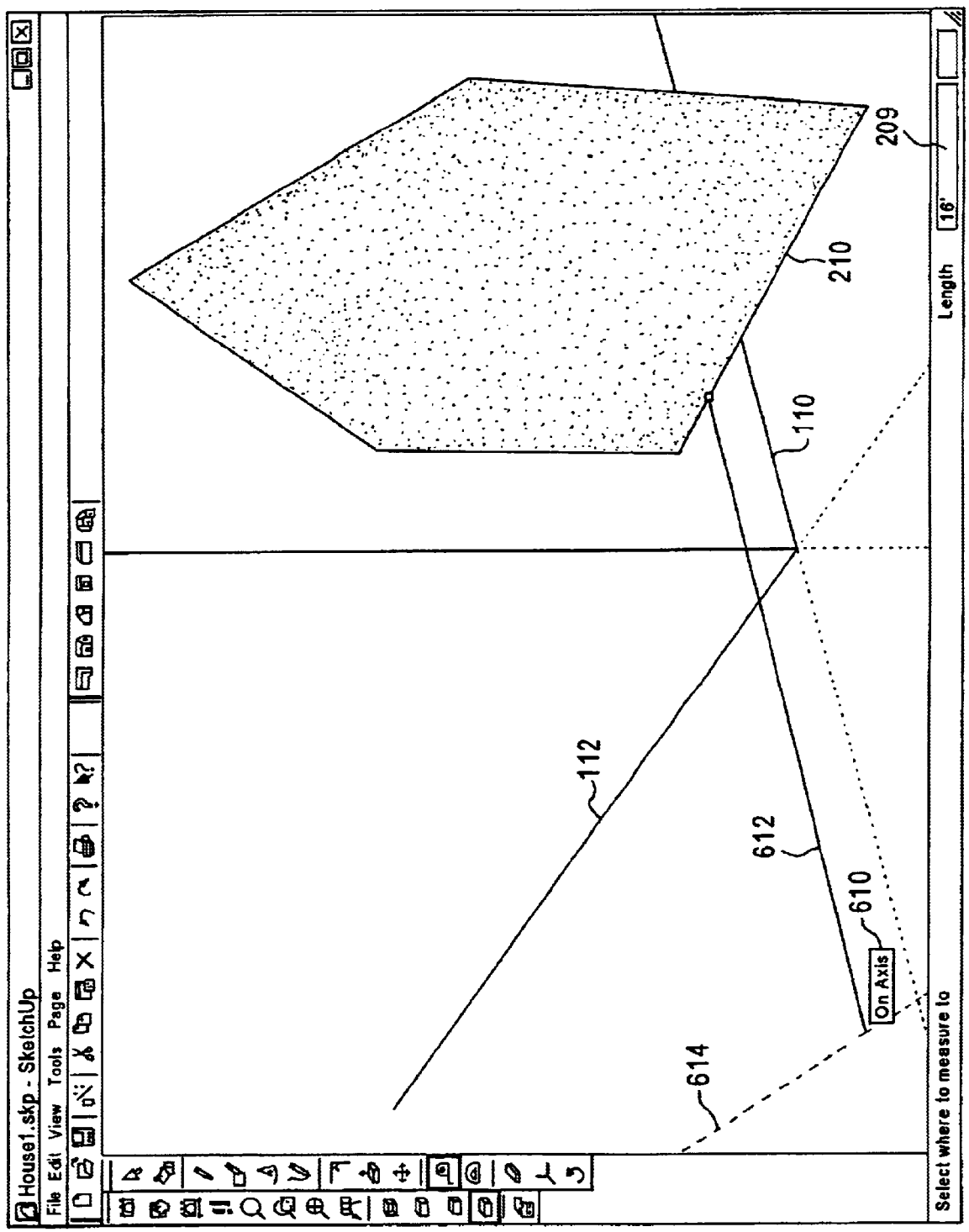

The tape measure tool 602, depicted in FIG. 6A, can be positioned over the edge 210 (with the help of the visual pop-up cue 604) and dragged to create and position a construction line 614. As shown in FIG. 6B, the placement of the construction line 614 is aided by the length display window. 209, that indicates the line 614 is 16 feet from the edge 210, and the pop-up cue 610 that shows the tape measure tool 602 has been dragged parallel to the axis 110 (i.e., perpendicular to the edge 210).

Figure 6C:
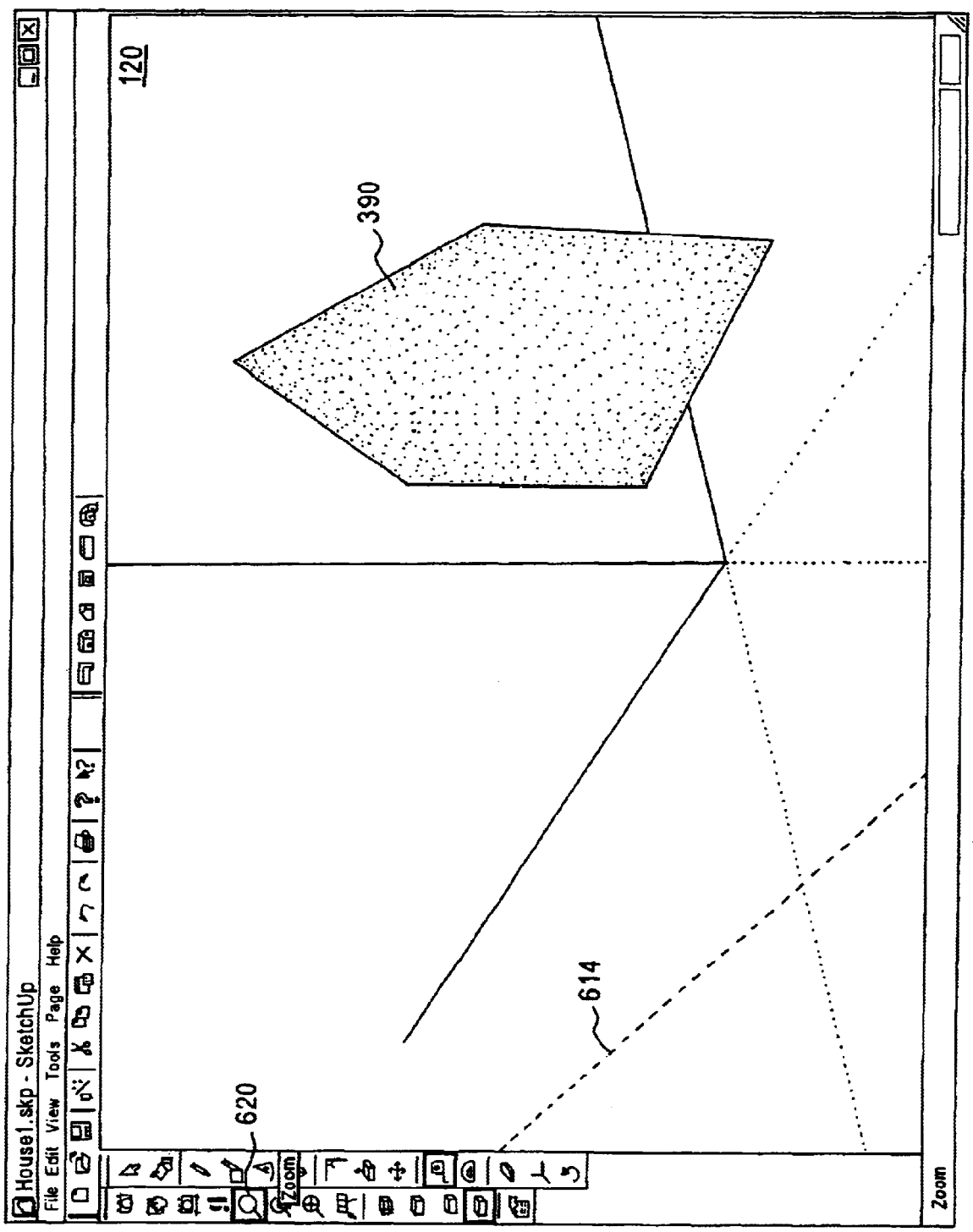

Once the construction line 614 is positioned, a zoom tool 620, is used, as depicted in FIG. 6C, to re-size the scene depicted in the display window 120. As commonly known, the apparent distance to a displayed object 390 can be changed by zooming-in or zooming-out. Typically, after selecting the zoom tool 620, dragging a mouse up or down effects the appropriate zoom function.

Figure 6D:
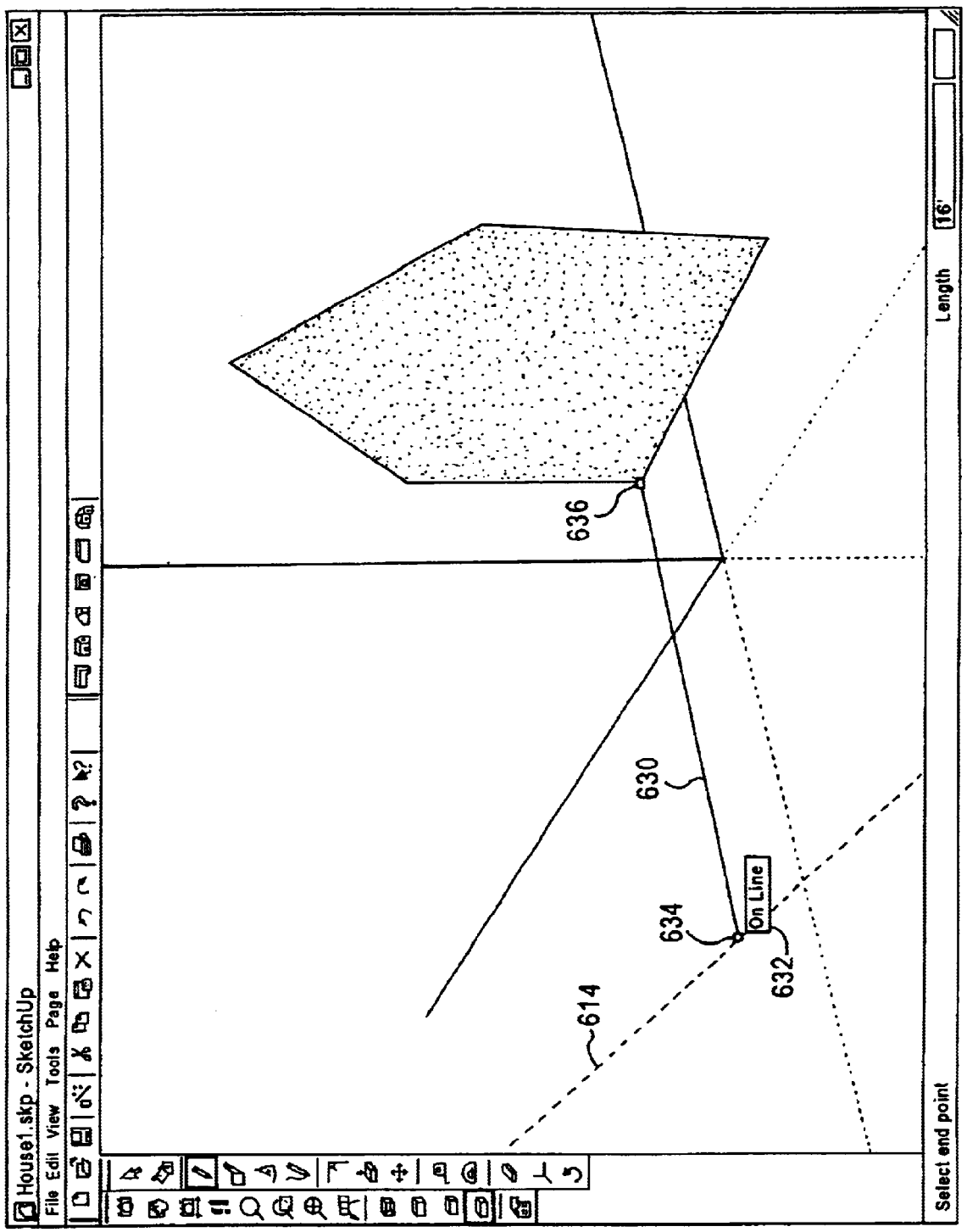

Using the construction line 614 and other visual cues 632, a user can draw the line 630 along the ground edge of the house between the endpoints 634 and 636, as shown in FIG. 6D. Earlier, in FIG. 3G, an inferencing cue was illustrated that assisted a user in drawing lines Of equal length. In that example, the endpoint that was referenced for purposes of the inferencing function had been recently drawn and its parameters were available for use in generating inferencing information. In some instances, inferencing with relation to an object may require reference to a point or line that was created a relatively long time before the current object. The present graphical design and modeling application could maintain a database, for use with an inferencing function, that stores parameters of every point, edge line or object in a drawing. The storage requirements required for such an approach, as well as the time needed to search such a database, would be unmanageable in even a moderately complex drawing. A preferable approach is to maintain an inferencing reference list of the last five to ten objects that were drawn.

Figure 6E:
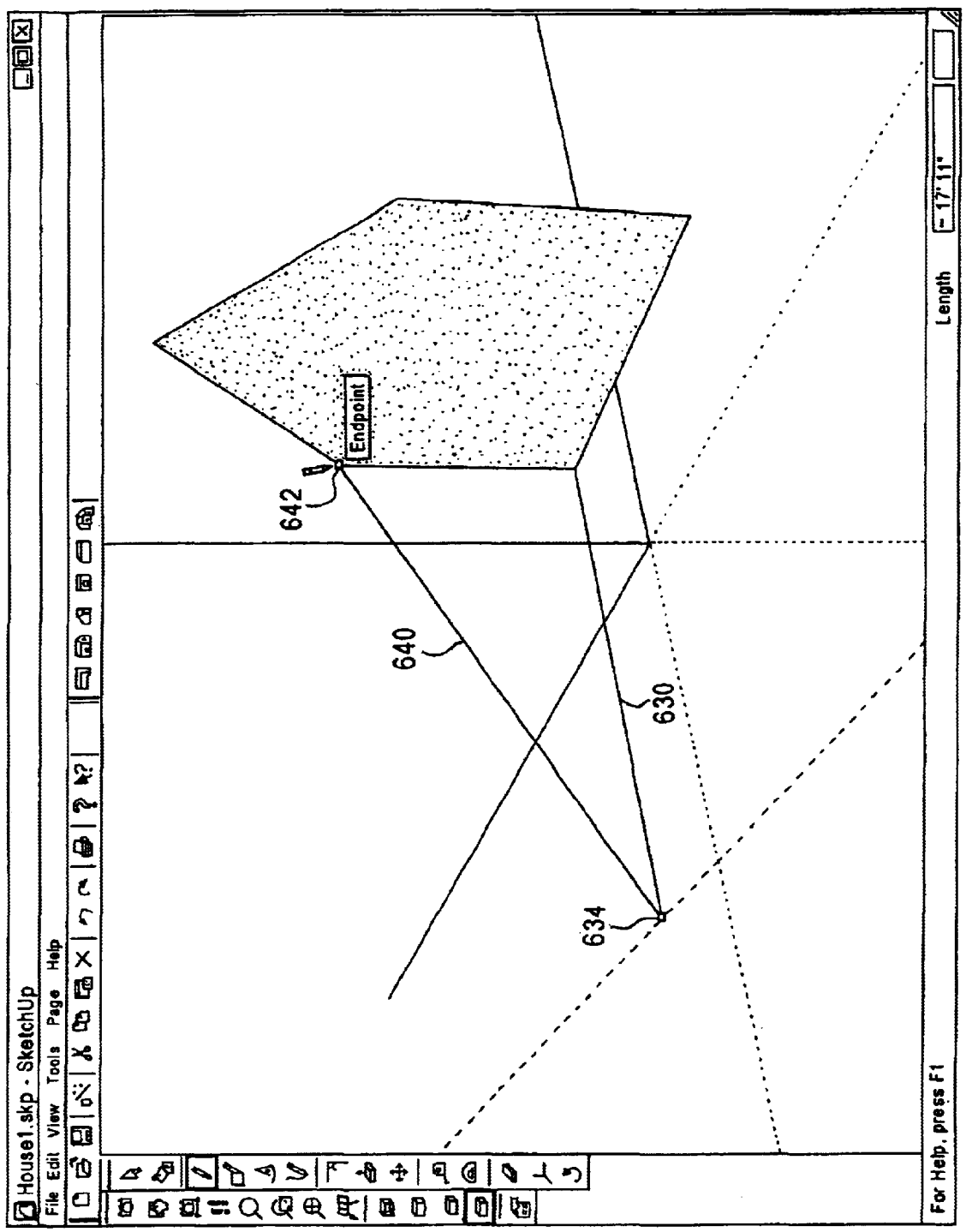
Figure 6F:
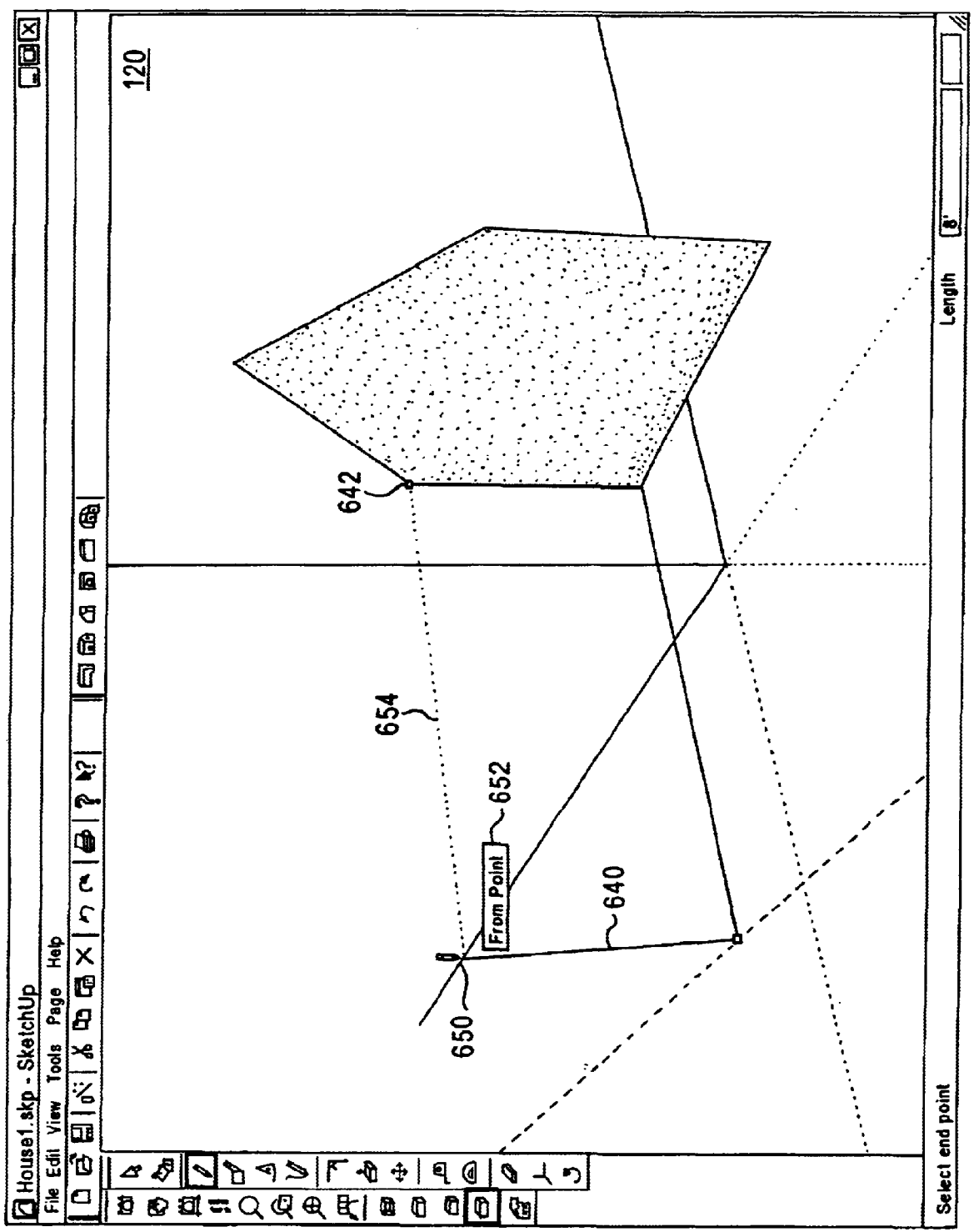

FIG. 6E illustrates another technique for controlling what inferencing information is displayed to a user. After drawing the line 630, the user can continue by drawing another line 640 from the endpoint 634. During the drawing of the line 640, the user can drag the line over to the endpoint 642 to identify that endpoint 642 as a feature of the drawing to reference for subsequent inferencing determinations. The user can then move the cursor back to the intended direction of the line 640, as shown if FIG. 6F, and when the endpoint 650 is the same height as the endpoint 642, the inferencing cues 652 and 654 appear on the display window 120.

Figure 6G:
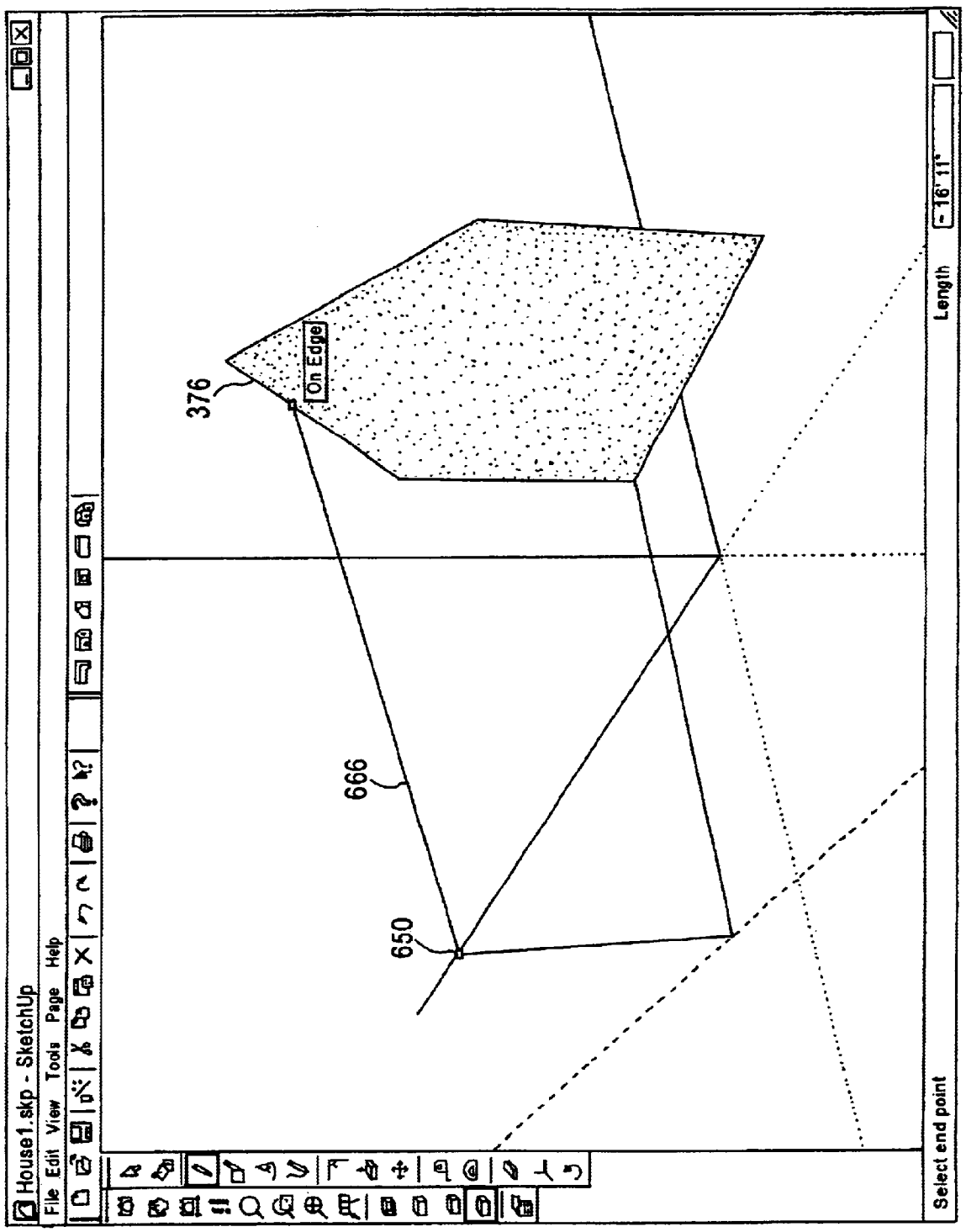
Figure 6H:
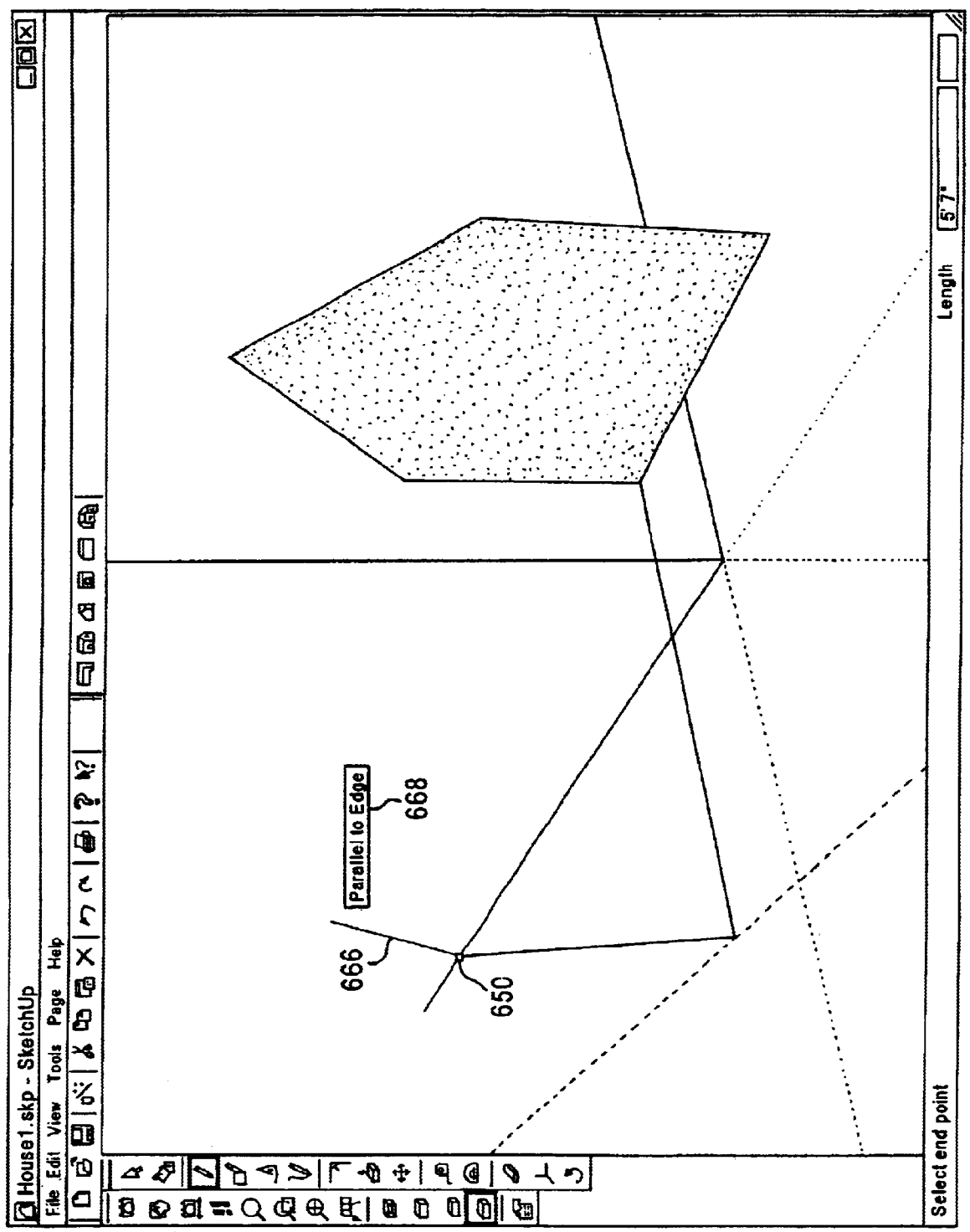
Figure 6I:
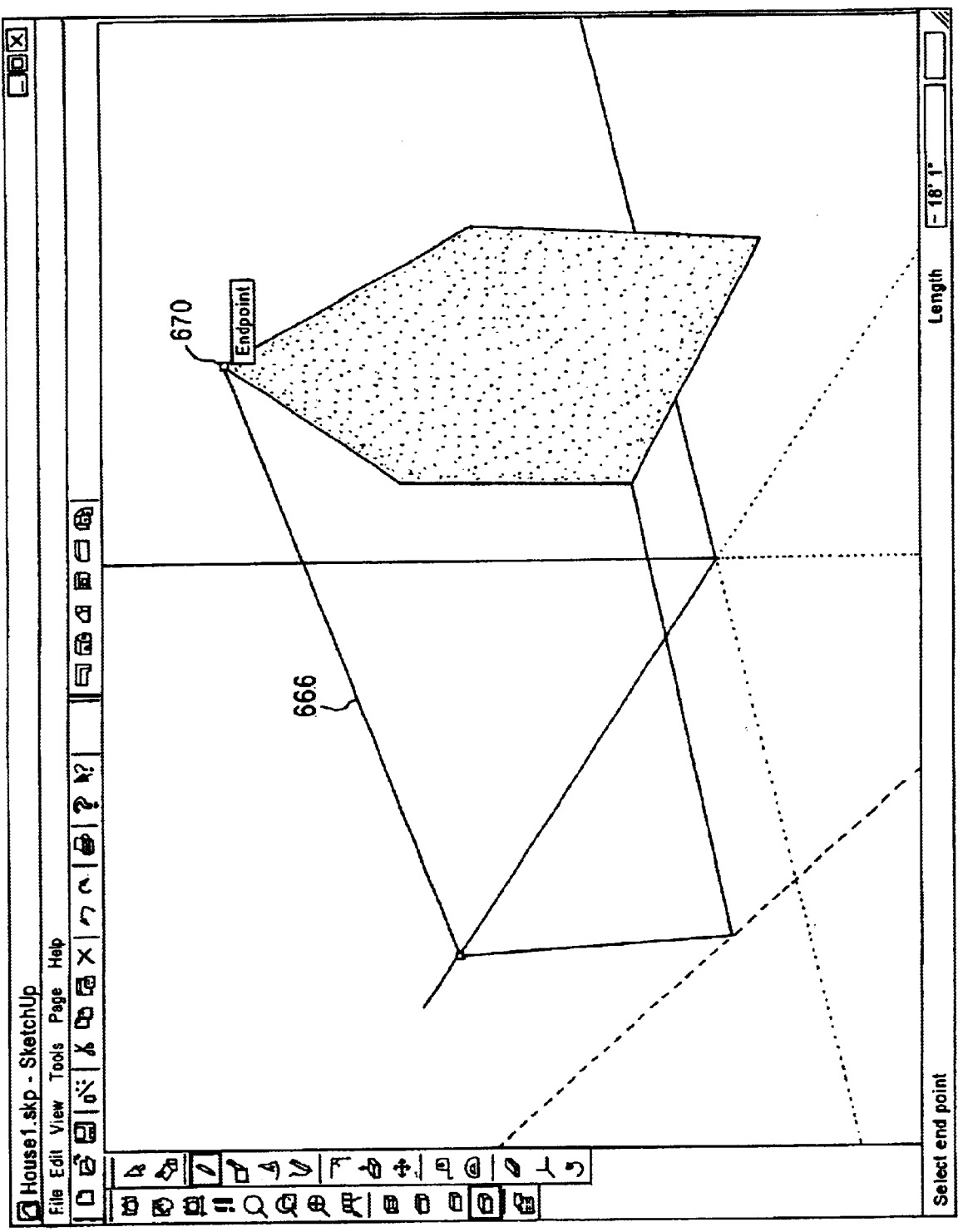
Figure 6J:
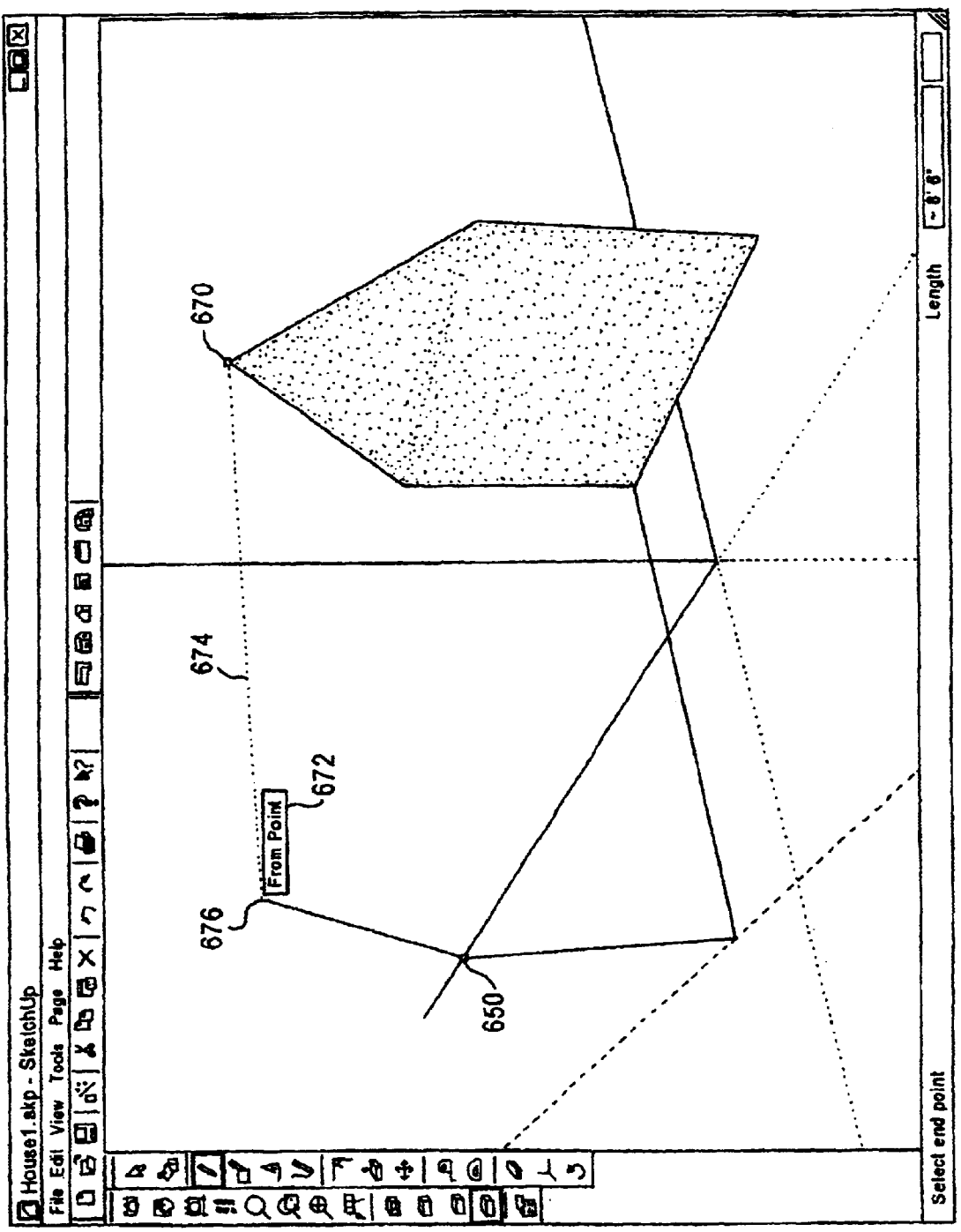
Figure 6K:
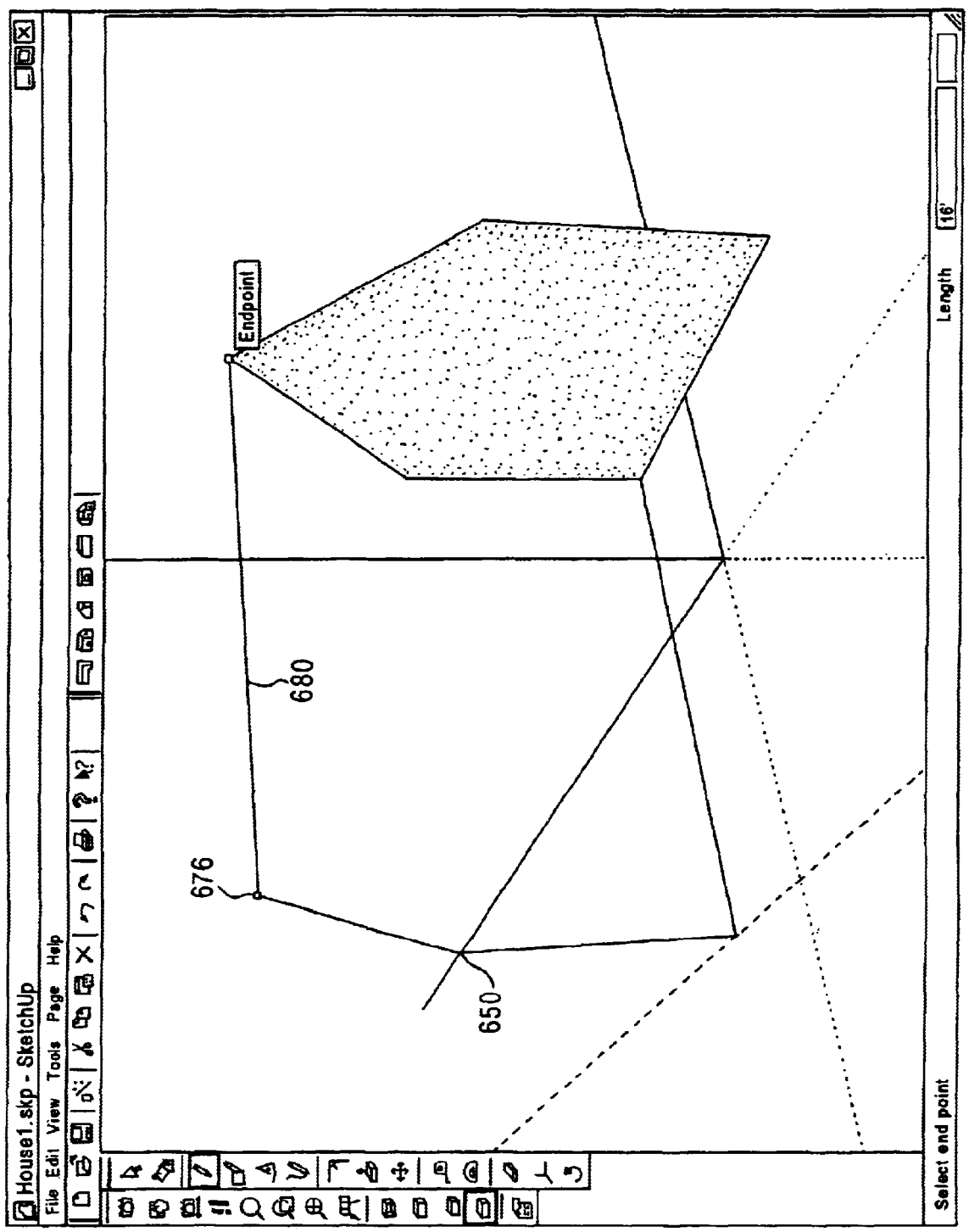

When a user draws lines that are parallel or perpendicular to the displayed axes, a number of helpful cues and inferences, as described earlier, are provided to assist the user in properly orienting a line. The sequence of FIGS. 6G through 6J depicts inferencing and other cues that help users to draw lines that are not oriented along one of the axes 110, 112 and 216. In FIG. 6G, the line 666 is started at the endpoint 650 and then extended over the edge 376 in order to identify the edge 376 as a possible inferencing reference. When the user returns to drawing the line 666, as shown if FIG. 6H, in an intended direction, the cue 668 appears to indicate that the line 666 is parallel to the edge 376. Typically, a line is drawn in one color, for example black; however, when the line 666 is drawn parallel to another line, e.g. 376, the color of the line 666 (or the color of both parallel lines) can be changed to another color, for example purple. The user can continue by identifying another endpoint 670 as an inferencing reference point, as shown in FIG. 6I. Thus, as depicted in FIG. 6J, when the user draws the line 666 as intended, the line's color is purple and when the appropriate endpoint 676 is reached, the pop-up window 672 and the dotted line 674 appear on the screen to show the proper relation to the endpoint 670. The user can then complete ridge line 680, as shown in FIG. 6K.

Figure 6L:
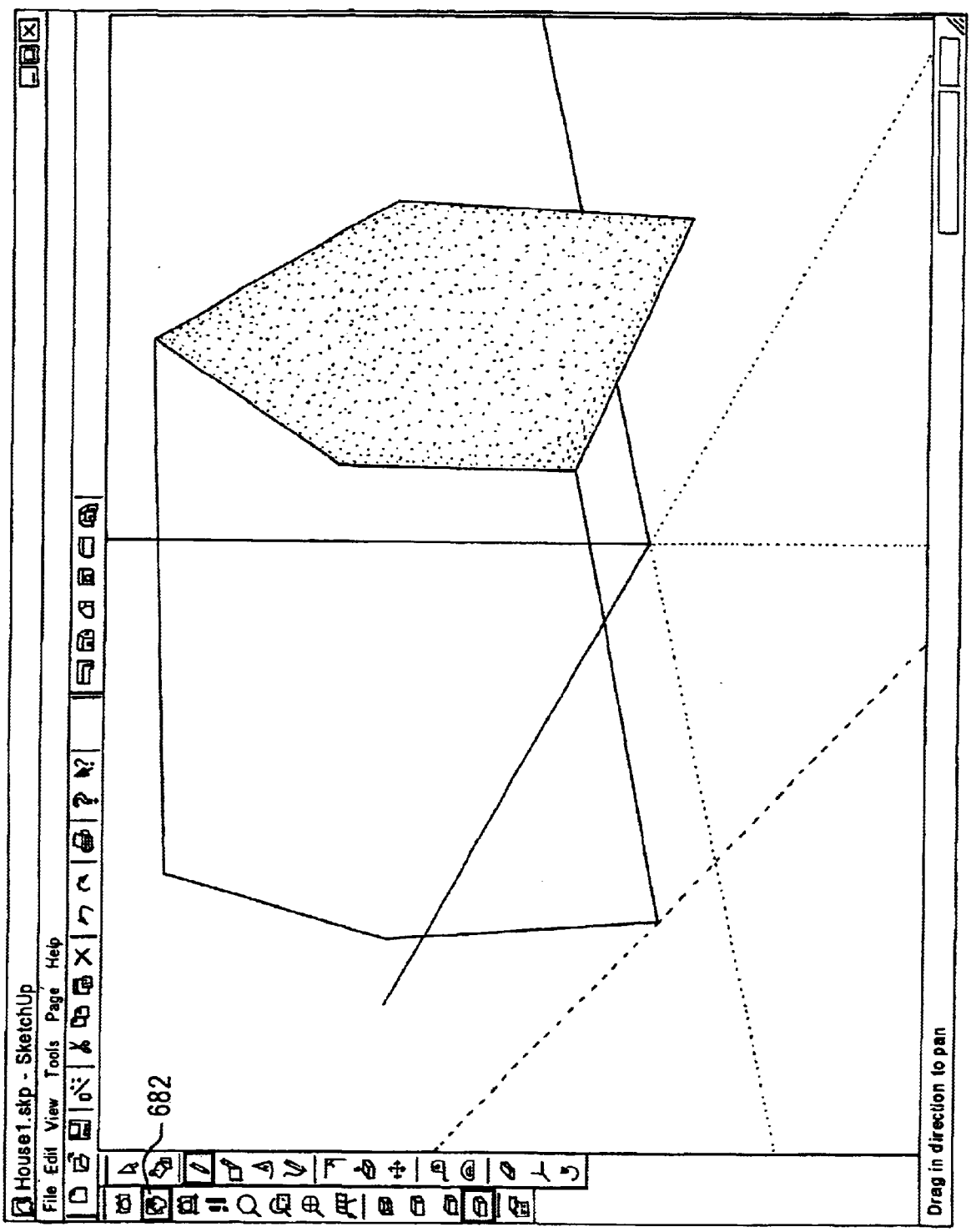

The effect of a dolly tool 682 is illustrated in FIG. 6L. The dolly tool 682 is typically used to re-adjust, in two-dimensions, the user's view of the display window 120. If the screen display visible to the user is considered to be a viewport into a larger world, then the pan tool 682 can be used to re-position this viewport to the left, right, up or down in relation to the world.

Figure 6M:
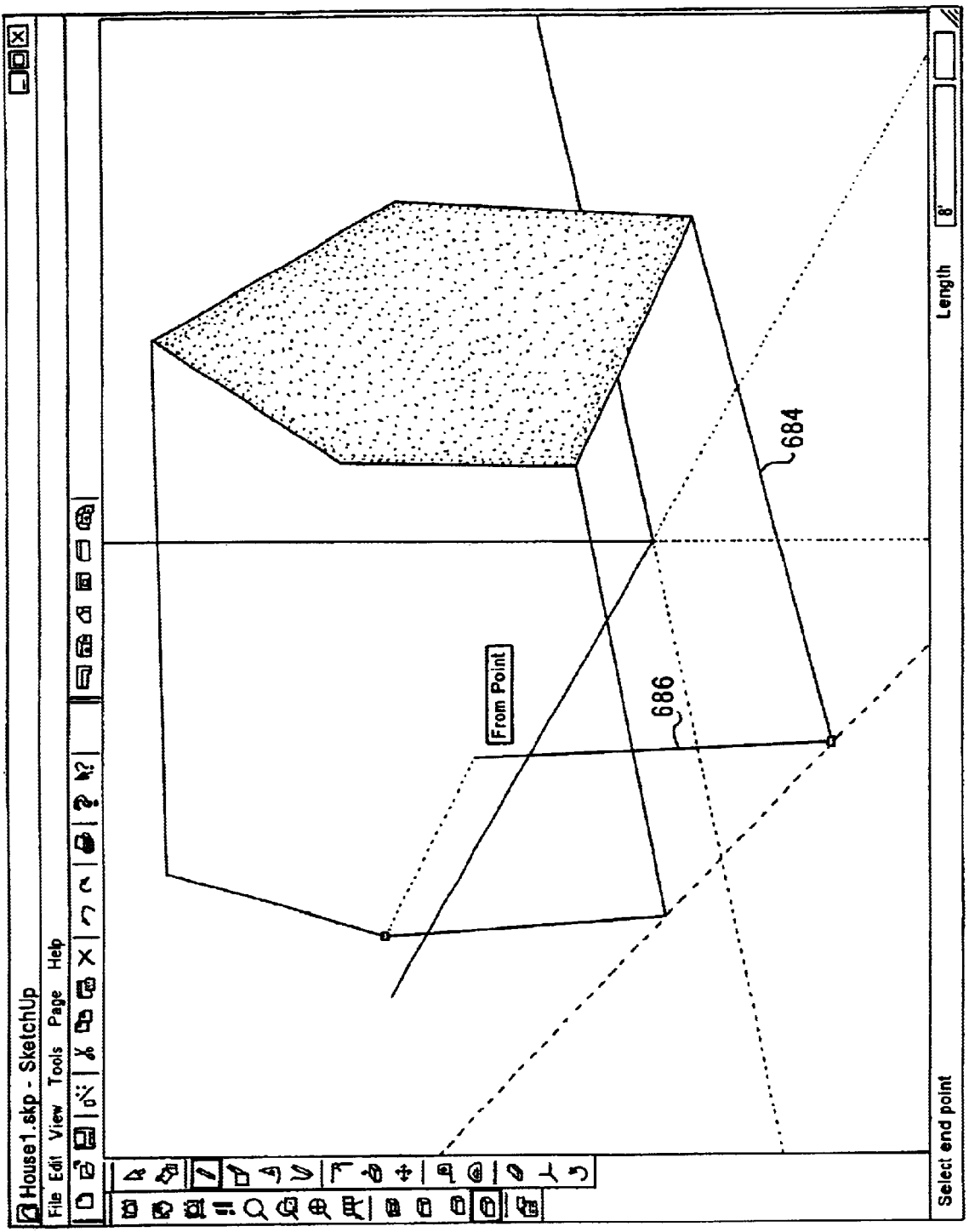
Figure 6N:
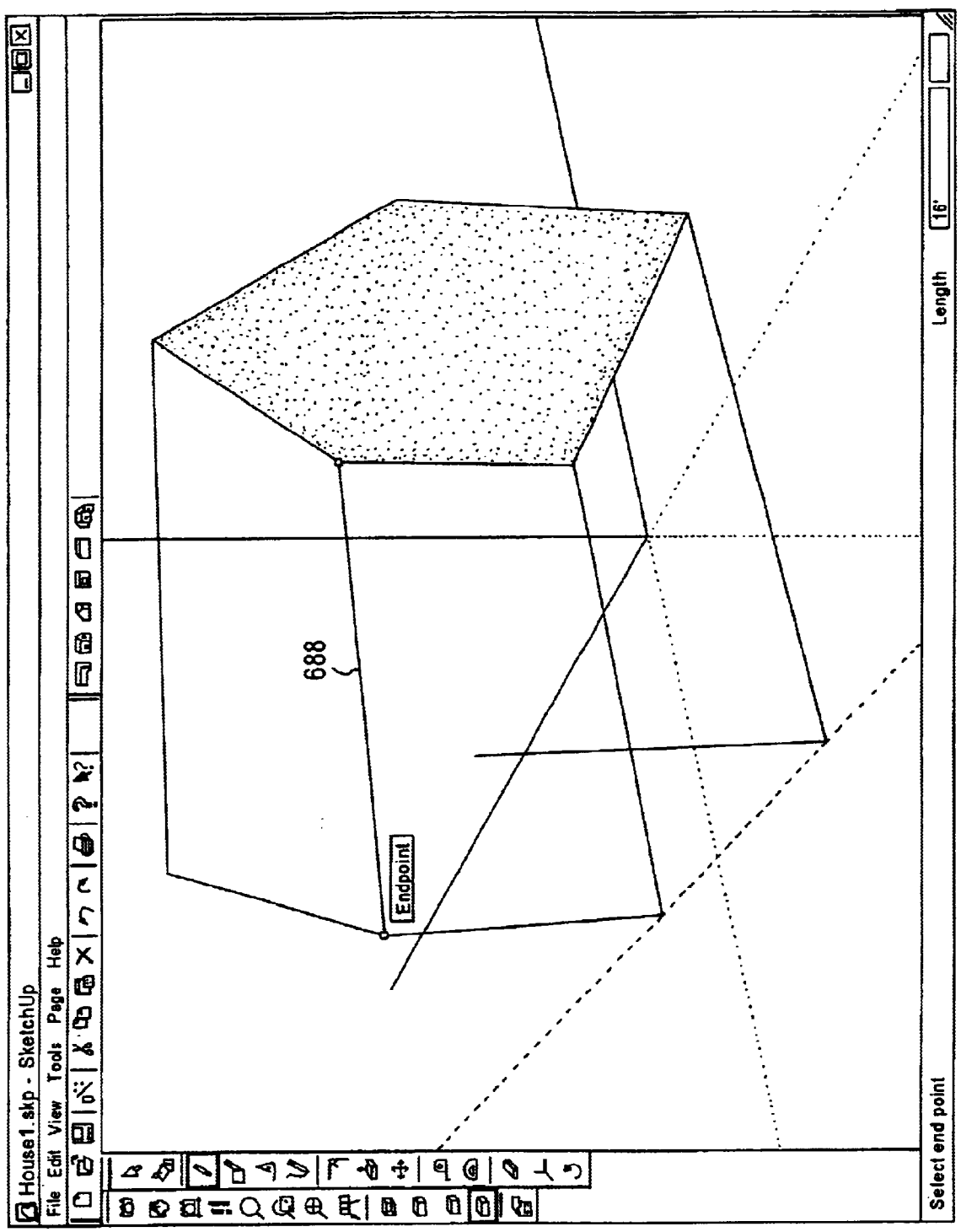
Figure 60:
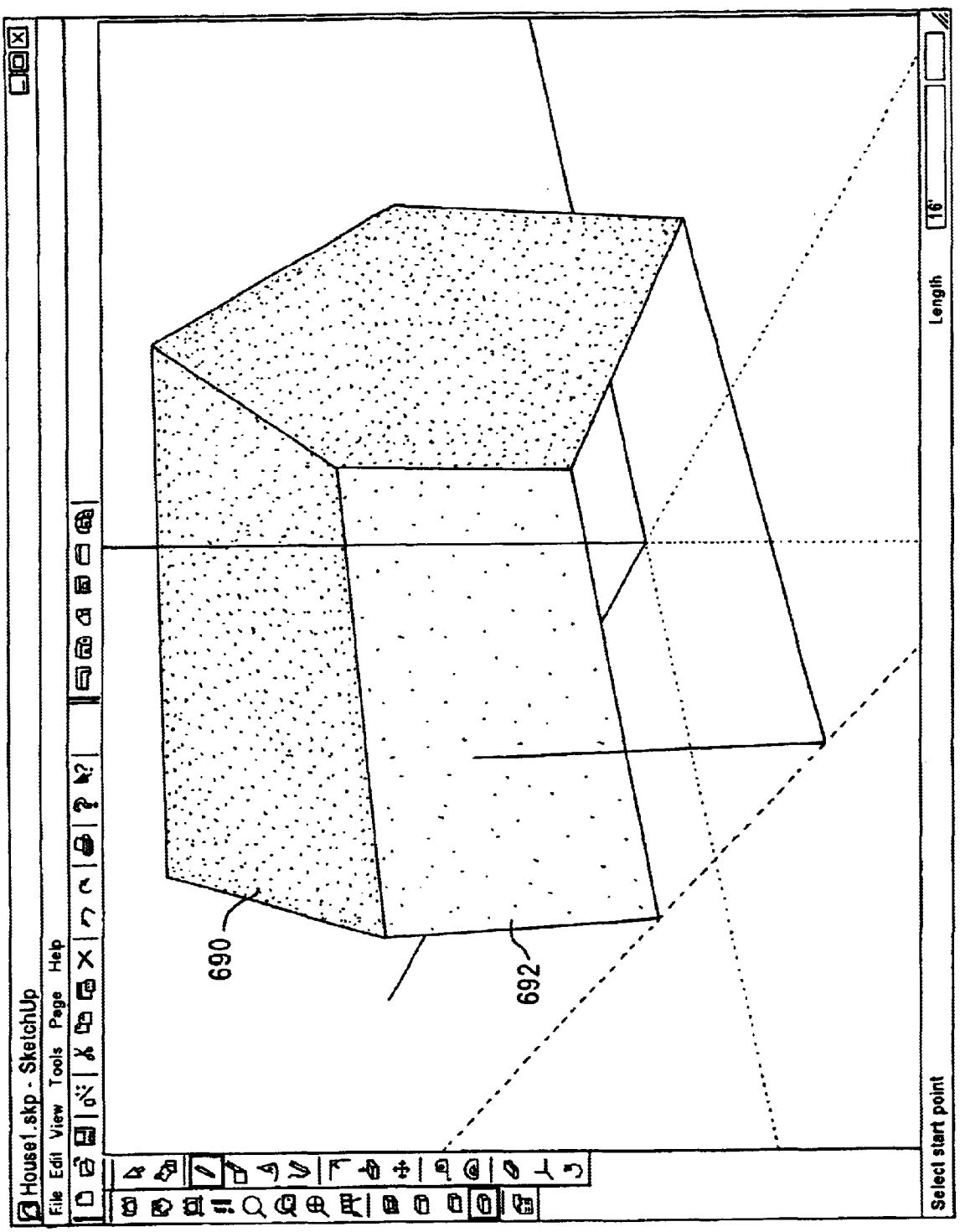
Figure 6P:
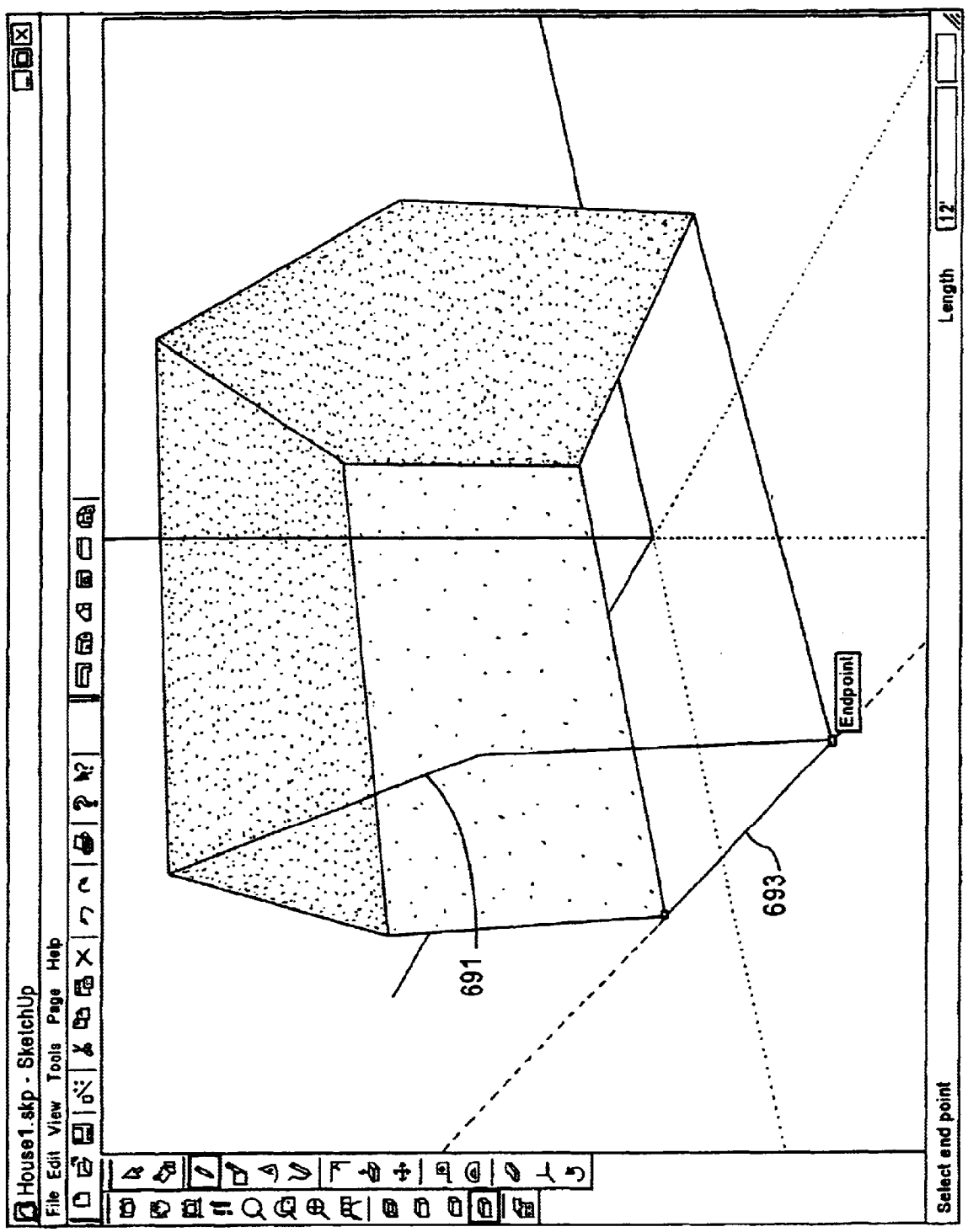
Figure 6Q:
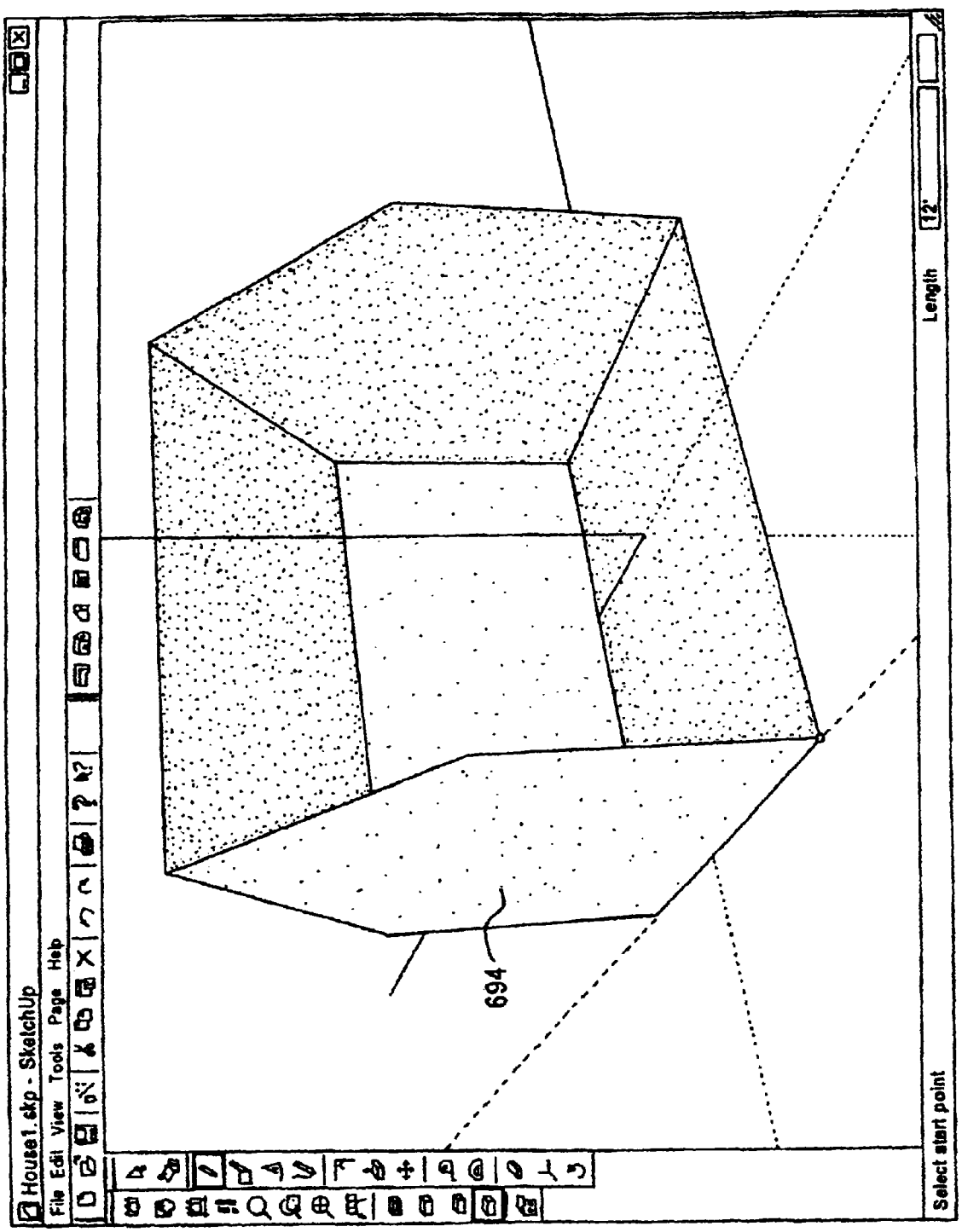
Figure 6R:
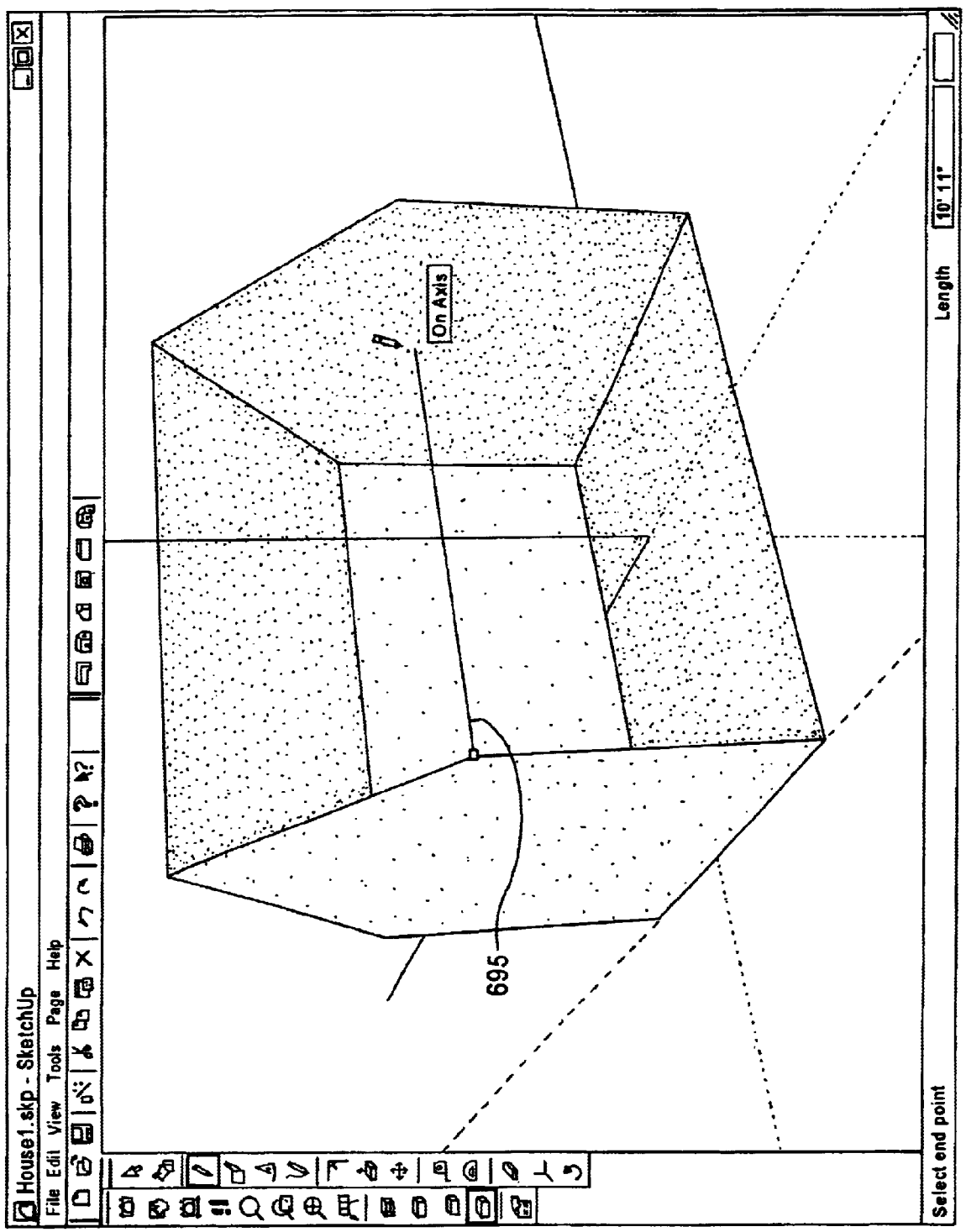
Figure 6S:
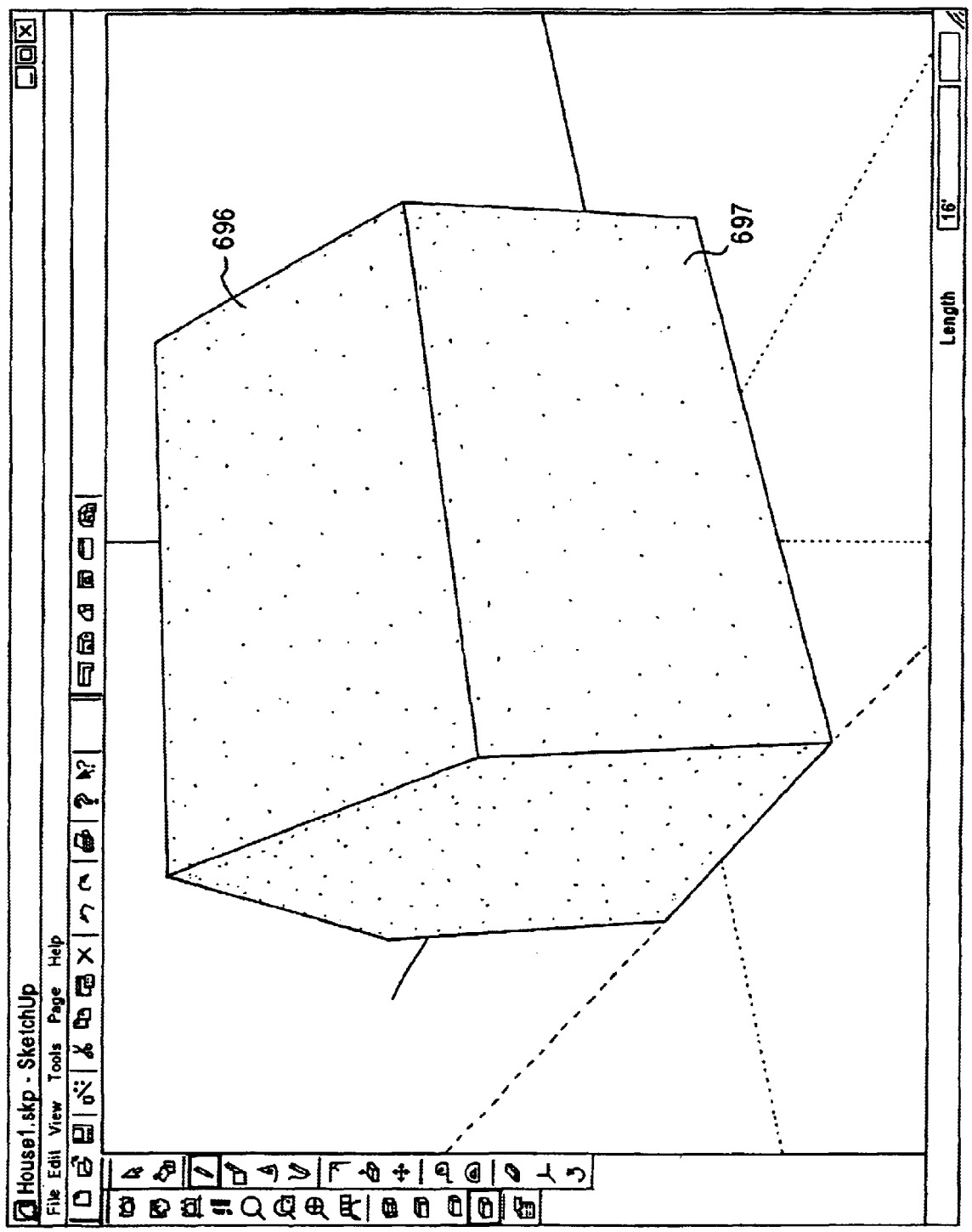

The remaining edges 684, 686 and 688 are drawn in any order as shown in the sequence of FIGS. 6M and 6N. When the line 688 is completed, the present graphical design and modeling application automatically creates faces 690 and 692 and shades them, as shown in FIG. 6O. In a similar fashion, FIGS. 6P and 6Q illustrate the drawing of lines 691 and 693 that results in the creation of the face 694. The drawing of line 695, depicted in FIG. 6R, creates two different faces 696 and 697, as depicted in FIG. 6S, to complete the basic shell of the exemplary house.

Thus, the user can use familiar pencil and paper techniques to draw lines and edges in any particular order in three-dimensional space. As each line or edge is completed the present graphical design and modeling application determines if, as a result of the most recent input, whether a face, comprising co-planar edges forming a closed surface and a skin bounded by these edges, should be created.

Automatic Deletion of Faces

In addition to the drawing of new edges, edge-related inputs that can effect the creation of faces can also include the erasing of edges from a model. When an edge of a face is erased so that the connected edges no longer form a closed perimeter or no longer lie in the same plane, then the face is erased along with the edge.

Figure 7A:
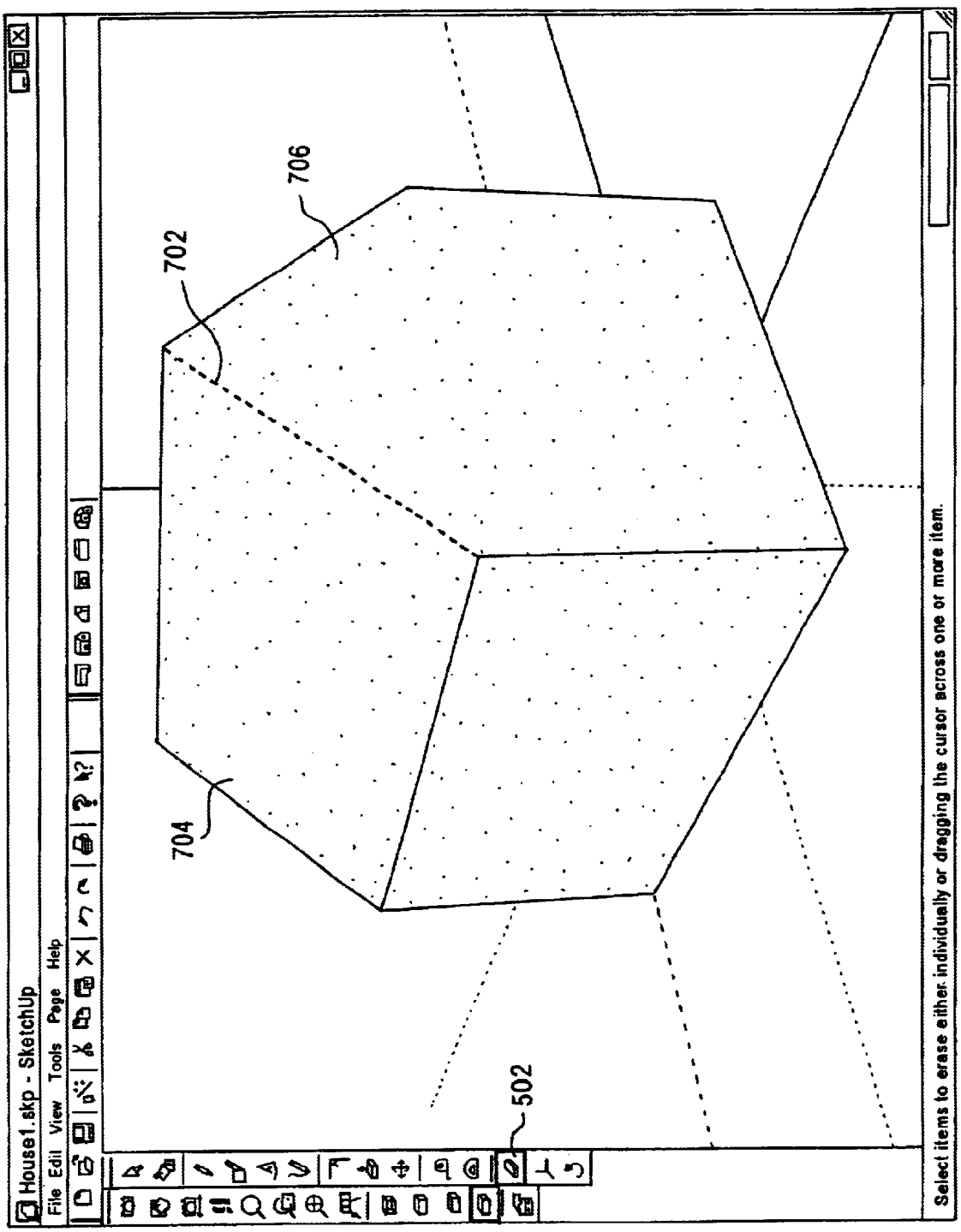
FIGS. 7A–7D illustrate a sequence of screen shots that demonstrate how surface face are automatically removed when any edges on which the faces depend are deleted according to an embodiment of the present invention.
Figure 7B:
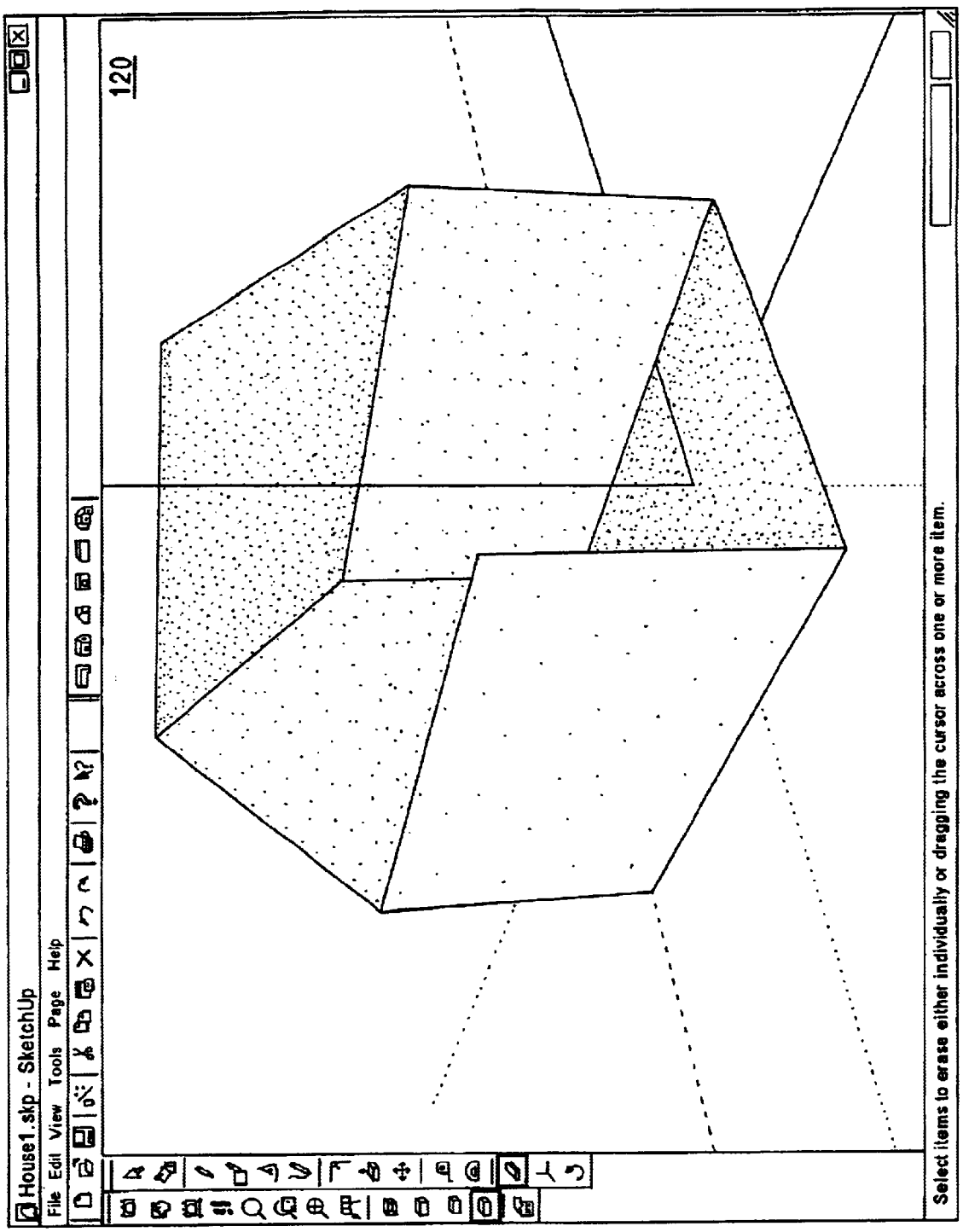
Figure 7C:
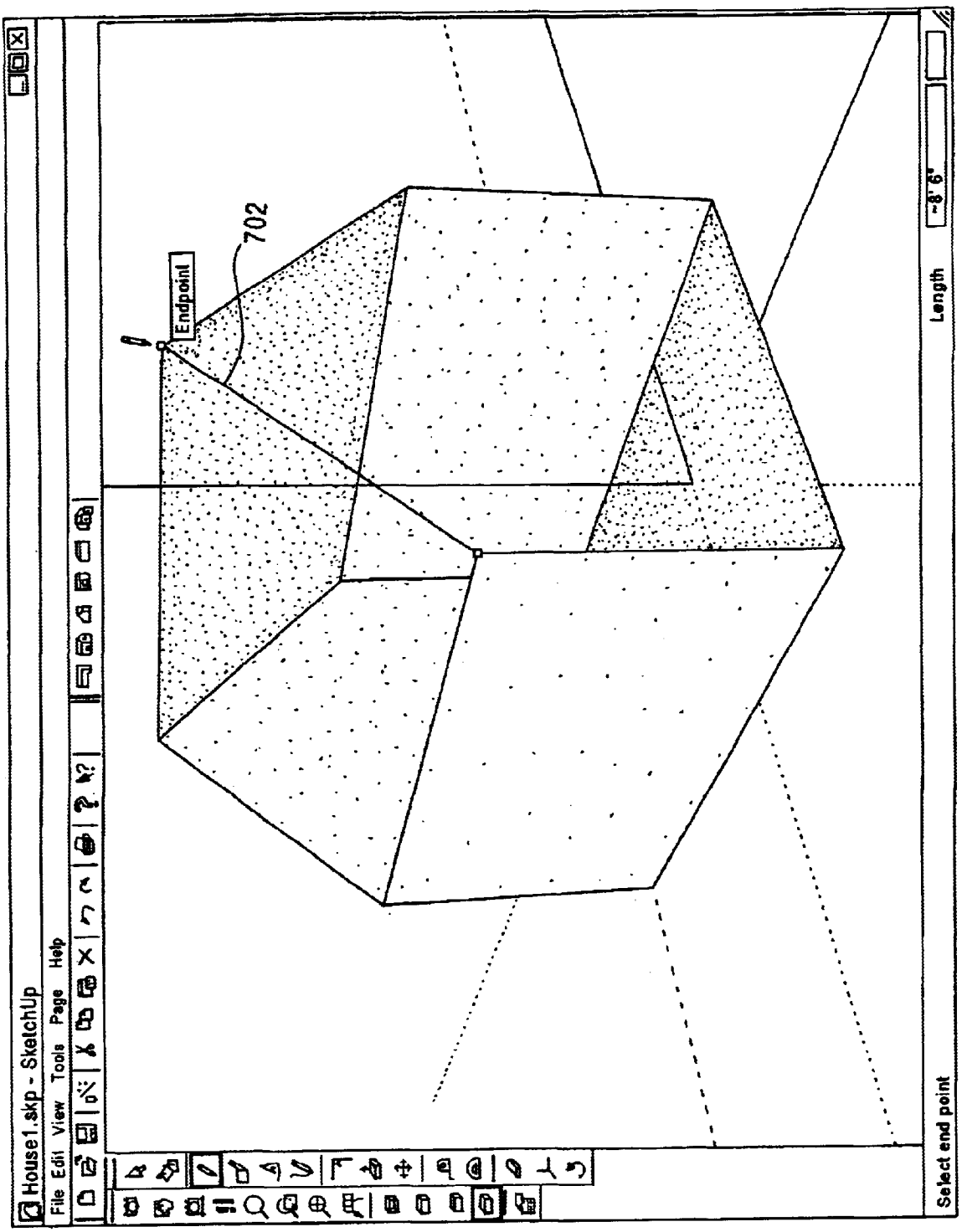
Figure 7D:
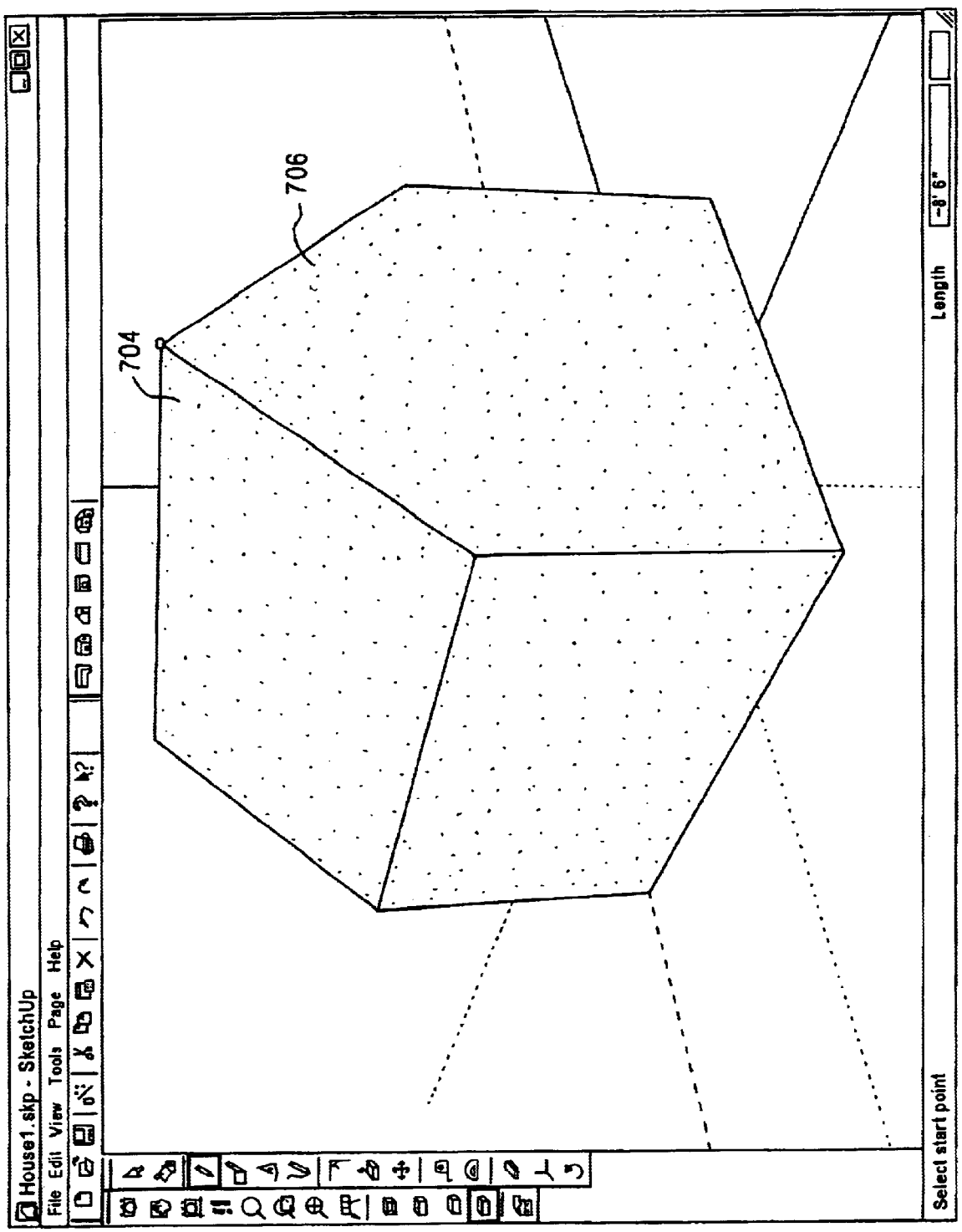

The erase tool 502 is used to highlight the edge 702, as depicted in FIG. 7A and to perform an erase operation, as depicted in FIG. 7B. As shown in FIG. 7B, the faces 704 and 706 are automatically erased when the edge 702 is deleted. When the edge 702 is re-drawn on the house, as shown in FIG. 7C, the faces 704 and 706 are re-created and shaded, as shown in FIG. 7D.

Self-healing Faces

Figure 8A:
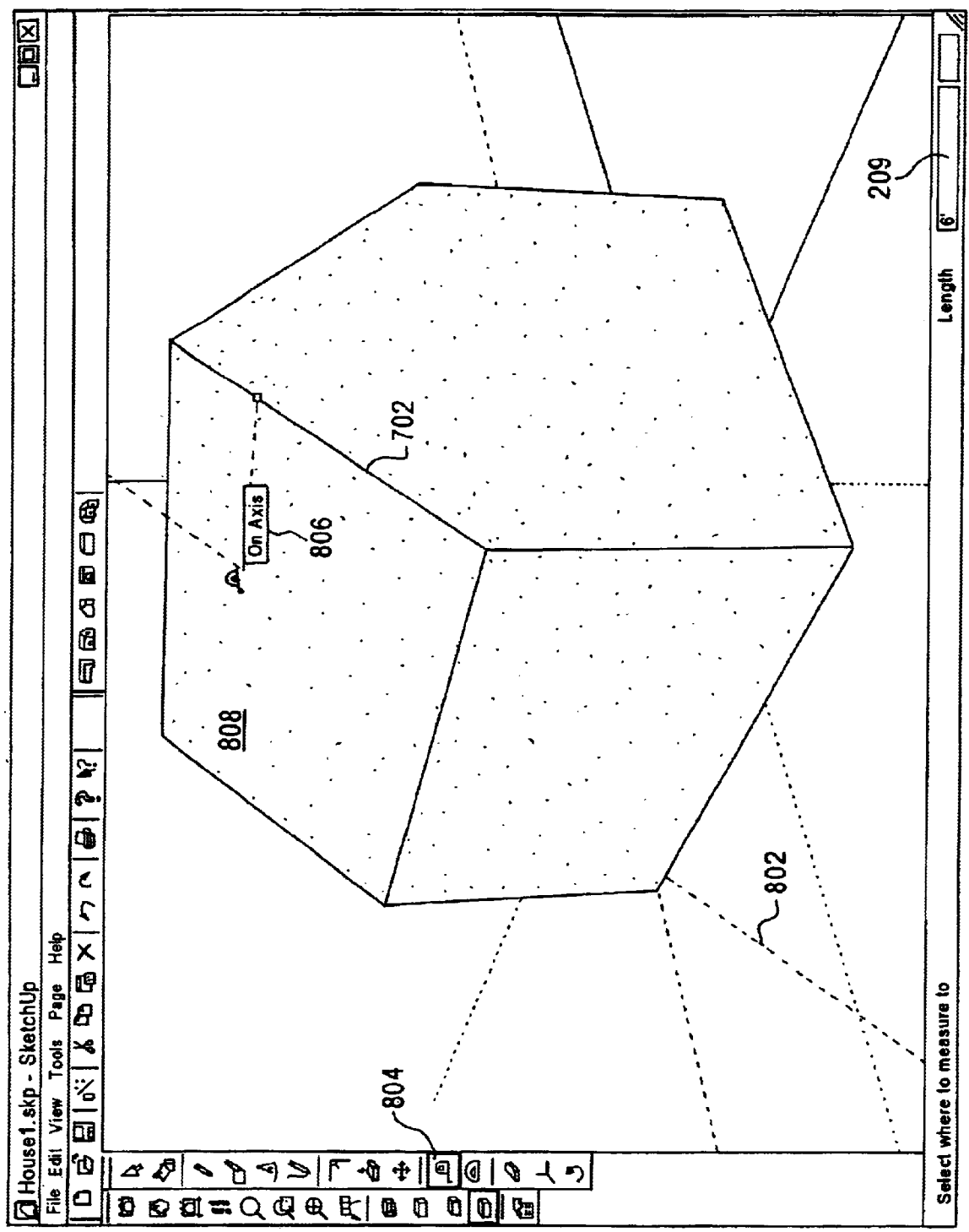
FIGS. 8A–8H illustrate a sequence of screen shots in which a user creates a non-visible surface face that automatically becomes visible when the obscuring faces are removed.
Figure 8B:
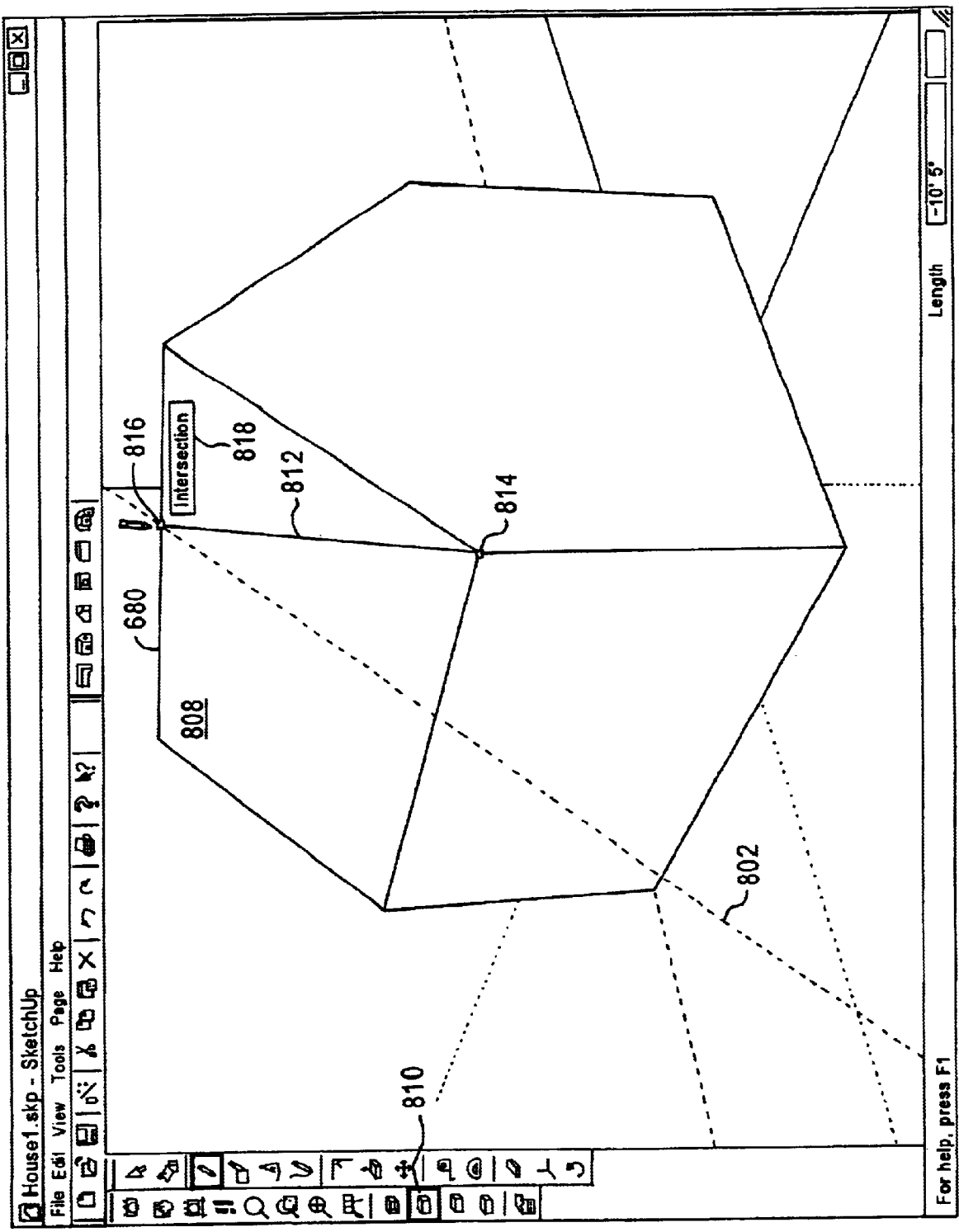

FIGS. 8A through 8H illustrate additional circumstances in which edge input effects the creation and removal of faces. In FIG. 8A, the tape measure tool 804 is used to draw a construction line 802 six feet from the roof edge 702. Visual cues 806 and 209 aid the user in positioning the construction line 802 as intended on the roof surface 808. The hidden-line icon 810 is shown highlighted and activated in FIG. 8B. As a result of the hidden-line icon 810 being activated, the shading of the different surfaces of the house is no longer visible. In FIG. 8B, the line 812 is drawn, using the construction line 802 as a guide, between the endpoints 814 and 816. When the endpoint 816 is reached, the application automatically detects the intersection of the construction line 802 and the ridge line 680 and provides the pop-up cue 818.

Figure 8C:
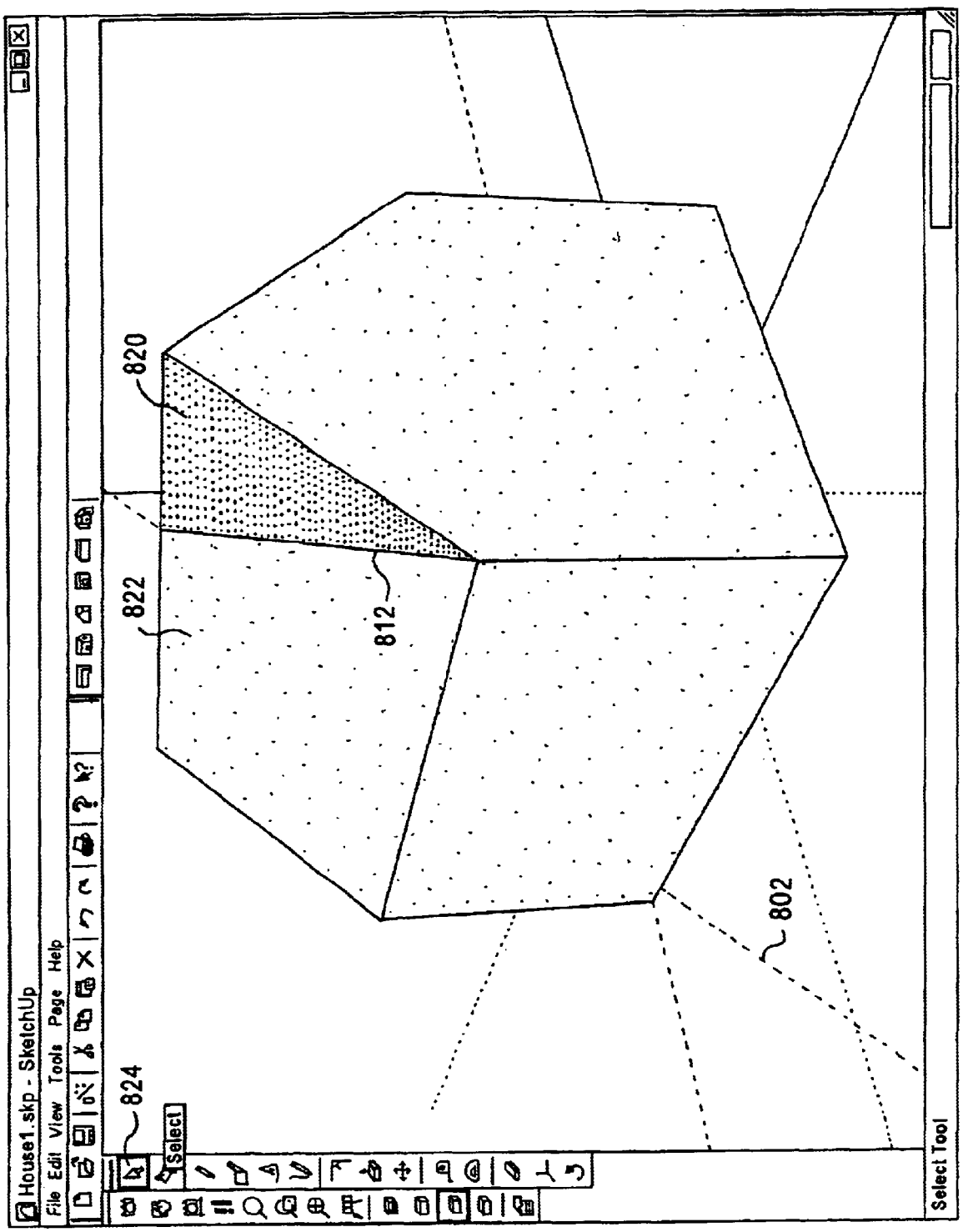
Figure 8D:
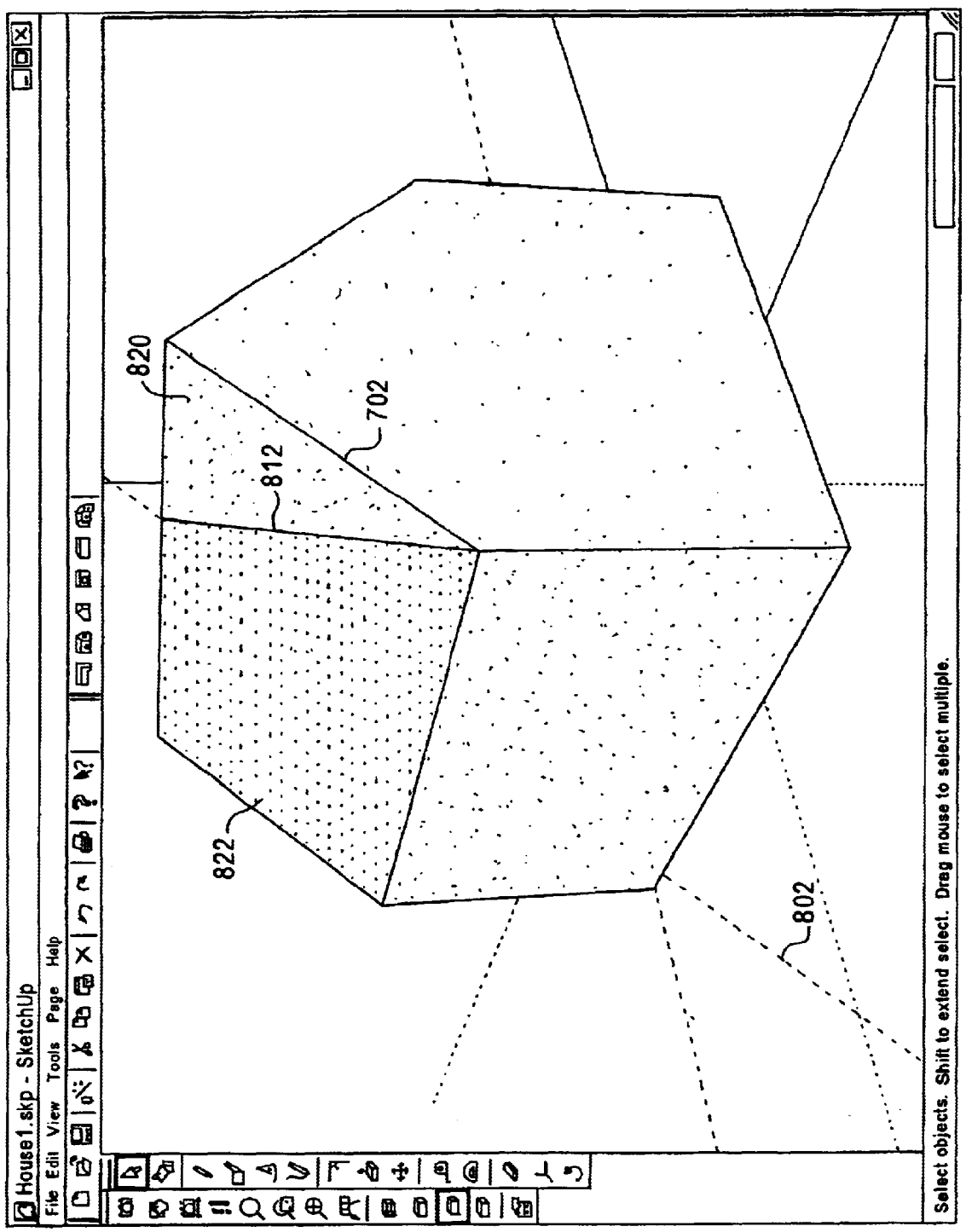

The shaded representation of the model is once again depicted in FIG. 8C. With the creation of the line 812, the roof surface 808 has been split into two regions 820 and 822 that meet the description of a face. In other words, both of the regions 820 and 822 form a closed, co-planar surface; accordingly, the software treats the faces 820 and 822 as two dimensional faces that can be manipulated into three-dimensions. The select tool icon 824 can be used to select different objects that are currently displayed. Typically a user can activate the select tool by clicking on the icon 824 and then use the tool to select an object, for example the face 820, by positioning the cursor over that particular object and once again clicking a mouse button. To illustrate that the face 822 is considered a separate object from the face 820, FIG. 8D depicts the effect of using the select tool while the cursor is positioned over the face 822.

Figure 8E:
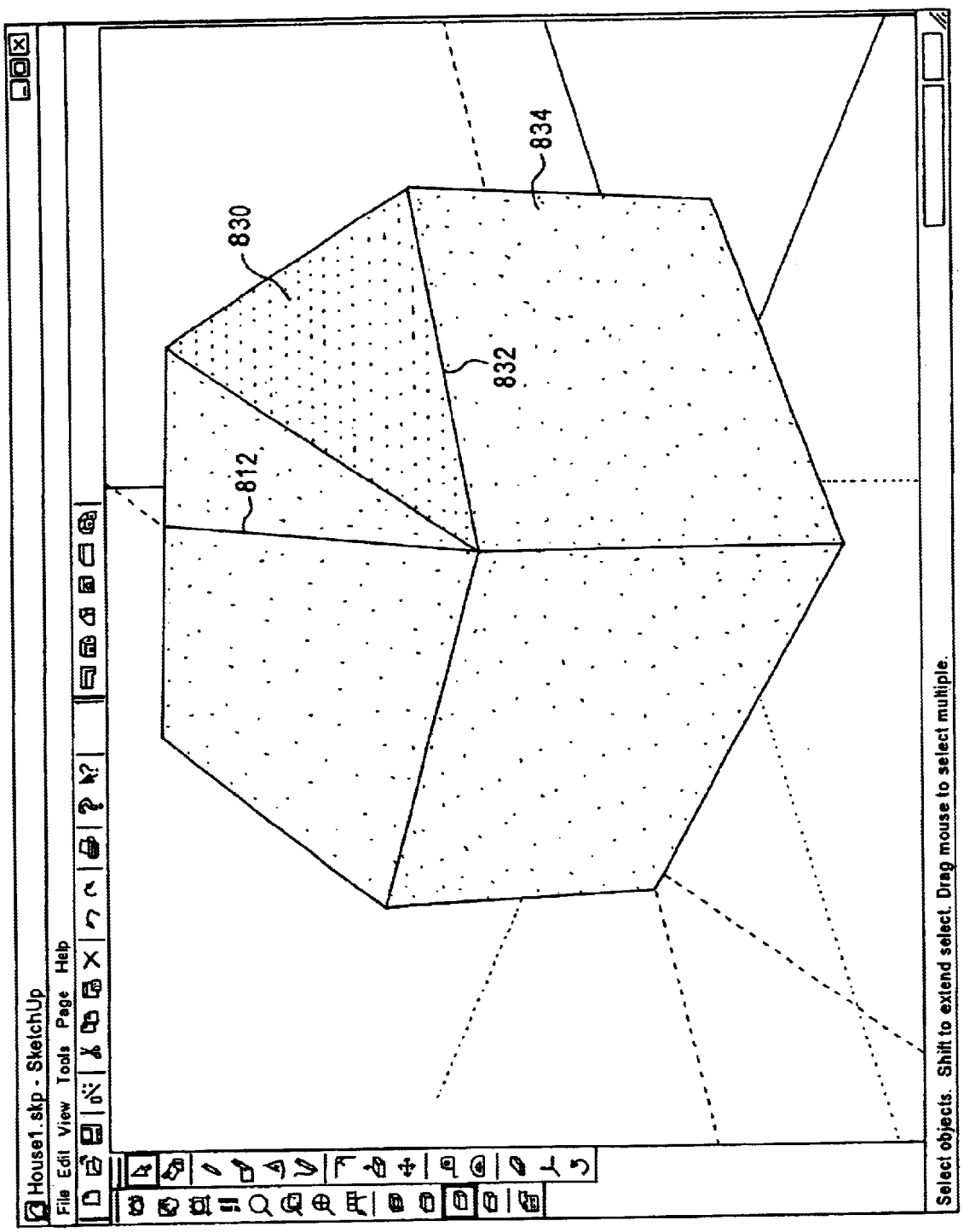
Figure 8F:
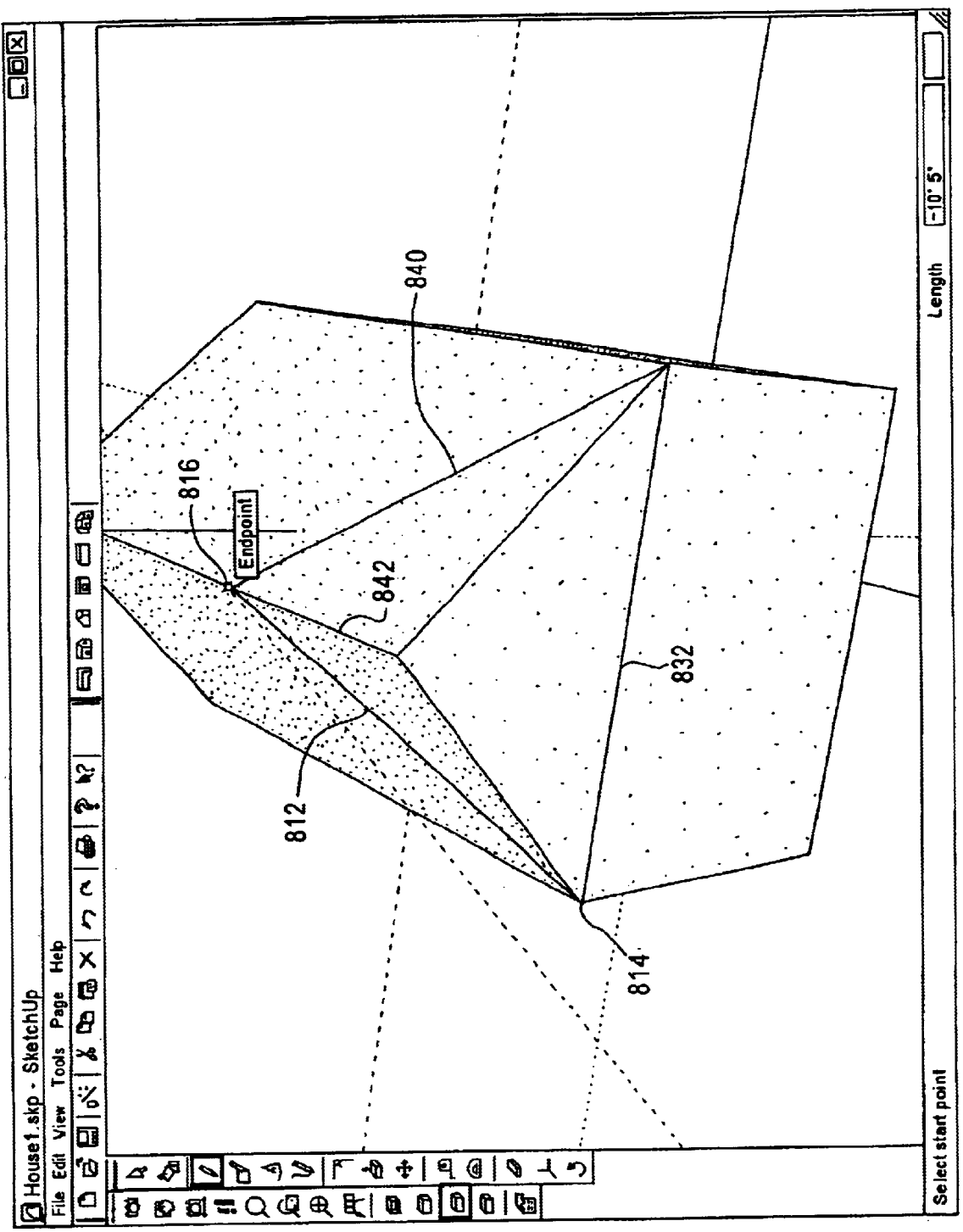
Figure 8G:
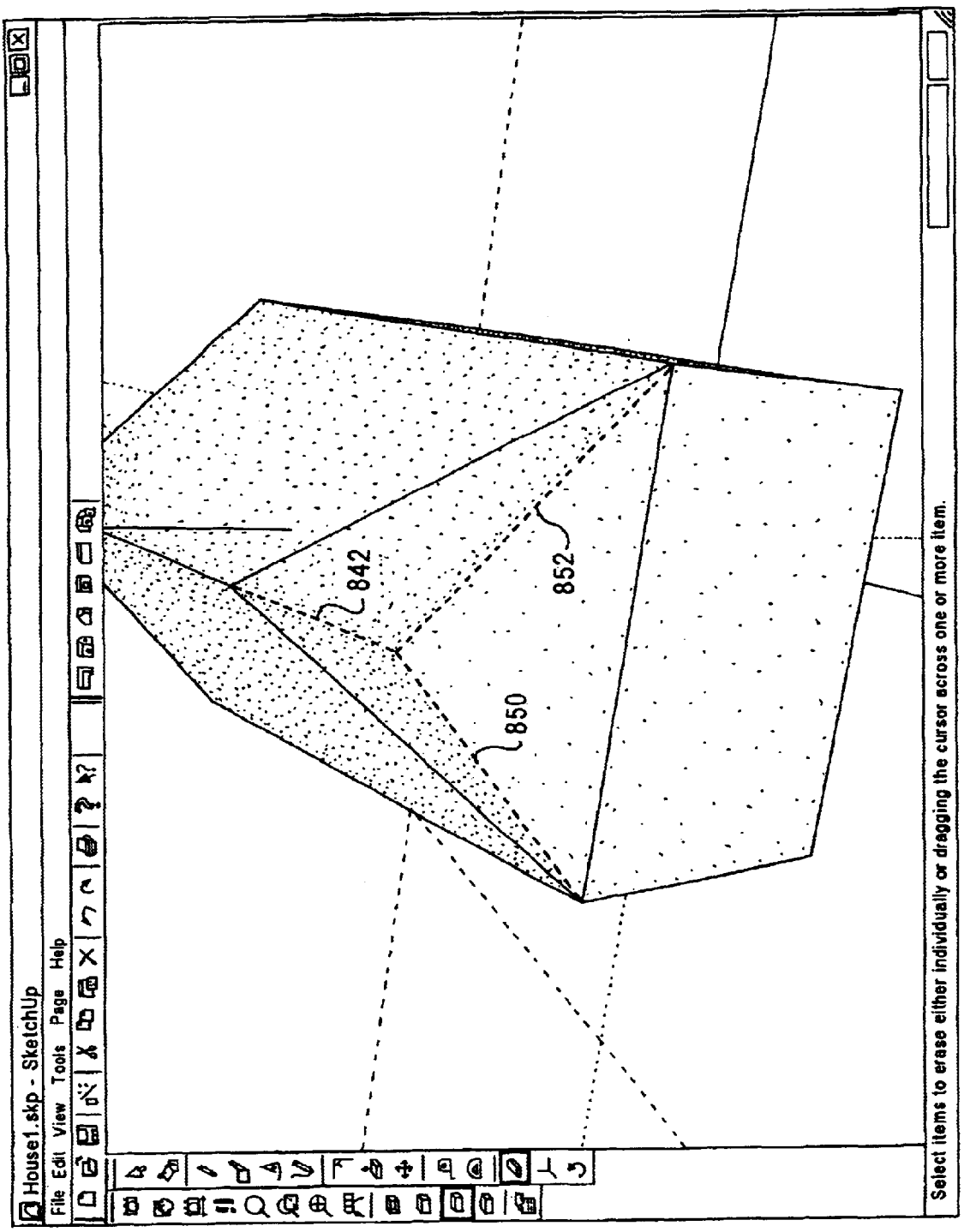
Figure 8H:
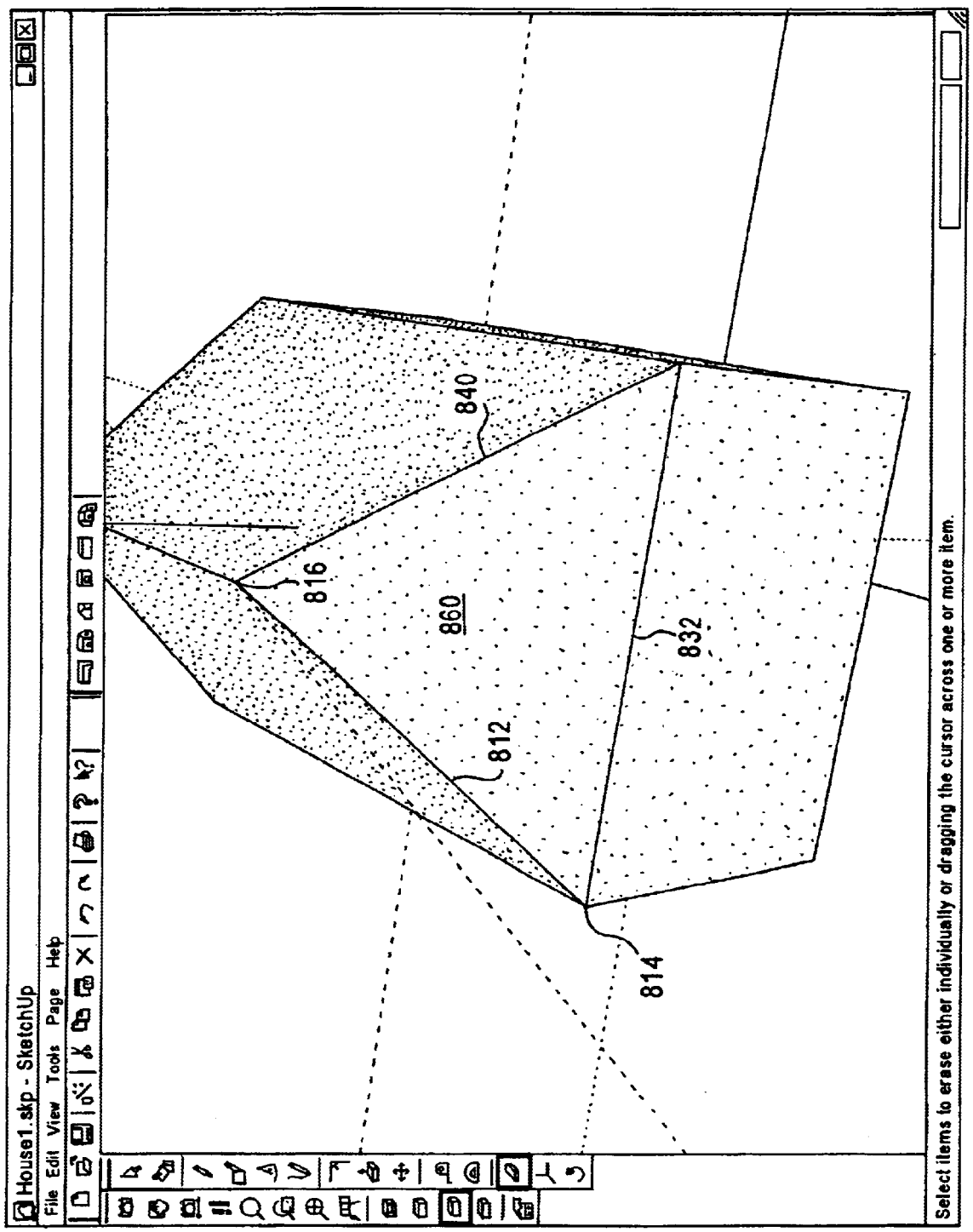

A horizontal line 832 is shown drawn in FIG. 8E that separates the front of the house into two faces 830 and 834. FIG. 8F depicts the front of the house viewed from above and illustrates the lines 812, 842, 840 and 832. These lines, along with previously defined edges of the house, create a three-sided pyramid with a non-visible, triangular, planar base bounded by the lines 812, 832 and 840. When the side edges 842, 850 and 852 of the pyramid are selected and erased, as shown if FIG. 8G, the side surfaces of the pyramid are also removed and the base 860 becomes visible, as shown in FIG. 8H. As shown, a user can create and delete edges in three-dimensions, in any order and the resulting model will automatically determine when and how the two-dimensional faces should be created.

Adding Features Within a Model

Figure 9A:
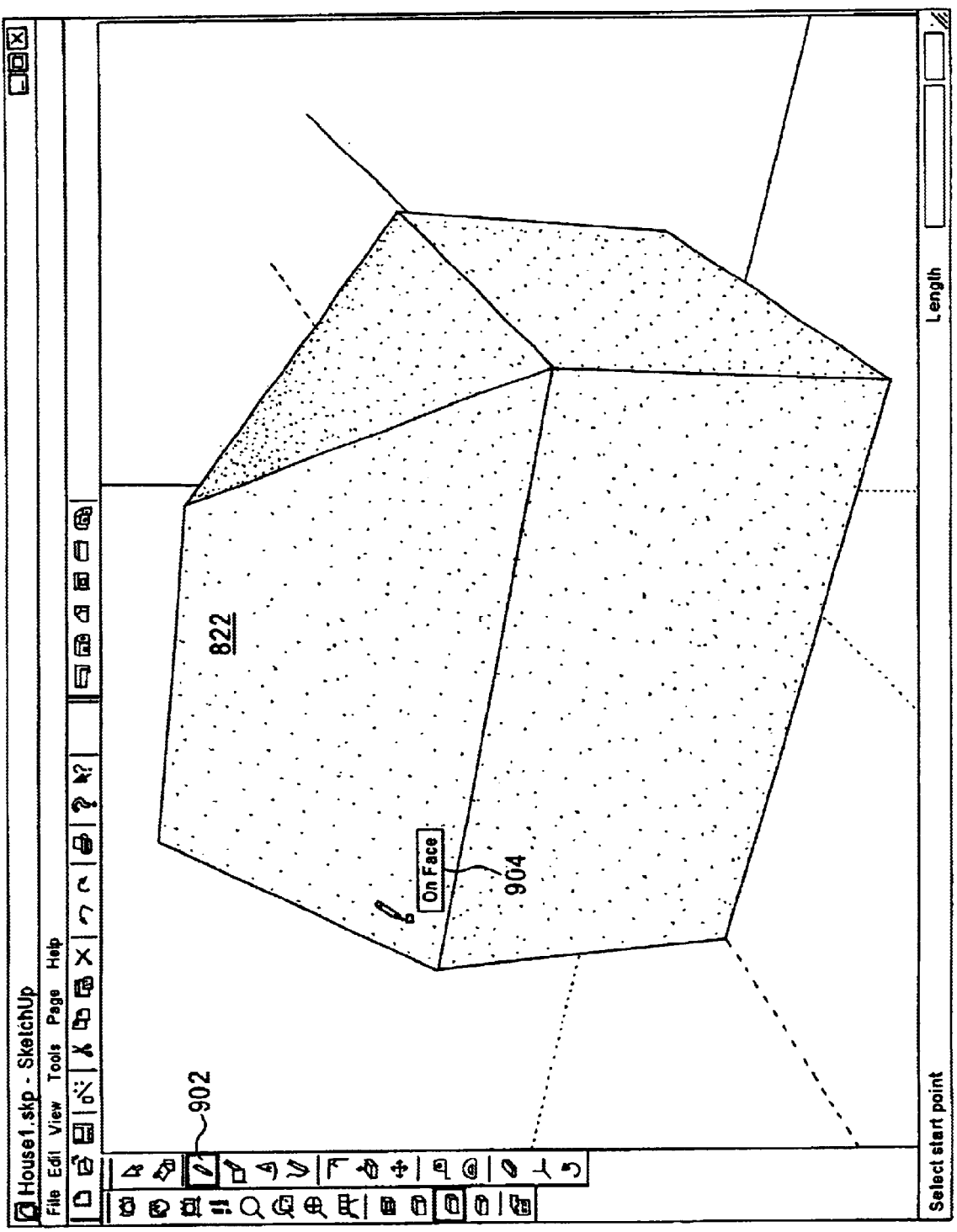
FIGS. 9A–9U illustrate a sequence of screen shots that depict the design aids provided to a user creating geometry features that tie-into exiting features of a model according to an embodiment of the present invention.
Figure 9B:
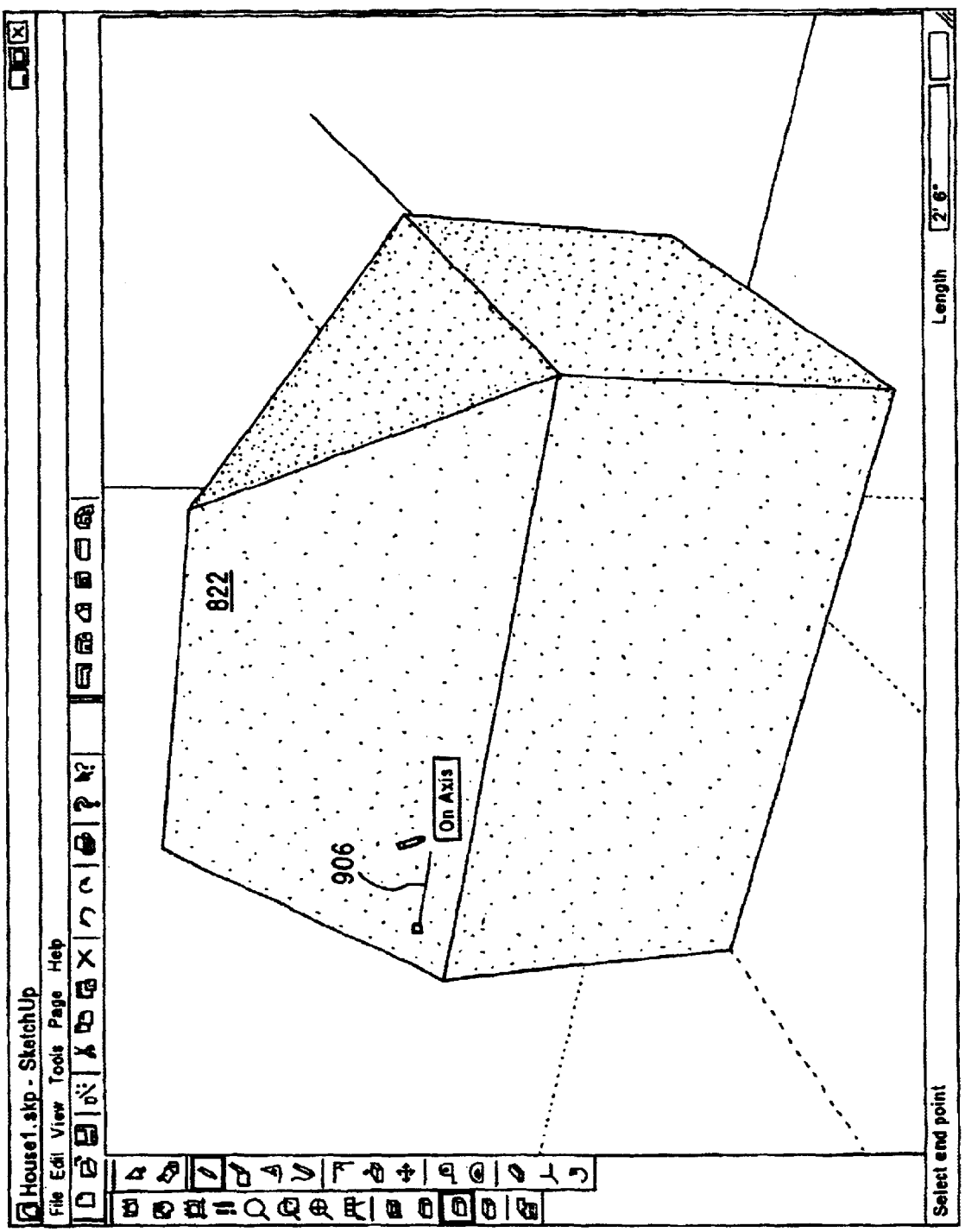
Figure 9C:
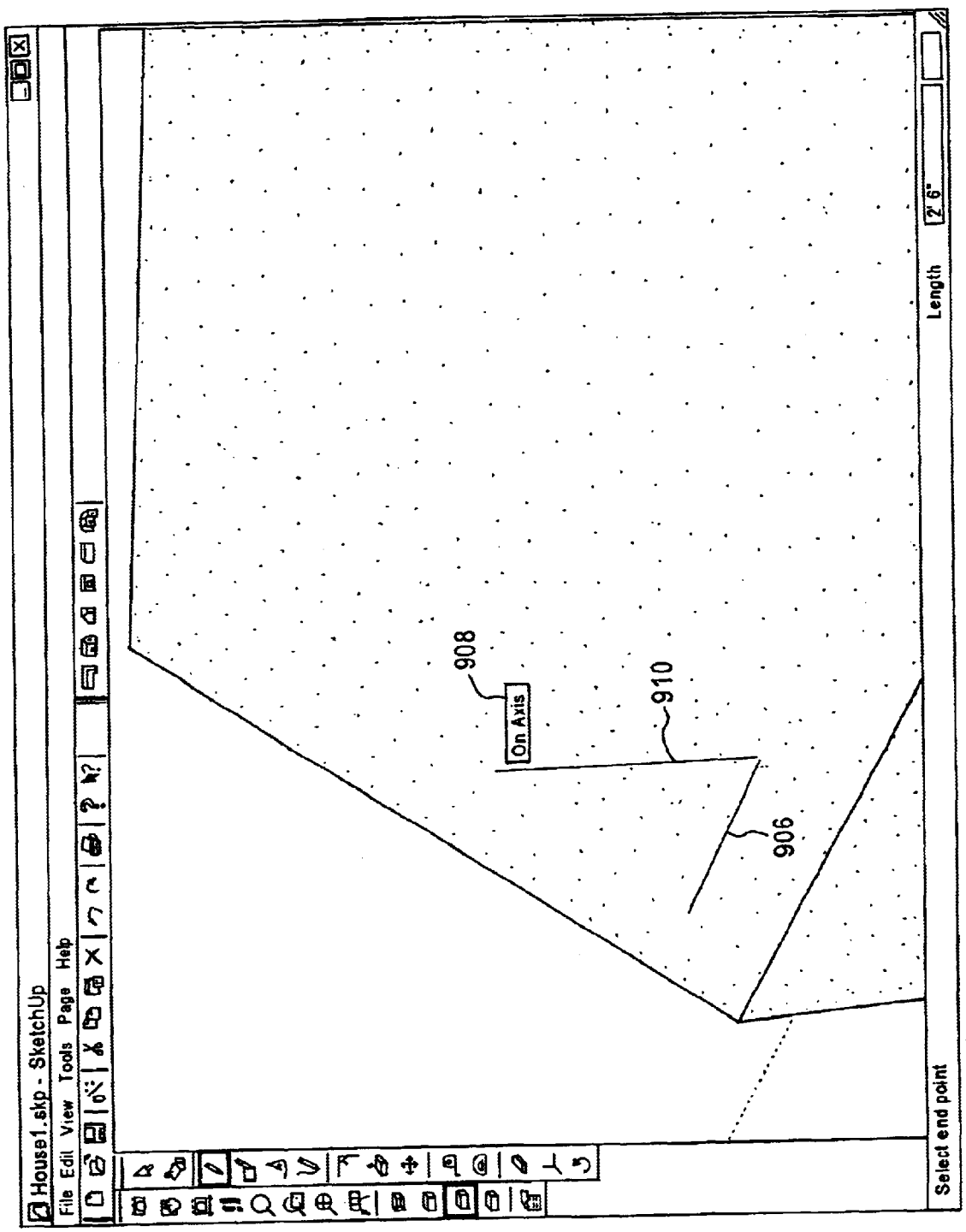
Figure 9D:
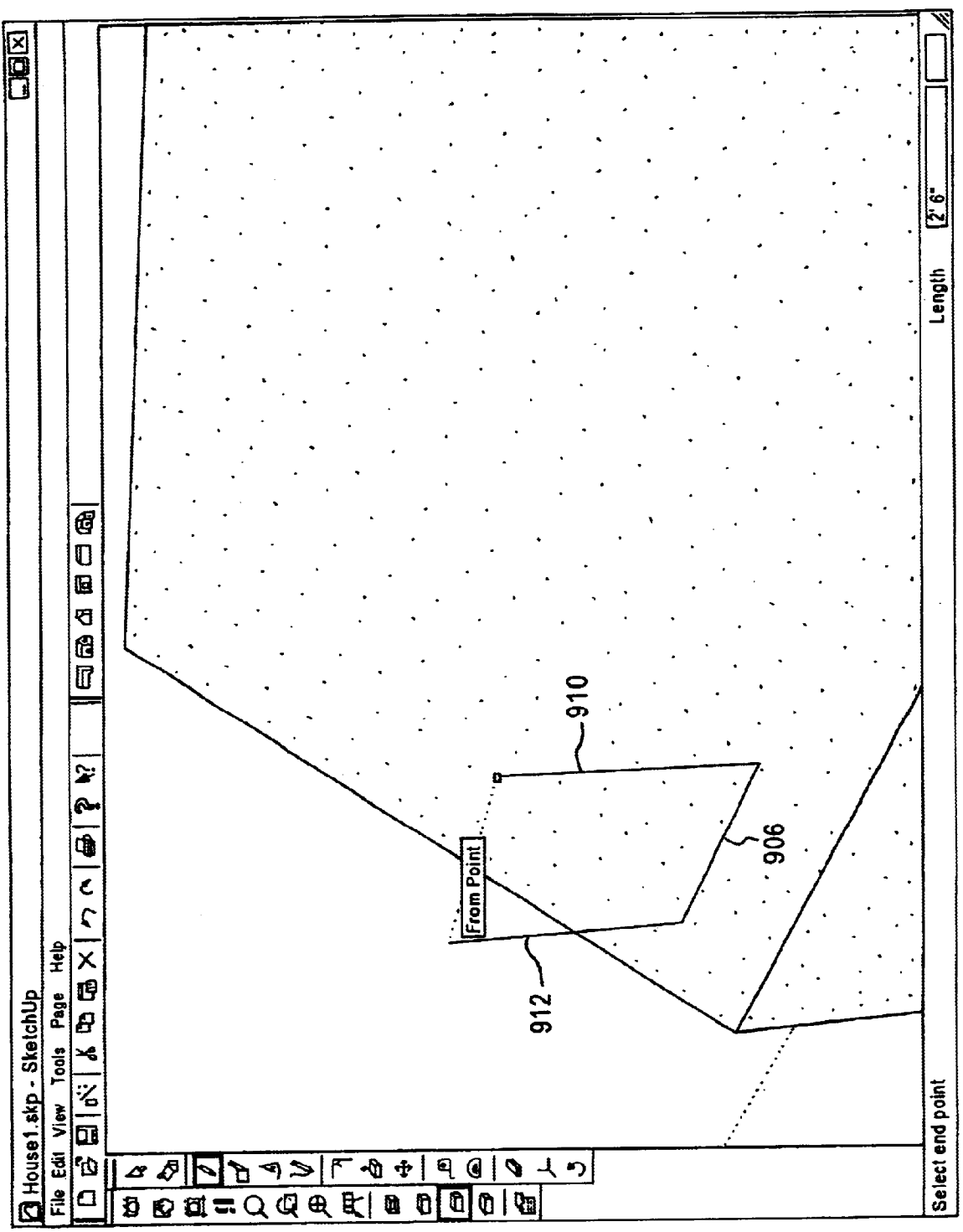
Figure 9E:
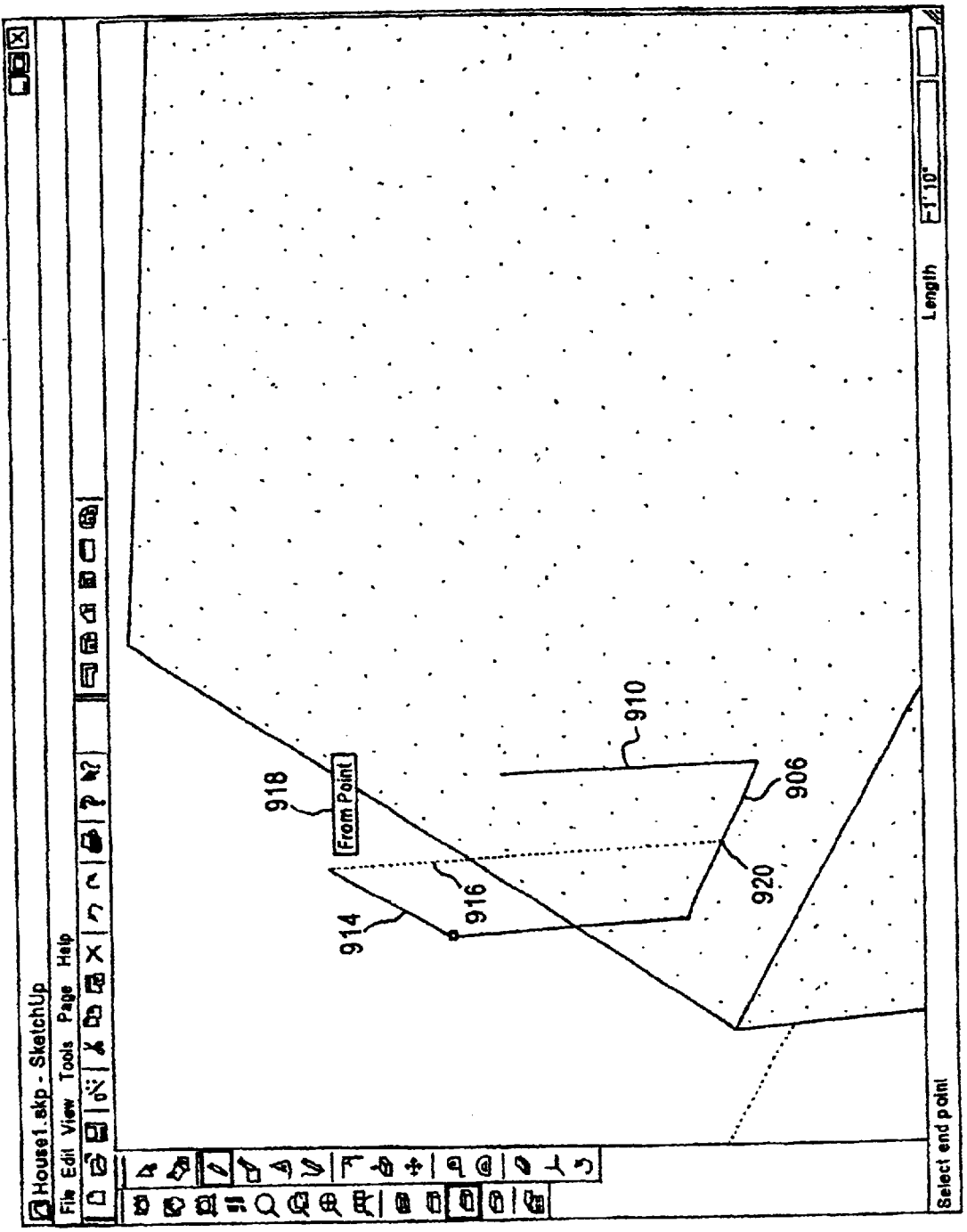
Figure 9F:
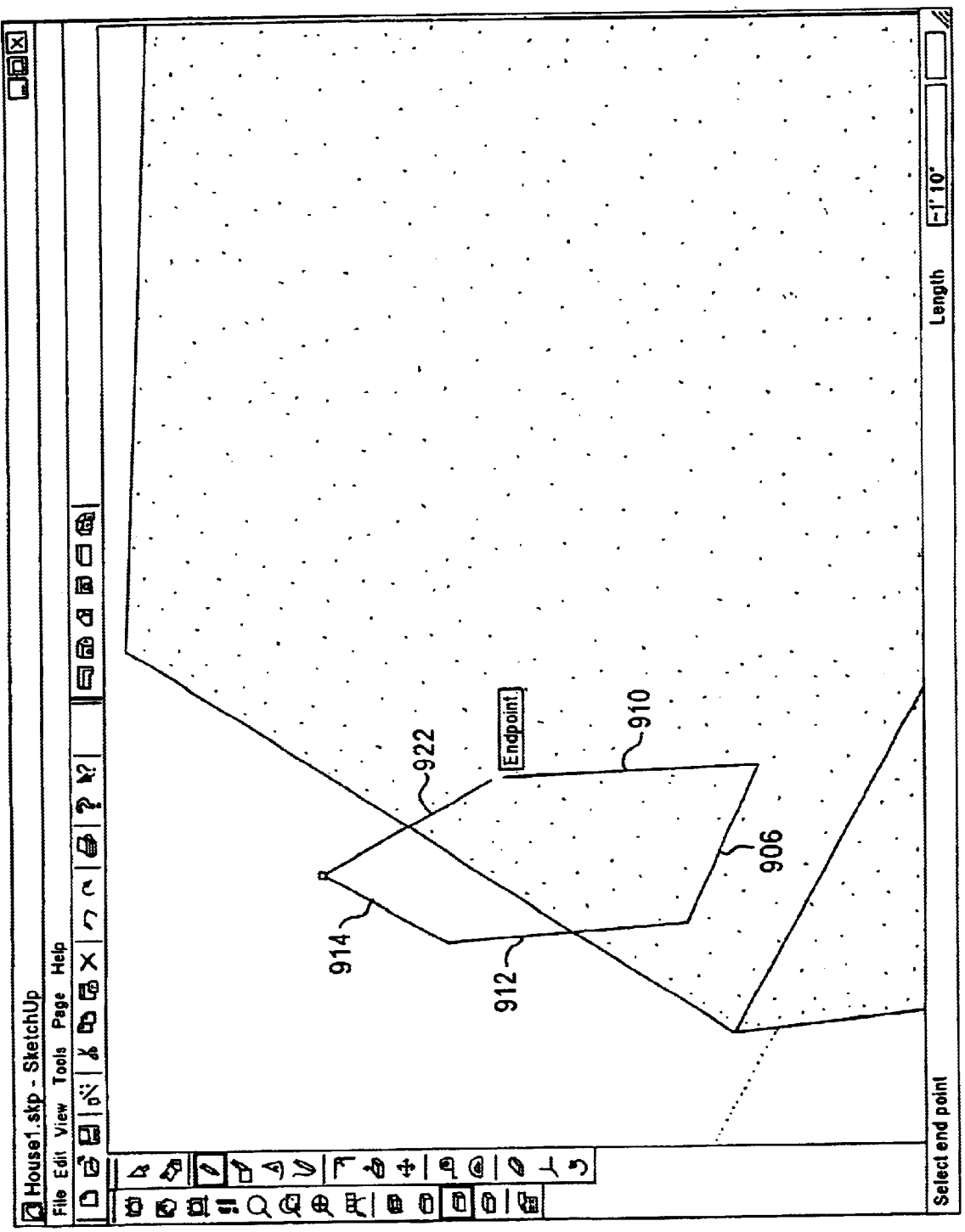
Figure 9G:
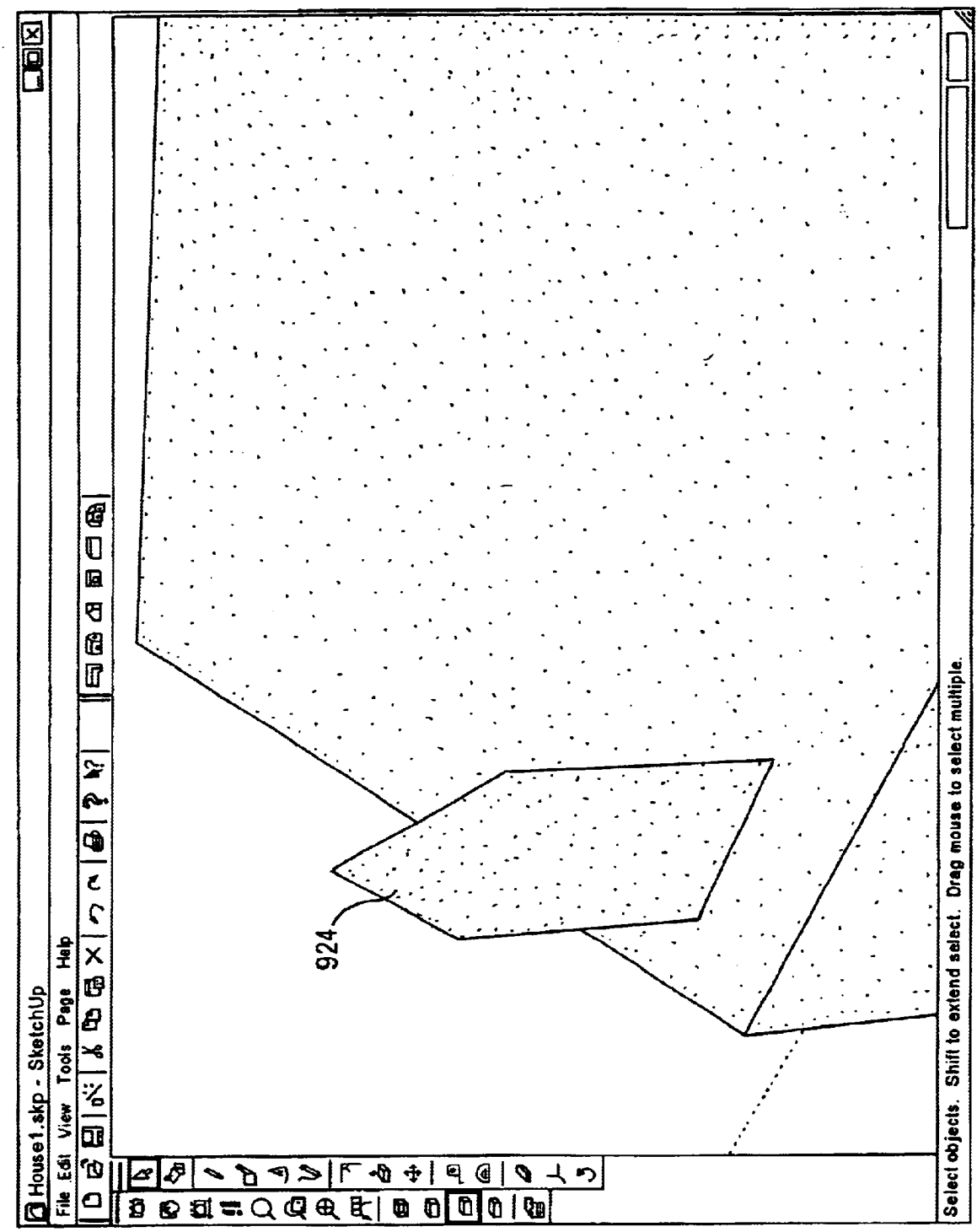
Figure 9H:
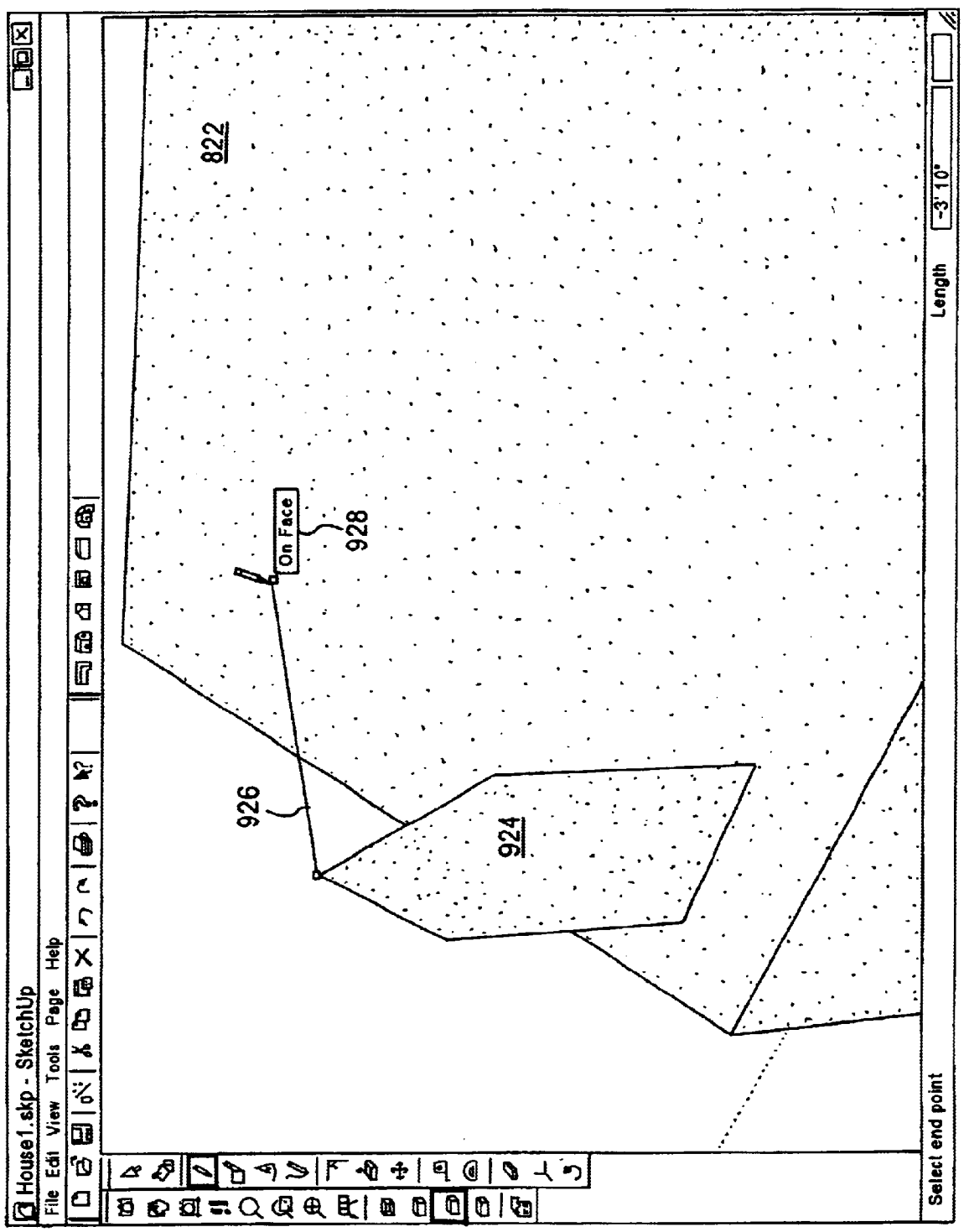
Figure 9I:
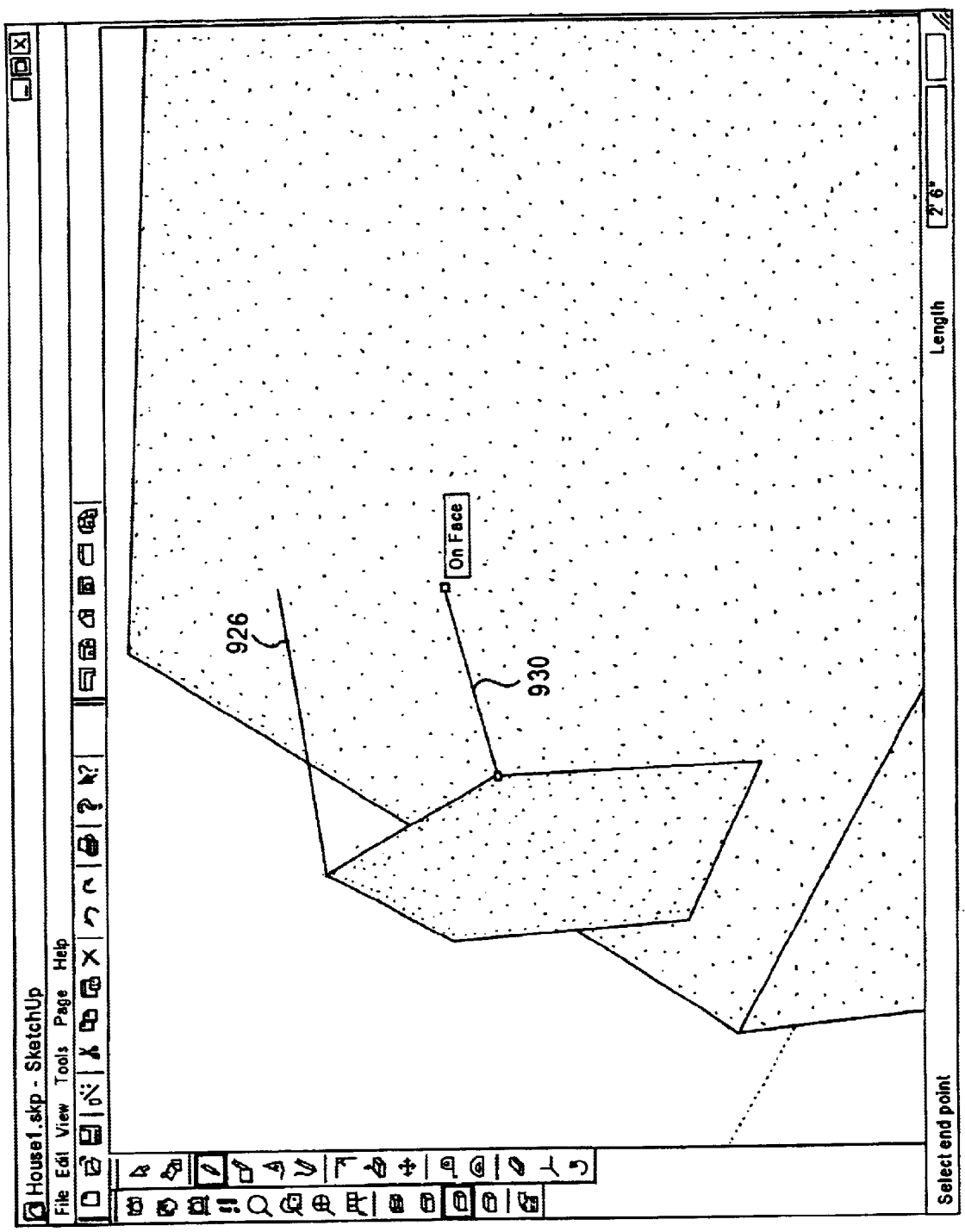
Figure 9J:
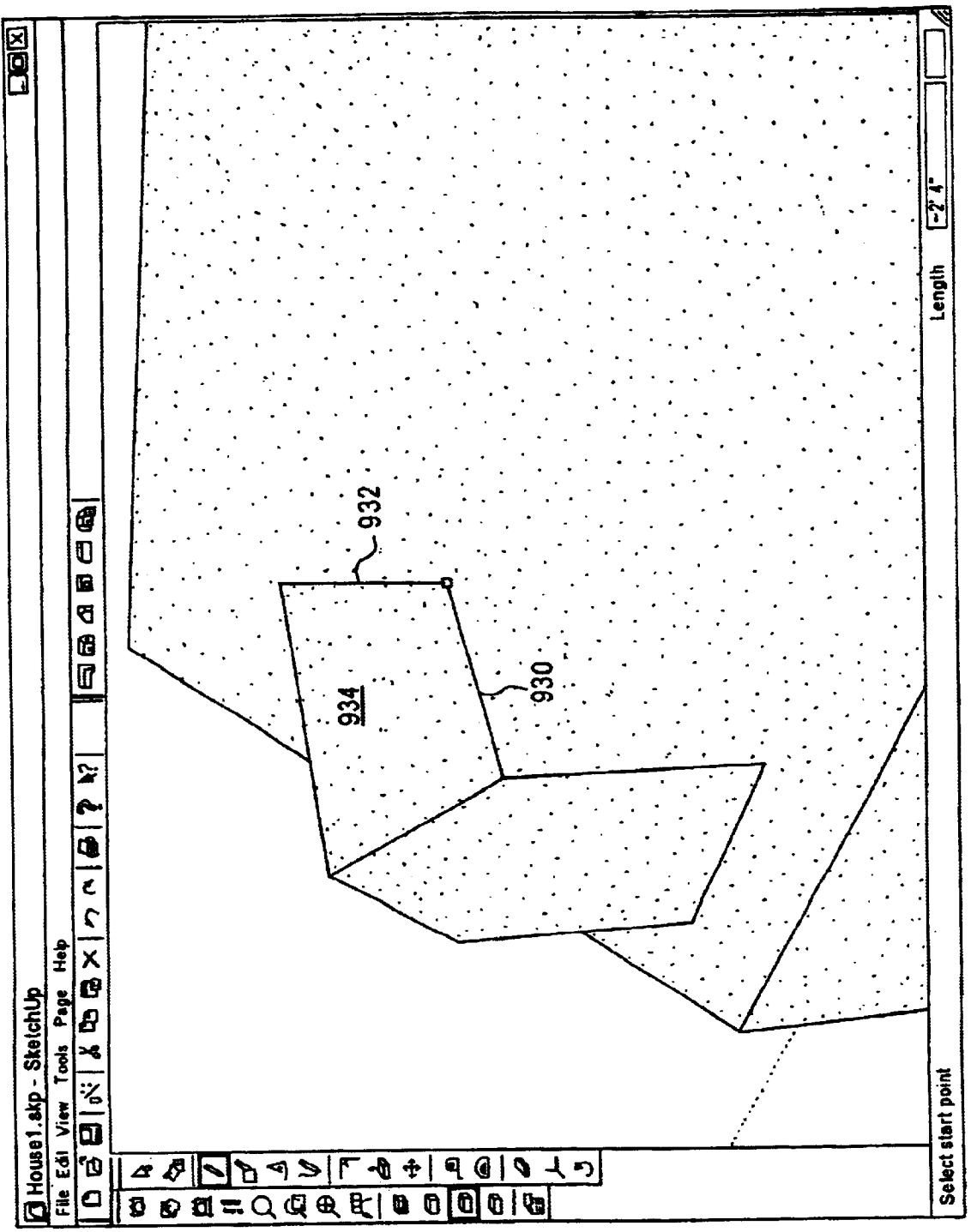
Figure 9K:
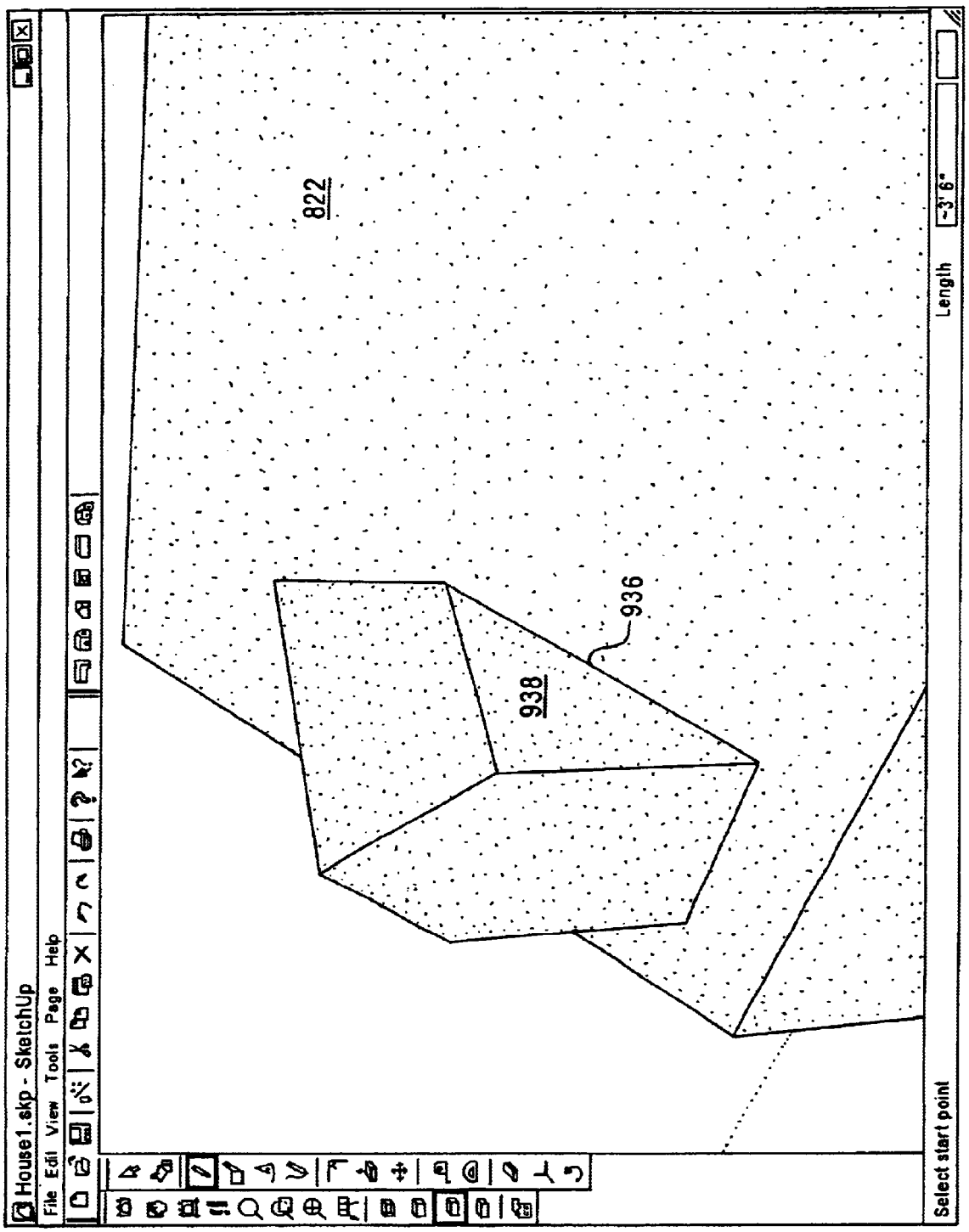
Figure 9L:
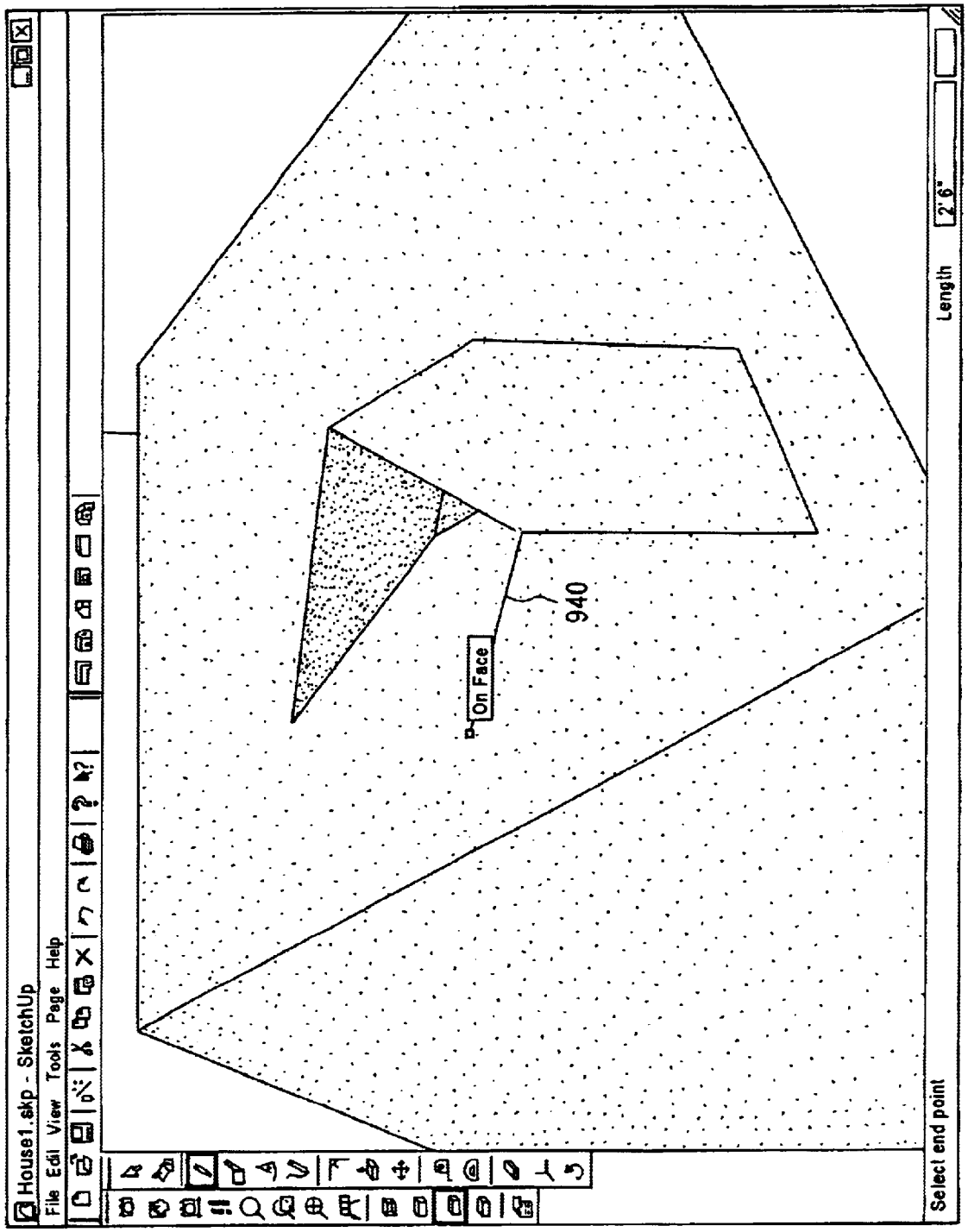
Figure 9M:
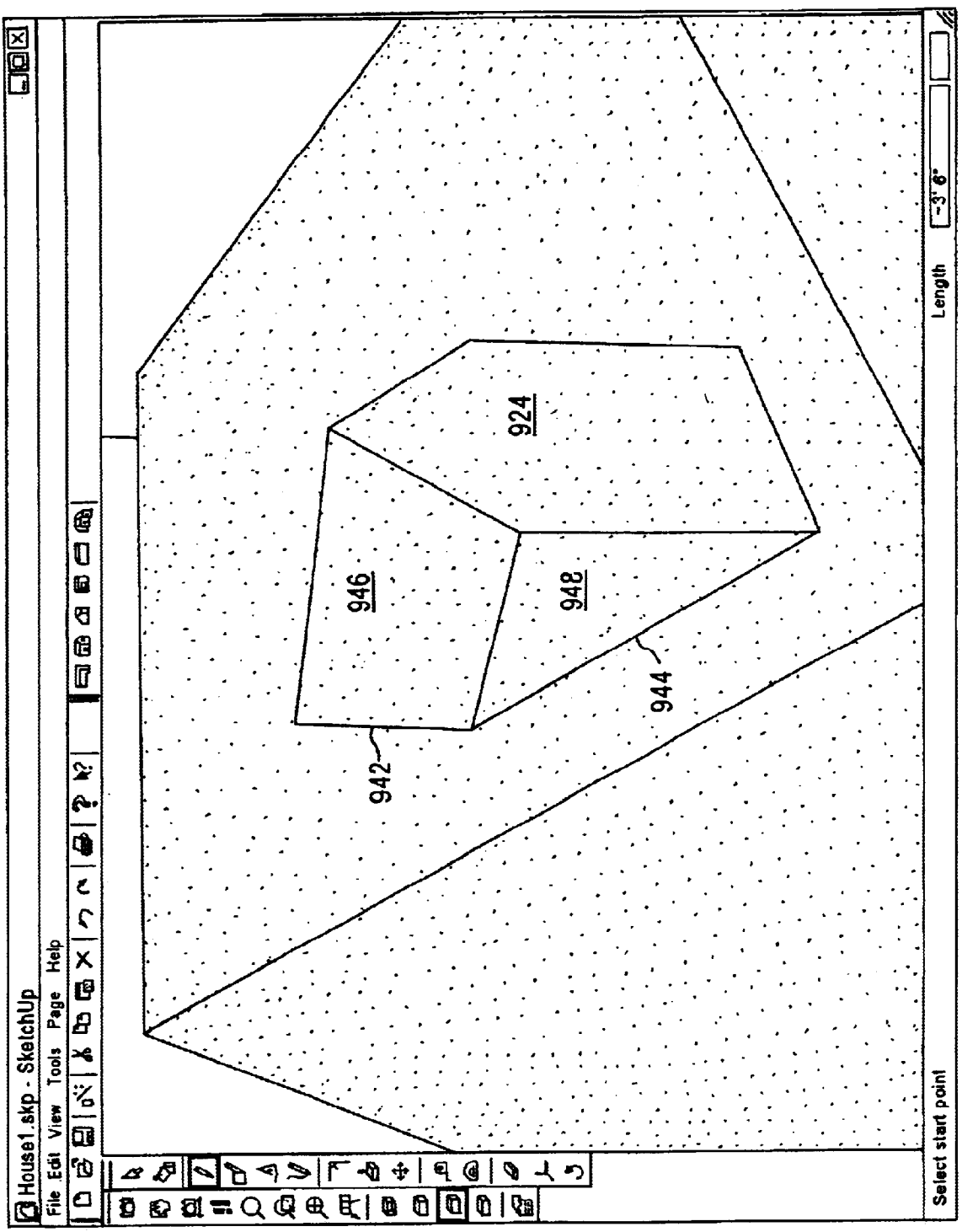
Figure 9N:
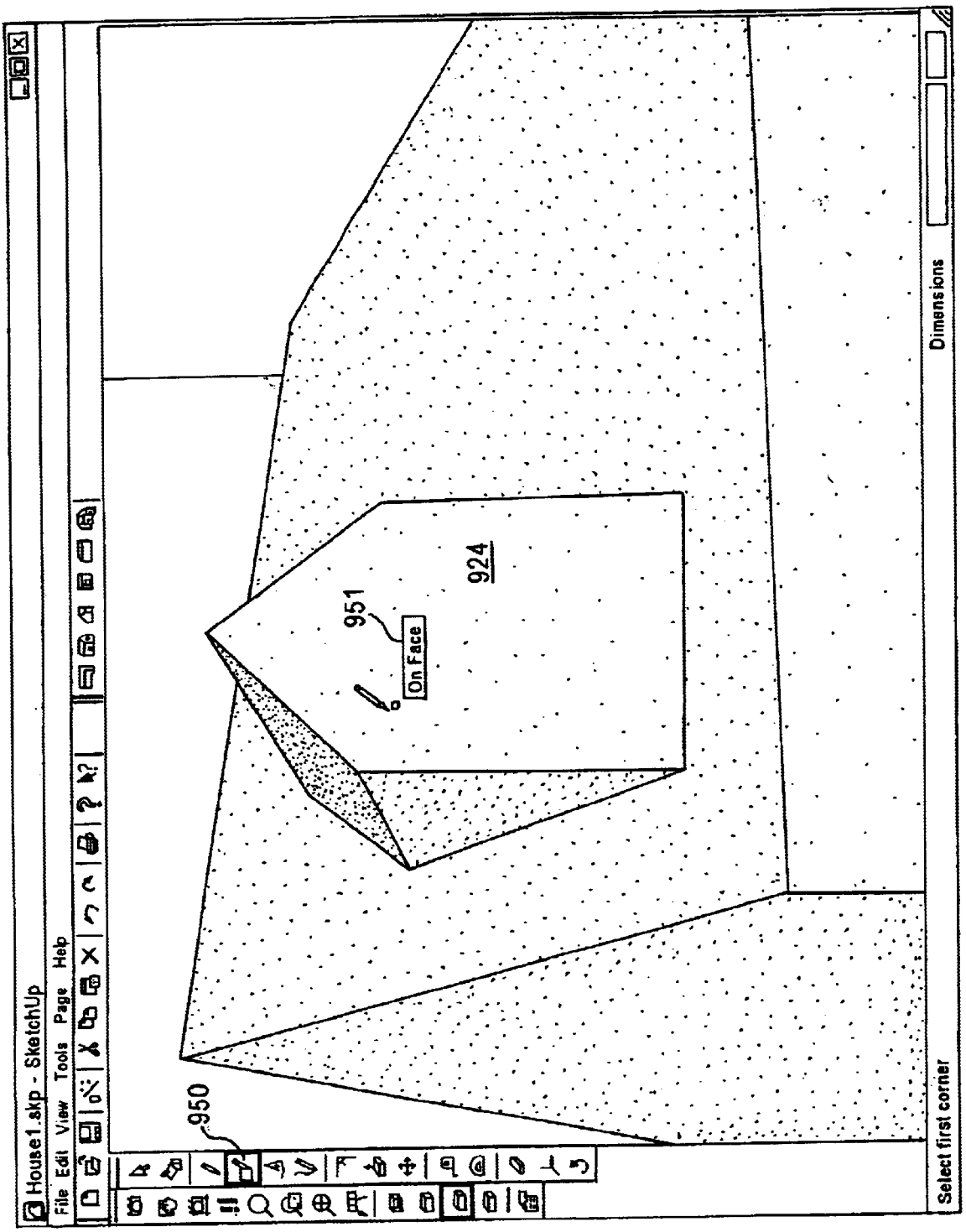
Figure 90:
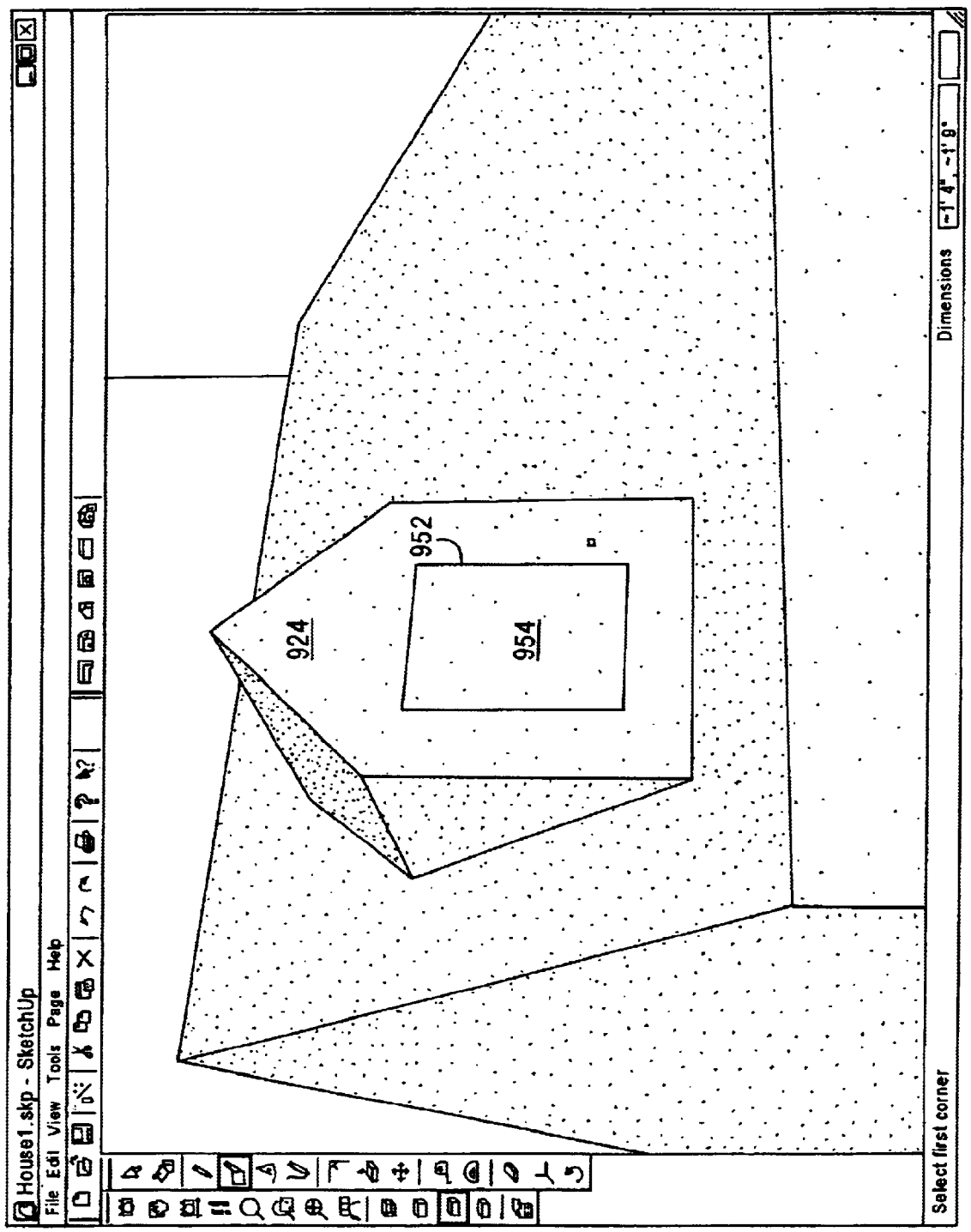
Figure 9P:
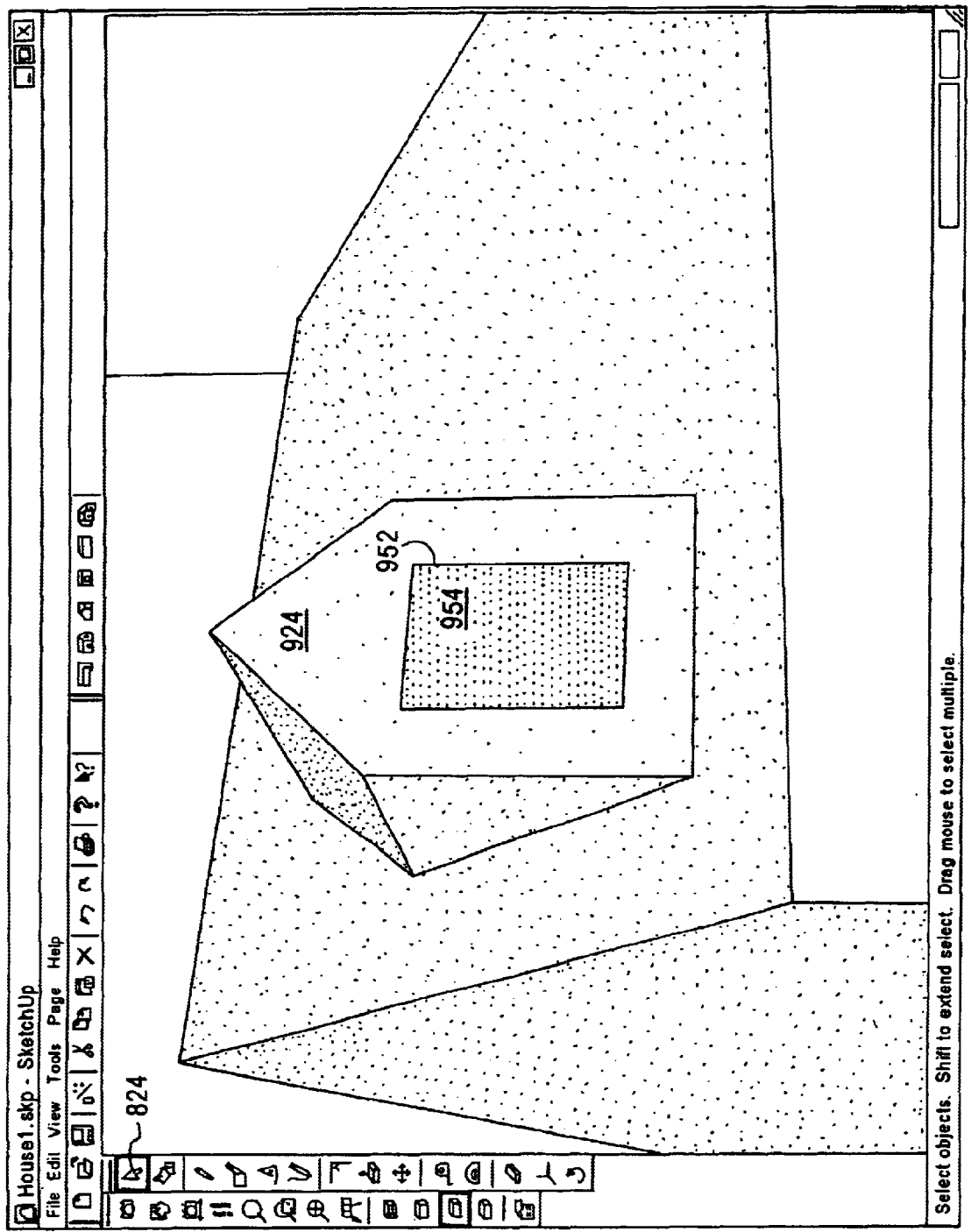
Figure 9Q:
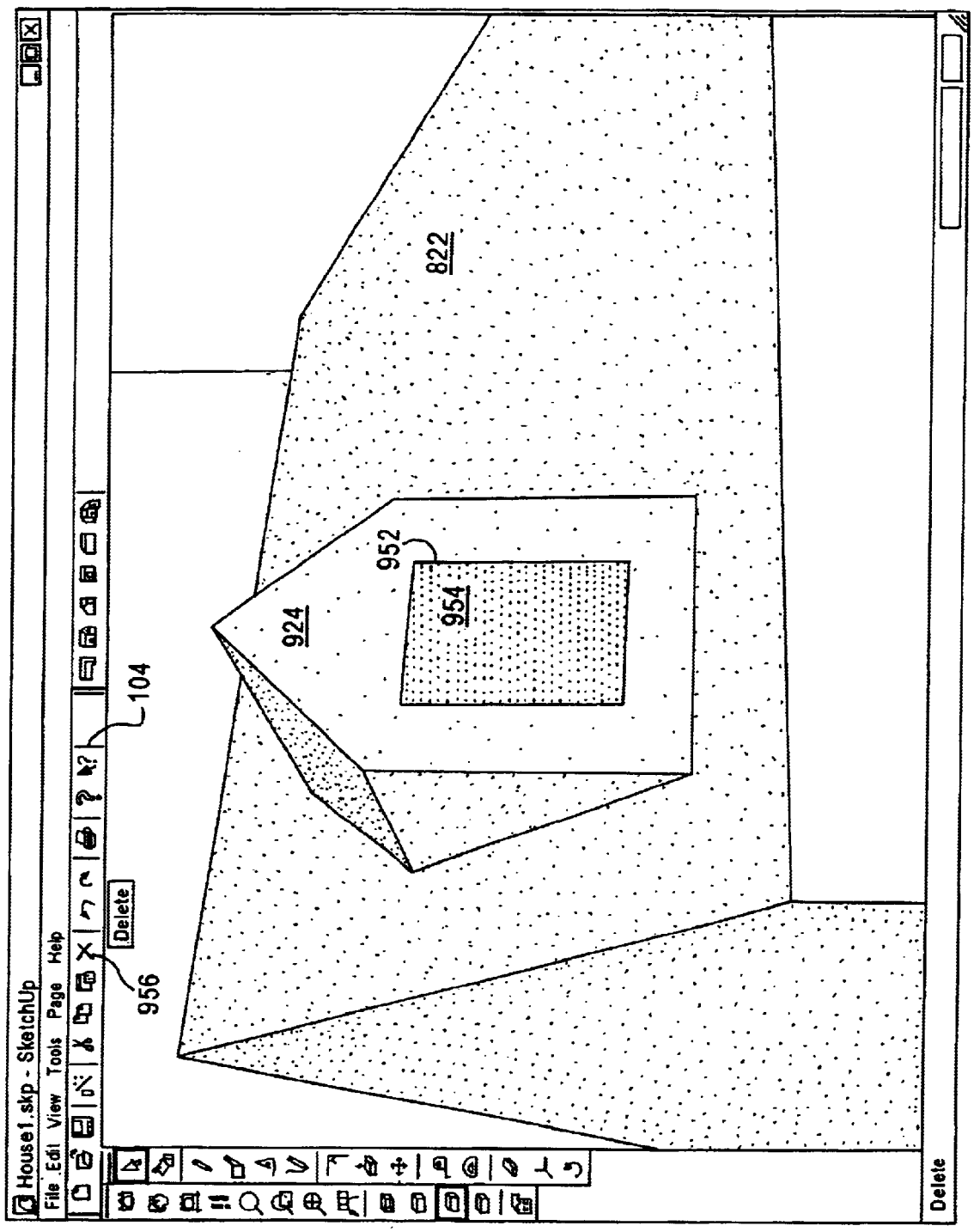
Figure 9R:
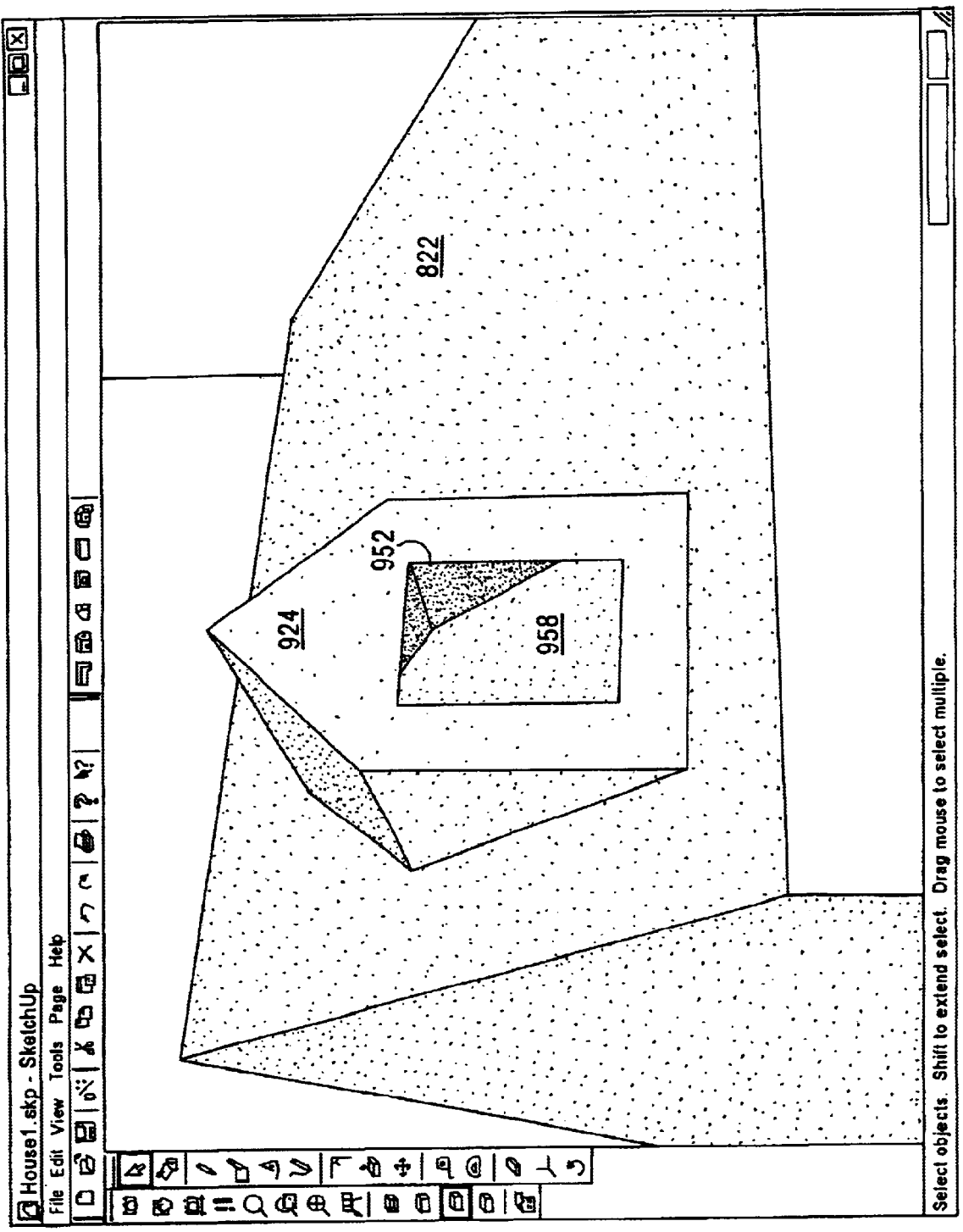
Figure 9S:
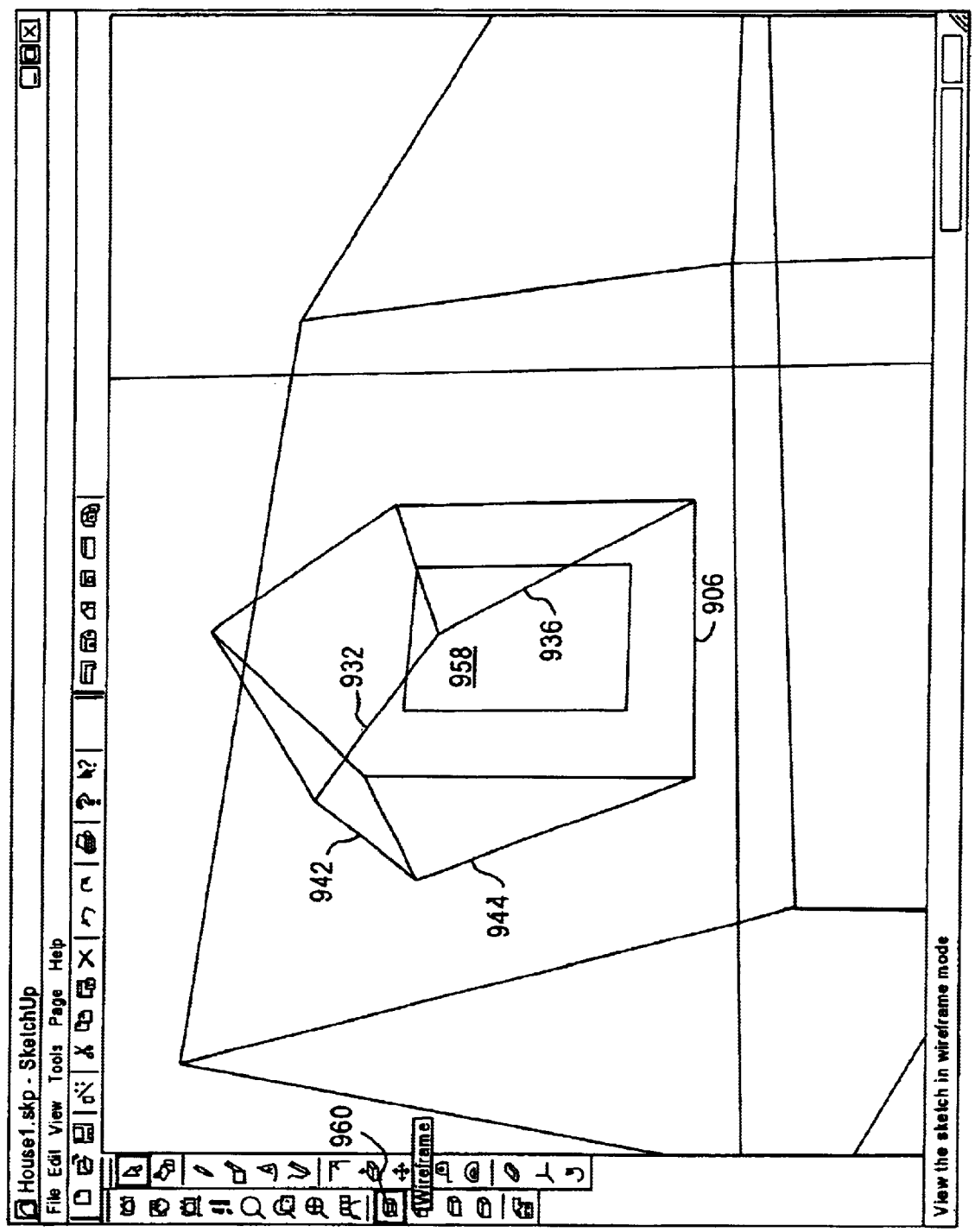
Figure 9T:
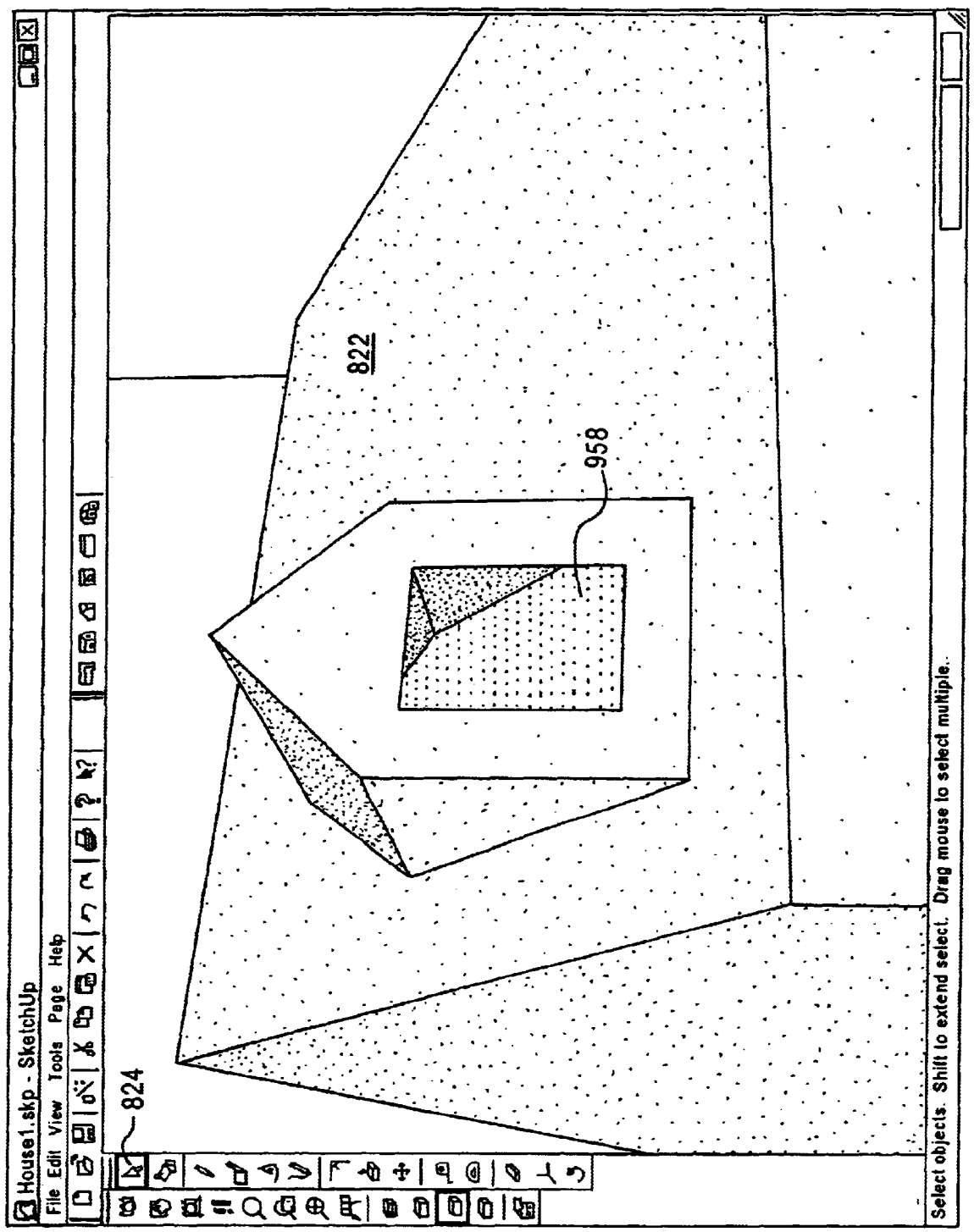
Figure 9U:
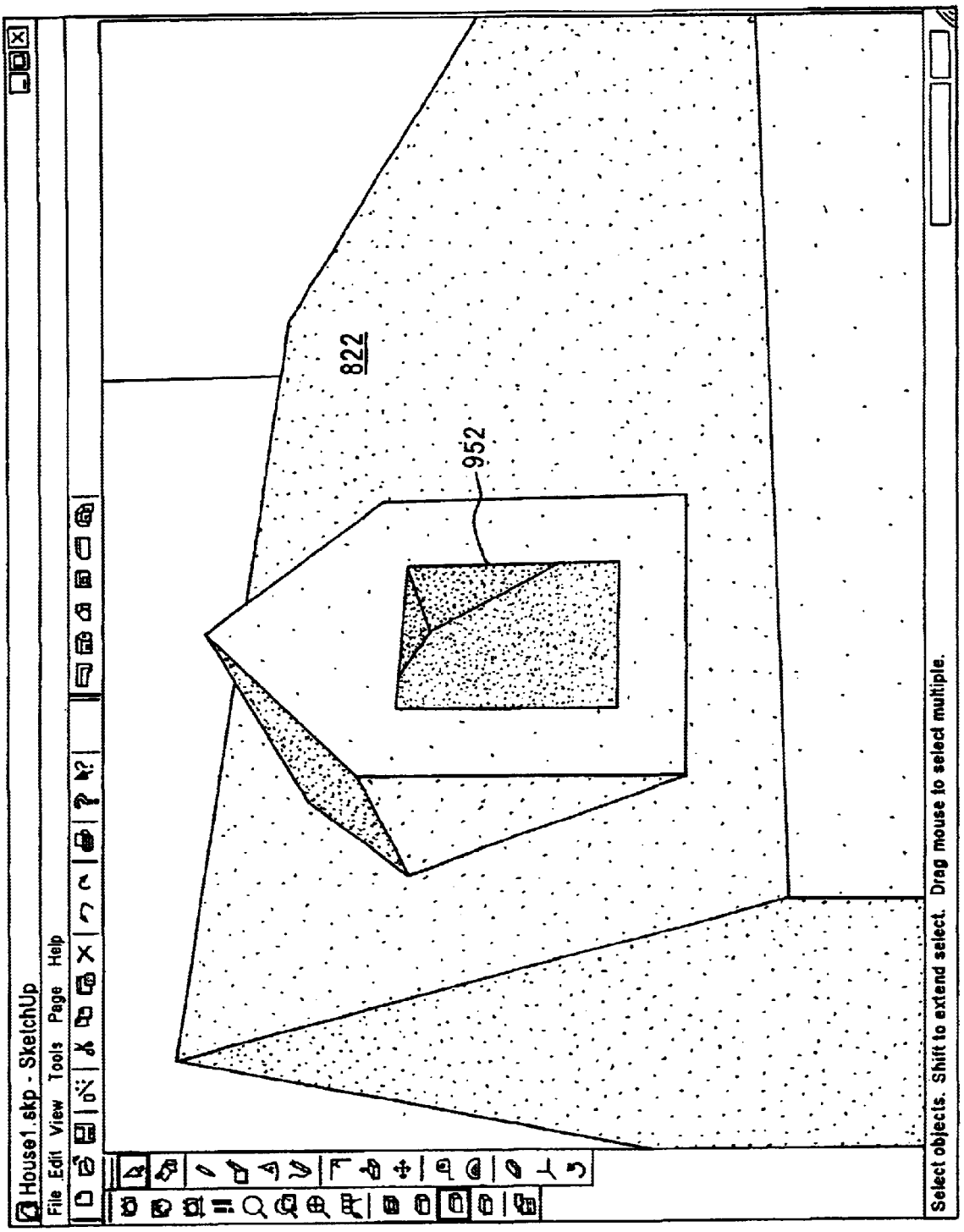

The sequence of FIGS. 9A through 9U depict drawing lines and edges that interact with existing objects in a three-dimensional manner. The present graphical design and modeling application provides visual cues and indicators to aid a user in real-time positioning of objects as the objects are being drawn. Many of the basic drawing operations and visual cues have already been introduced and will not be explained again in detail with relation to the description of FIGS. 9A through 9U.

A different viewing angle of the house is depicted in FIG. 9A. According to a preferred aspect of the present graphical design and modeling application, when the pencil icon 902 is activated and the cursor is positioned over the face 822, the user can be provided a pop-up cue 904 to indicate that drawing operations will take place on the face 822. In FIG. 9B, the line 906 is drawn on the roof surface 822. However, the user can move the mouse to affect the drawing of a line not on the surface 822, for example line 910 of FIG. 9C. As illustrated, the line 910 changes to the same color as the z-axis (not shown) and the visual cue 908 pops-up as well. The line 912, in FIG. 9D, is drawn to complement the line 910 using the inferencing aids described earlier. FIG. 9E illustrates an inferencing aid that has not previously been introduced. The midpoint 920 of line 906 is inherently defined whenever the line 906 is first created. When drawing the line 914, this midpoint 920 can automatically be provided as a reference point even though the midpoint had not explicitly been defined previously. The color of the midpoint 920 on line 906 can have a unique color, for example cyan, to provide an additional indication that the point 920 is a midpoint. In FIG. 9F, the front surface of a dormer is completed by the drawing of line 922 and once the line 922 is drawn, a closed planar face 924 is created, as shown in FIG. 9G. The ridgeline 926 of the dormer is drawn to connect the top of the front face 924 with the roof face 822, as shown in FIG. 9H. The pop-up cue 928 and other visual clues are displayed when the cursor is positioned, in three-dimensional space in contact with the roof surface 822. The color of the line 926 can be used by the user to confirm that the line 926 is properly oriented in relation to the axes. FIGS. 9I through 9M illustrate the sequential steps of completing the dormer on the roof surface 822. The particular order of this sequence of drawing steps is exemplary only and can be performed in any order to arrive at the resulting dormer of FIG. 9M.

In this sequence of drawings, lines 930 and 932 are added to create one dormer roof 934 as shown in FIG. 9J. With the addition of the line 936 drawn on the roof surface 822, one dormer side surface 938 is created as shown in FIG. 9K. FIGS. 9L and 9M shown analogous operations on the other side of the dormer with the lines 940, 942 and 944 creating the dormer surfaces 946 and 948.

The orientation of the user's view is modified in FIG. 9N in order to clearly view the face 924 of the dormer just created. A rectangle tool 950 is activated, as shown in FIG. 9N, so that when the cursor is over the face 924 of the dormer, the pop-up cue 951 is displayed. To use the rectangle tool, a user selects one corner of a rectangle 952, for example by clicking on a particular cursor location, and then drags the mouse towards the opposite corner of the rectangle 952 where the user releases the mouse button. As a result, the rectangle 952, as shown in FIG. 9O, is drawn on the dormer's front face 924 and an interior closed planar surface 954 is created that can be manipulated independently of the face 924.

The select tool 824 is used to select the inner face 954, as shown in FIG. 9P and then, equivalent to an erase operation, the delete icon 956, shown in FIG. 9Q, is selected from the menu bar 104. In addition to the delete icon 956, the DEL key on a keyboard can also be used to erase a selected item from the display window. As a result, the face 954 is deleted while the rectangle 952 remains and a view into the dormer to the region 958 of the roof surface 822 is provided to the user, as depicted in FIG. 9R. The wire-frame icon 960 is activated, in FIG. 9S, to more clearly illustrate the interior face 958 that is formed from the edges 906, 932, 936, 942 and 944. FIG. 9T, once again, depicts the house in the shaded view and shows the region 958 as being selected. Once selected, the face 958 can be erased or deleted to produce the dormer and roof structure depicted in FIG. 9U. The user is presented a view through the dormer window (i.e., the rectangle 952) and the roof 822 into the interior regions of the exemplary house.

Components

Once all the lines, edges and faces have been created to define a dormer 1002, the present graphical design and modeling application provides a user with the ability to duplicate these geometrical features as a consolidated object. Because a house can have many dormers, or other particular features, a user is provided with a facility for duplicating and otherwise manipulating user-defined components, such as dormers.

Figure 10A:
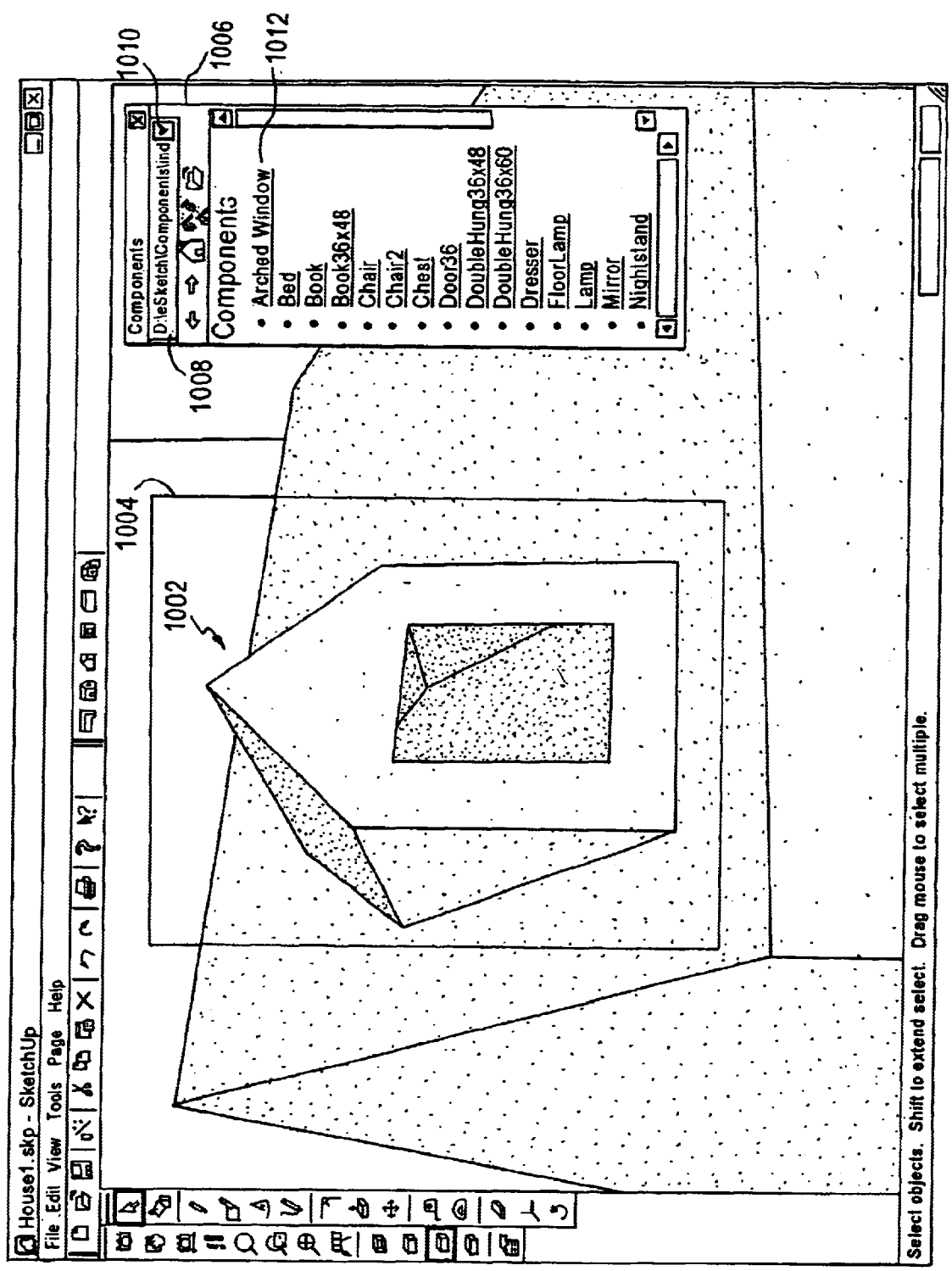
FIGS. 10A–10O illustrate a sequence of screen shots in which a user creates an intelligent component according to an embodiment of the present invention.

Using the drop-down menus or an appropriate icon, the user can display, as shown in FIG. 10A, a component window 1006 becomes visible that lists the components that can be added to the present drawing. Within the window 1006, various component names 1012 are listed and a selection box 1008 is provided to allow the user to view other components, such as specialized library of pre-defined-components, or a list of those components that are present in the current drawing.

Figure 10B:
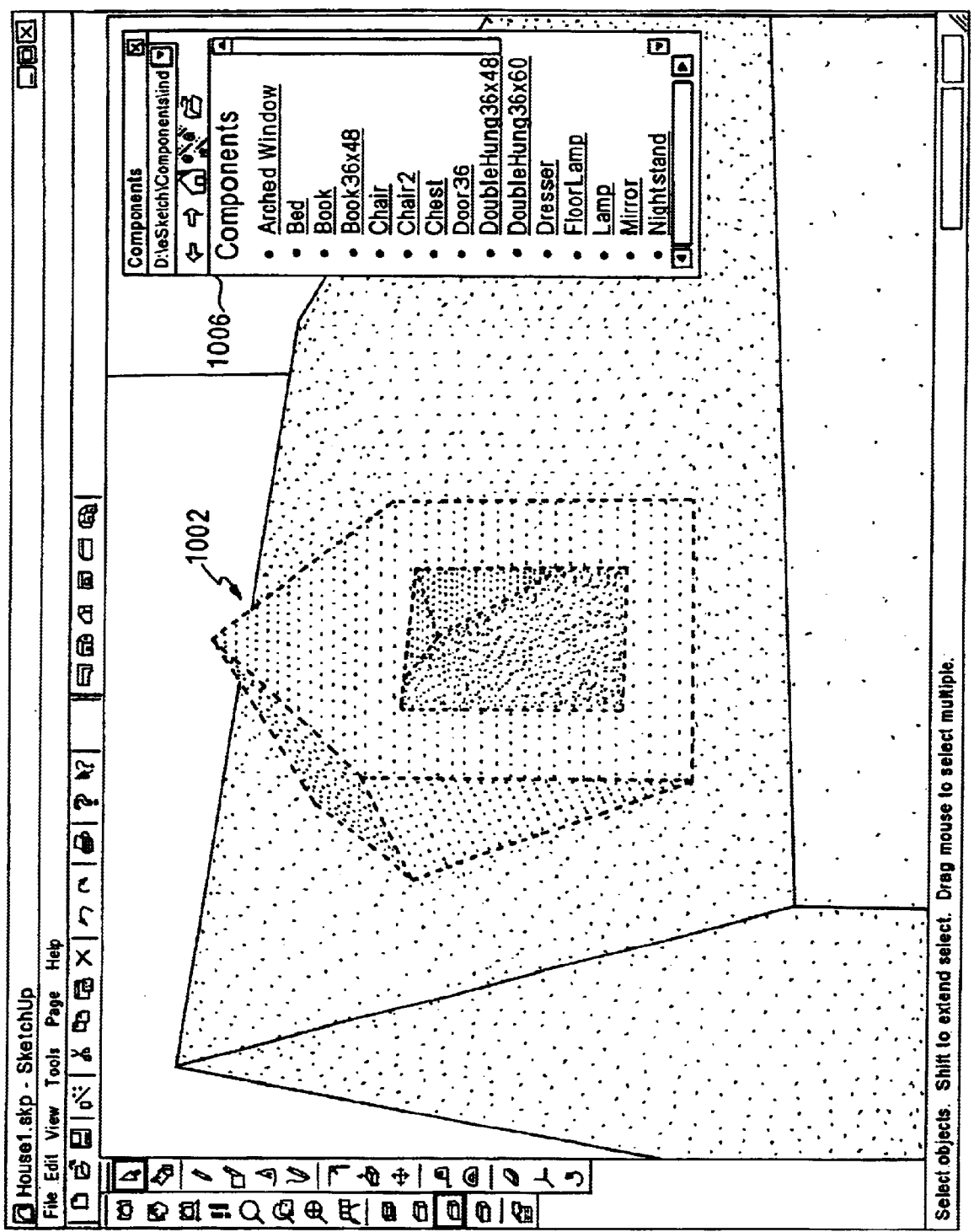

FIG. 10A illustrates, by way of the rectangle 1004, a method of selecting within the display window the many geometrical features that make up the dormer 1002. Once the dormer 1002 is selected, illustrated by way of the dotted lines in FIG. 10B, the dormer 1002 can be made into a component. A component is an aggregation of separate graphical elements and associated behavioral properties. Once a component is defined, that component can then be inserted, selected, moved, or otherwise manipulated within a model as an aggregate. As shown in the following sequence of figures, individual graphical elements can be drawn on a model and then selected in-place to define a component. The definition of a component includes the elements that comprise the component and its associated behavioral properties. Thus, when storing a component within a computer system, the data structure of the component includes both the geometrical elements (e.g., vertices, edges and faces) of the component as well as the expected behavior of the component. In this way, users can create a re-usable graphical object and provide the object with rules regarding how the object should interact with the other elements within a model in which the component is placed.

Figure 10C:
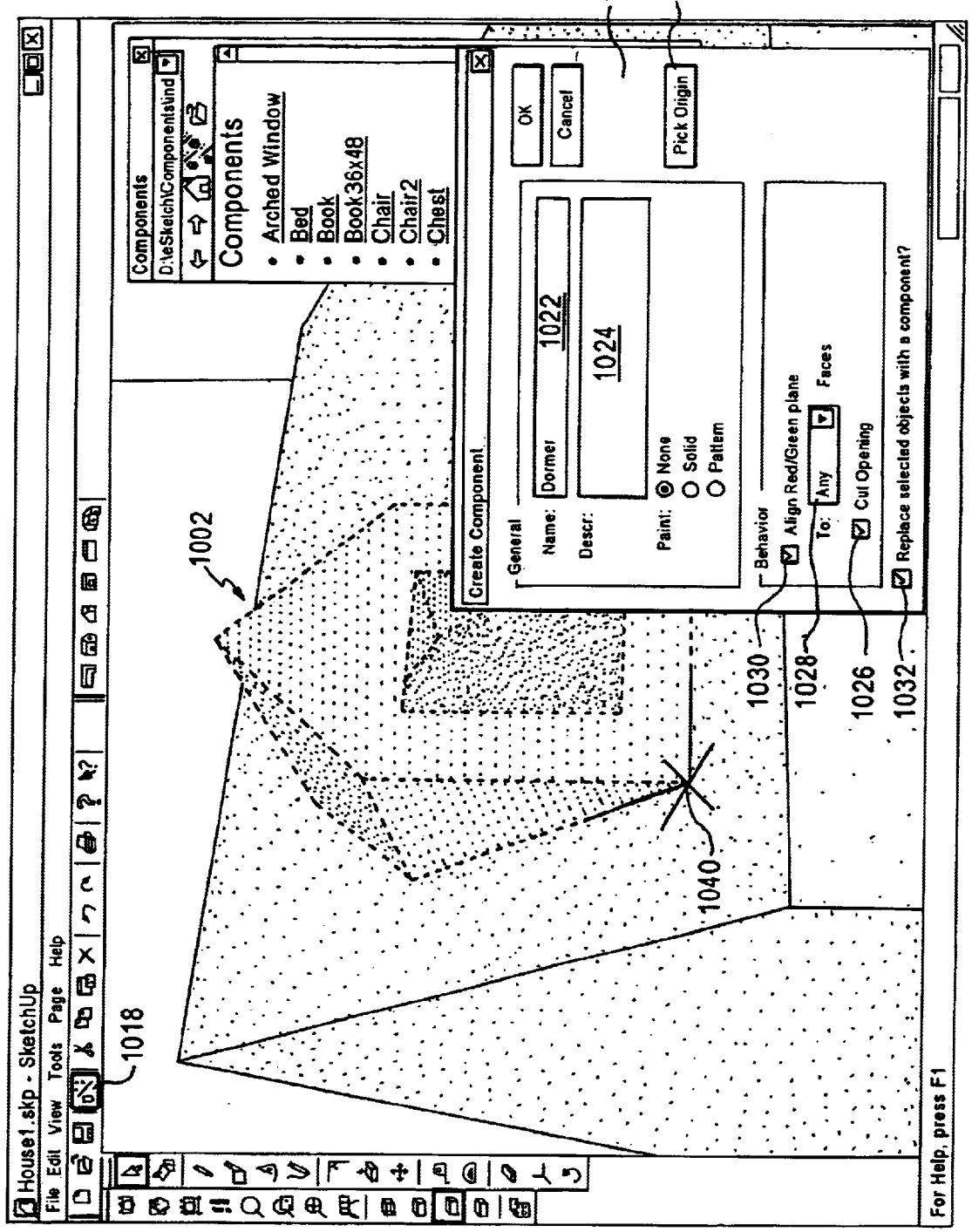

A component creation tool 1018 is depicted in FIG. 10C which, when selected, causes input display window 1020 to appear on the screen. The display window 1020 provides a way for the user to input a name 1022 of the component, a description 1024 of the component, and to specify its behavior. Check-box 1026 allows the user to specify whether or not a component will cut an opening in the surface on which it is placed and box 1030 allows the user to specify whether the red-green plane (i.e., a reference plane for the component) will be aligned-with the plane of the surface on which the component is located. The selection box 1028 permits a user to specify the types of surfaces the component will snap to. With the selection box 1028 the user can essentially limit a component to being placed on vertical, horizontal, slanted or any surface planes. The option box 1034 allows the user to select a point 1040 of the component 1002 as the origin in order to aid in placing and orienting the component 1002 in a model. The origin point 1040 also displays the orientation of the red-green plane for the component 1002. Box 1032 allows the user to replace the currently selected objects that comprise the dormer 1002 with an instance of the component presently being defined. If box 1032 is not selected, then the selected objects remain discrete elements even though they are used to successfully define the new component. Once the component definition is complete, the component is created by the user selecting the "OK" button. Once the component is defined, the component can be inserted and placed within the model in the display window.

Figure 10D:
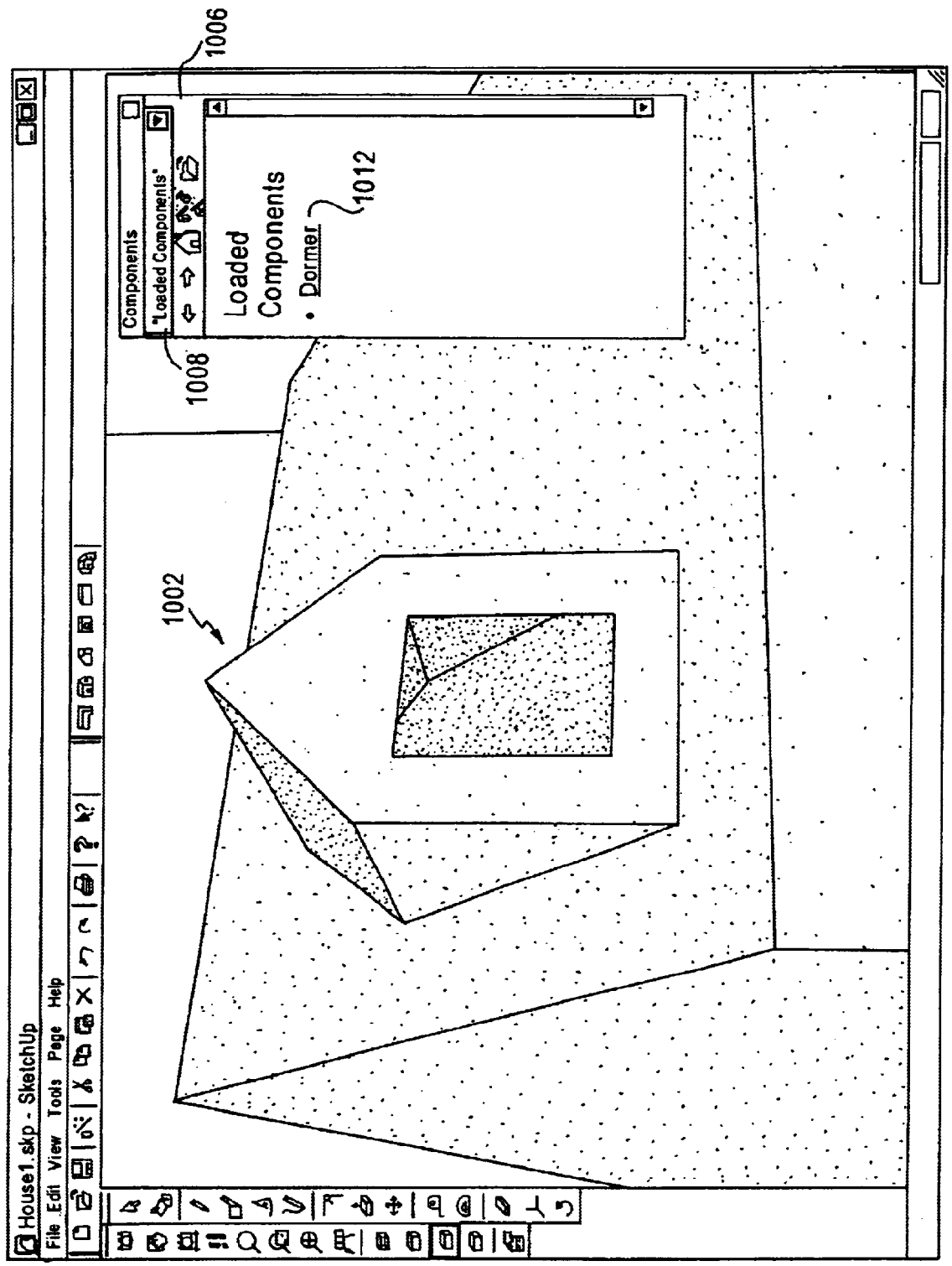

FIG. 10D depicts the dormer component instance 1002 that replaced the individual geometrical features that were created in the series of drawings earlier described. The physical appearance of the dormer 1002 does not give any indication that it is a component rather than individual elements but the software manages and manipulates the component differently than if it were simply individual elements. The selection box 1008 of the component dialog window 1006 has been changed to list the components that are presently loaded in the active drawing in the graphical display. The list of loaded components 1012, in FIG. 10D, is limited to the dormer component just defined. A component from the component list 1012 of dialog box 1006 can be selected by a user for insertion into the drawing.

Figure 10E:
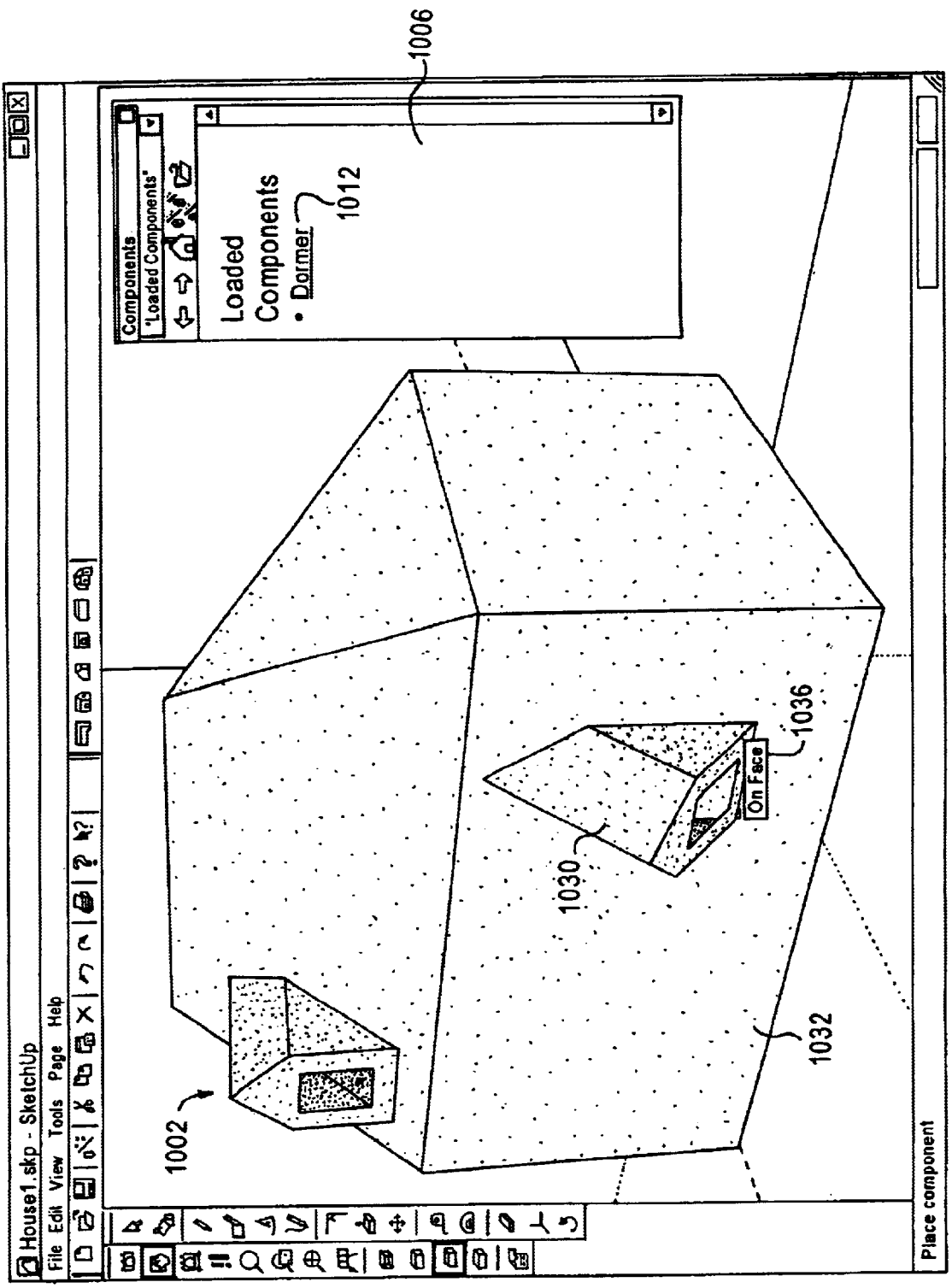
Figure 10F:
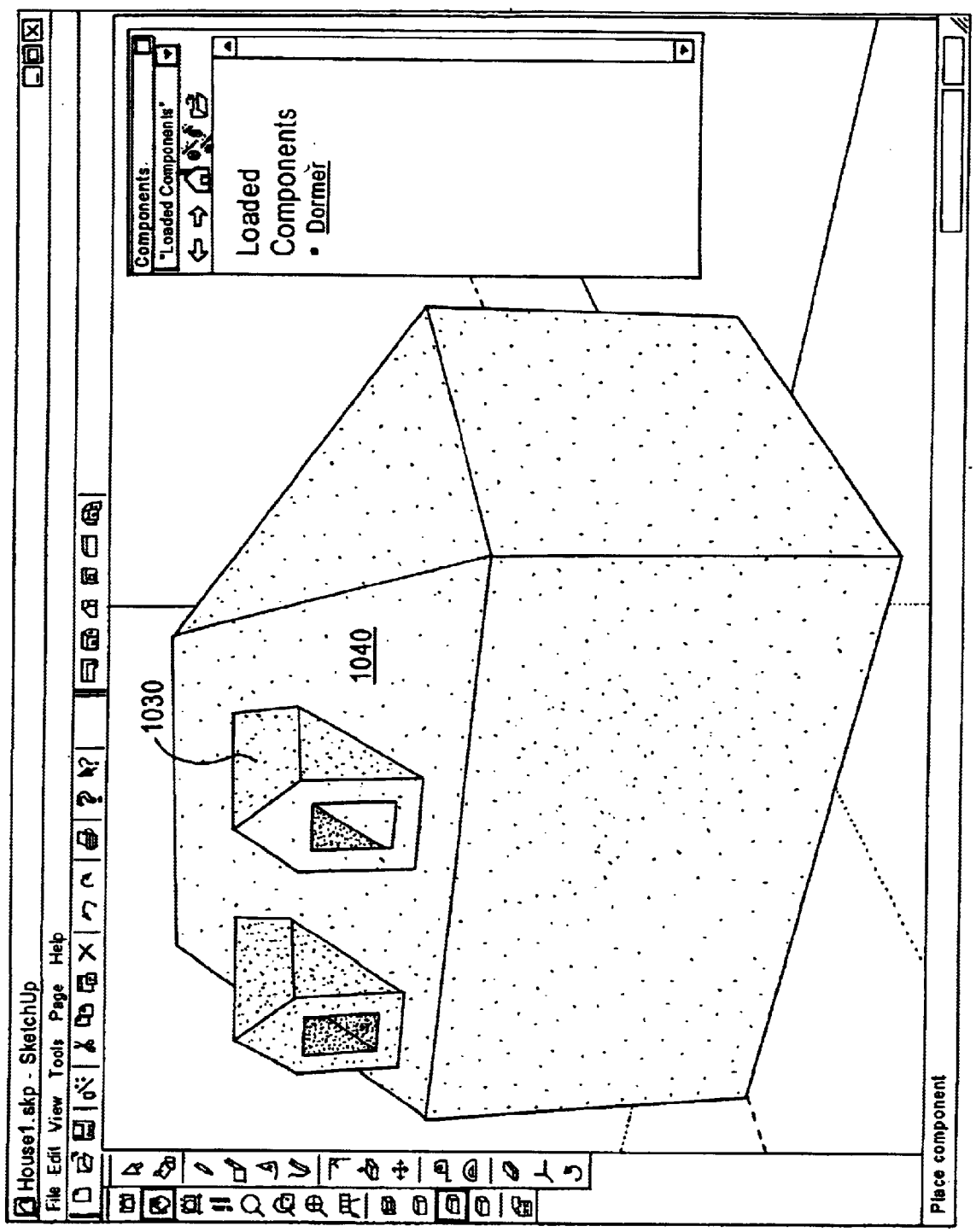

Turning now to FIG. 10E, when a component is selected from the dialog box 1006, typically by clicking on the component's name, an instance of that component 1030 comes into view in the display window and is ready to be moved to an intended location. The selection and placement of a component is a relatively simple operation. The user need not be required to select the component instance in the display window, then select the move tool, then position the instance, and then anchor it. In the present graphical design and modeling application, the user simply chooses the component from the list 1012 and moves the cursor to the desired position in the display window to anchor the origin of an instance of the chosen component. FIG. 10E illustrates that when the user moves the component instance 1030 over the vertical face 1032, the instance 1030 snaps to the surface face 1032. In other words, the red-green plane of the component instance 1030 is oriented on the same plane as the vertical face 1032. As seen in FIG. 10E, a pop-up cue 1036 indicates that the component instance 1030 is "on face" and can be anchored to the surface face 1032 by a left mouse click, or other method. By continuing to move the cursor position before performing a left mouse click, the user can position the dormer instance 1030 on the roof surface 1040. As shown in FIG. 10F, because the dormer component was defined as having the behavioral property of sticking to any plane, the dormer instance 1030 automatically orients itself with the plane of the roof 1040 when the cursor is positioned over the roof 1040. Once anchored in place, a hole is cut in the roof 1040 because that behavioral property was selected as well during the creation of the dormer component.

Figure 10G:
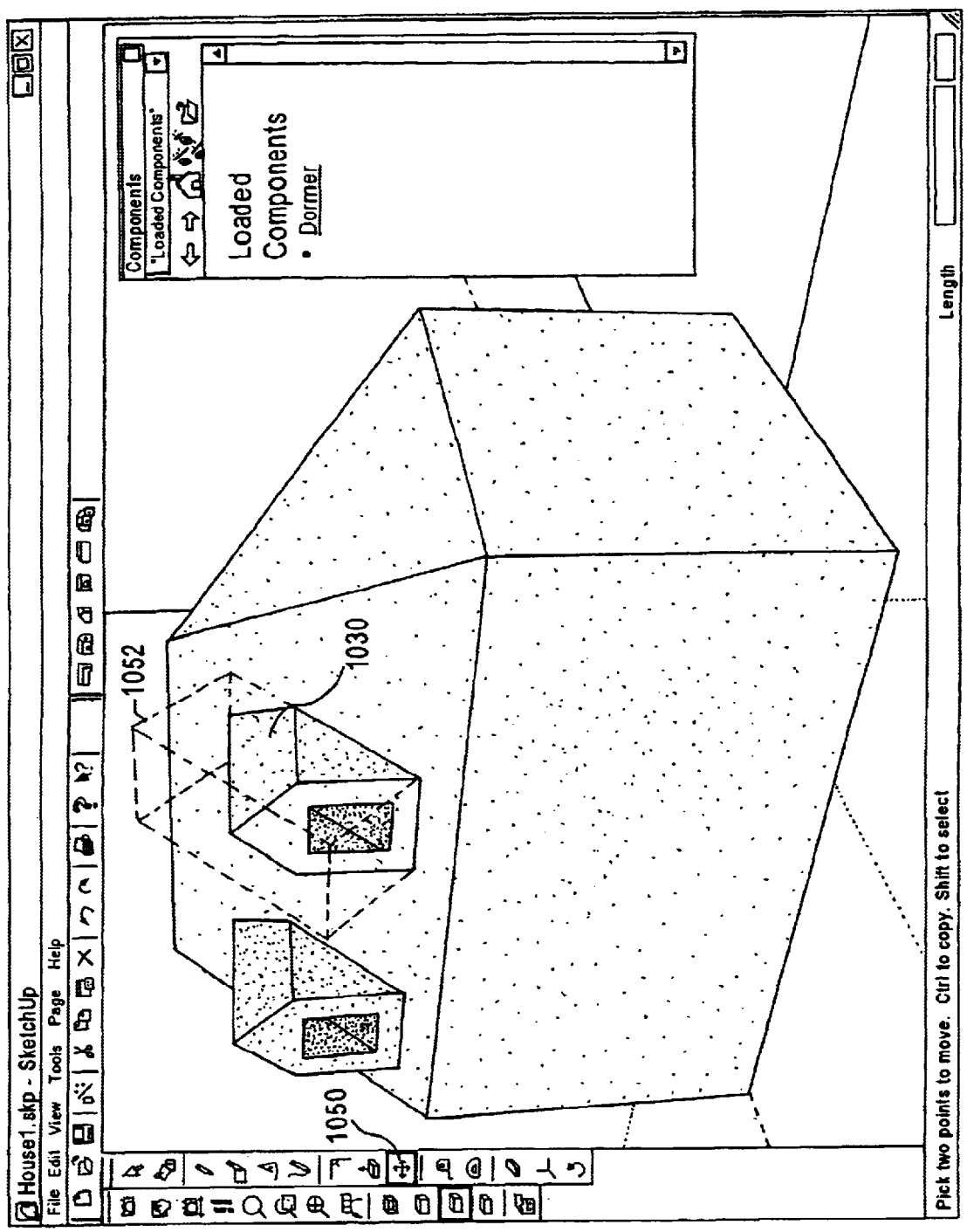

A move tool 1050 is illustrated, by way of being highlighted, as activated in FIG. 10G. This move tool allows the user to move a selected object and reposition that object within the model. When any portion of the dormer instance 1030 is selected, the entire dormer, rather than its individual elements, is selected, as shown by the highlight box 1052 in FIG. 10G. Once the instance 1030 is selected, dragging the mouse, or the arrow keys, can be used to reposition the instance 1030 from its original placement.

Figure 10H:
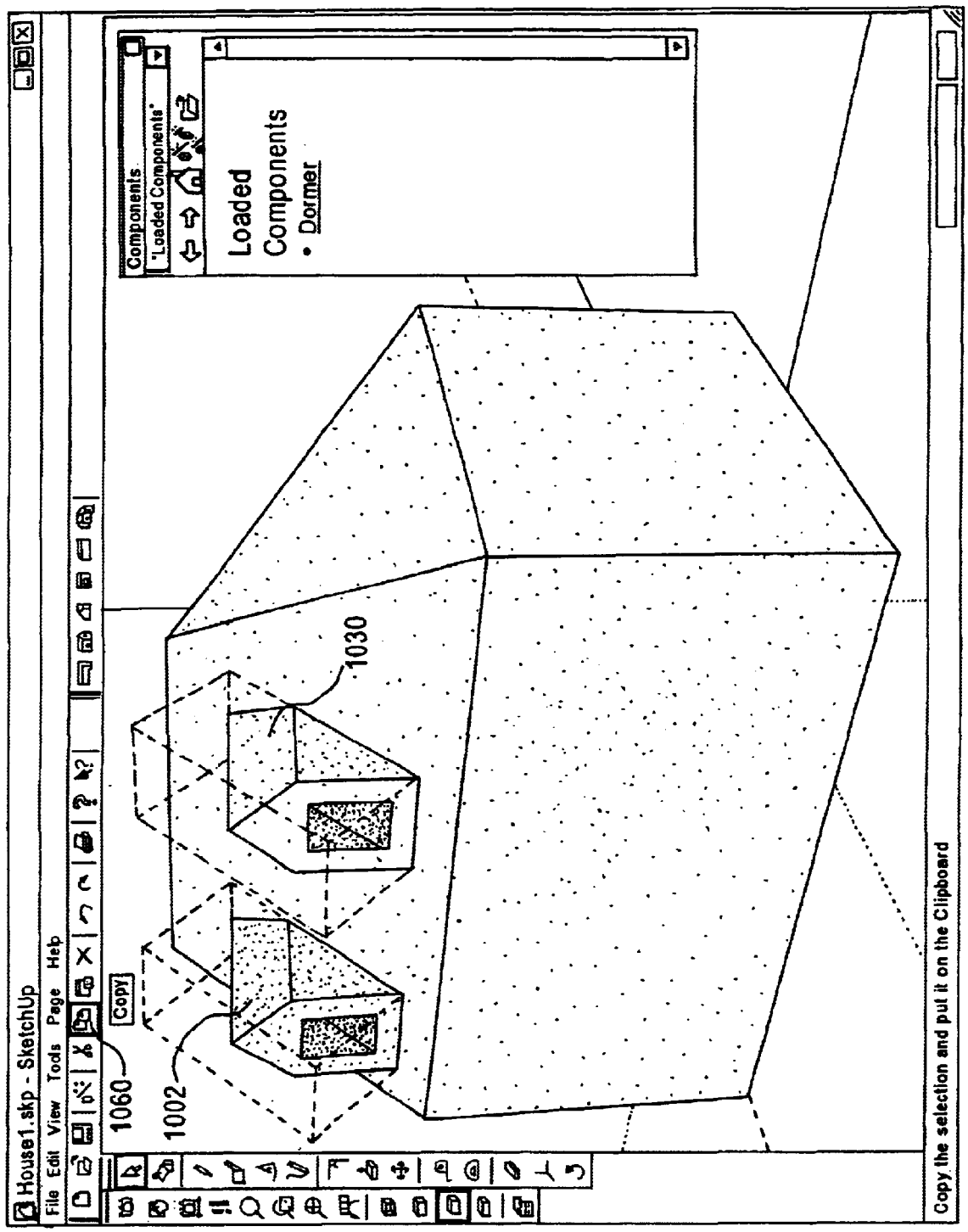
Figure 10:
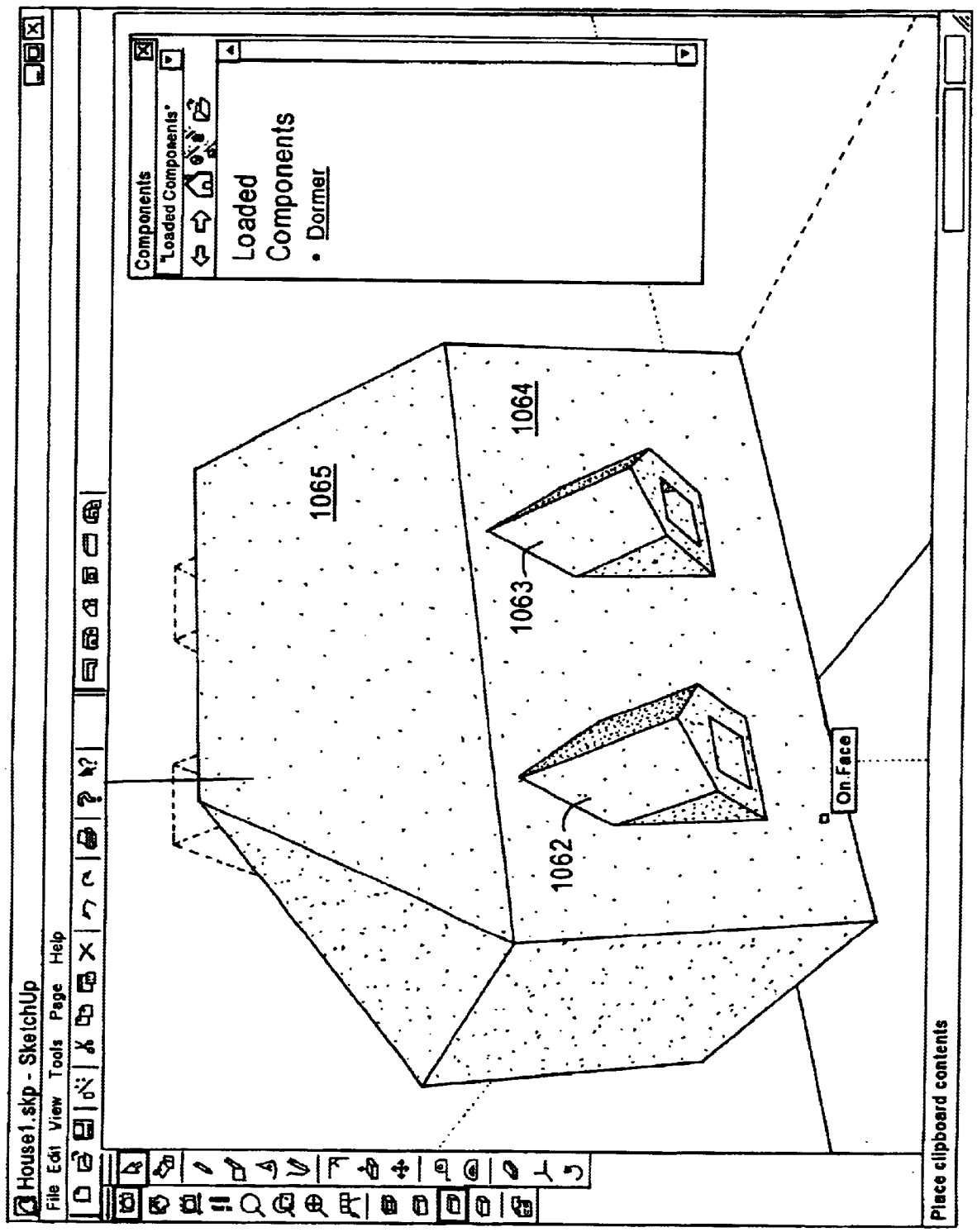
Figure 10J:
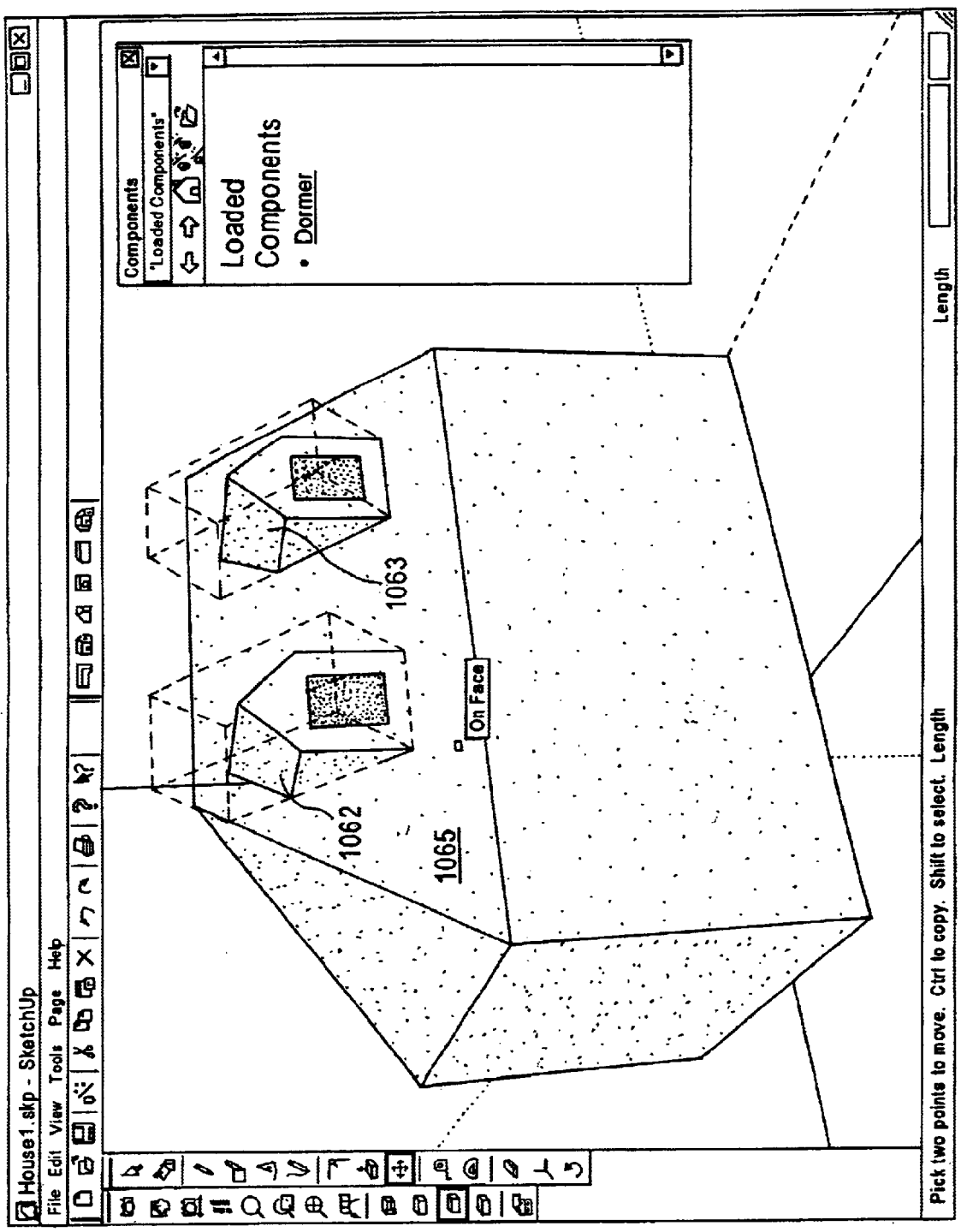

In FIG. 10H, both dormer instances 1002 and 1030 have been selected. One method of performing this multiple selection is to select one instance, for example 1002, and then hold the CTRL key while selecting the other instance 1030. After selection of the dormer instance 1002 and 1030, the copy icon 1060, or CTRL-C, or other method, can be used to copy the selected items. After changing the orientation of the view of the house, the paste command, or equivalent menu item, can be used to paste the copied instances into the model, as shown in FIG. 10I. The dormer instances 1062 and 1063 snap to the face 1064 over which the cursor is positioned. The cursor can be dragged over the roof surface 1065, as shown in FIG. 10J, to cause the dormer instances to orient themselves with the roof surface 1065. When the instances 1062 and 1063 are placed on the roof 1065, typically by clicking the mouse, appropriate openings are cut in the roof 1065.

Figure 10K:
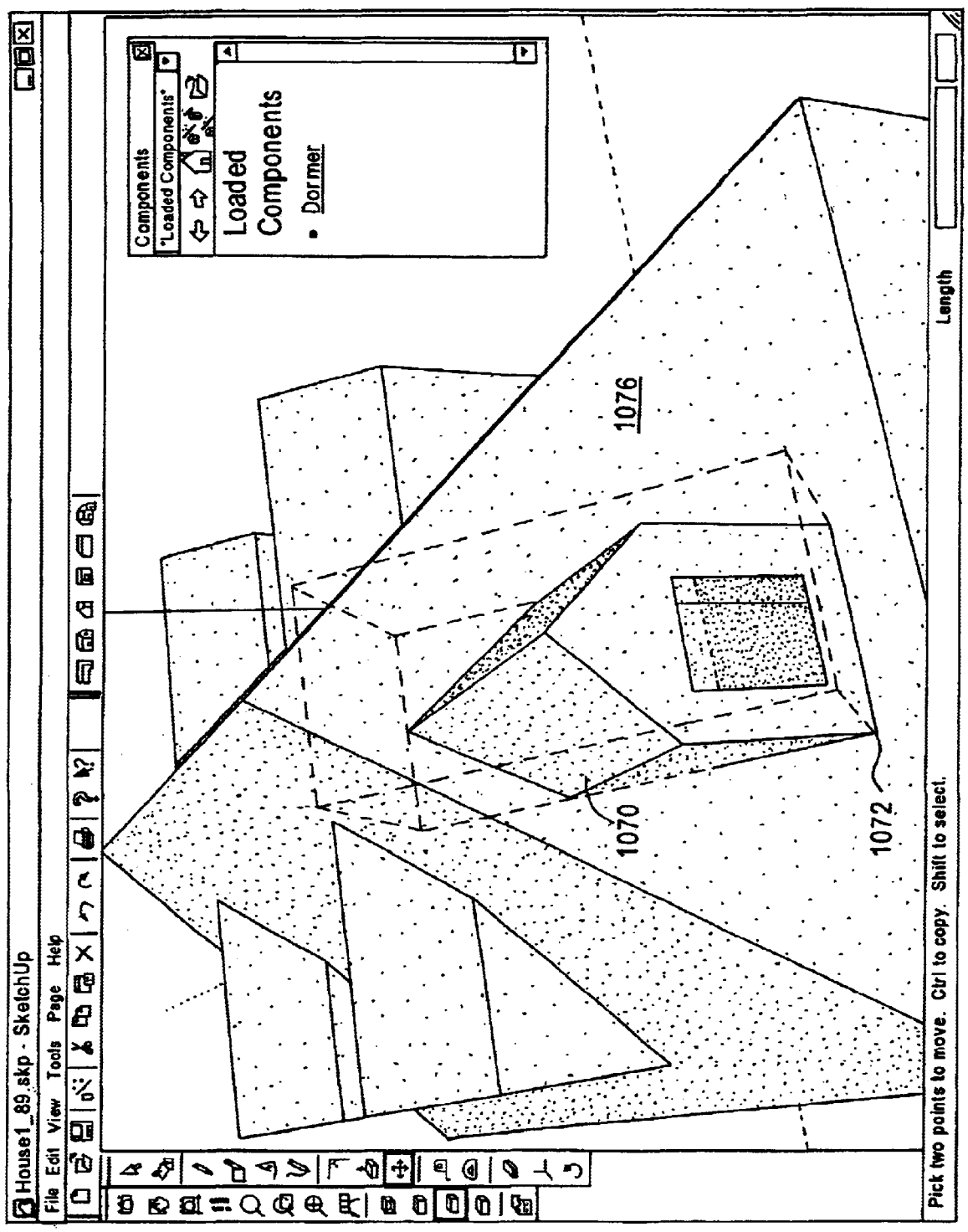
Figure 10L:
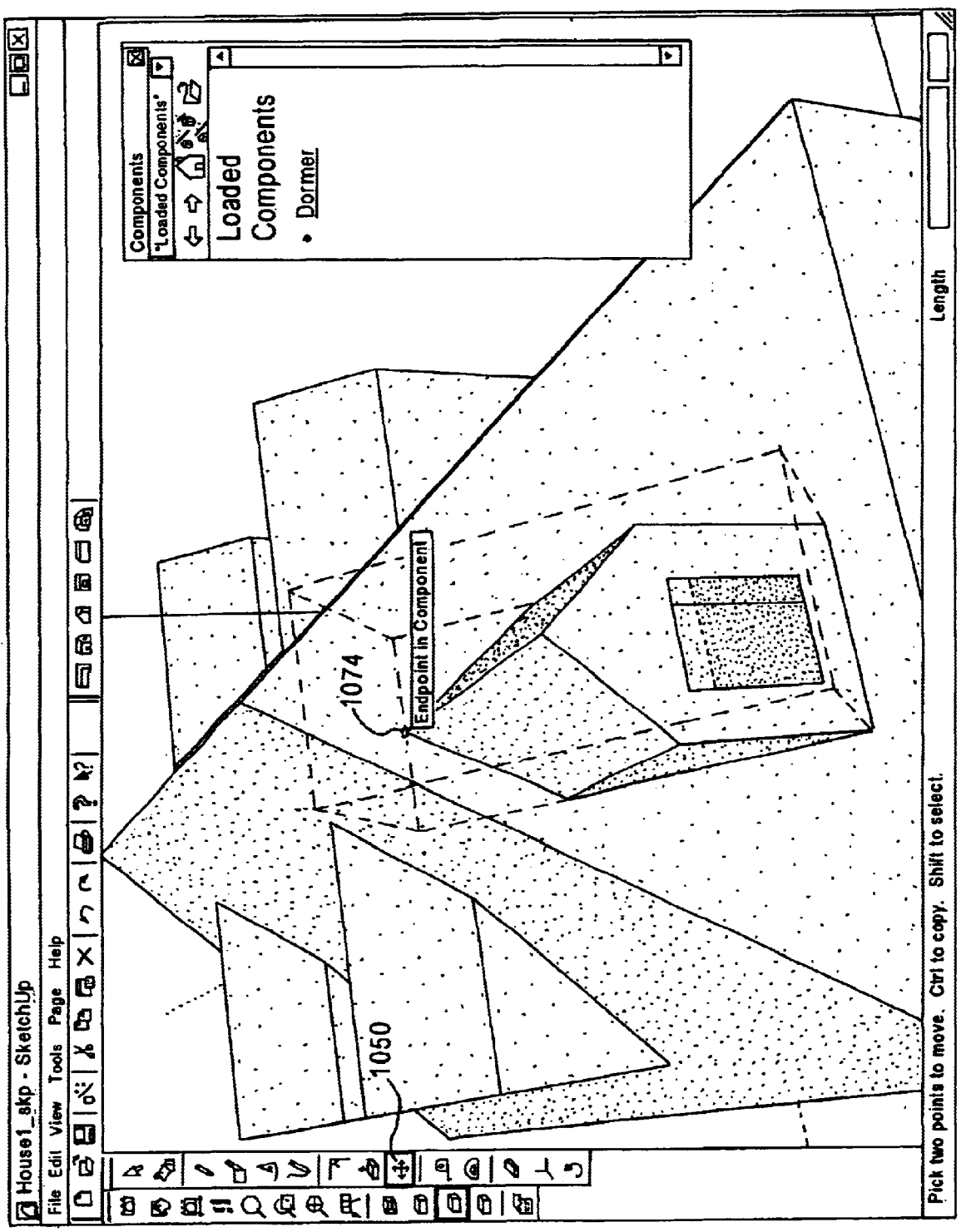
Figure 10M:
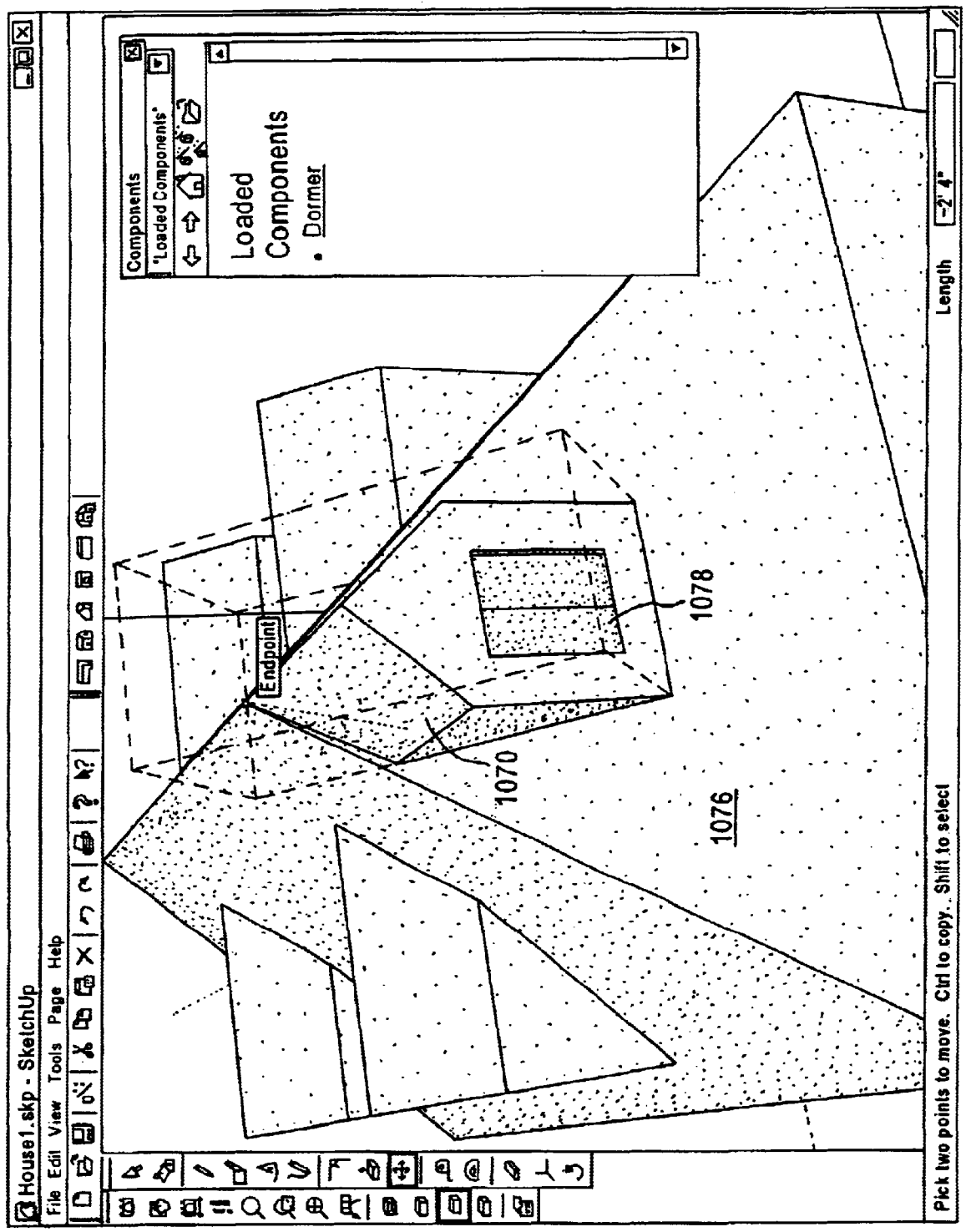
Figure 10N:
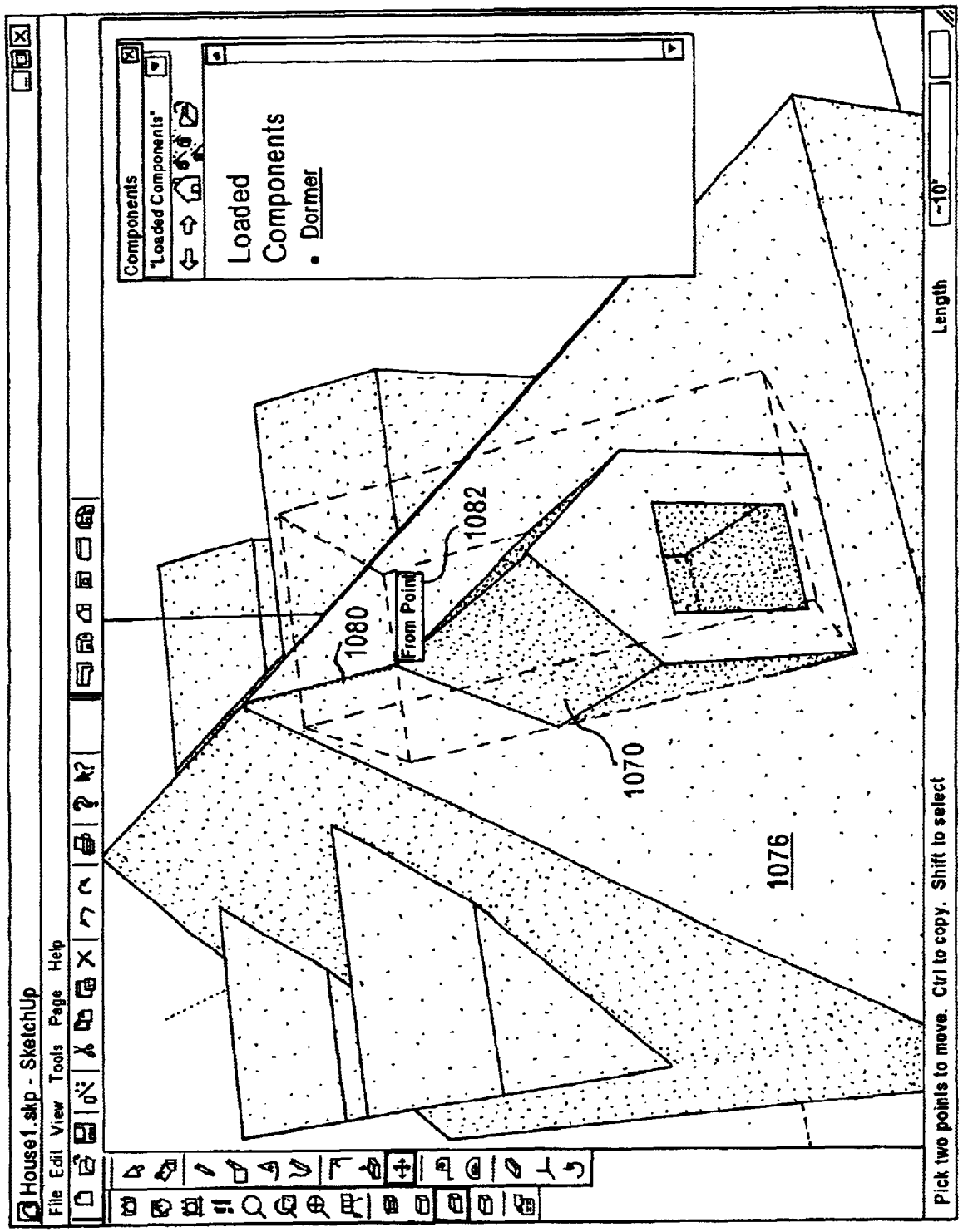
Figure 10:
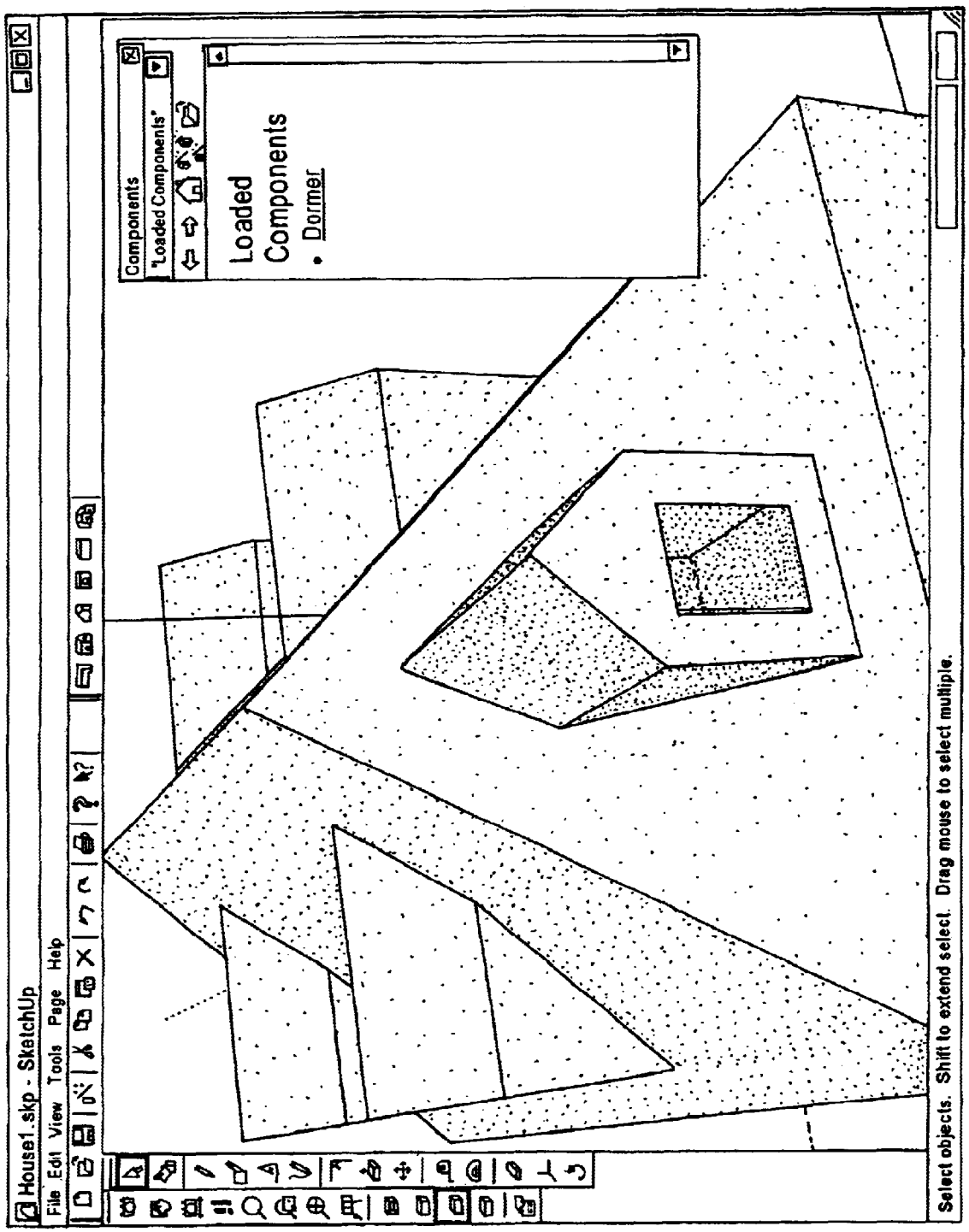

The sequence of FIGS. 10K through 10O illustrate that the inferencing aids, described earlier, function with components as well as individual geometry elements. In FIG. 10K a new dormer instance 1070 is positioned on the roof surface 1076. The move tool 1050 can be used to position the dormer instance 1070. By default, the origin 1072 is the reference point for inserting the dormer instance 1070. As shown in FIG. 10L another endpoint 1074 can be selected as a reference point by moving the cursor over the endpoint 1074 and clicking the mouse, or other equivalent input, to grab the endpoint 1074. Once the endpoint 1074 is grabbed, the dormer instance 1070 can be dragged up towards the top vertex of the roof surface 1076, as shown in FIG. 10M, to identify that vertex as a point of reference for inferencing. The hole 1078 cut by the dormer 1070 in the roof 1076 is modified in real-time as the dormer 1070 is moved around the roof surface 1076. The visual cues 1080 and 1082, shown in FIG. 10N, indicate to the user that the dormer 1070 is centered on the face in line with the roof ridgeline. FIG. 10O illustrates all the dormer instances in their final positions.

Figure 11:
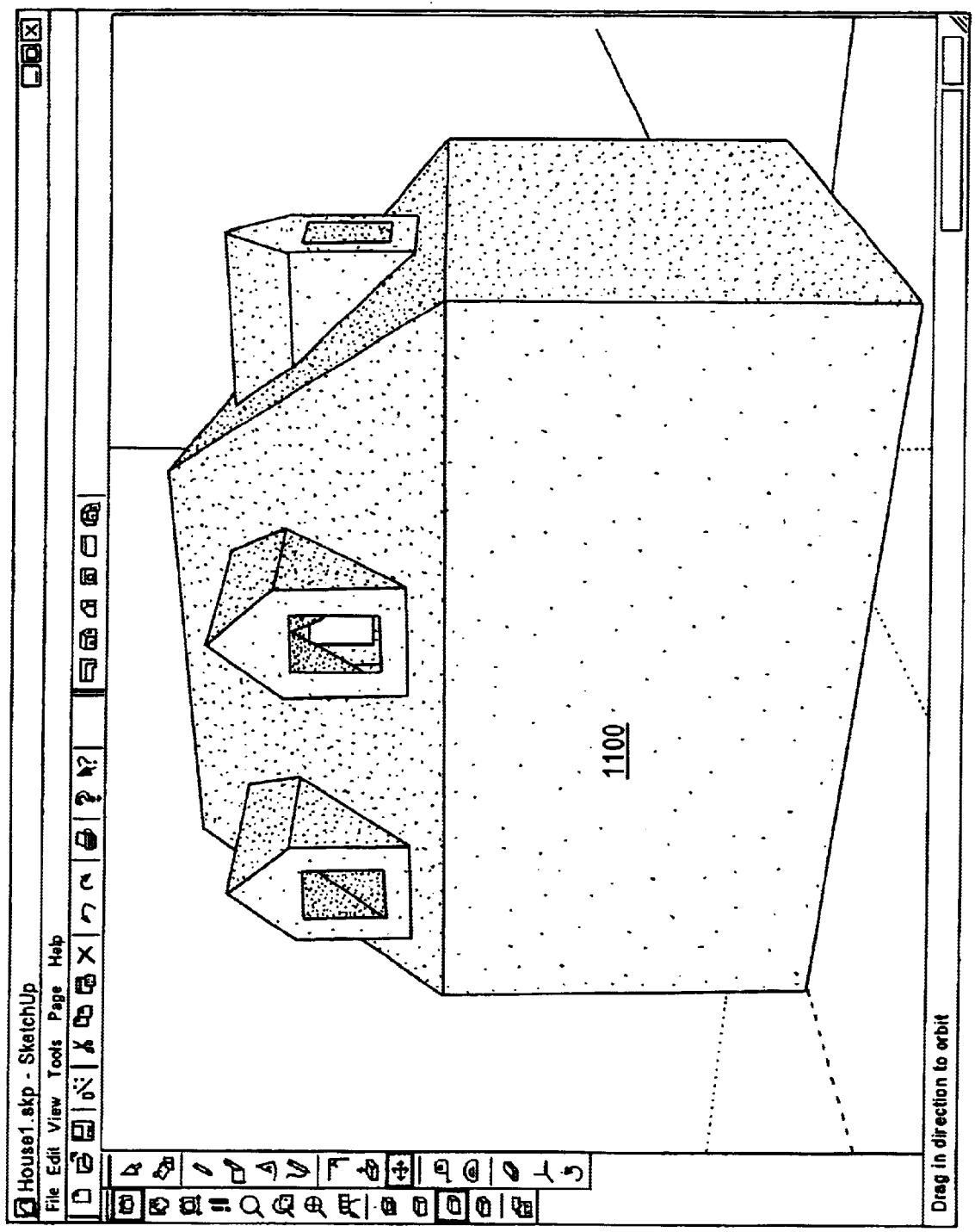
FIG. 11 illustrates the completed exemplary architecture.

The perspective view of FIG. 11 illustrates the completed exemplary house 1100 and shows the cooperation of the hole cutting behavior to provide a view entirely through a portion of the house 1100.

Figure 12:
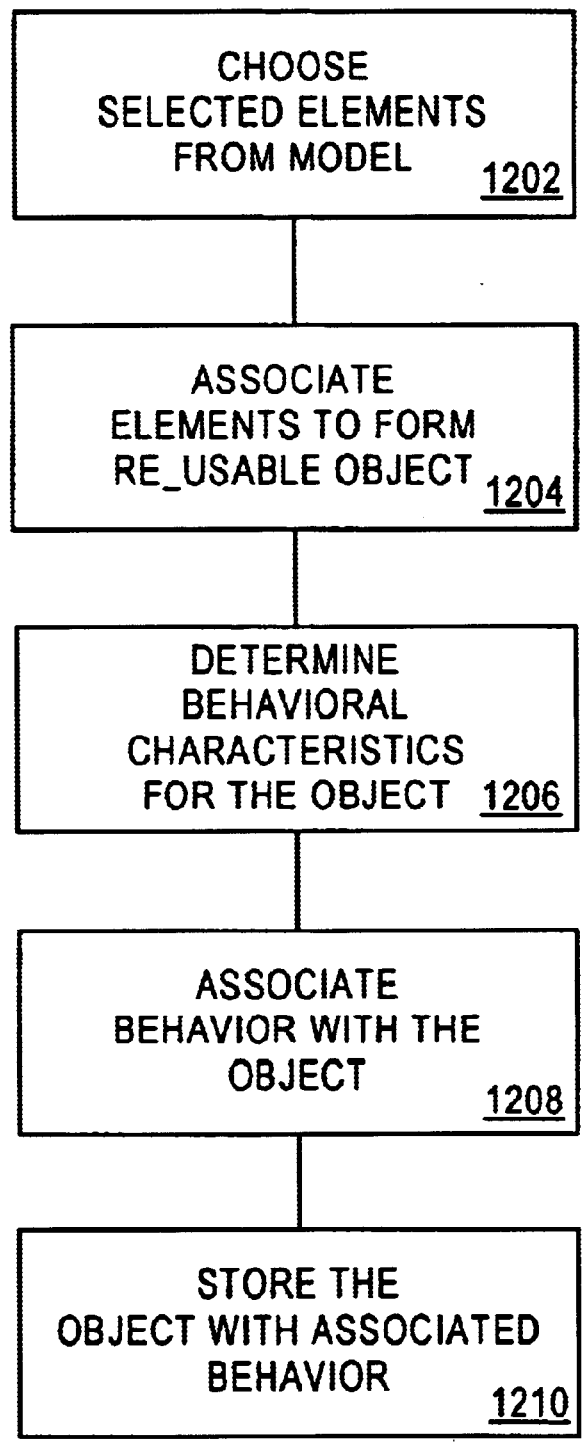
FIG. 12 illustrates a flowchart for creating an intelligent component according to an embodiment of the present invention.

The flowchart depicted in FIG. 12 provides a summary of the general procedures for defining a component within the present graphical design and modeling environment. A user first selects, in step 1202, elements within the model that will become a component. Using a component creation tool, the user, in step 1204, associates the individual elements together to form a re-usable object. As part of the component creation, in step 1206, the system, in-part based on specifications from a user, determines the behavior the component will exhibit when it is instantiated in a model. In step 1208, the object is associated with its behavior to create the component and stored together in step 1210.

In defining a component, the component creation tool analyzes the selected geometry to determine how that geometry should behave by default when inserted as a component. As illustrated previously with respect to FIG. 10C, a user can change the default behavior via a dialog box. The same information about the selected geometry used to determine default behavior can also be used to determine whether the selected geometry can be replaced with a component instance. The flowchart of FIG. 13 depicts some of the sub-steps that are performed in accomplishing the step 1206 from FIG. 12.

Figure 13:
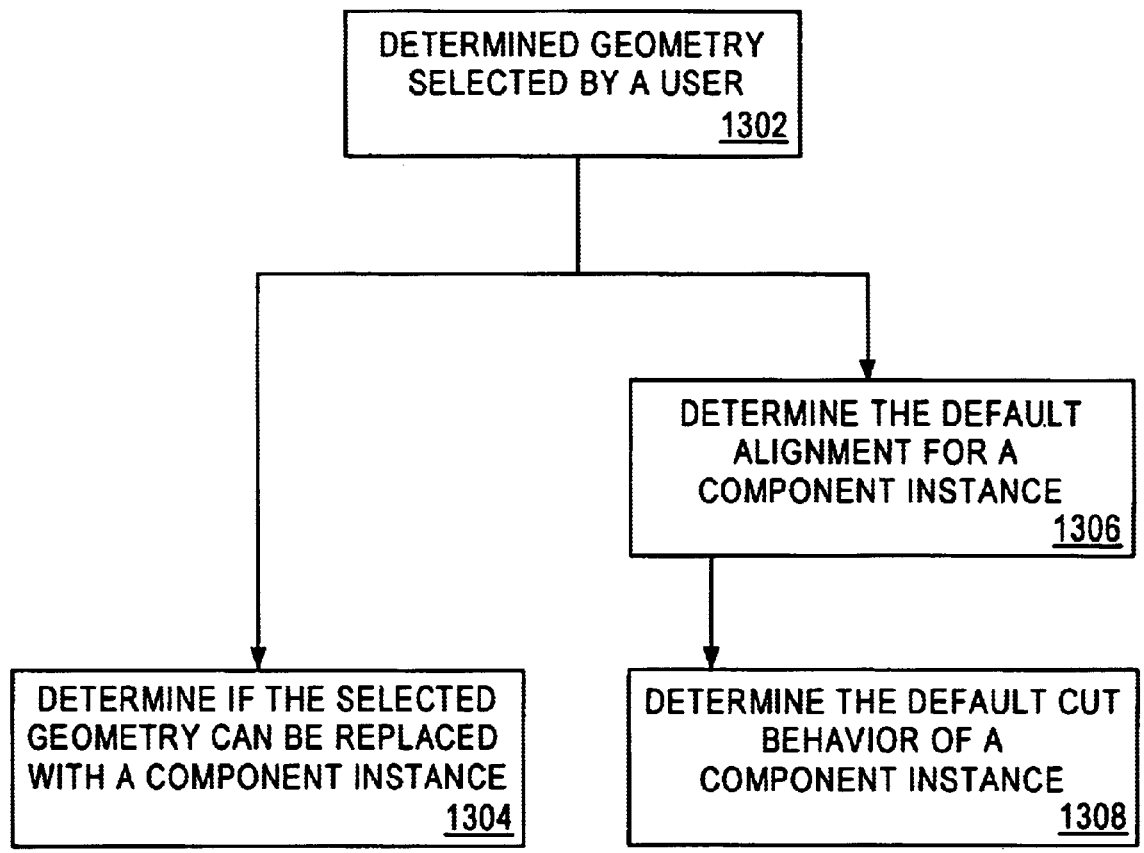
FIG. 13 illustrates a flowchart for determining the default behavior and replacement behavior of the geometry selected for a component.

In FIG. 13, the selected geometry is identified in step 1302 and evaluated to determine, in step 1304, if that geometry can be replaced with a component instance. Also using the information from step 1302, the default alignment of the component instance is determined in step 1306 and the cut behavior of the component is determined in step 1308. As illustrated, both steps 1304 and 1306 are performed after step 1302. However, steps 1304 and 1306 are depicted as parallel paths to indicate that there is not necessarily a temporal order between these two steps (although steps 1304 and 1306 can easily be performed in a linearly fashion, as well).

The determination of whether or not the selected geometry can be replaced with a component depends on if that geometry is isolated from the rest of the geometry in a model or can be disconnected from the model and still provide the same visual results when replaced with a component instance. Because the connectivity of various geometries in a model is well described (i.e., components are connected to components or other faces, faces are connected to edges, and edges are connected to vertices) determining if geometry is isolated involves searching for geometry within the selected set which references geometry outside that set. To aid in this determination, some simplifications can be made such as assuming that a face cannot exist without its edges and, thus, if a face is selected then its edges are as well.

Figure 14:
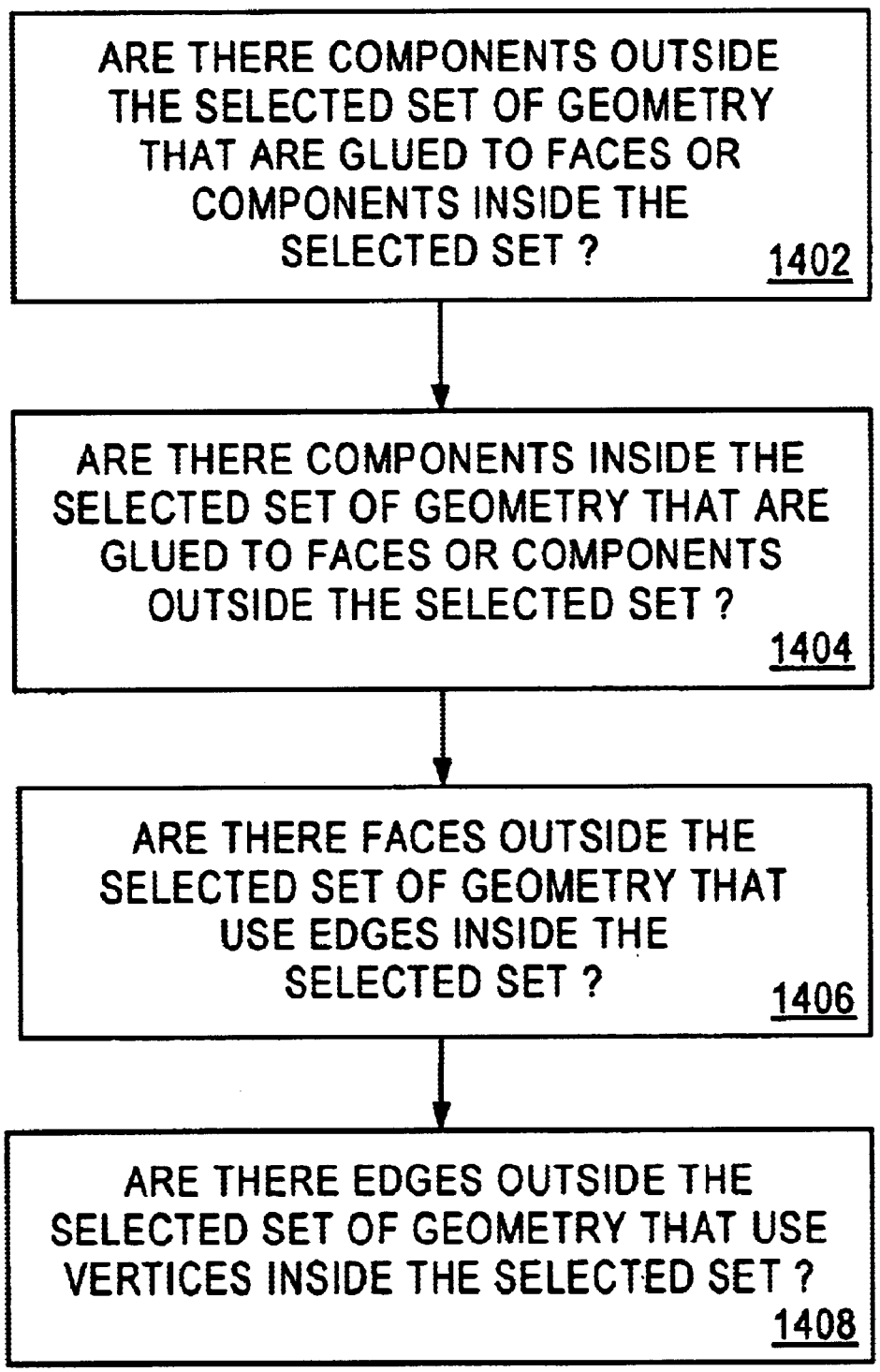
FIG. 14 illustrates a flowchart for determining, according to an embodiment of the present invention, which selected features of a model are isolated from other model geometry.

The flowchart of FIG. 14 illustrates one process for searching for isolated geometry. Components in the model, but outside the selected set, are tested to determine if any of these components are glued to faces or components inside the selected set of geometry (step 1402). Next, the components inside the selected set of geometry are tested to determine if any of these components are glued to faces or components not in the selected set (step 1404). Also, the edges inside the selected set of geometry are tested to see if any faces outside the selected set use these edges (step 1406). Finally, the vertices inside the selected set-are tested to see if any unselected edges utilize these vertices (step 1408). If the results of any of the tests in steps 1402–1408 are true, then the selected geometry is not isolated and cannot yet be replaced by a component instance.

Figure 15:
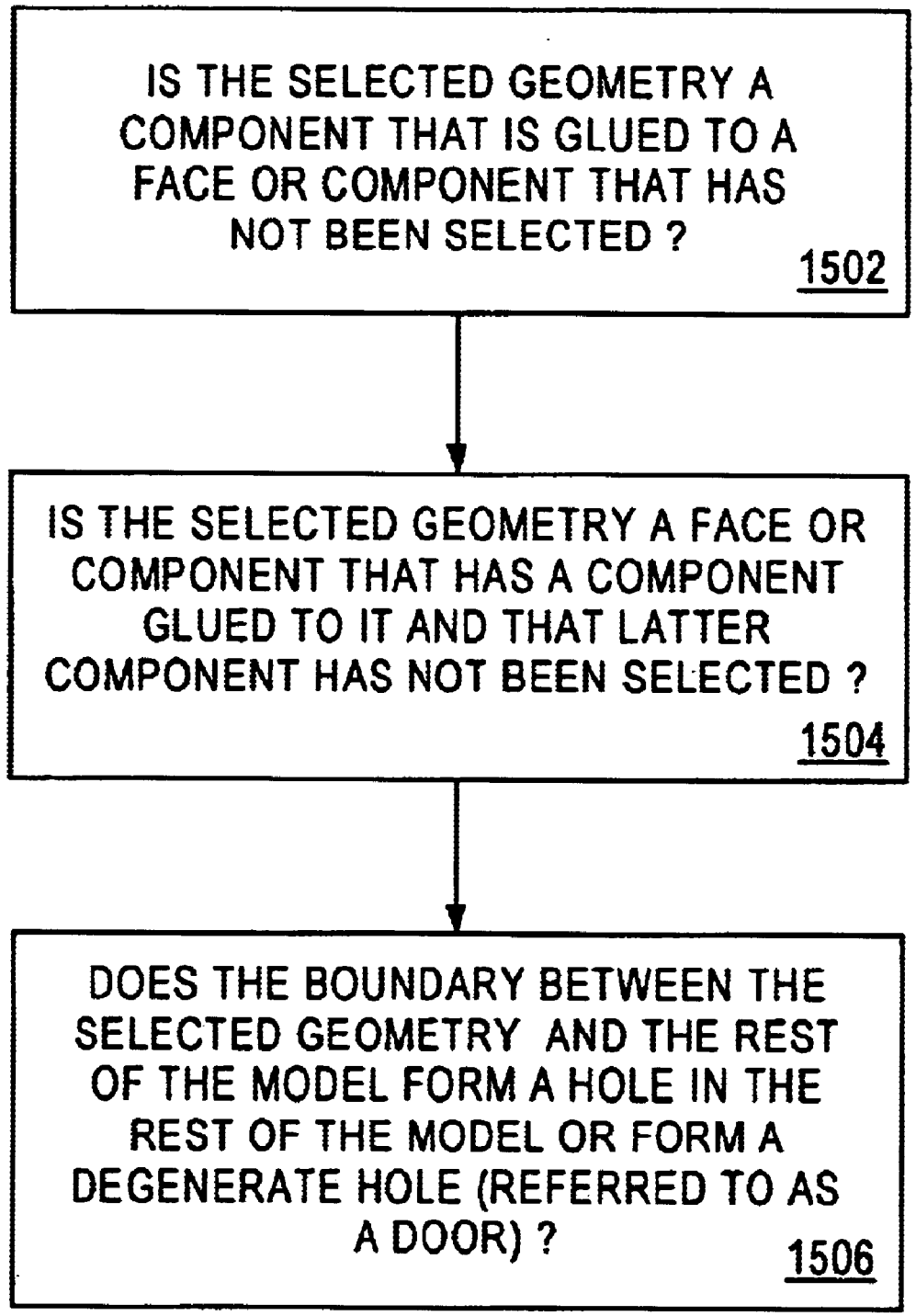
FIG. 15 illustrates a flowchart for determining, according to an embodiment of the present invention, which selected features of a model can be disconnected from other model geometry.

However, geometry which is not isolated may still be replaced if that geometry can be disconnected from the rest of the geometry of the model. The flowchart of FIG. 15 illustrates a process for identifying if a set of selected geometry can be disconnected from the model. In step 1502, if the selected geometry is a component then it is tested to see if that component is glued to a face or component that has not been selected. In step 1504, if the selected geometry is a face or component that has another component glued to it, then that other component is tested to see if it has been selected. In step 1506, the boundary between the selected geometry and the rest of the model is tested to see if the boundary forms a hole (or a degenerate hole). If any of the three tests of steps 1502–1506 are true then the selected geometry can be disconnected from the model and replaced by a component instance.

The test of step 1506 is more complex than the tests of either steps 1502 or 1504. If the boundary of the selected geometry consists of all the edges of one or more interior loops in an existing face, then the selected geometry is considered to be a hole (and can be replaced). The degenerate hole, also referred to as a door, is simply a hole where one edge has been moved over the top of one linear edge of the surrounding face and the overlapping edges have been merged together. Topologically, a degenerate hole is not strictly a hole but can be treated as one for purposes of determining whether or not selected geometry can be replaced with a component instance.

When the boundary between the selected geometry and the rest of the model consists of some, but not all, of the edges of an exterior loop of a face, the geometry must be further analyzed to see if it would also qualify as a door. In the case of a door where the primary opening of the door is on one face but a portion of the door wraps around to another face, the requirement that the resulting opening remain visually identical is slightly relaxed. Only the primary opening is cut while the wrap-around portion remains filled in. Although the resulting component instantiation is not exactly visually identical, any differences can be easily corrected by exploding the component and erasing the wrap-around portion that should have been cut.

When the planes from which the selected geometry are disconnected, as determined from each of steps 1502–1506, are co-planar, then a resulting component instance is inserted and automatically aligned with, and glued to, the plane from which the selected geometry was detached. Otherwise, the component instance is inserted aligned with the coordinate system of the model and does not glue to any other geometry.

The determination of the default alignment of the component instance (FIG. 13, 1306) is performed by determining the normal of the plane from which the selected geometry is disconnected. The determination of the cut behavior of the component (FIG. 13, 1308) on the face on which it is placed is simplified by assuming that a component always performs a cut. This simplification can be assumed because any selected faces that fill regions of the perimeter will continue to do so after the component is inserted, thus, achieving the same visual result. In those cases when the selected geometry is not replaced with a component instance, the selected geometry is simply copied for later insertion by a user.

Second Exemplary House Design

A second exemplary house design is presented to illustrate the intuitive and powerful characteristics of the present graphical design and modeling application. As many of the drawing tools and aids have already been described in detail with regard to the first house design, the description of the second house design will focus more on those aspects of the present graphical design and modeling application that have not been described.

Push/Pull a Shape Into Three Dimensions

Figure 16A:
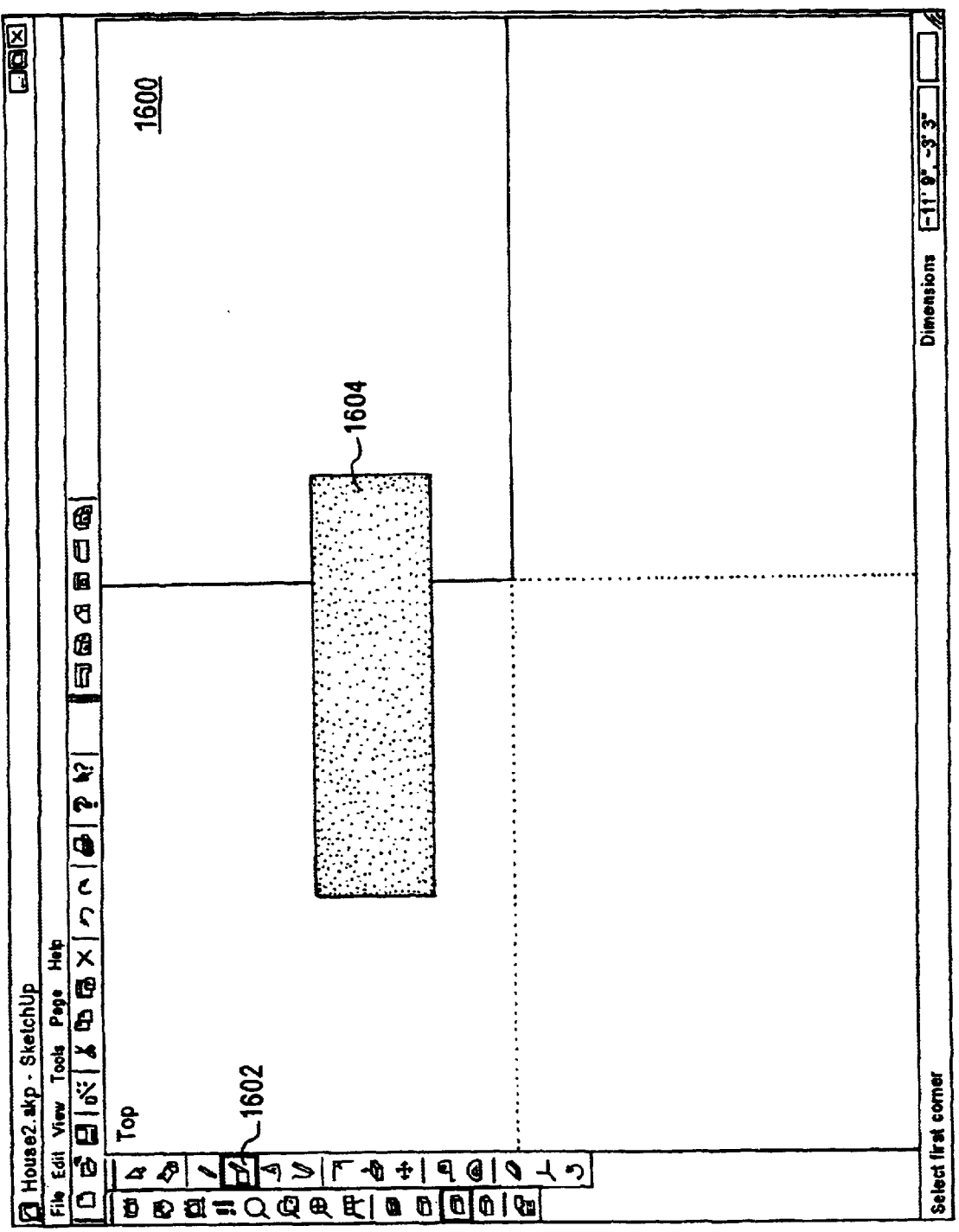
FIGS. 16A–16D illustrate a sequence of screen shots in which a user creates the basic frame of a second exemplary house design within the exemplary environment of FIG. 1.
Figure 16B:
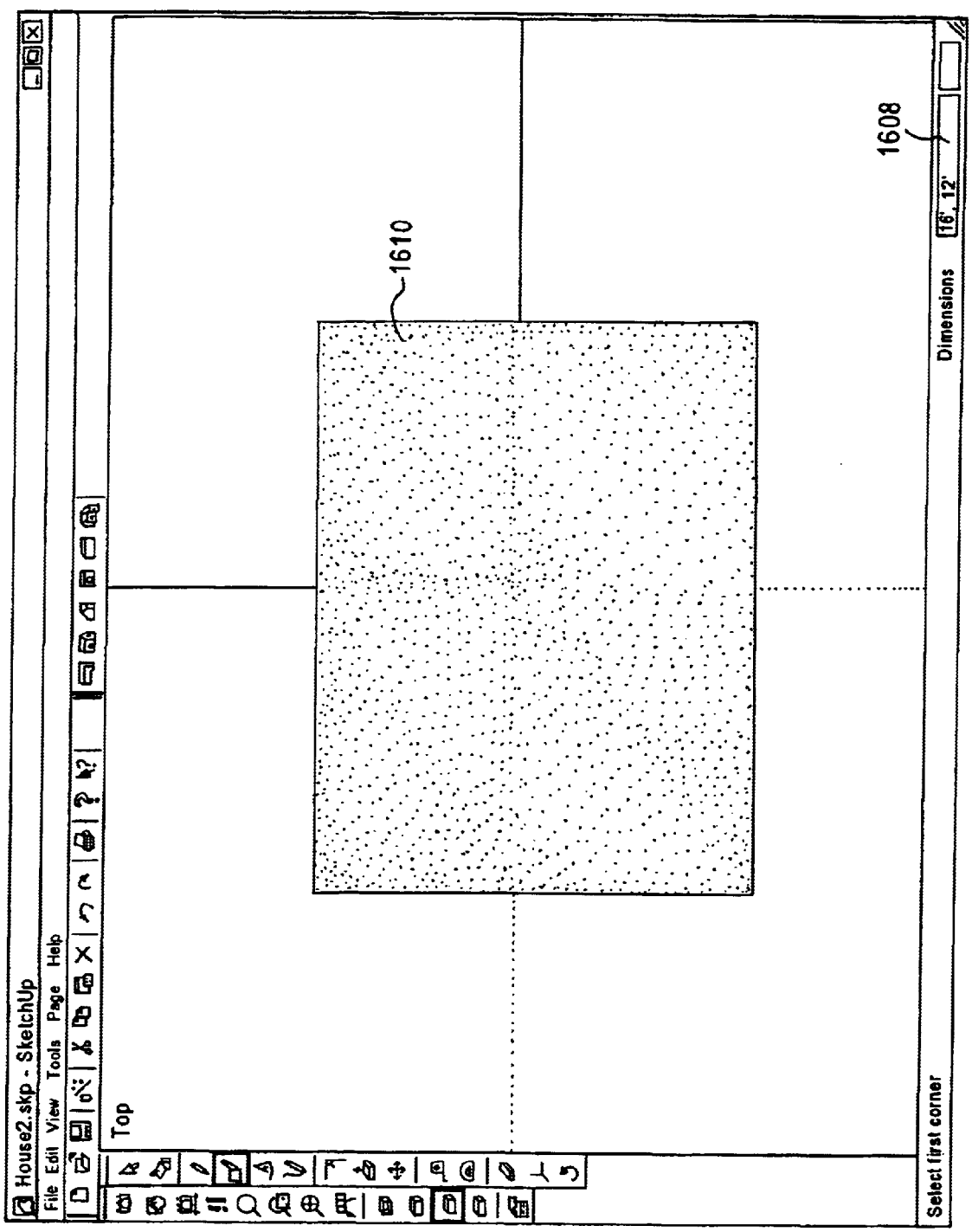
Figure 16C:
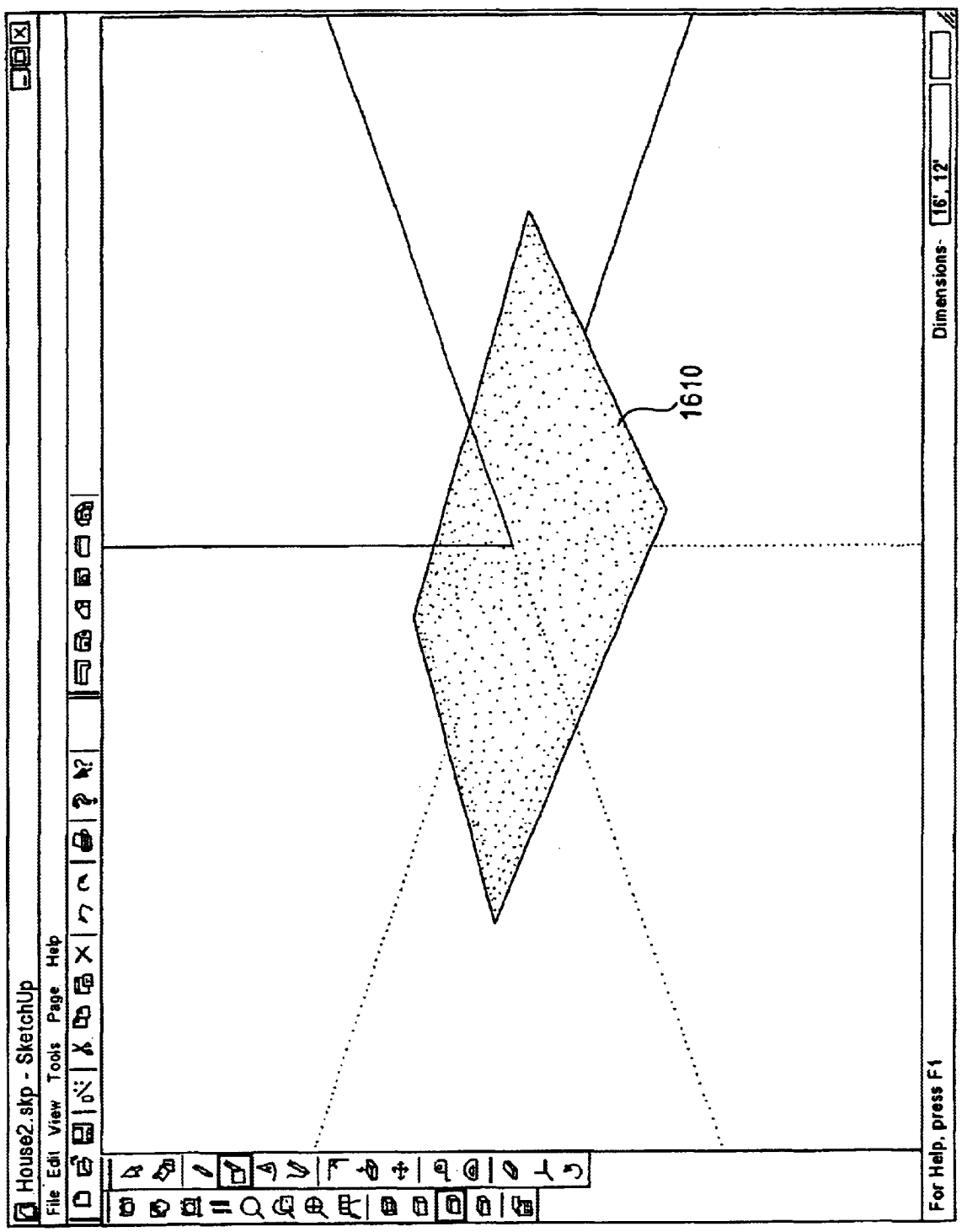

In FIG. 16A, the rectangle tool 1602 is used to create the rectangle 1604 in the display window 1600. As indicated by the shading, the rectangle is considered a face with skin. To properly size the rectangle 1604, the user can type the dimensions, for example "16', 12'", which will appear in the sub-window 1608, to create the base of the house 1610, as shown in FIG. 16B. The user's view of the base 1610 can be modified by using the orbit tool, as shown in FIG. 16C.

Figure 16D:
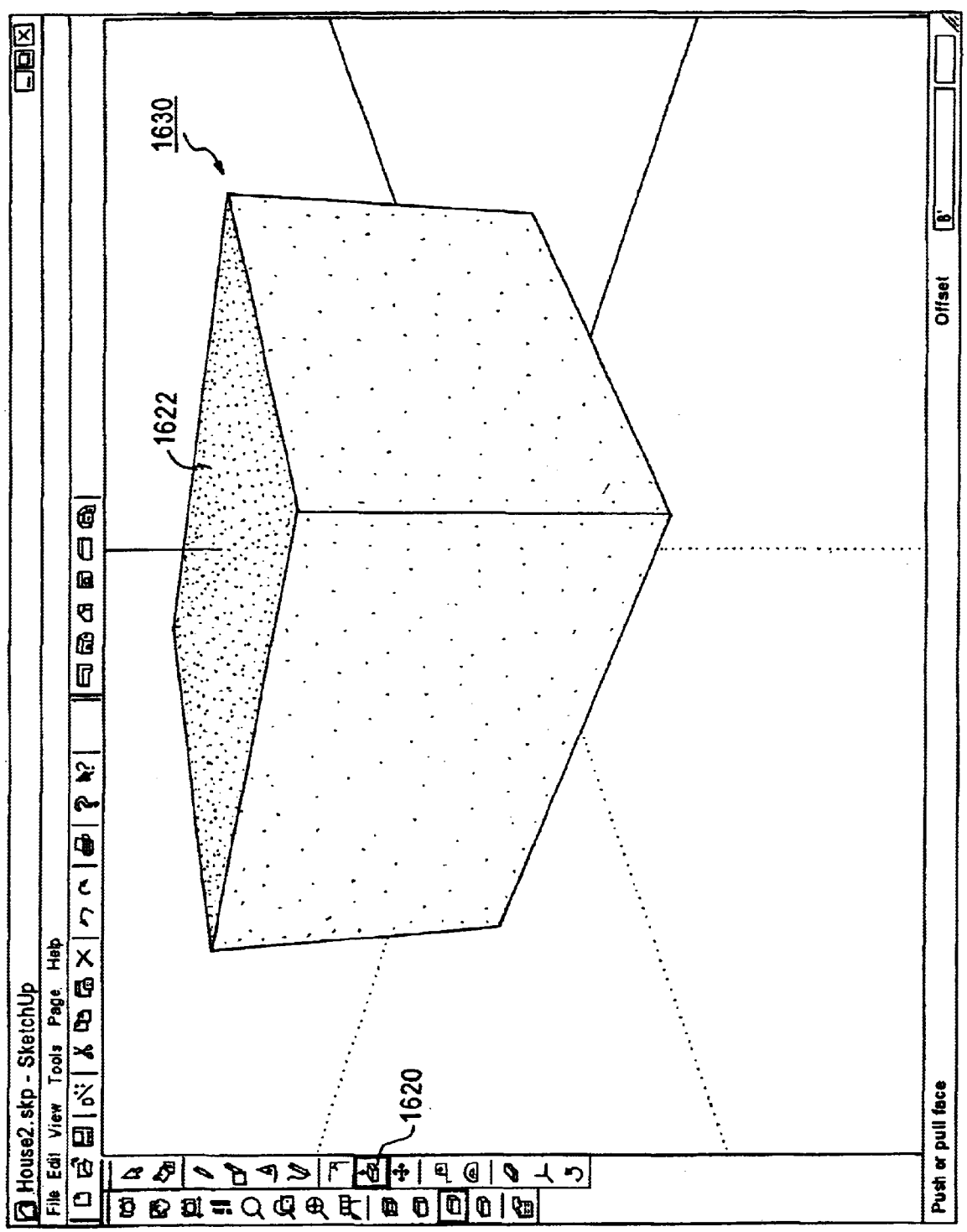

With the creation of a two dimensional surface face, a push/pull tool 1620 is provided in the icon bar to manipulate the two dimensional, skinned faces to create and shape three-dimensional objects. This tool's descriptive name indicates the behavior of taking a two-dimensional object and pushing or pulling its skin to create a three-dimensional solid. In use, the graphic designer selects the tool 1620, typically by clicking on the icon with a mouse or other cursor-control device, and then selects the two-dimensional face to push (or pull) also by clicking on an interior region of the face with the mouse or other cursor-control device. By dragging the mouse, or other equivalent input, the face can be moved, or extruded, from that face's plane into a third dimension. Preferably, the movement is restricted to be perpendicular to the face's plane to match the user's intuition, but other embodiments may permit skewed push/pull operations. The result of pulling the base 1610, depicted in FIG. 16D, is that the rectangle 1610 remains stationary and, following the contours of its perimeter, the box 1630 is formed by pulling up an automatically created top surface 1622.

Shaping with the Move Tool

Figure 17A:
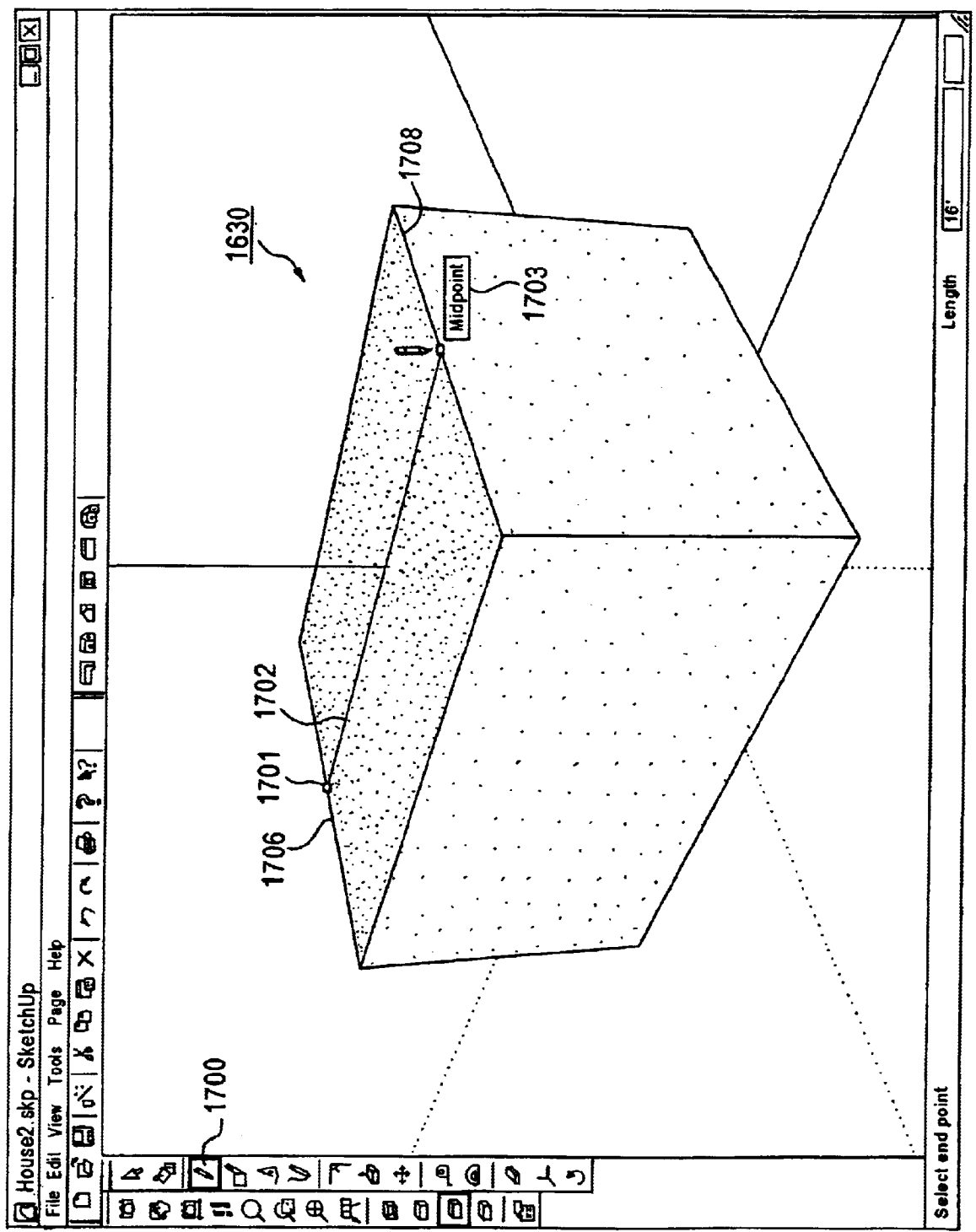
FIGS. 17A–17G illustrate a sequence of screen shots that demonstrate the effect of using a move tool to shape a three-dimensional object.
Figure 17B:
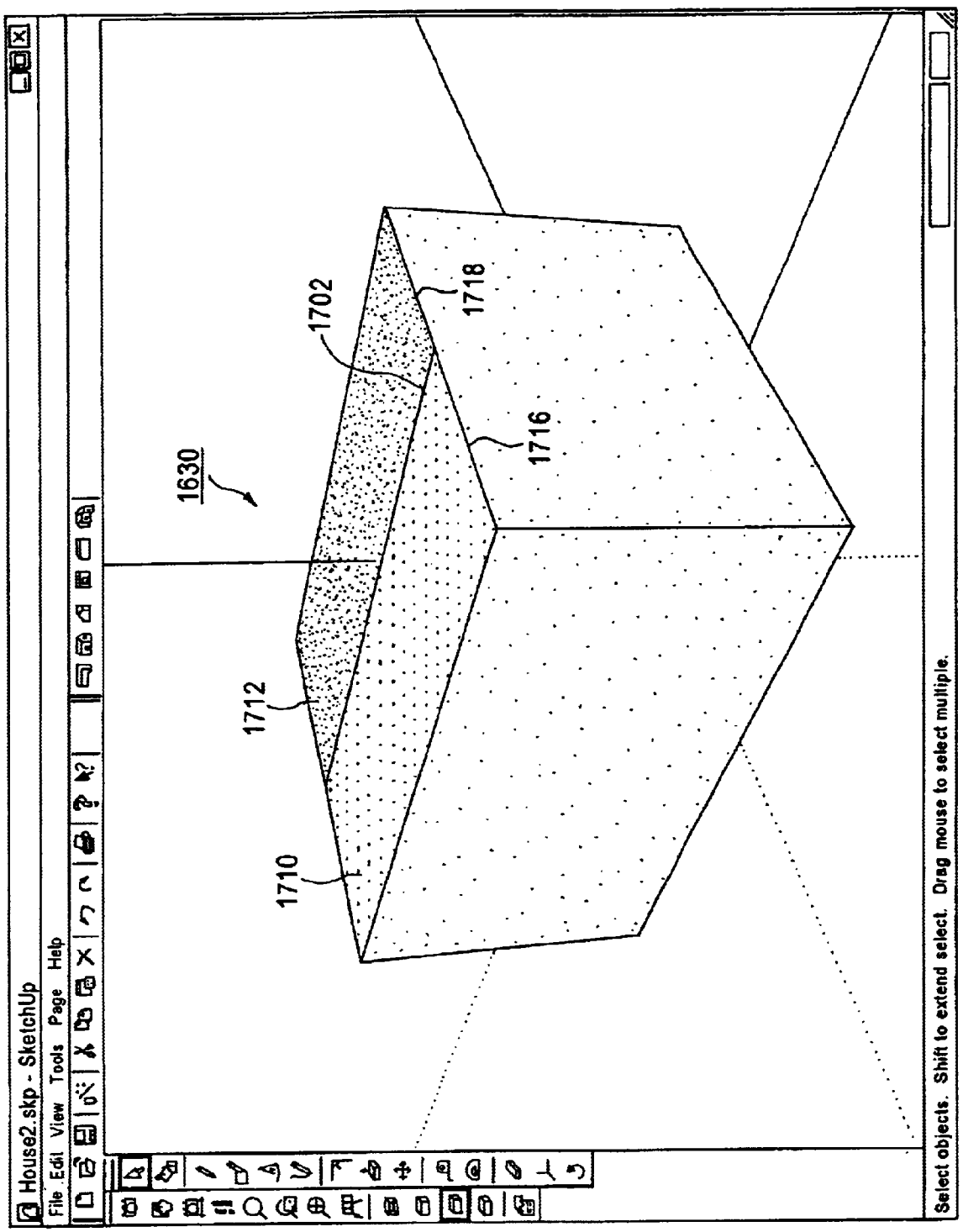

Now the user is ready to build the roof of the house. In FIG. 17A, the pencil tool 1700 is selected to draw on the top surface 1622 of the box 1630. When the cursor is moved so as to be located over the edge 1706 of the box 1630, a square 1701, or other cue, becomes visible, informing the user that any point the user now creates is on the edge 1706. The color, or other characteristic, of the square 1701 can change to reflect additional information. For example, one color, such as green, might indicate the cursor is over the endpoint, another color, such as cyan, might indicate the cursor is located at the midpoint, and another color, such as red, may be used simply to distinguish from these two special conditions. Further, a pop-up cue 1703 may also be used to inform the user of certain conditions as well. FIG. 17A depicts drawing a line 1702 on the top surface 1622 of the box 1630. Similar to earlier descriptions, the color and other features of the line 1702 can be used to indicate to the user the orientation of the line 1702. When the line 1702 is completed, the system performs the operations described earlier in relation to the flowchart of FIG. 4. Specifically, the system determines that with the addition of the line 1702, the top surface 1622, which was internally represented as a single surface face, has been replaced with two newly-created, co-planar surfaces 1710 and 1712, as shown in FIG. 17B, each having their own newly created edges, such as edges 1716 and 1718.

Figure 17C:
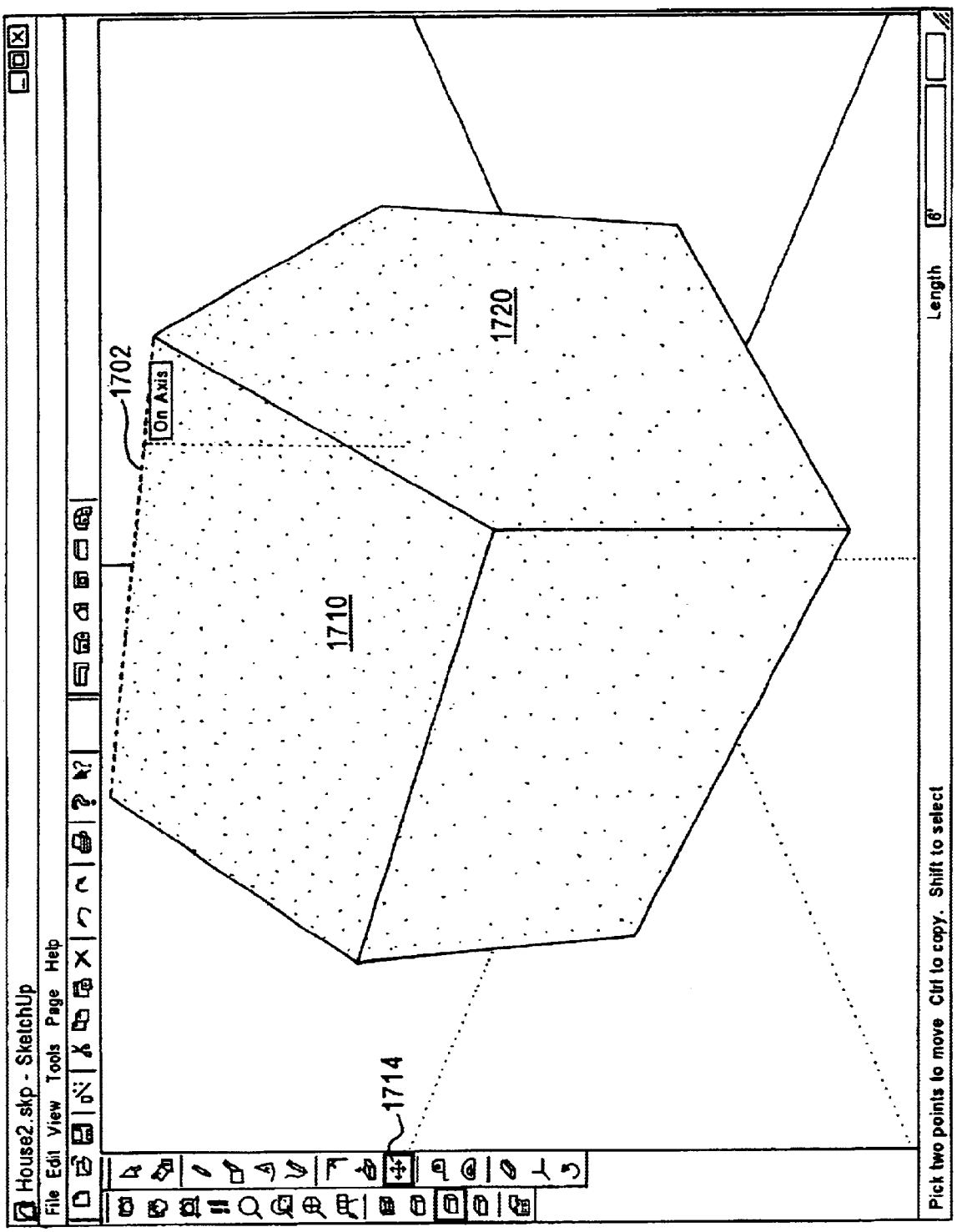

The move tool 1714 is then shown as being selected by the user in FIG. 17C. Using the move tool, the center line 1702 is selected, as indicated by the dotted lines, and then moved upwards to create the roof of the house, as shown in FIG. 17C. The face 1720 is automatically re-shaped to conform to the new positions of the edges which define the face 1720.

Figure 17D:
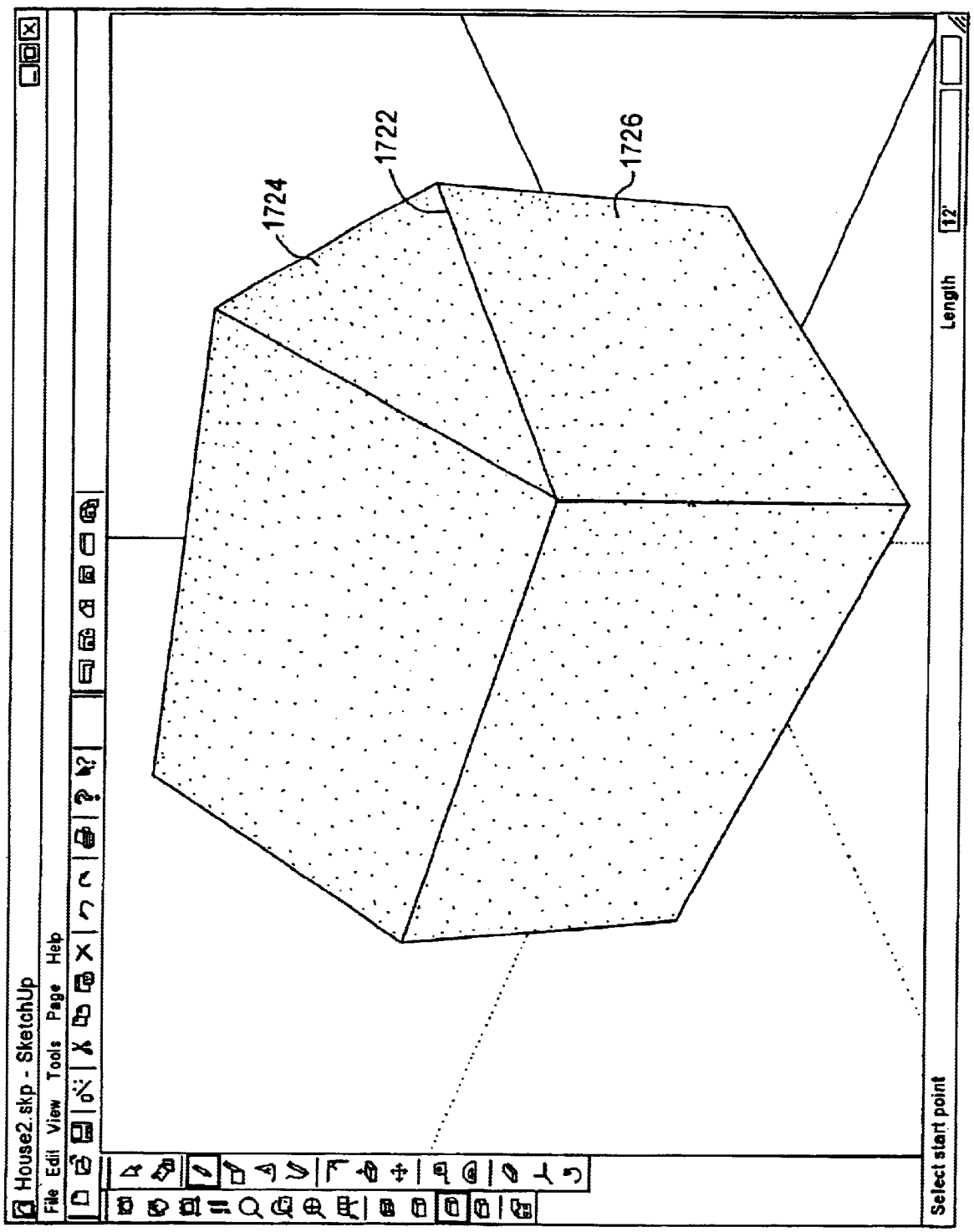
Figure 17E:
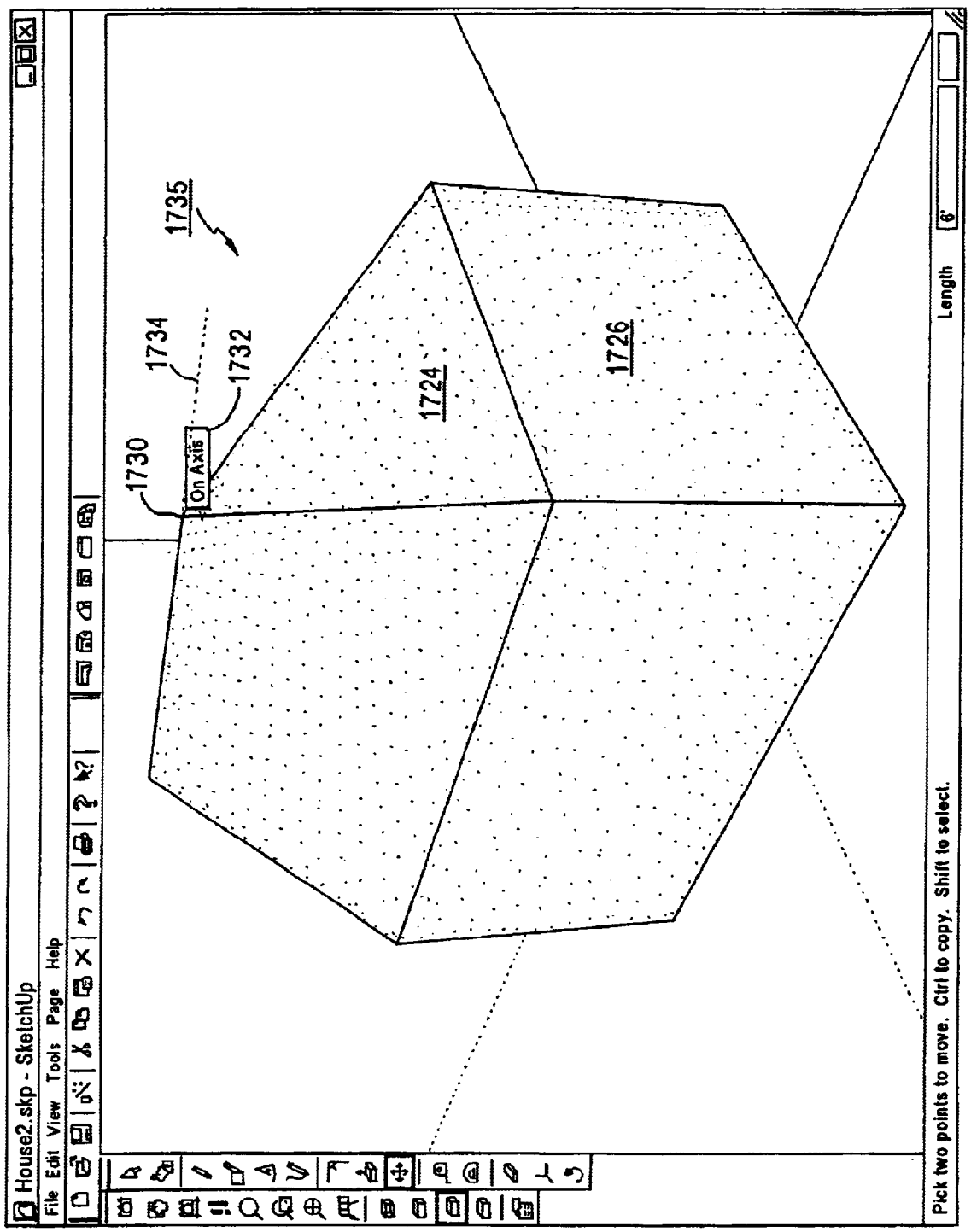
Figure 17F:
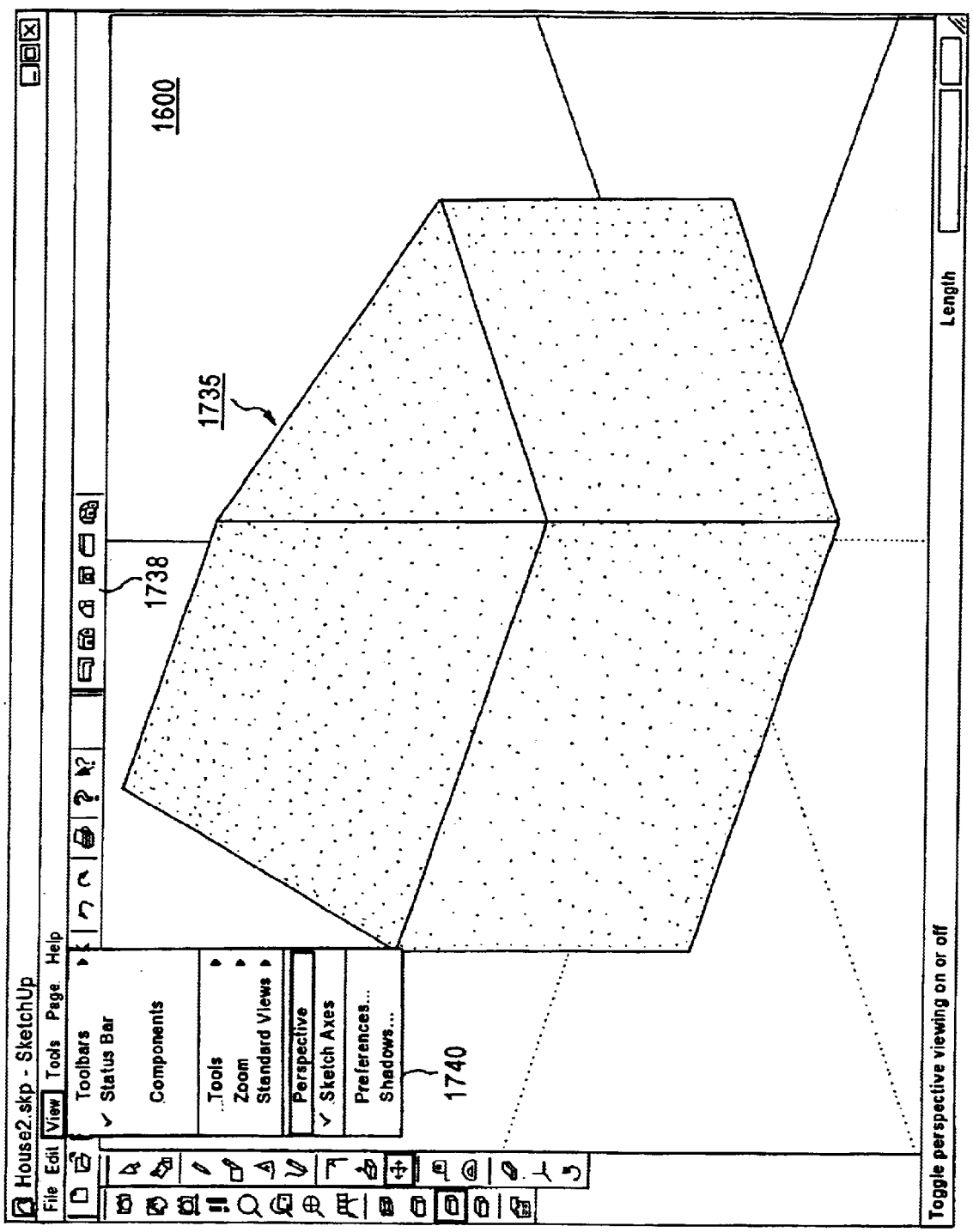
Figure 17G:
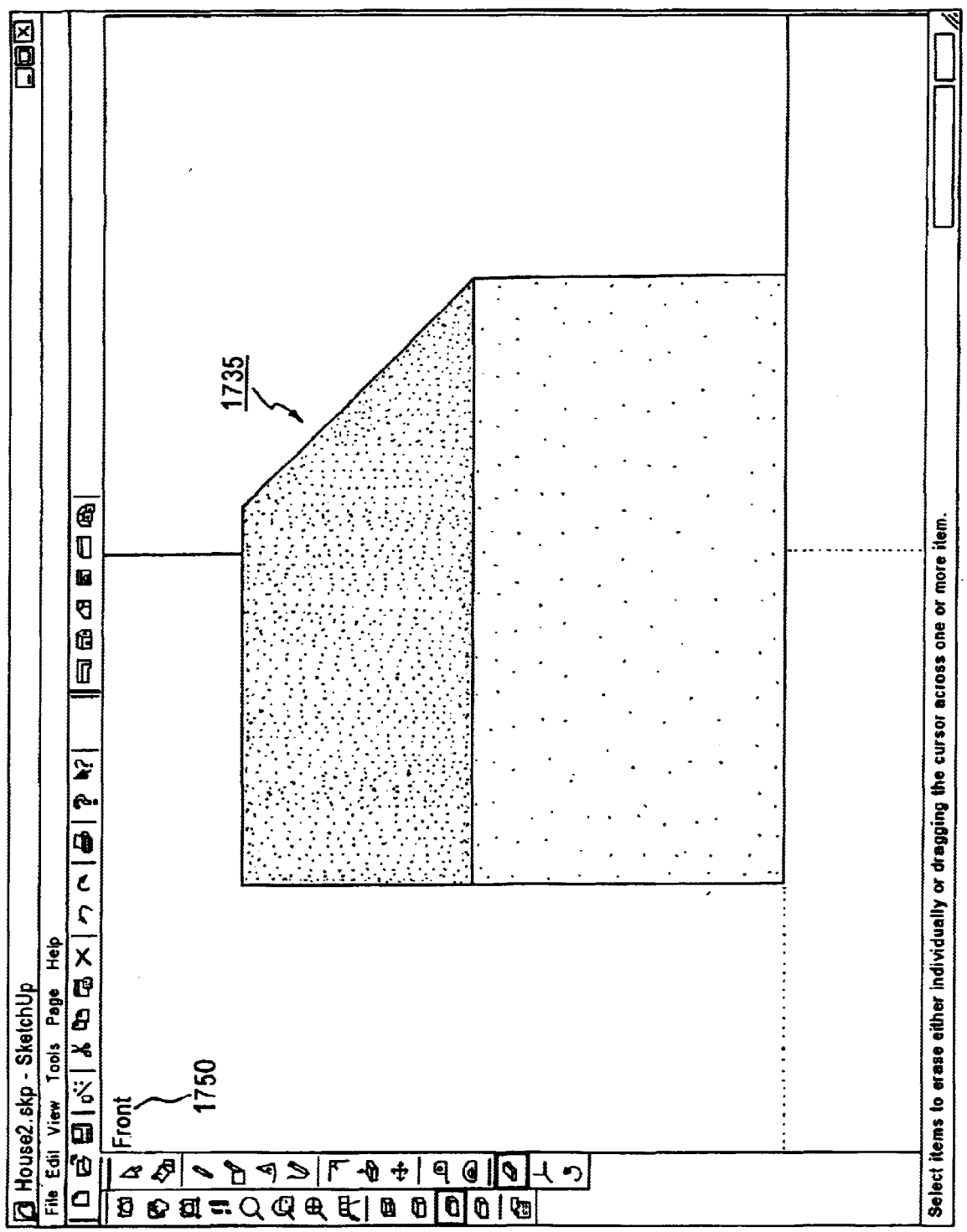

FIG. 17D depicts the line 1722 drawn across the face 1720 to create the two regions 1724 and 1726. The effect of using the move tool to reposition a vertex is illustrated in FIG. 17E. The top vertex 1730 of the region 1724 is selected and moved to create the roof outline 1735. As shown by the dotted line 1734 and the pop-up visual clue 1732, inferencing functionality, as described earlier with regard to other geometry such as points and lines, also functions with regard to vertices such as the vertex 1730. The faces 1724 and 1726 are treated as separate objects; as a result, moving the vertex 1730 affects the face 1724 but not the face 1726. The face 1724 stretches to accommodate the movement of the vertex 1730 and remains a plane but is no longer oriented parallel to the z-axis. FIG. 17F depicts using the pull down menu 1740 to turn off the perspective view mode of the house 1735. The house, in FIG. 17F, is shown in parallel projection view mode. Another view, the "Front" view, is depicted in FIG. 17G. As a result of changing the view to the front view, as shown in FIG. 17G, the "Front" label 1750 becomes visible in the display window.

Shaping with the Push/Pull Tool

Figure 18A:
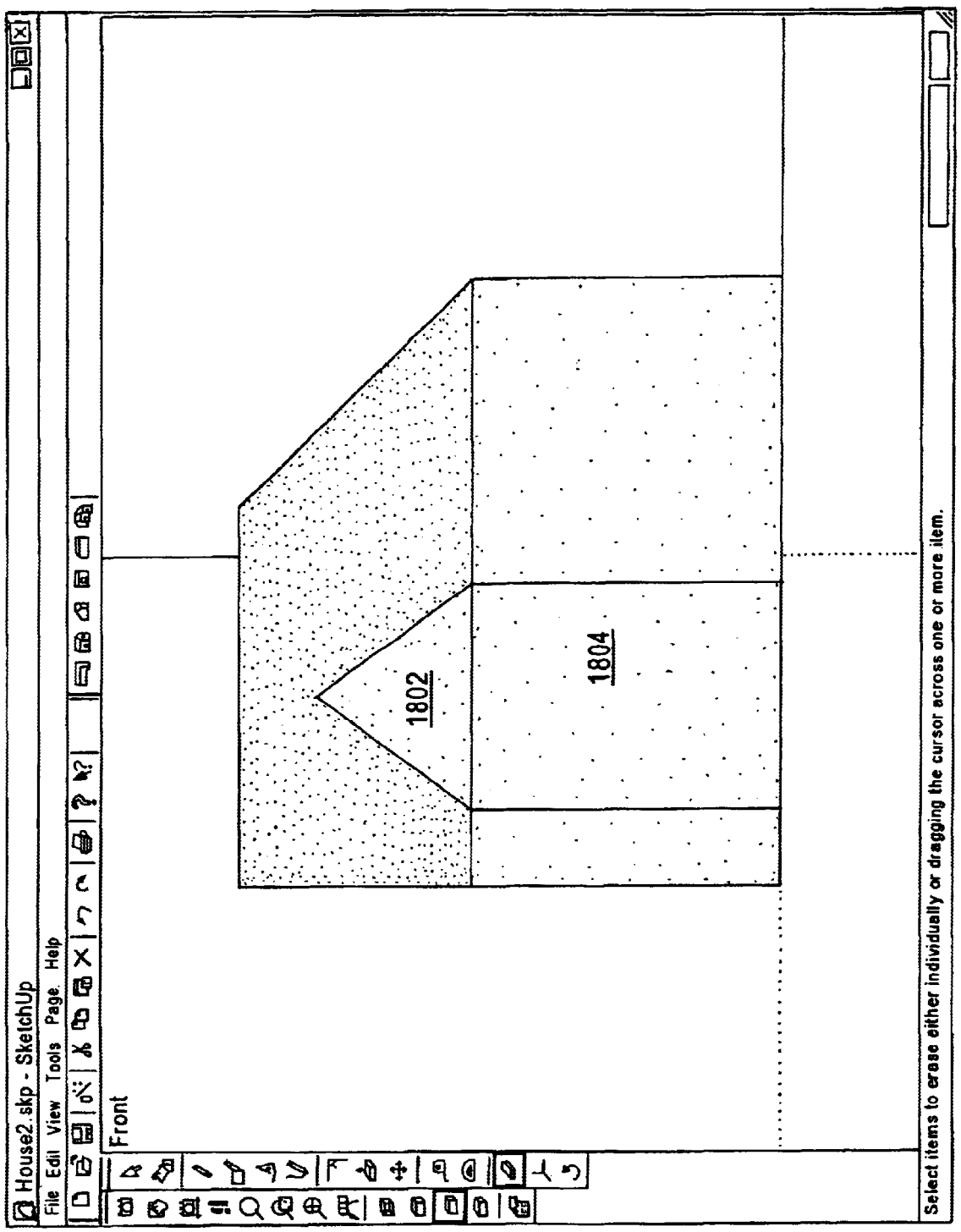
FIGS. 18A–18H illustrate using a push/pull tool to shape a three-dimensional object.
Figure 18B:
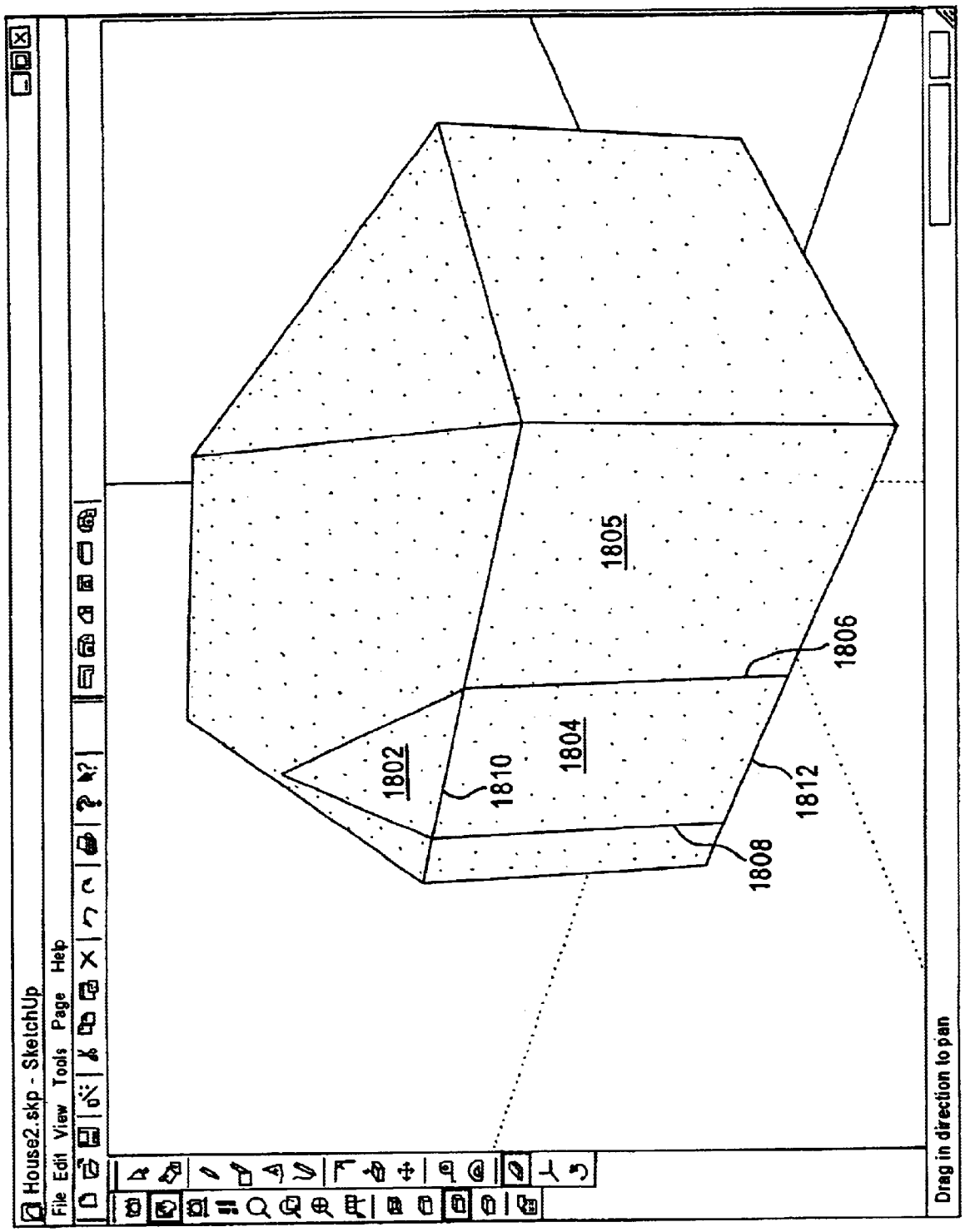
Figure 18C:
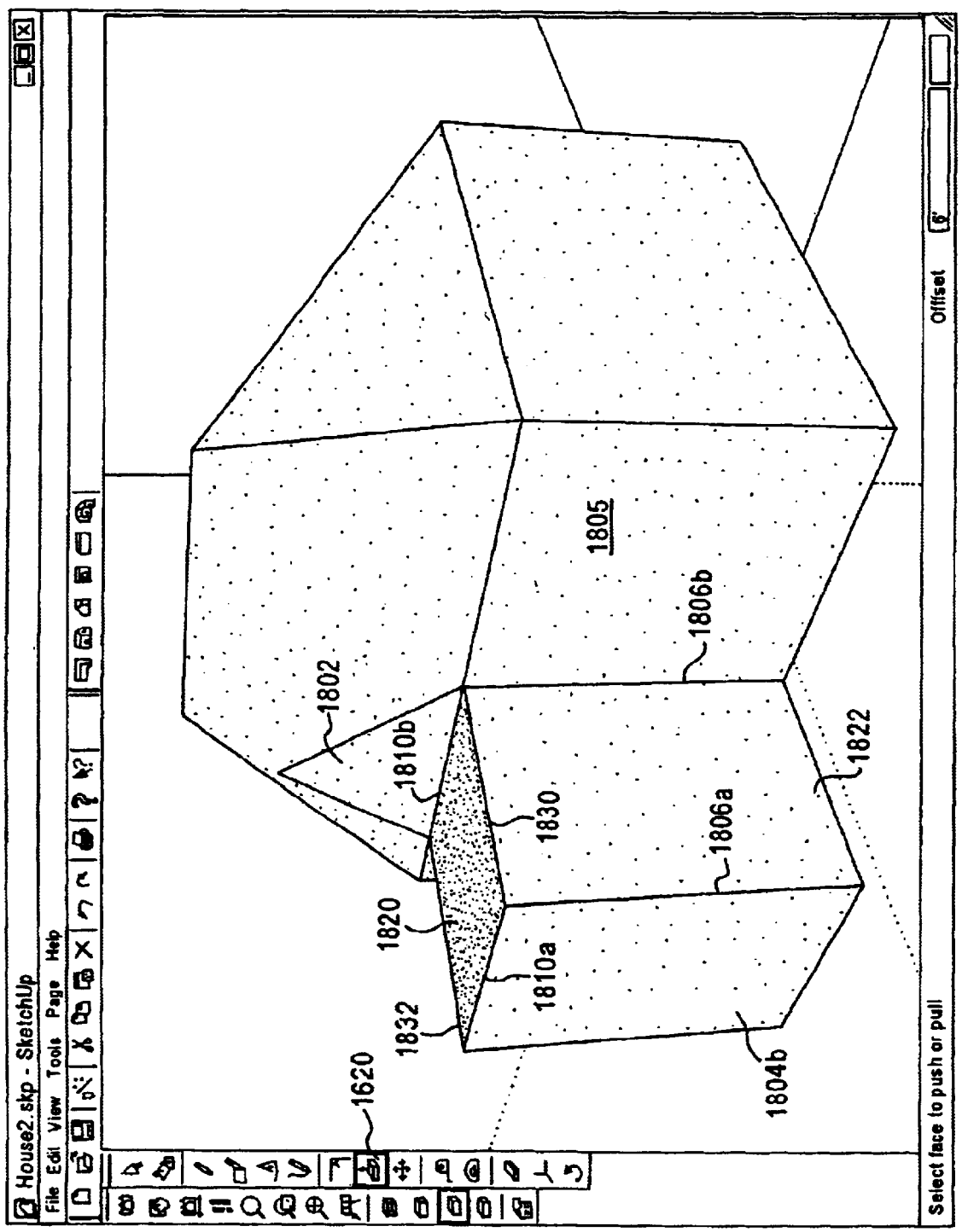

Using the methods for drawing freely in three-dimensions previously described, surface faces 1802 and 1804, of FIG. 18A, are created. In particular, as shown in FIG. 18B, the face 1804 has a perimeter comprising the edges 1806, 1808, 1810 and 1812. When the push/pull tool 1620 is used to pull the face 1804 away from the main body of the house, the structure depicted in FIG. 18C is formed.

Figure 18D:
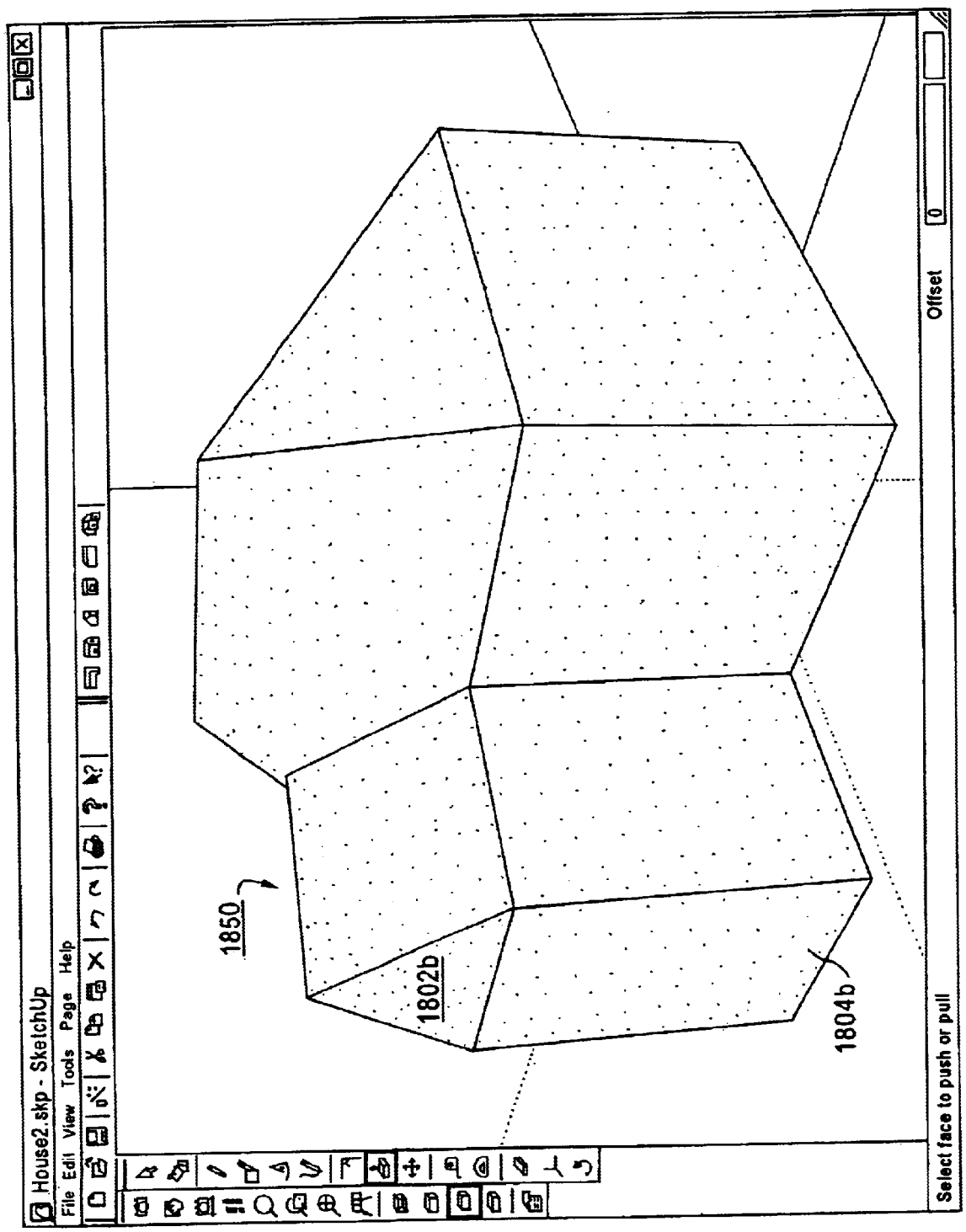

Originally (as shown if FIG. 18B), there are two co-planar faces 1804 and 1805 separated by an edge 1806. To pull the face 1804, the edge 1806, and its vertices, are duplicated so that both faces 1804 and 1805 are bounded by separate and distinct, but originally parallel and coextensive, edges 1806a and 1806b (see FIG. 18C). The duplicated edges and vertices effectively transform the surface face 1804 into a three-dimensional volume with zero-height sides (and, therefore, zero-area sides). As the face 1804 is pulled, the zero-area side. 1822, for example, between the edges 1806a and 1806b, acquires non-zero dimensions and becomes visible as the face 1822. A similar occurrence takes place in creating the new face 1820 along the top edge of the face 1804. As the face 1804 is pulled, the zero-area side along the face's top acquires non-zero dimensions and becomes visible as the face 1820. These new faces 1820 and 1822 are formed from edges that lie in a common plane and form a closed perimeter and therefore, can be selected and manipulated like the other surface faces described earlier. To create the structure 1850 depicted in FIG. 18D, the push pool tool 1620 is similarly used to pull the face 1802b out evenly with the previously moved face 1804b; the inferencing tools described earlier can be utilized by the user to facilitate proper alignment of the two faces.

Figure 18E:
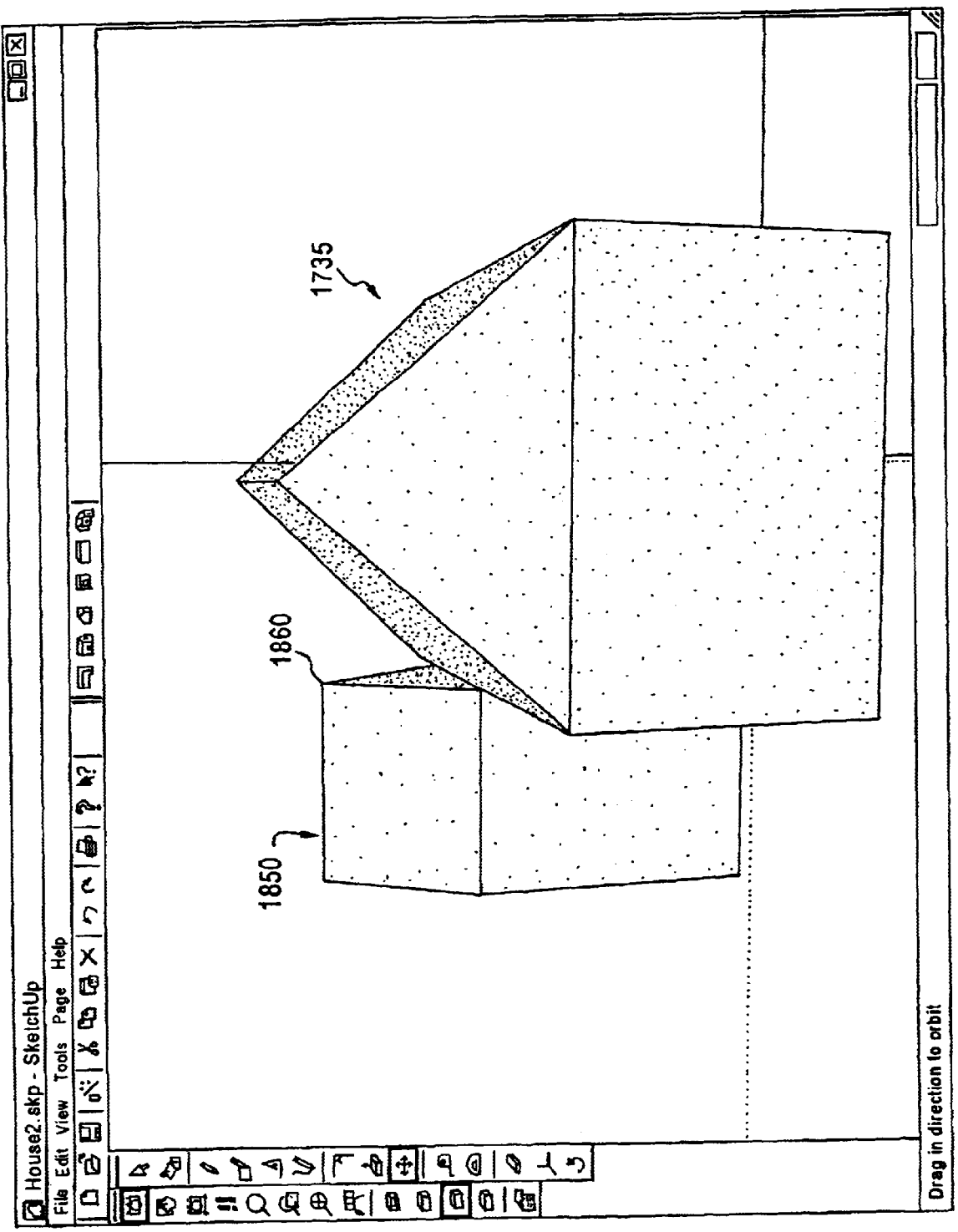
Figure 18F:
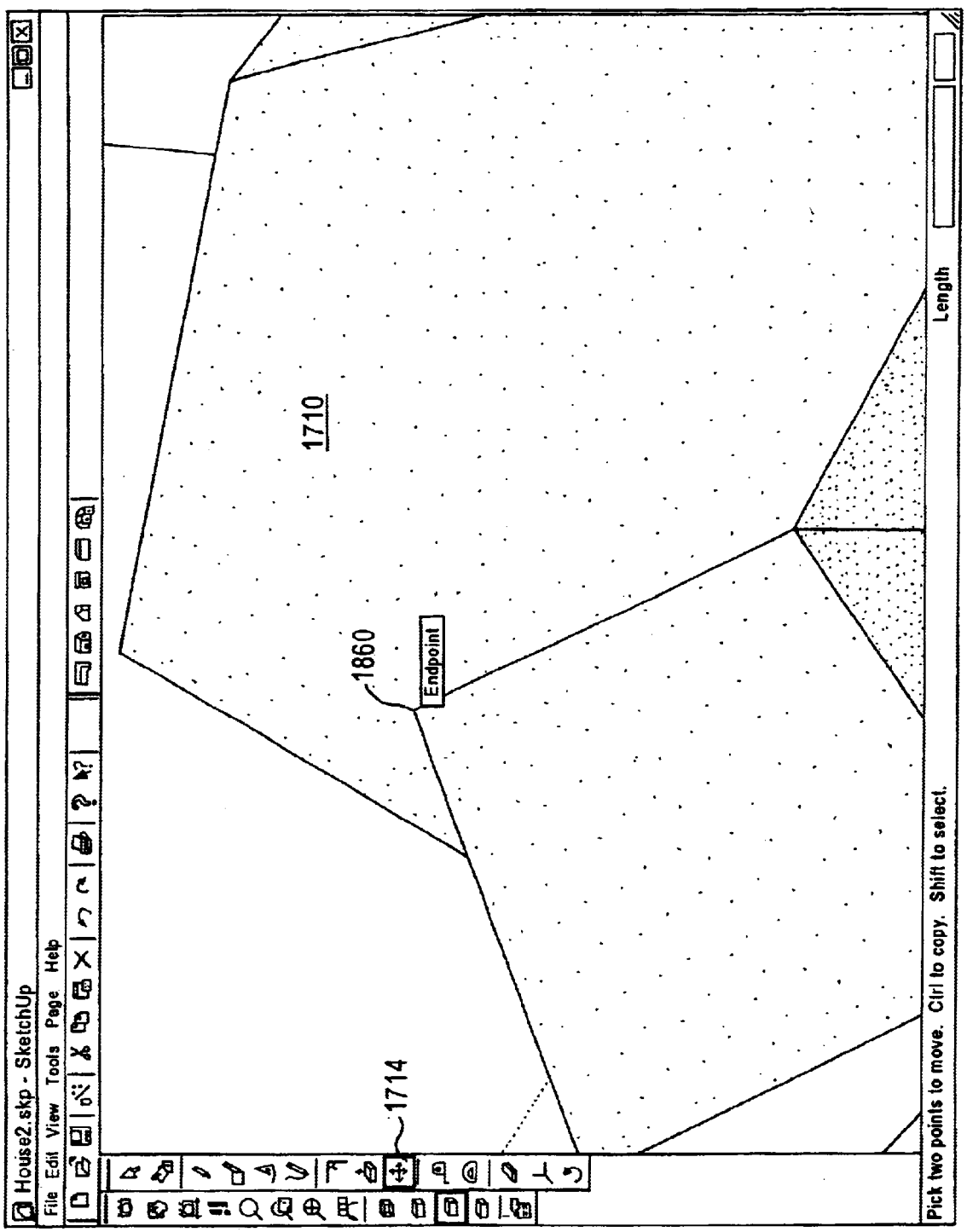
Figure 18G:
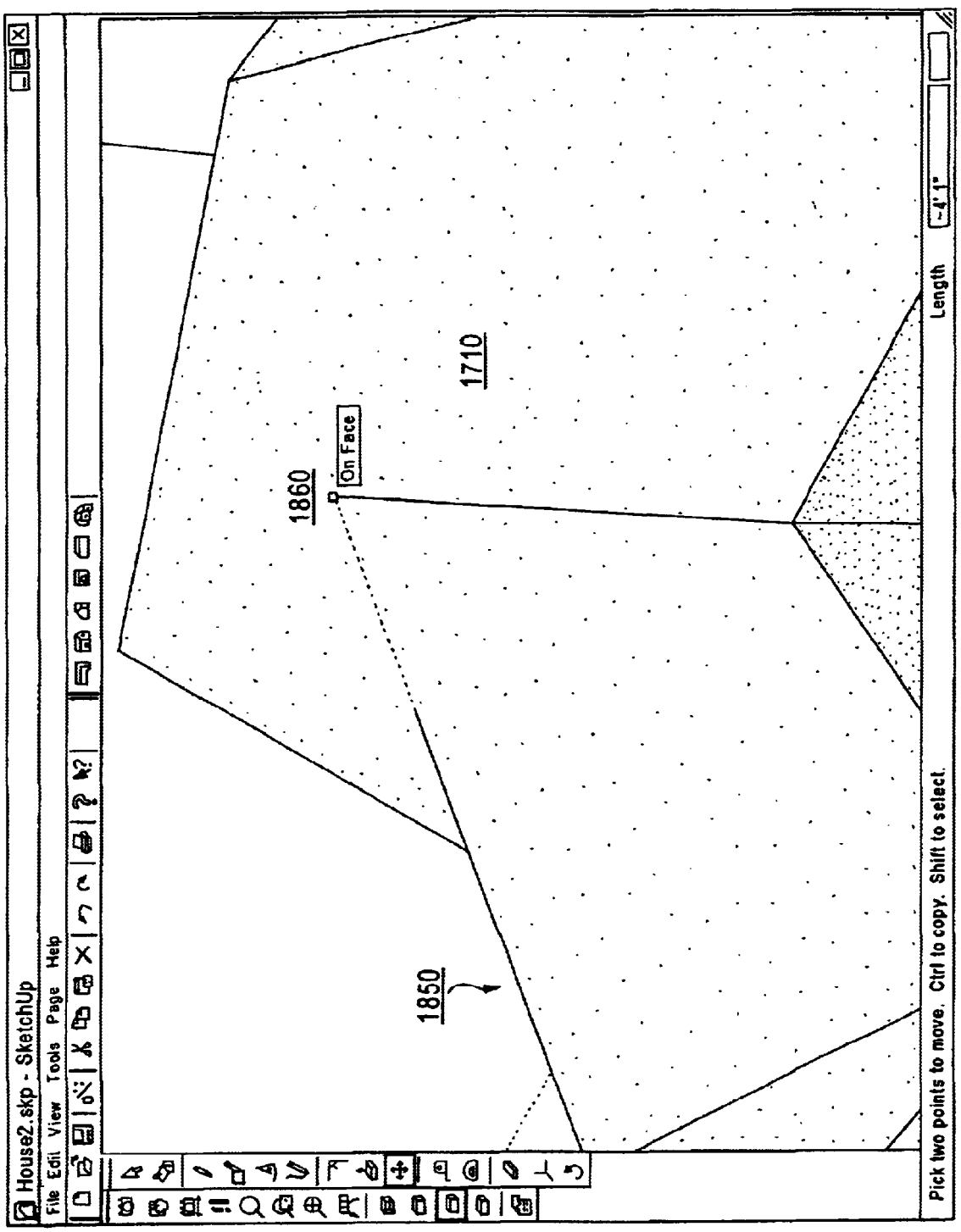
Figure 18H:
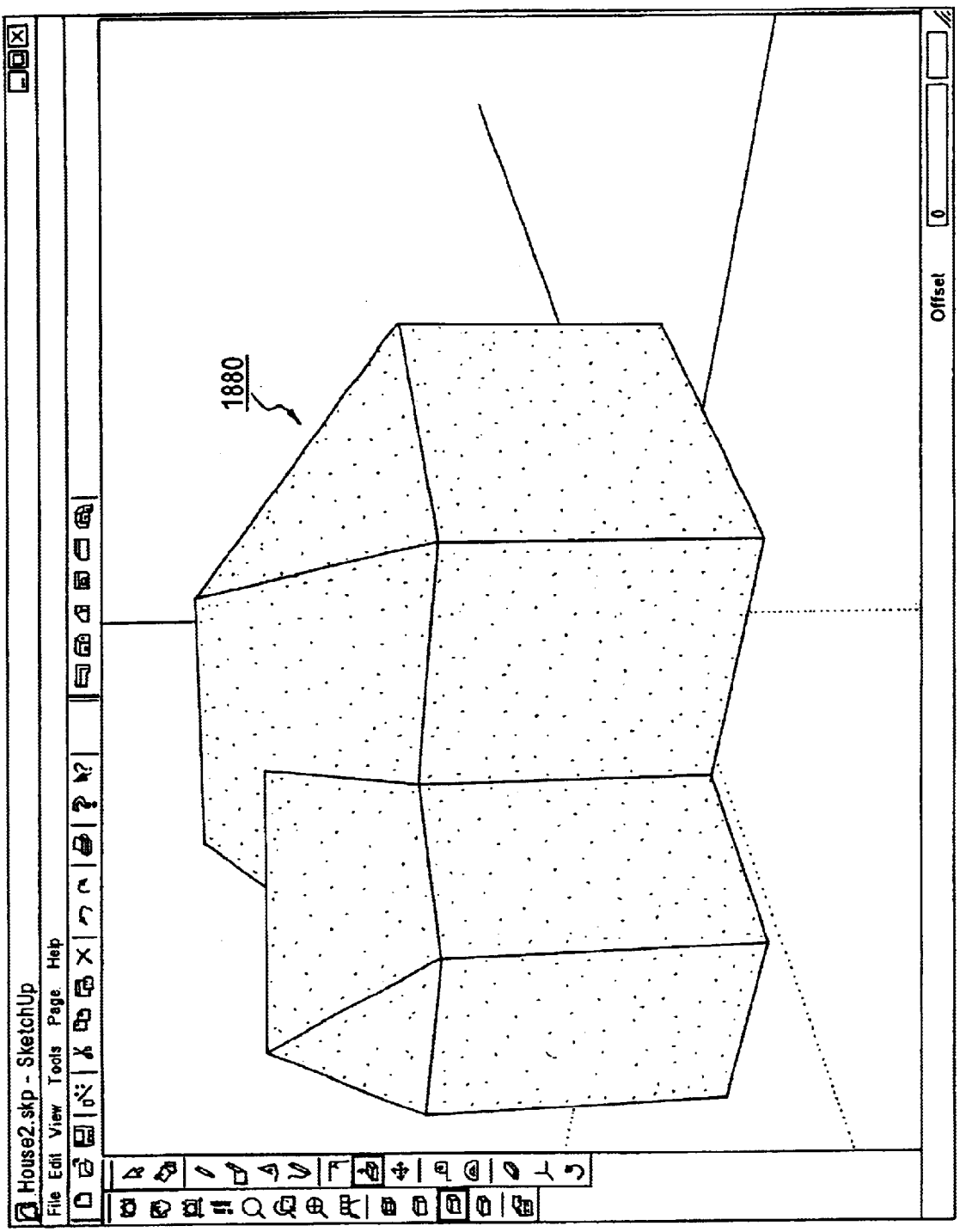

A side view of the house, as depicted in FIG. 18E, shows that the vertex 1860 of the structure 1850 is separated from the roof of the house 1735. The move tool 1714 can be used to selected the vertex 1860 and move it towards the closest roof surface 1710, as shown in FIG. 18F. Using the visual cues and other inferencing aids, as shown in FIG. 18G, the user can position the vertex 1860 on the roof 1710, to created the complex roof line of the house 1880 depicted in FIG. 18H.

Shaping with Both the Move and Push/Pull Tool

FIGS. 19A through 19K illustrate how moving, pulling and pushing two dimension faces can be exploited by a user to easily create complex three-dimensional models.

Figure 19A:
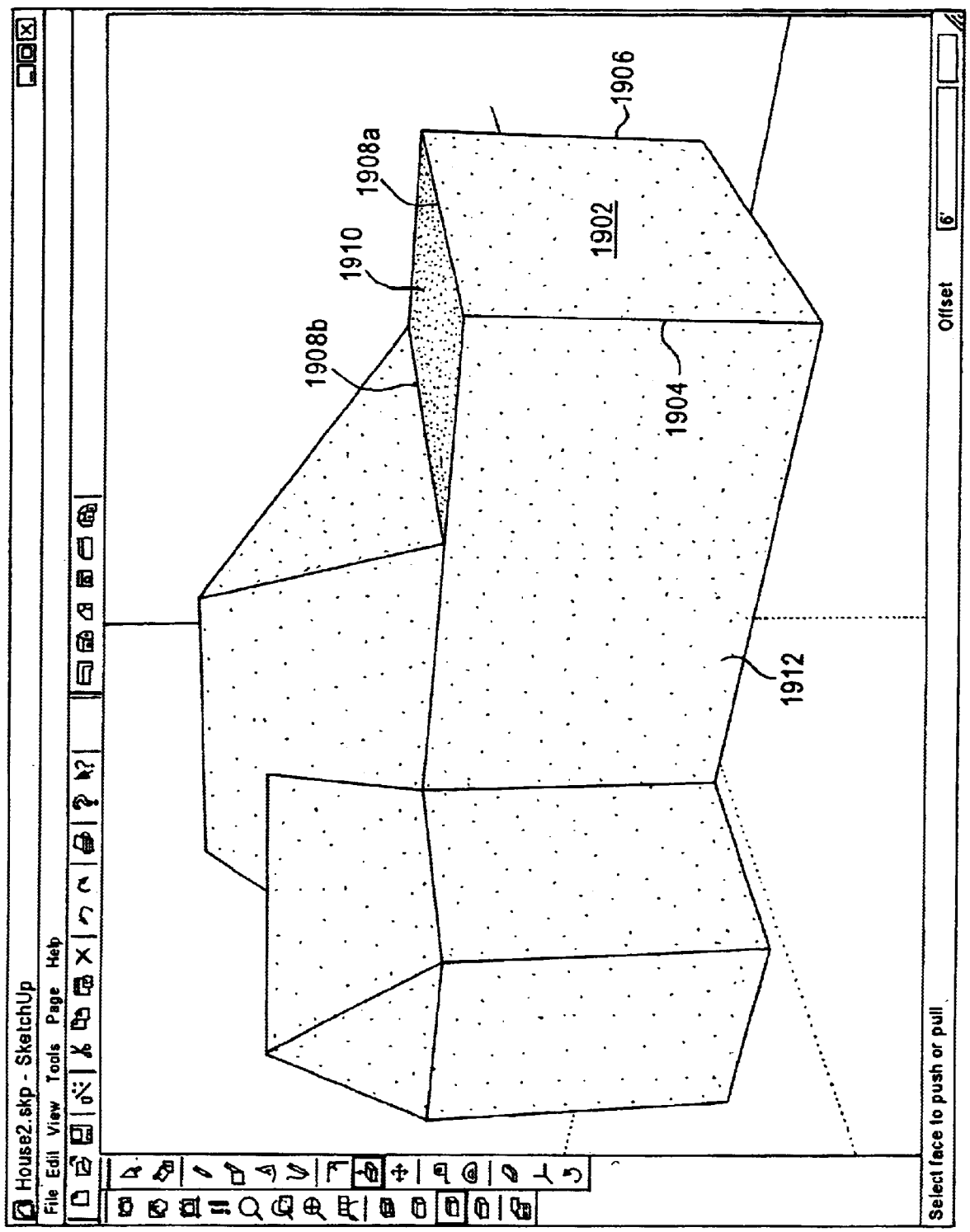
FIGS. 19A–19K illustrate a sequence of screen shots that compare and contrast the effects of shaping a three-dimensional object using the push/pull tool and the move tool.

In FIG. 19A, the side face 1902 of the house 1880 has been selected and pulled away from the house to create a new top surface face 1910. In the process, the duplicate edges 1908a and 1908b were created to accommodate the face 1910. In contrast, the edge 1904 borders a face 1912 that is perpendicular to the face 1902 that is being pulled. As a result, the face 1912 is simply extended in the direction of the pulling without the need to duplicate the edge 1904.

Figure 19B:
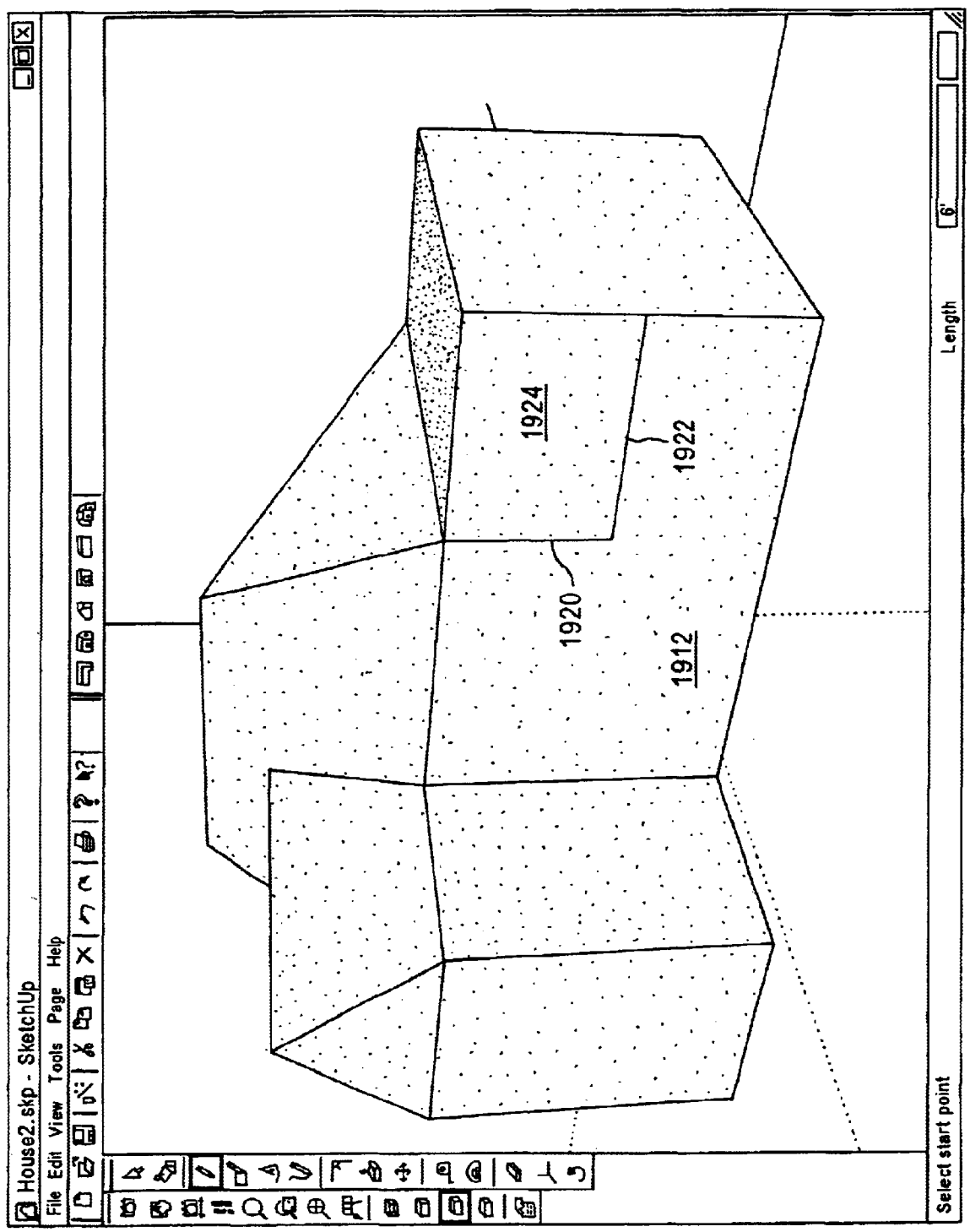
Figure 19C:
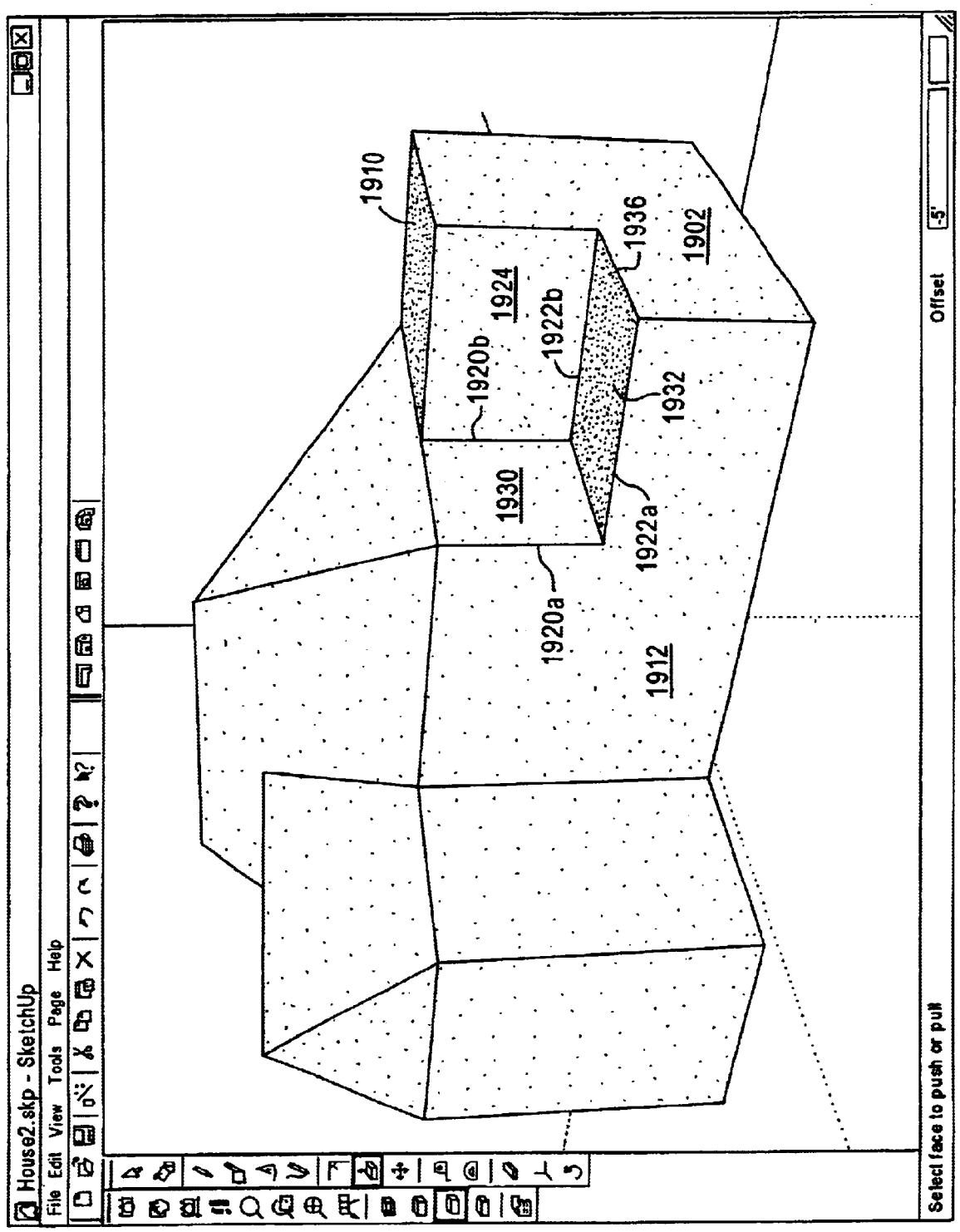
Figure 19D:
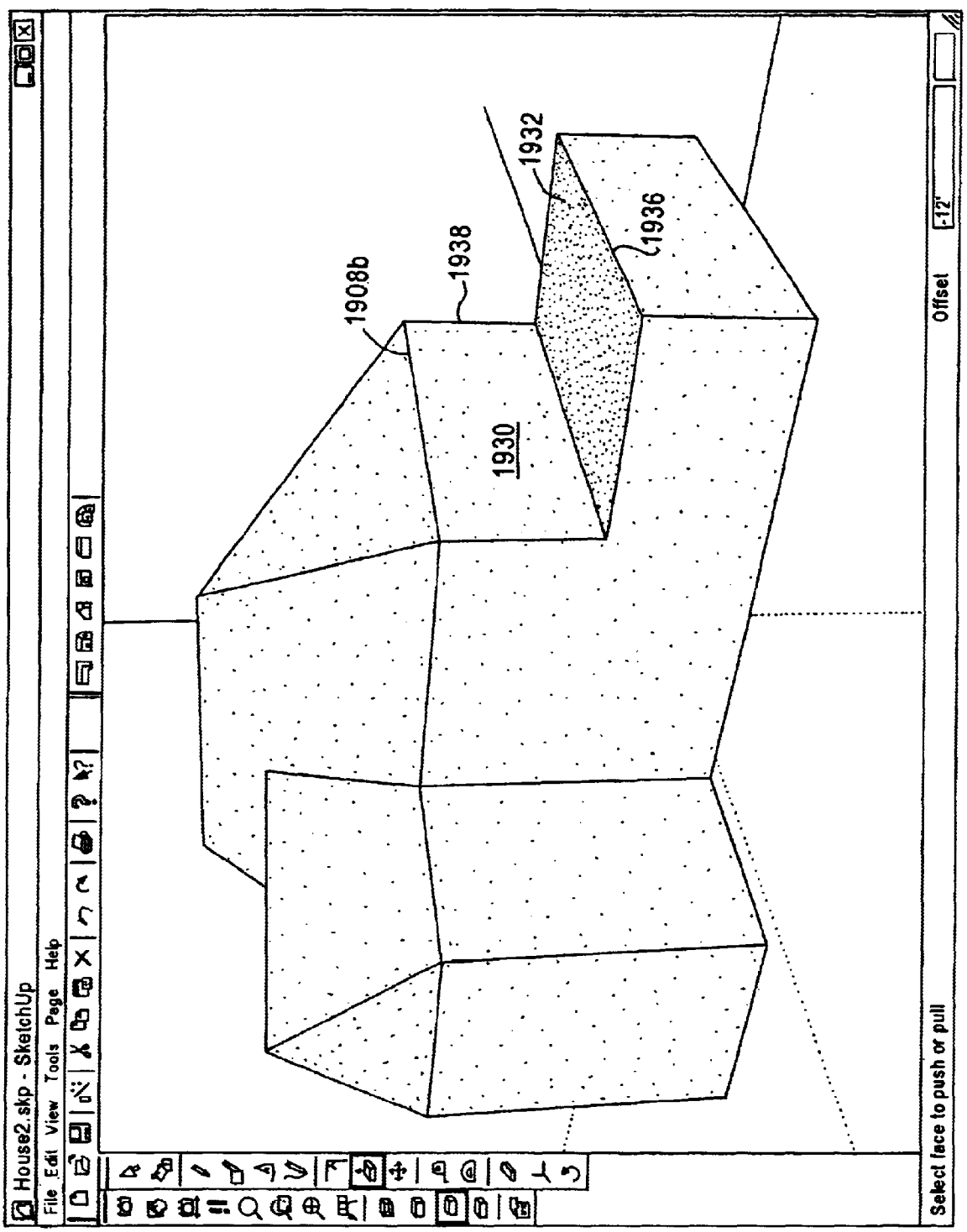

The lines 1920 and 1922 drawn in this newly created region of the face 1912, as shown in FIG. 19B, create the surface sub-face 1924. When a push/pull operation is invoked on the sub-face 1924, zero area faces 1930 and 1932 and duplicate, coextensive edges 1920a, 1920b, 1922a, and 1922b are created, as shown in FIG. 19C. Continuing the invoked push/pull operation on the face 1924 causes the face 1924 to move back from the plane of the face 1912, thereby extending the originally zero area faces 1930 and 1932. FIG. 19D depicts the face 1924 (not shown) pushed all the way to the plane of the edge 1938. When such a condition is detected, the residual face after the push/pull operation is automatically deleted, as illustrated in FIG. 19D.

Figure 19E:
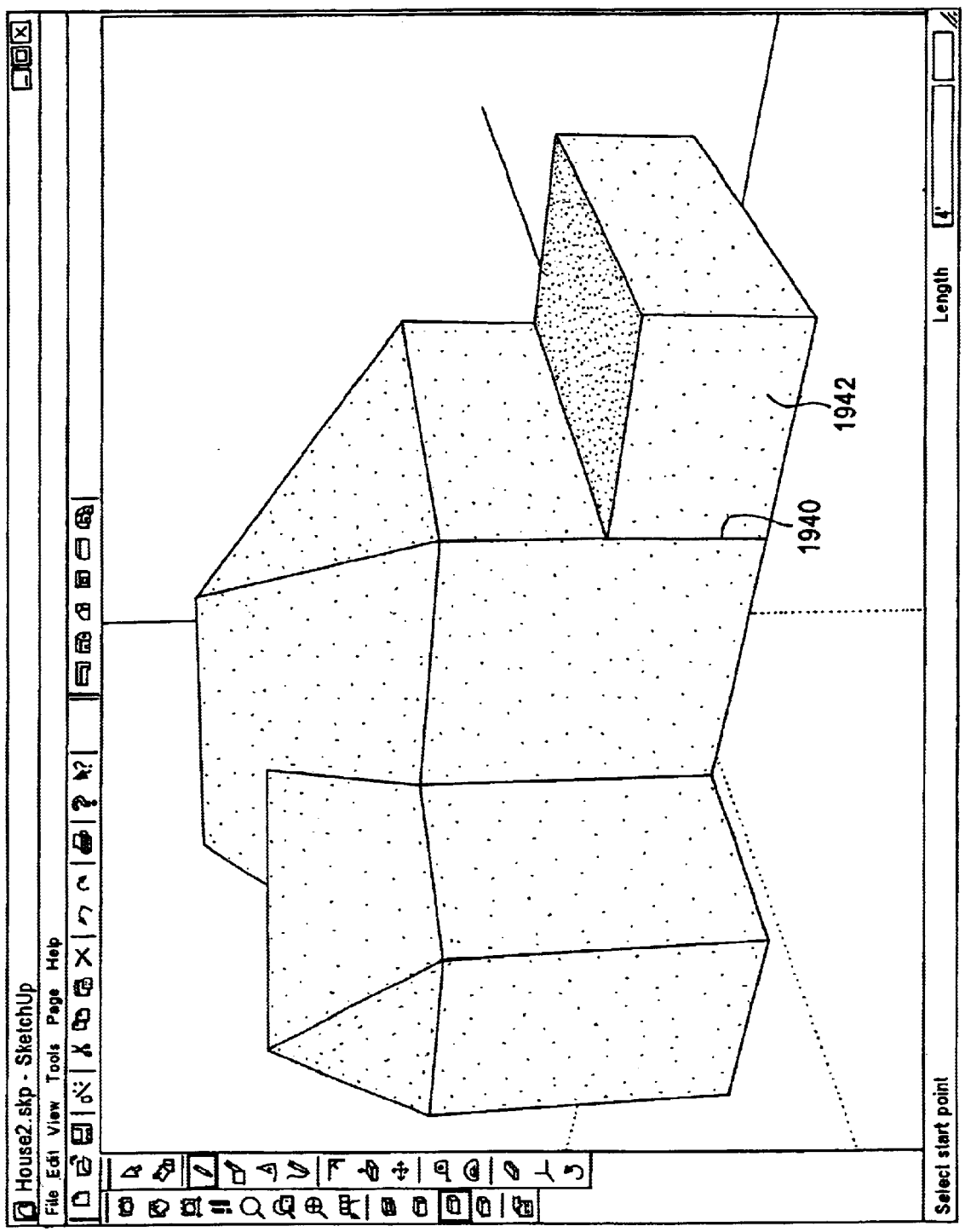
Figure 19F:
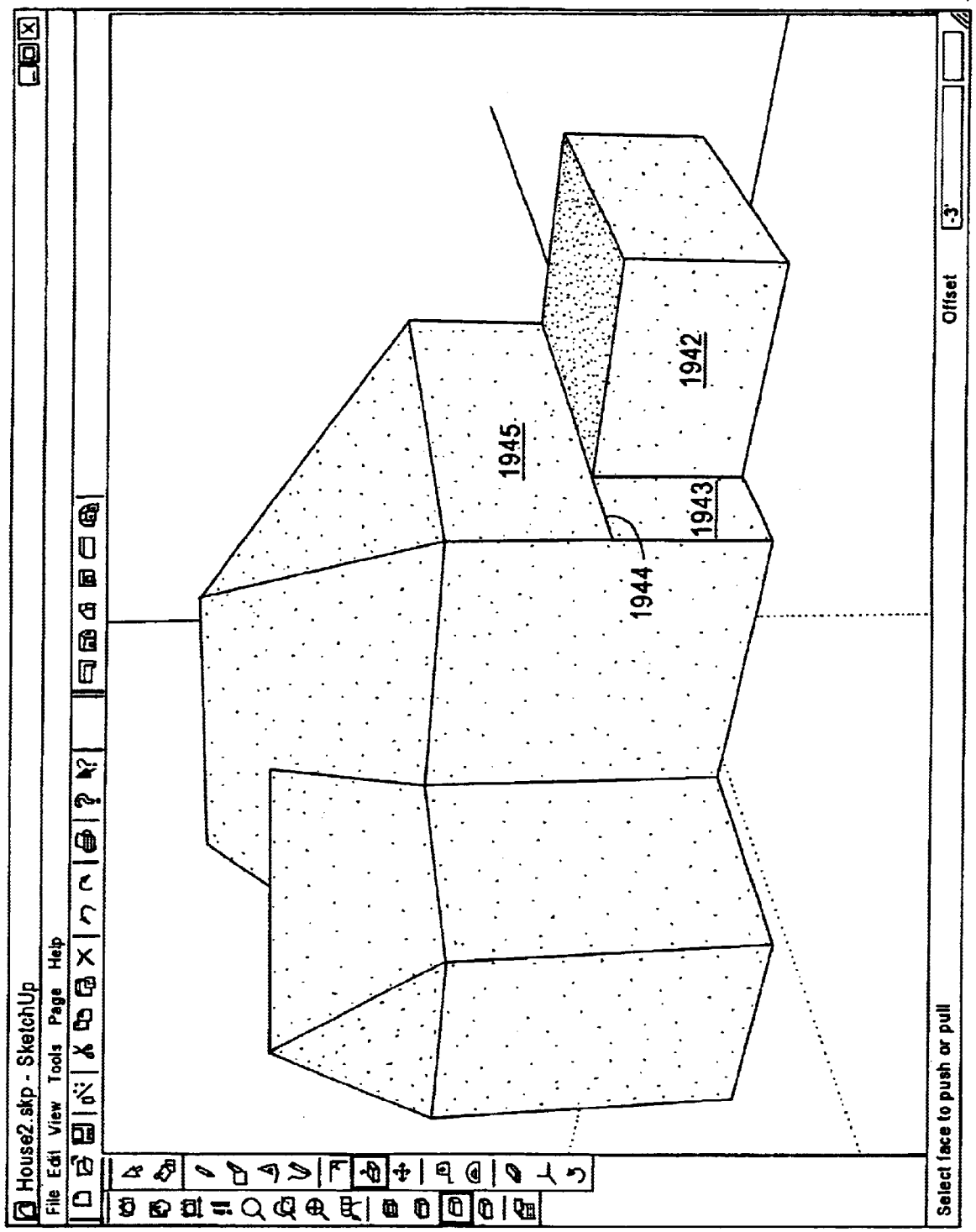
Figure 19G:
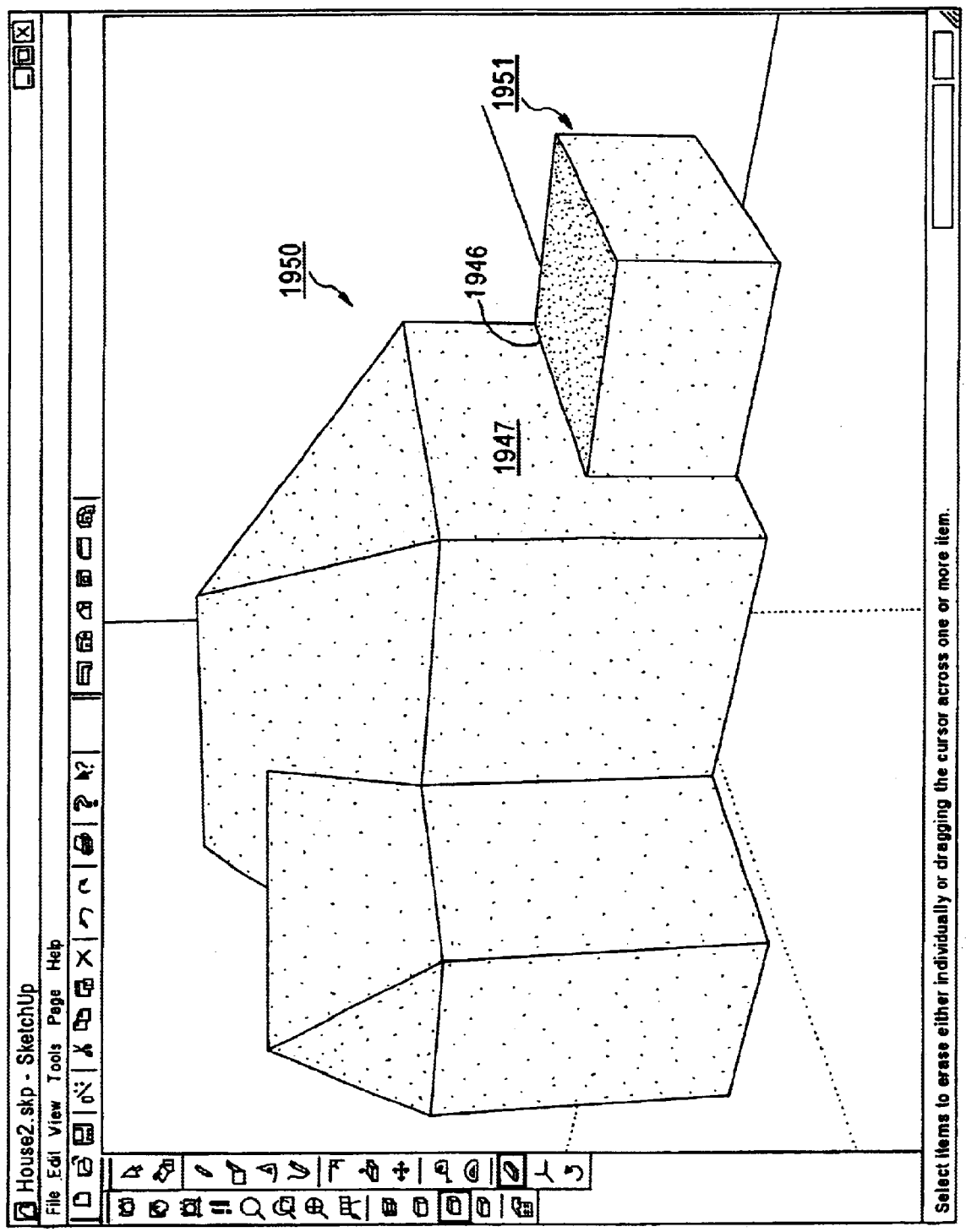
Figure 19H:
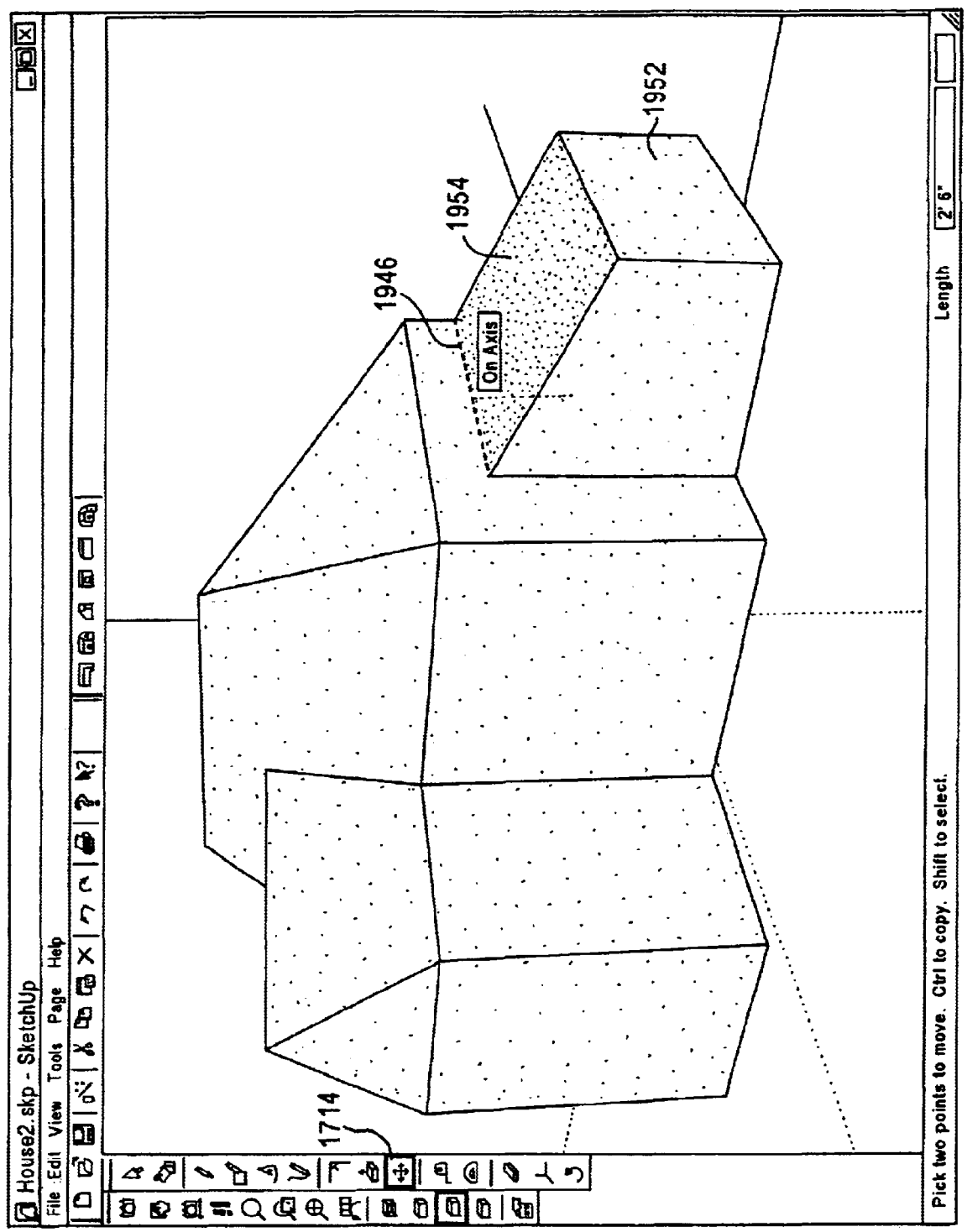

In FIG. 19E the vertical line 1940 is drawn to create the face 1942 which can be separately selected and pushed backwards, as shown in FIG. 19F, to create the edge 1944 that separates the two regions 1943 and 1945. After deleting the edge 1944, the house architecture 1950 of FIG. 19G is created with a new surface face 1947 created as a result. The edge 1946 that is located at the intersection of the house 1950 and the wing 1951 can be selected, as indicated by the dotted line of FIG. 19H, and moved upwards parallel to the axis using the move tool 1714. As a result of moving the edge 1946, the face 1954 stretches to accommodate its new length and angles downward to conform to the new position of its edge 1946.

Figure 19I:
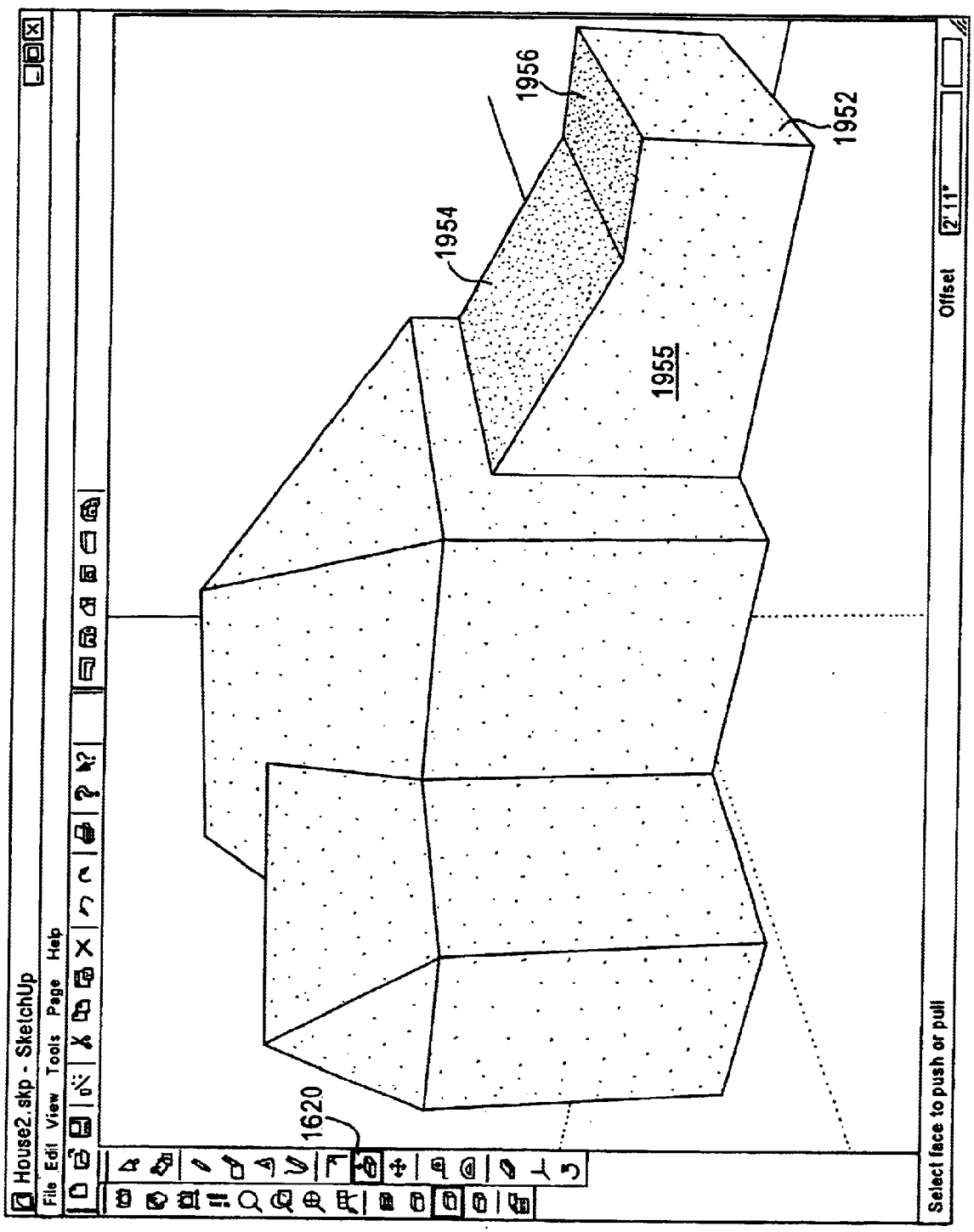
Figure 19J:
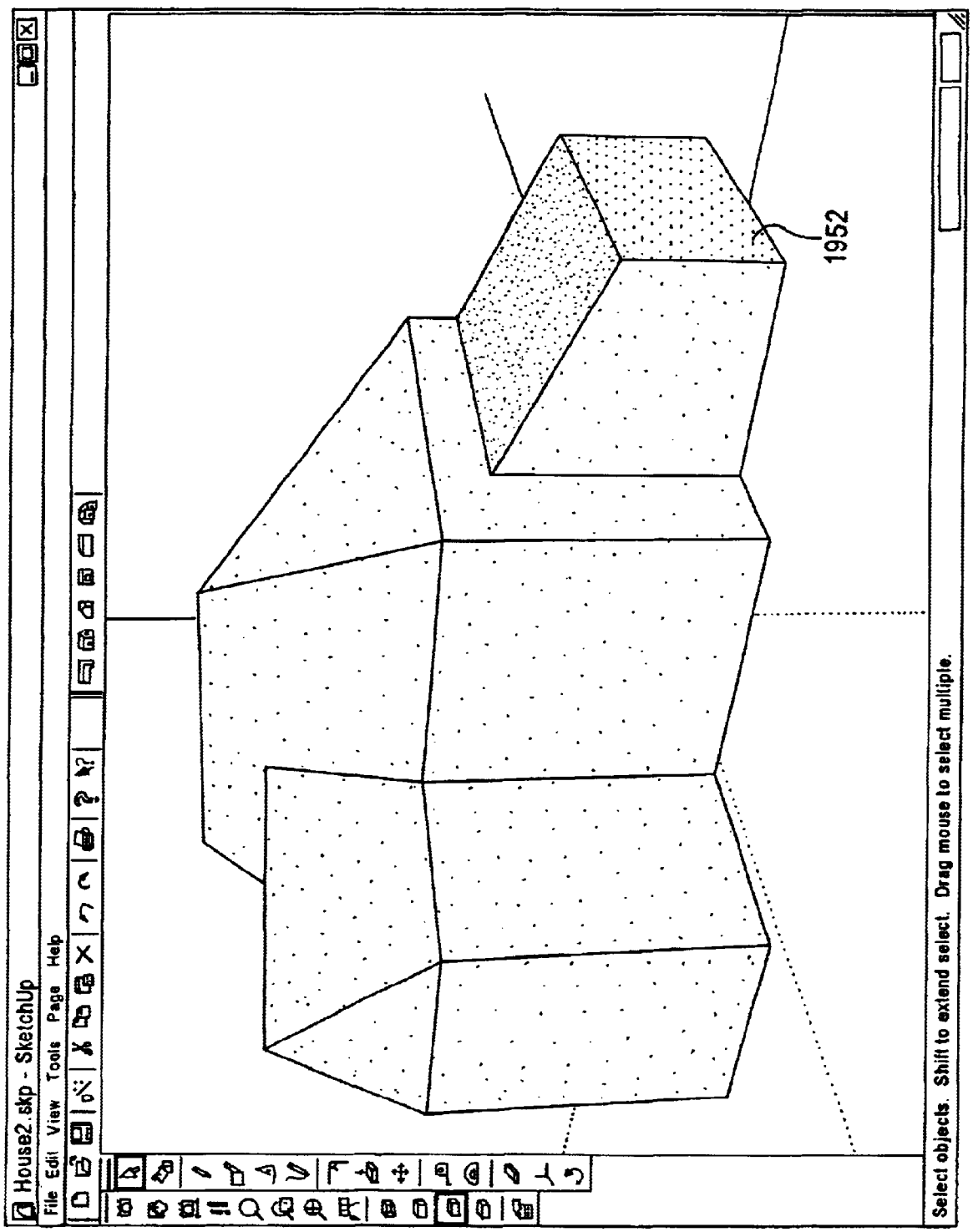
Figure 19K:
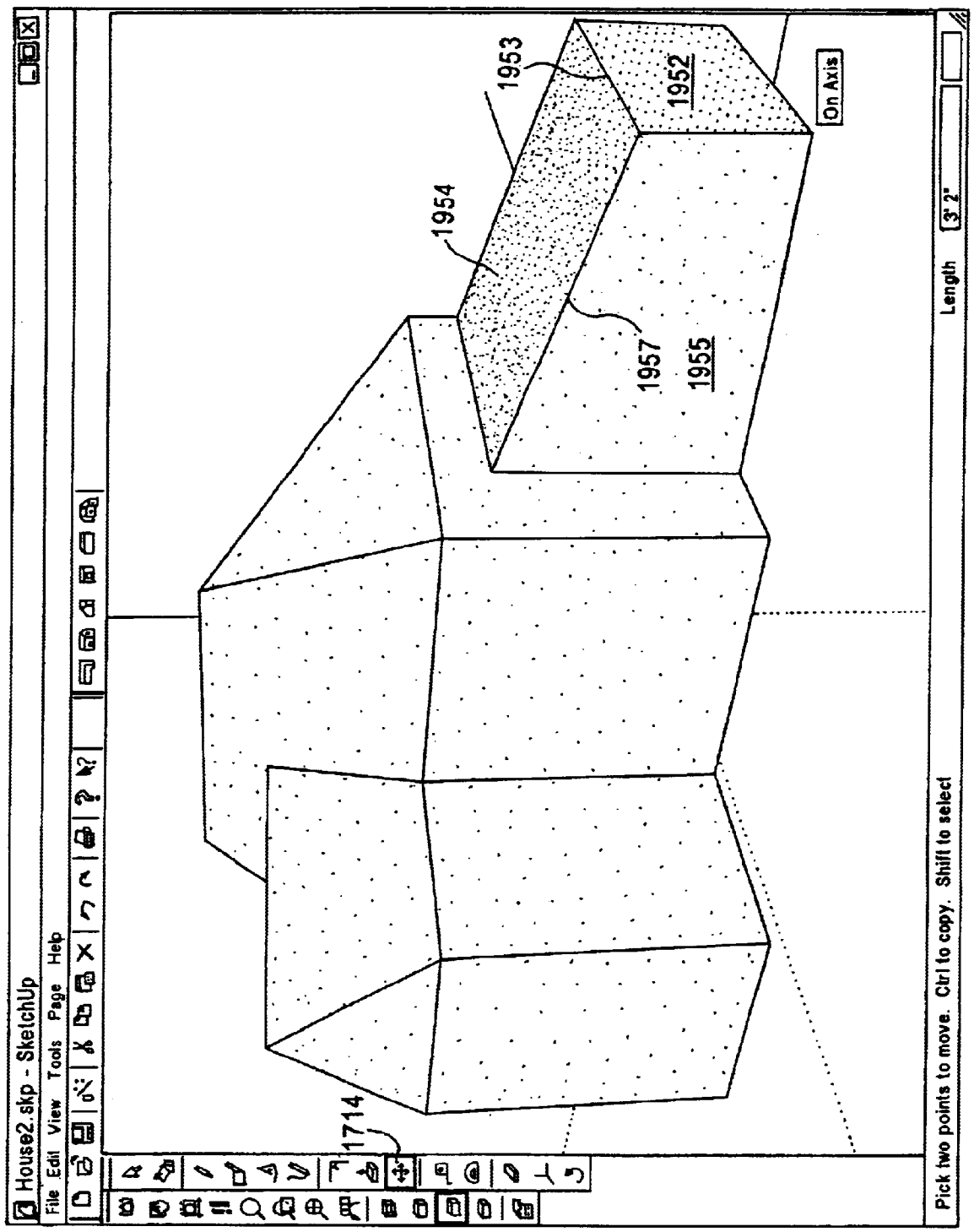

Continuing with FIG. 19I, the face 1952 is selected and operated on using the push/pull tool 1620. The horizontal face 1956 is created to conform to the new geometry that is created by pulling the vertical face 1952 away from the house. The wing's side face 1955 is stretched because of the new geometry but remains as a single surface face. Utilizing a conventional undo feature, from either an icon, keyboard input, or pull-down menu, the house structure can be returned to its architecture, as shown in FIG. 19J, absent the effects of the previous push/pull operation. In FIG. 19J, the face 1952 is once again selected but this time is operated on using the move tool 1714. As FIG. 19K illustrates, the face 1952 is moved away from the house but the resulting surfaces 1954 and 1955 significantly differ from the push/pull results illustrated earlier in FIG. 19I. In FIG. 19K, the face 1954 stretches, but remains a single face, and changes its inclination to conform to the new position of the edge 1953. The face 1955 remains a single face also with a top edge 1957 that follows the inclination angle of the surface 1954.

Both the push/pull tool and the move tool can be used to shape and modify a model in three-dimensions. The move tool stretches and adapts the existing surface faces to conform to the re-positioning of edges, vertices or faces. The push/pull tool, on the other hand, can create (or delete) new geometry to accommodate the repositioning of surface faces.

Referring to the flowchart of FIG. 20 the general steps of creating three-dimensional geometries is illustrated. A user selects a surface face and a push/pull tool (step 2002). The order of these operations is not critical; either the tool or the surface face can be selected first. The selected surface face is transformed from the two-dimensional, skinned surface, described earlier, to a three-dimensional solid. The surface face is duplicated, and in the process creates duplicate edges and vertices of the surface face to be coextensive with the original vertices and edges. In addition, more edges and faces are created between the original and duplicate edges and vertices. This duplication creates a three-dimensional object with zero-height edges (in the third dimension) and zero-area faces (step 2004) between the original and duplicate edges and vertices. Operation of the push/pull tool by the user generates input indicating how far the selected surface face should be moved in the third dimension (step 2006). Based on this input, the surface face is moved (step 2008) accordingly and, as the surface face is moved, the zero-height edges acquire non-zero height in accordance with the extra-dimensional offset and, therefore, the faces acquire non-zero area (step 2010). These non-zero area faces are displayed, thereby depicting the resulting object in three dimensions. Once an object of the intended size is created, a user can terminate the push/pull operation to end the movement of the selected surface face (step 2012). A push operation will extend the face in a specified direction, while a pull operation will extend the face in the opposite direction.

Figure 20A:
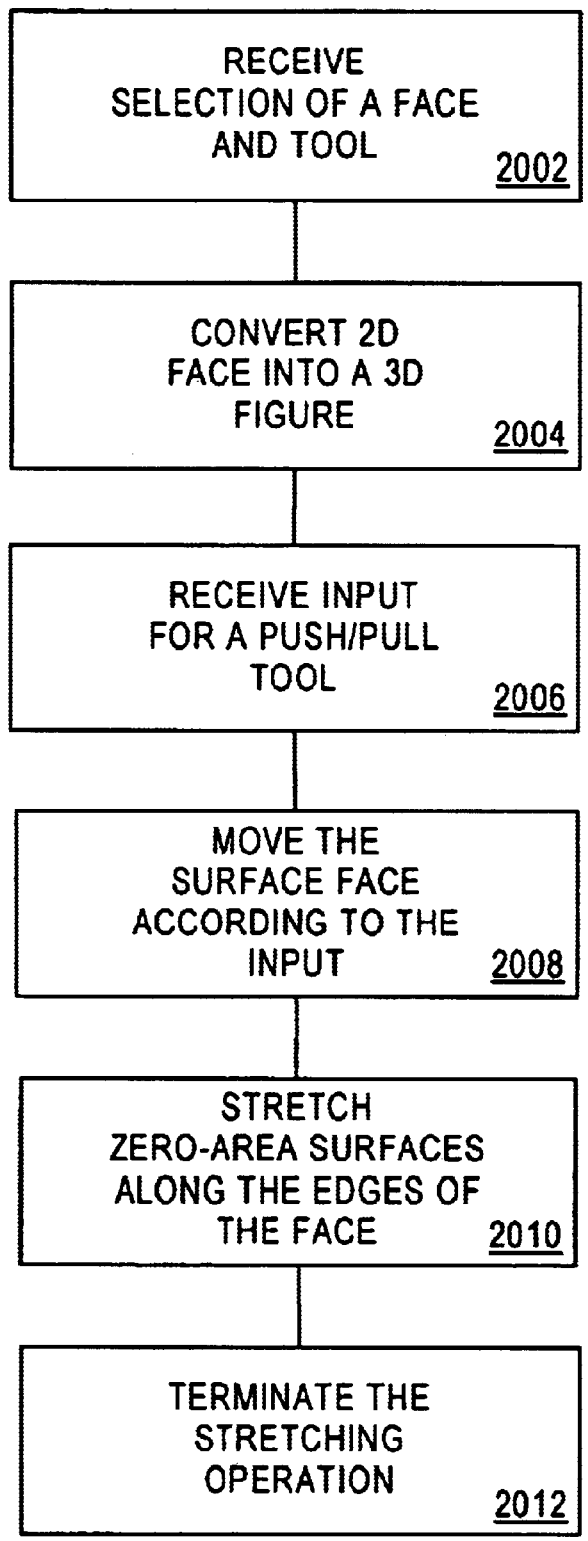
FIG. 20A illustrates a flowchart for manipulating a surface face in order to create a three-dimensional geometry according to at least one embodiment of the present invention.
Figure 20B:
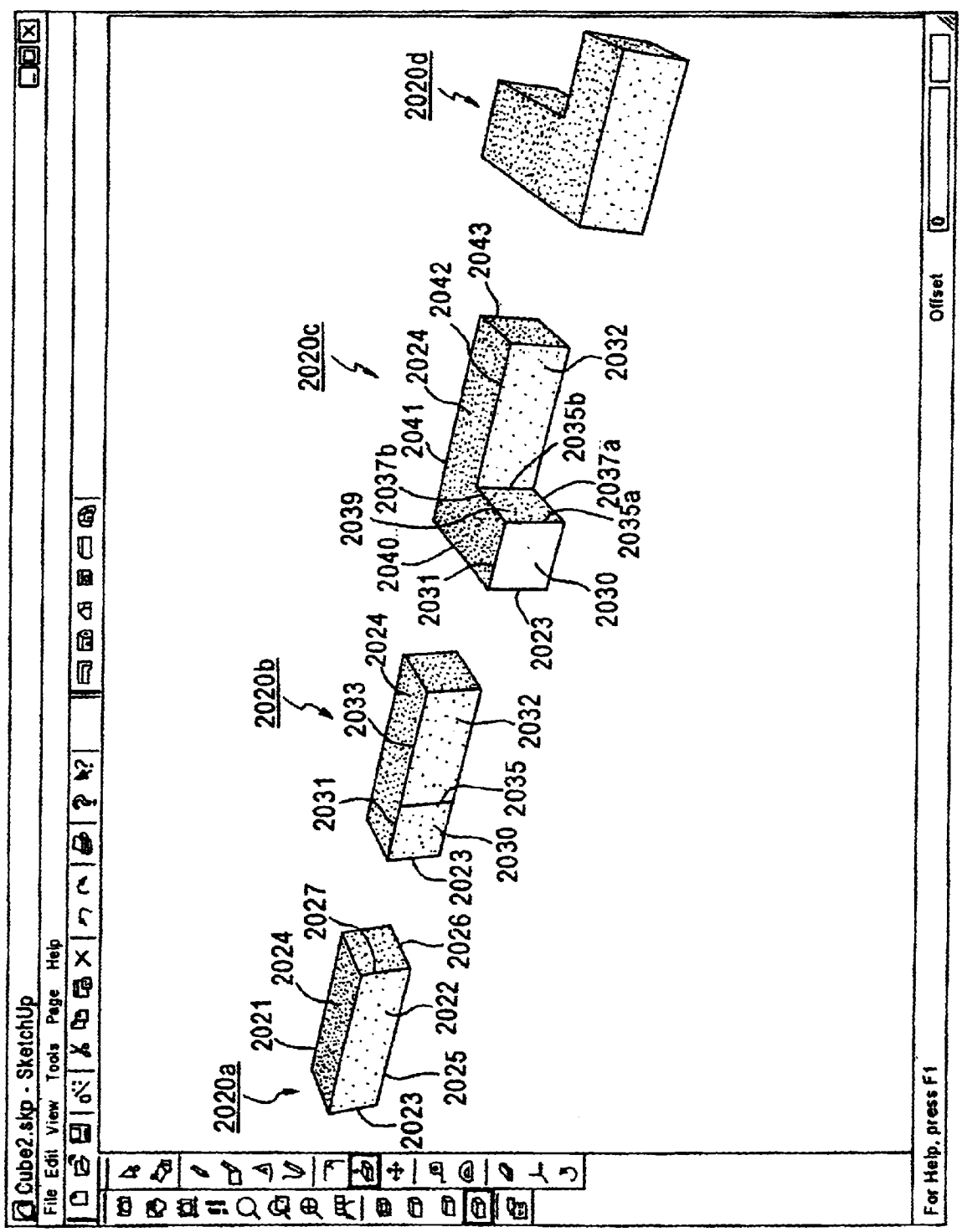
FIG. 20B illustrates a detailed view of the push/pull method of the flowchart of FIG. 20 A on faces of different orientation.

The sequence of four objects depicted in FIG. 20B illustrate the intelligent duplication of coextensive geometry only as necessary to facilitate the push/pull operations as described in the flowchart of FIG. 20A.

The left-most object 2020 includes a front face 2022 that includes the edges 2023, 2025, 2021 and 2027. The edge 2021 is shared with a top face 2024 and the edge 2027 is shared with a side face 2026. The next object 2020b in the sequence shows a vertical line 2035 being drawn across the front face. As a result, two front faces 2032 and 2030 are created to replace face 2022. Along the border with the top face 2024, two edges 2031 and 2033 are created to replace the edge 2021. Although not explicitly labeled, the bottom edge 2025 is also split into two edges.

The third object 2020c in the sequence illustrates the effect of a push/pull operation on the left-most front face 2030. As object 2020b shows, the edge 2035 separates two non-perpendicular faces 2030 and 2032. Prior to initiating the push/pull of the face 2030, the edge 2035 is duplicated into coextensive edges 2035a and 2035b and separating these edges are zero length edges 2037a and 2037b. As the face 2030 is pulled out, the edges 2037a and 2037b extend in the direction of the push/pull movement to make the face 2039 visible. This face 2039 is created and is bounded by edges 2035a, 2035b, 2037a and 2037b. Although faces 2030 and 2032 are shown as parallel, a similar result occurs even if the adjacent faces are not parallel.

However, when a face, such as top face 2024, lies in a plane perpendicular to an adjacent face, such as the front face 2030, which is the object of a push pull operation, the shared edge, such as edge 2031, does not need to be duplicated in order to accommodate the movement of the front face 2030. As depicted in FIG. 20B, the top face 2024 becomes L-shaped as the front face 2030 is pulled out. After the push/pull operation, then, the top face 2024 is bounded by the edges 2031, 2040, 2041, 2042, 2043 and 2037b.

The right-most object 2020d of the sequence in FIG. 20B, depicts another view of the object 2020c in order to illustrate that the faces that were hidden from view behave the same as those described.

The push/pull principles can also be implemented in lower dimensions. For example, a line (i.e., a one dimensional shape) can be coextensively replicated so that a push/pull operation will extend the line in a second dimension resulting in a two-dimensional quadrilateral. A rectangle tool is provided, however, as a preferable way to create quadrilateral shapes.

Components as Surface Treatments

Figure 21A:
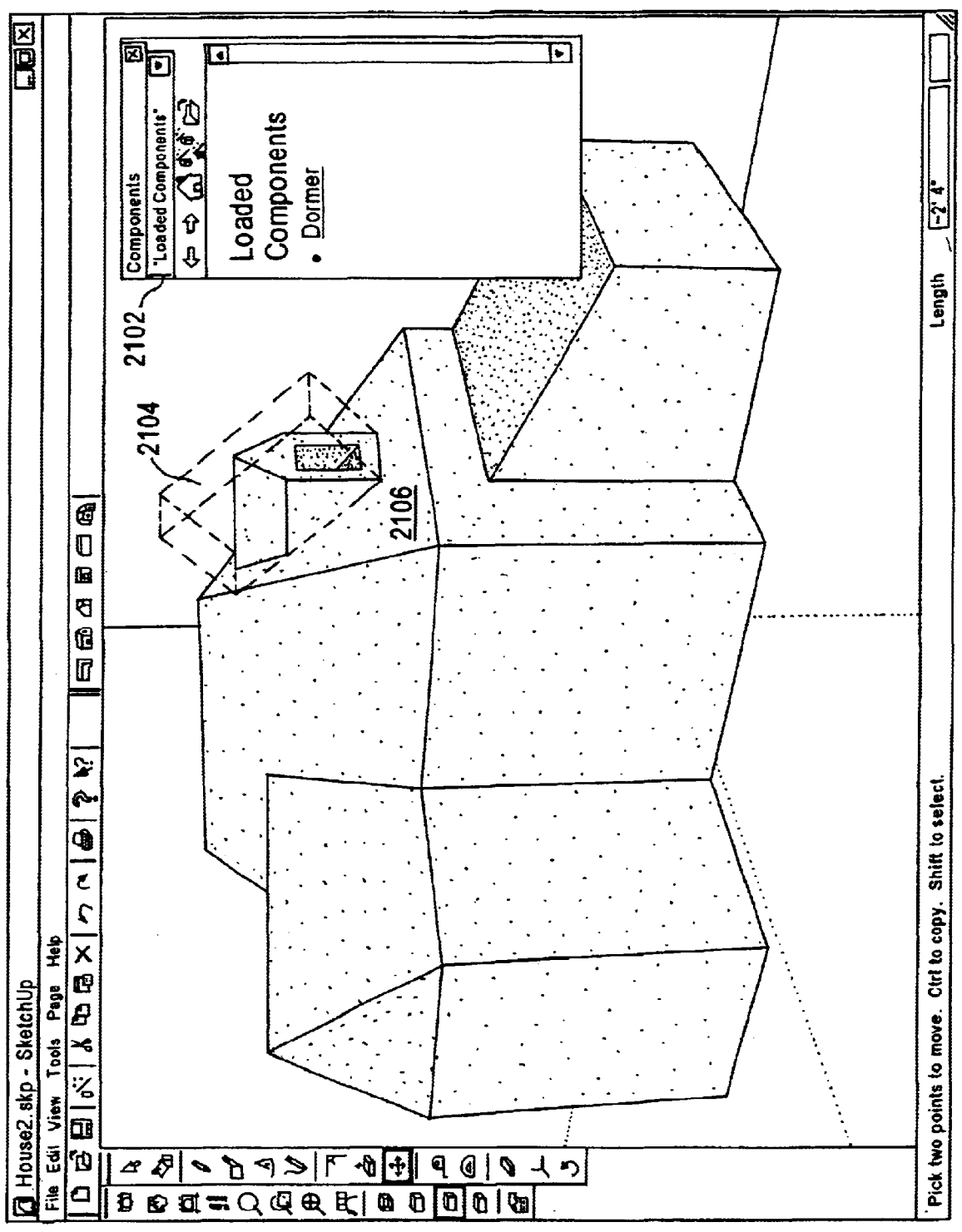
FIGS. 21A–21H illustrate how components interact with the surface faces of the second exemplary house design.

FIG. 21A illustrates the benefits of the user being able to create and define components, as described in relation to the previous exemplary house. The component dialog window 2102 is opened, by any one of various methods, and lists the "Dormer" component created in a previous model. By selecting this component from the dialog window 2102, the user can insert a dormer instance 2104 on the roof surface 2106 of the current model. In this way, components can be re-used among different models to save time and effort and to promote consistency in developing models using the present graphical design and modeling application.

Figure 21B:
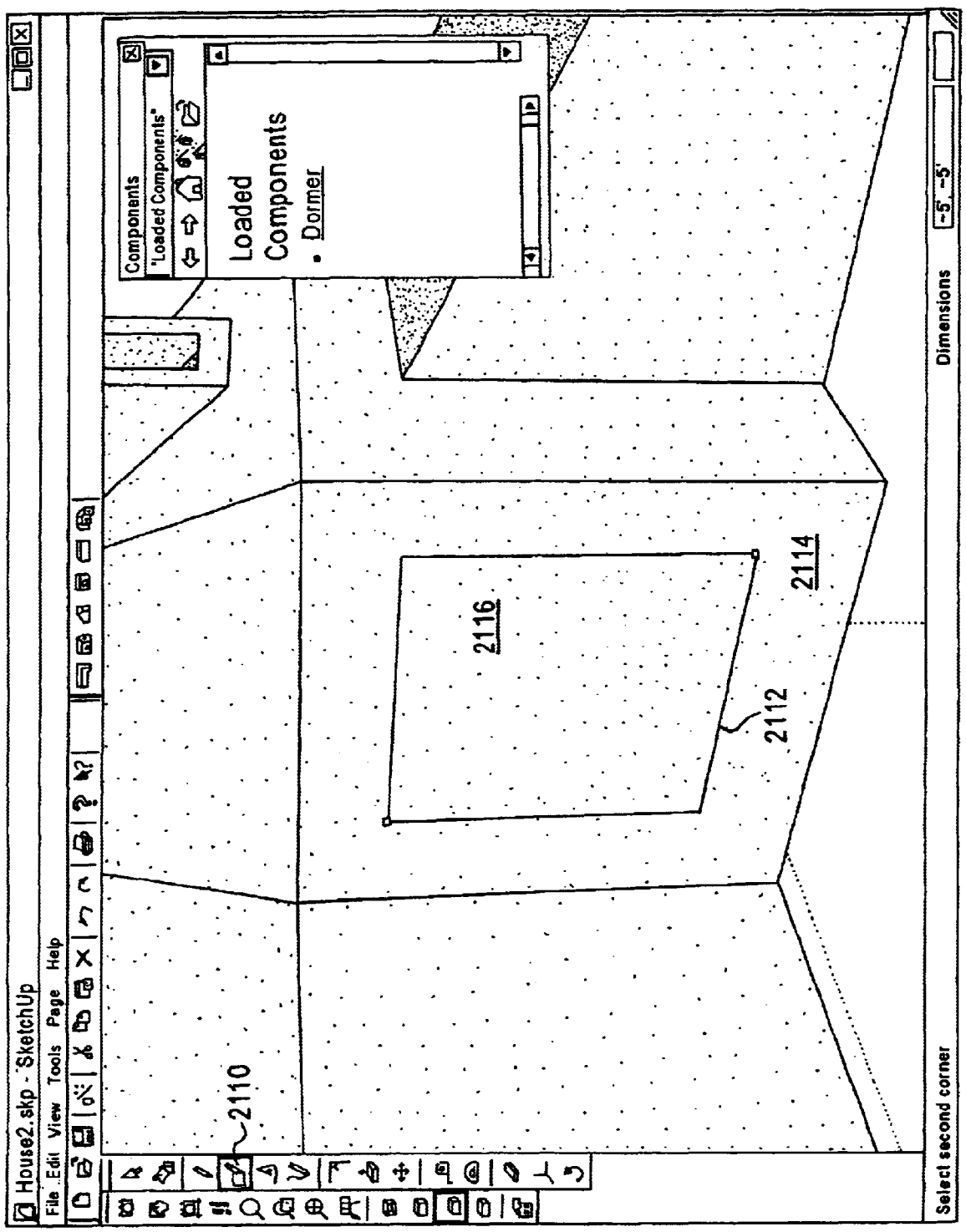
Figure 21C:
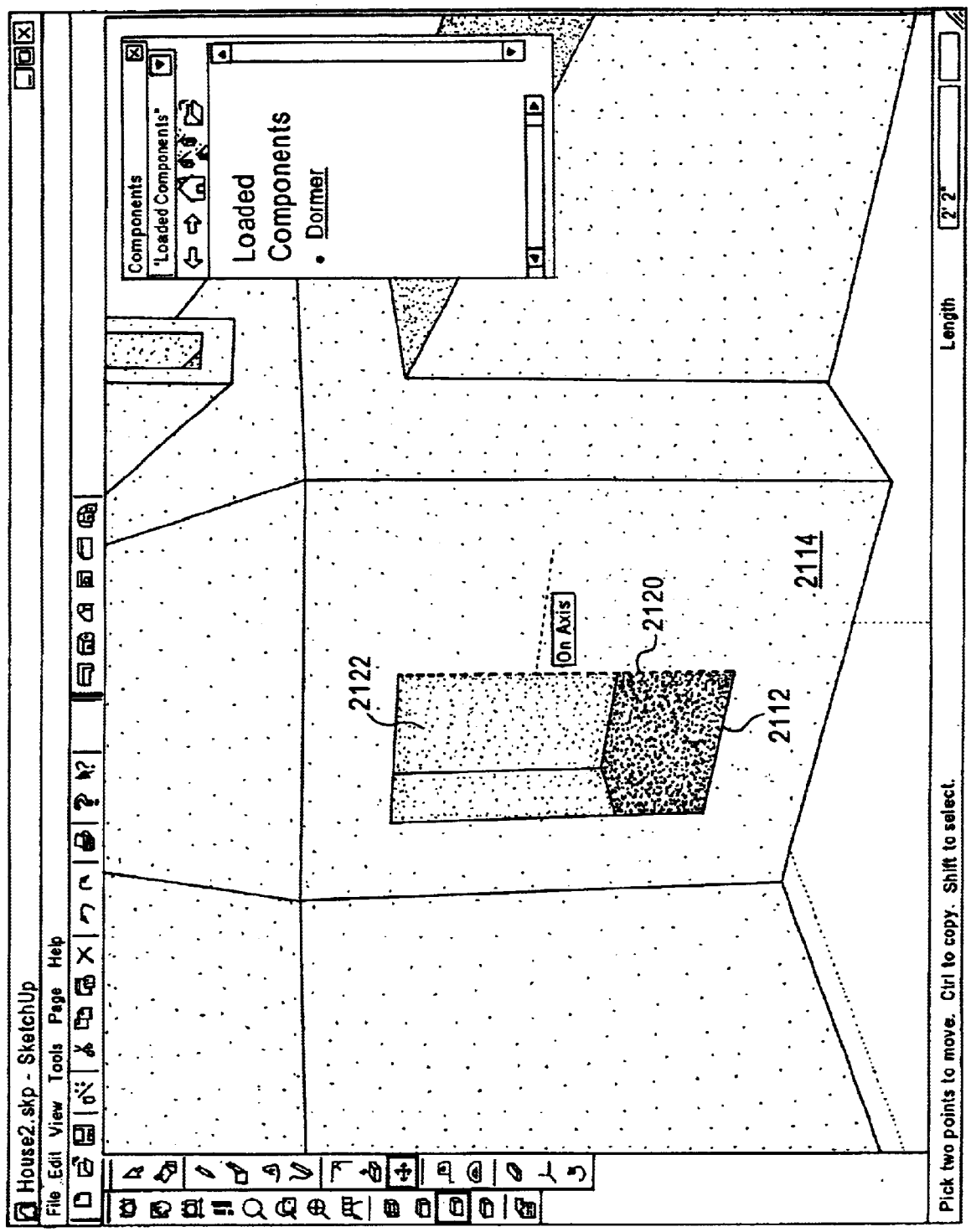

Continuing with FIG. 21B, the rectangle tool 2110 is used to create the relatively large rectangle 2112 on the vertical face 2114. The interior region 2116 of the rectangle 2112 is, itself, a surface face and can be selected and deleted to create an opening 2122 in the vertical face 2114, as shown in FIG. 21C. Even though, using the rectangle tool 2110, all the edges of the rectangle 2112 were simultaneously created, these edges are distinct geometrical features. Thus, the right vertical edge 2120 of the rectangle 2112 can be selected separately from the other edges of the rectangle 2112 and moved, as shown in FIG. 21C. As the edge 2120 is moved towards the left on the face 2114, the rectangle 2112 and the opening 2122 gets smaller and the opening 2122 into the face 2114 is modified in real-time to aid the user in immediately visualizing the effect of the move operation.

Figure 21D:
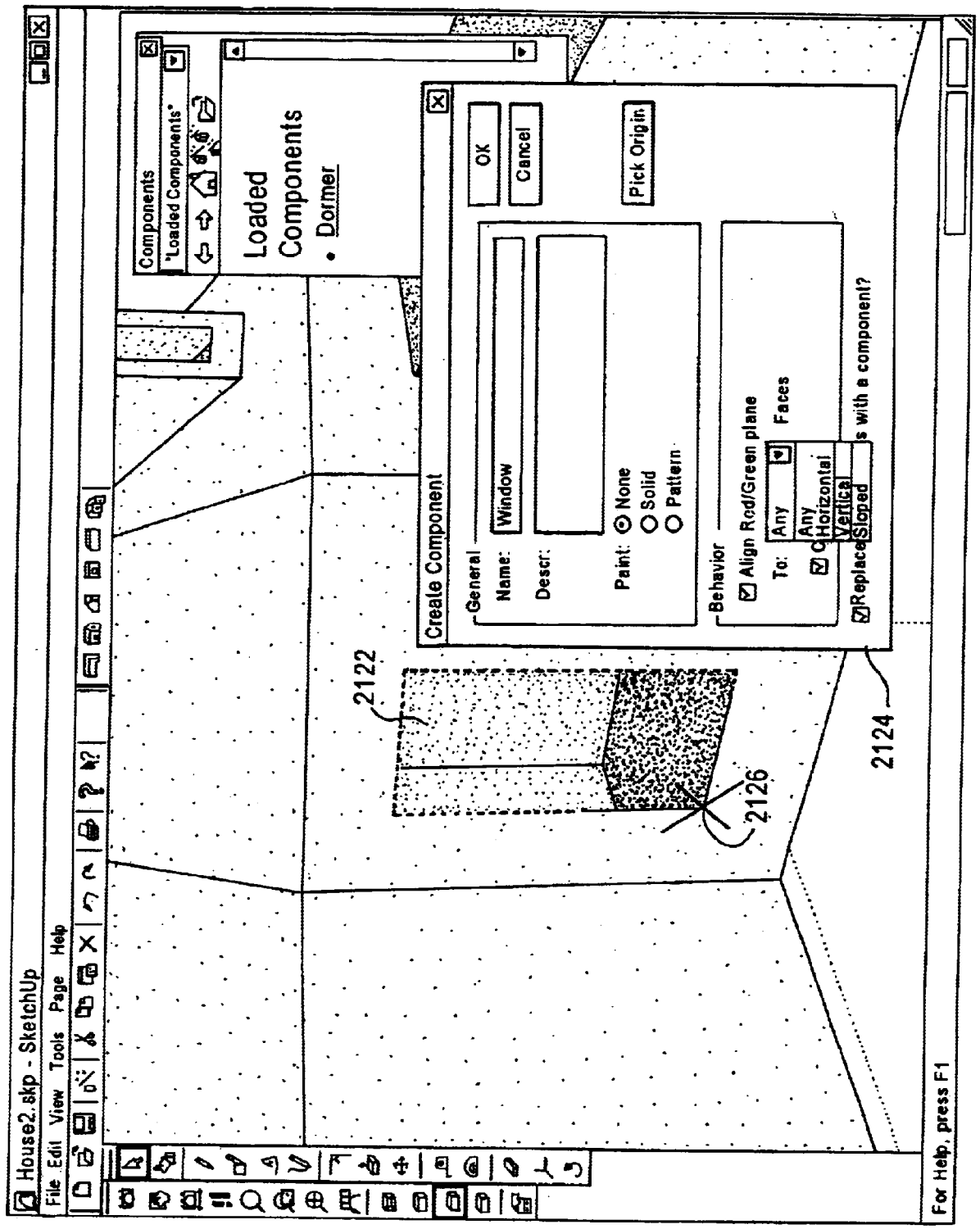

Using the select tool and the component creation dialog box 2124, the rectangle 2112 can be transformed into a component instance. According to the exemplary dialog box 2124 of FIG. 21D, the "Window" components is defined to snap only to vertical faces. The origin and axis indicators 2126 are provided to facilitate the user's definition of the component.

Figure 21E:
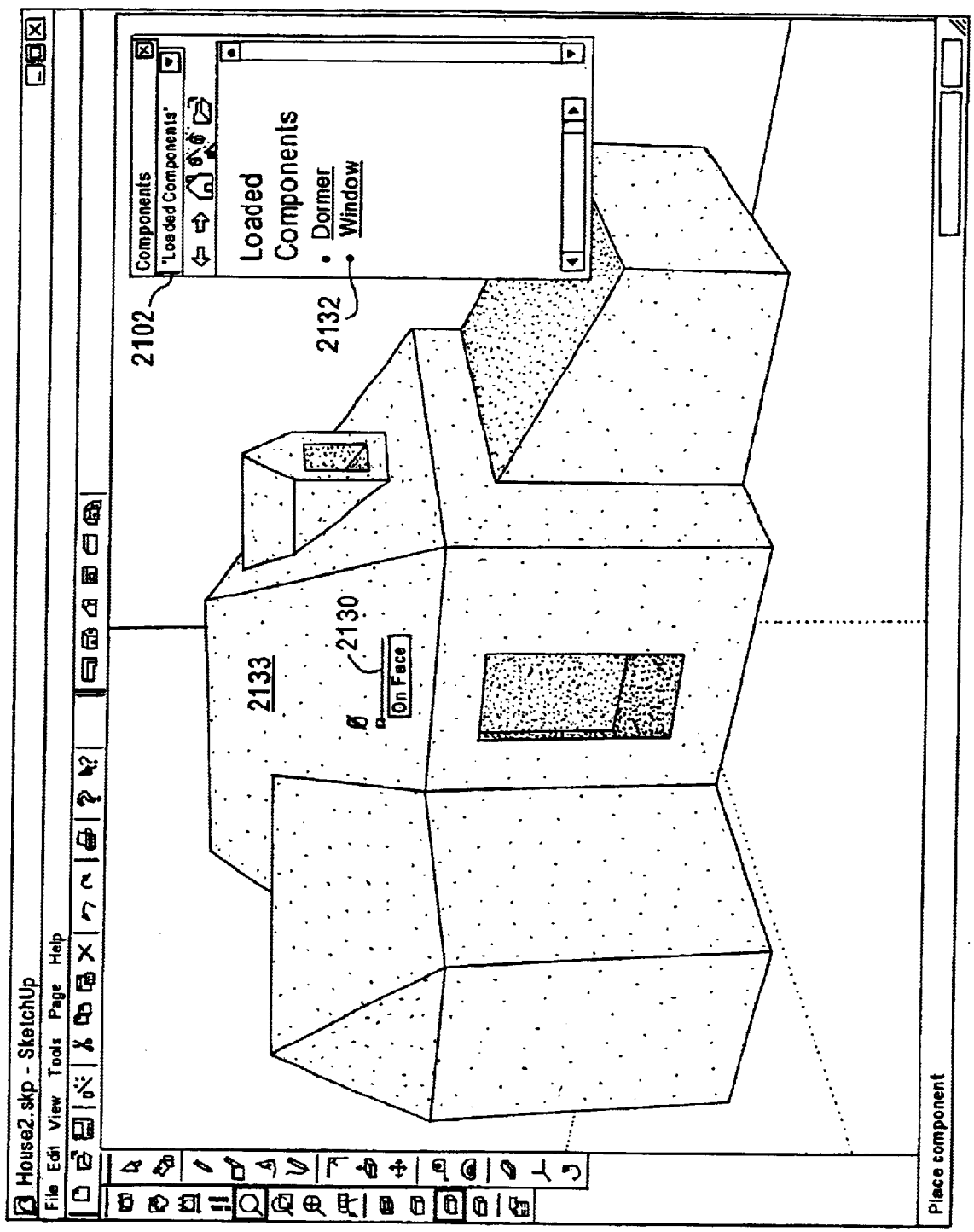
Figure 21F:
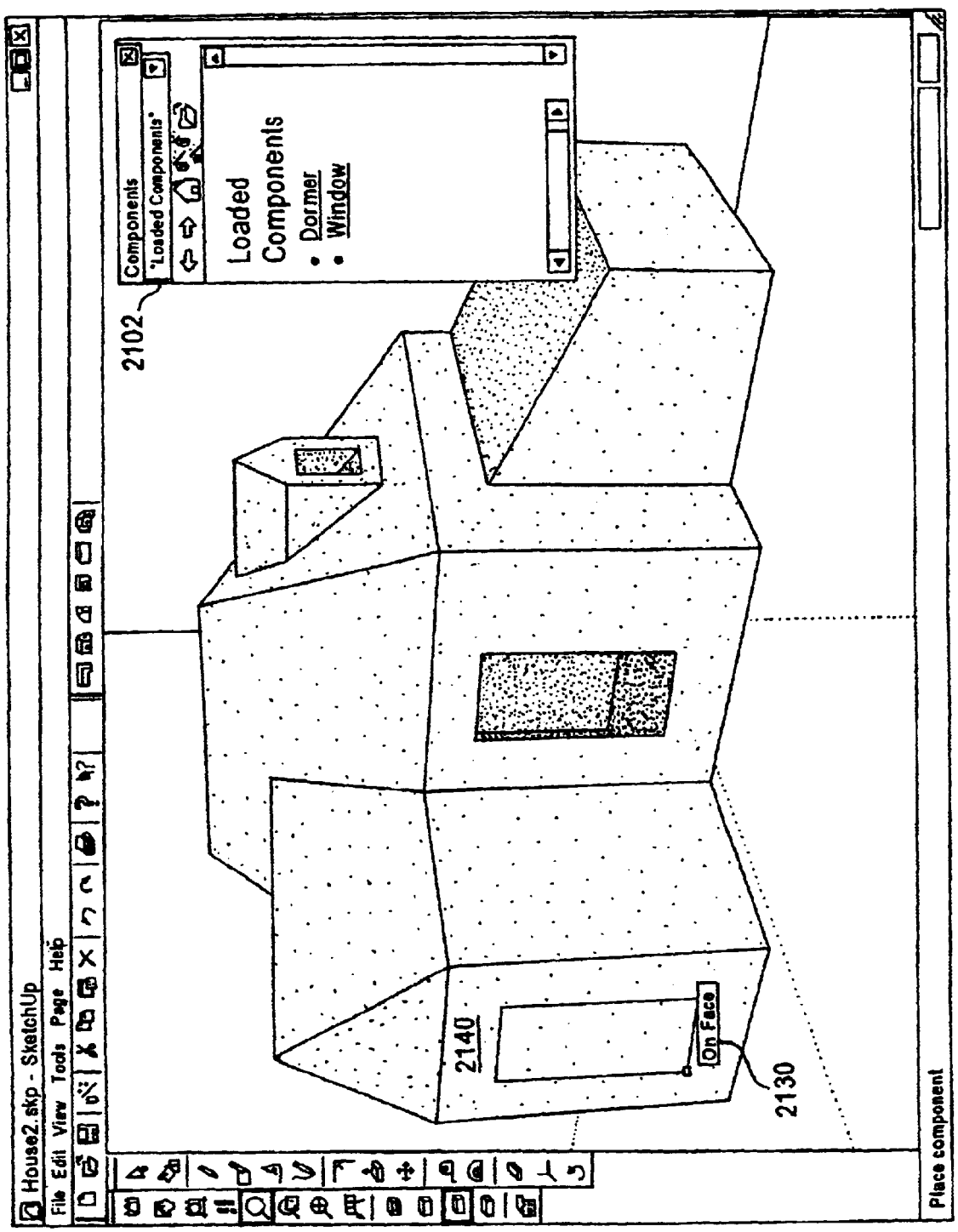

Once the window component is defined, its name 2132 appears in the list of loaded components in the window 2102, as shown if FIG. 21E. From this window 2102, a user can select the window component and place an instance 2130 in the current model. As the user moves the cursor to position the component instance 2130, visual cues are provided depending on the type of surface face over which the cursor is positioned. With the cursor positioned over the non-vertical face 2133, as shown in FIG. 21E, the component instance 2130 does not align with the face 2133 and the cursor changes, for example to a circle with a slash through it, to indicate the component instance 2130 will not properly align to the face 2133. However, as shown in FIG. 21F, when the cursor is moved to a position over the surface 2140, then the window instance 2130 can align with the vertical face and the instance 2130 is displayed on the face 2140. Clicking a mouse button, for example, will complete the instantiation of the window component 2130 along with its resultant opening in the surface face 2140.

Figure 21G:
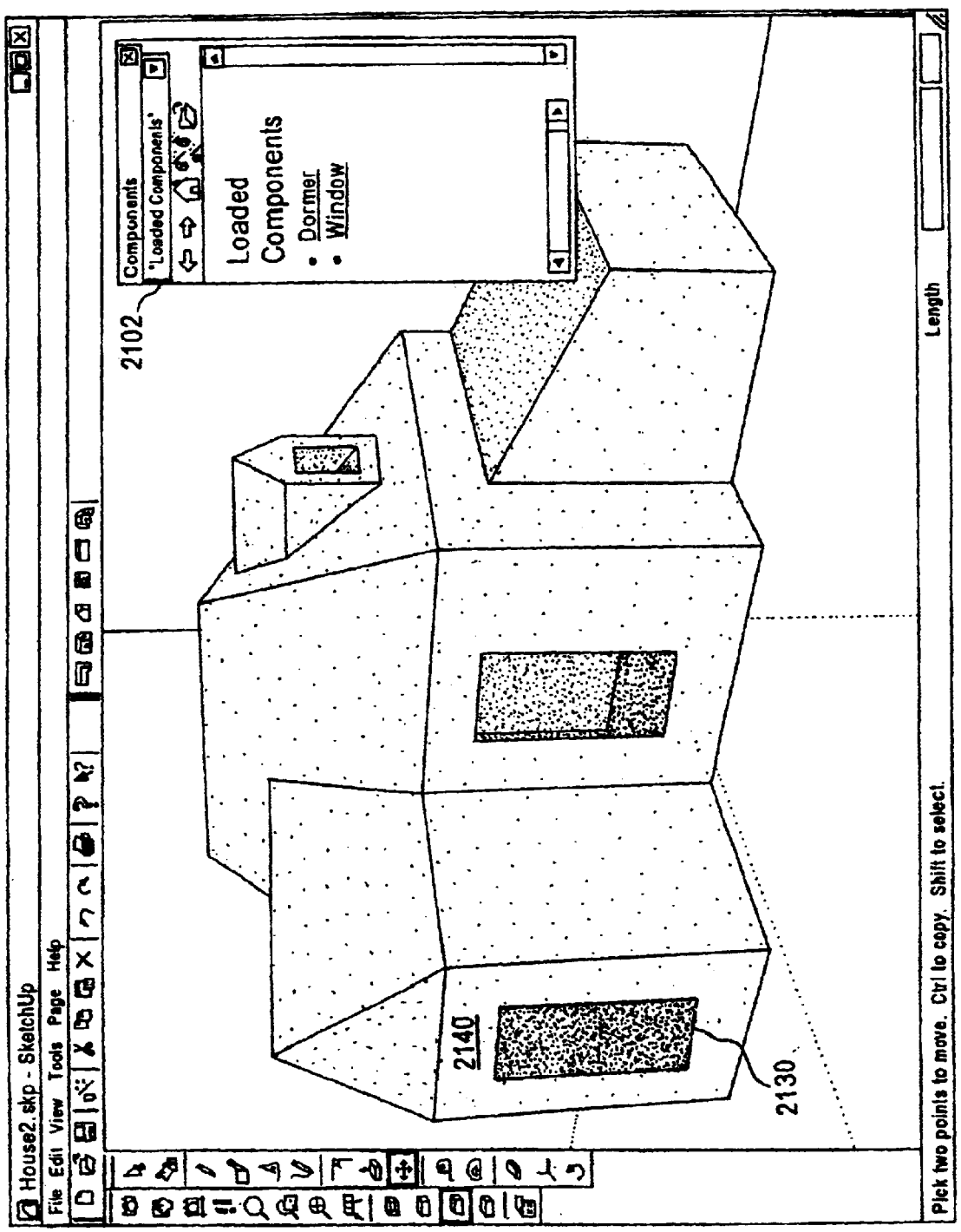
Figure 21H:
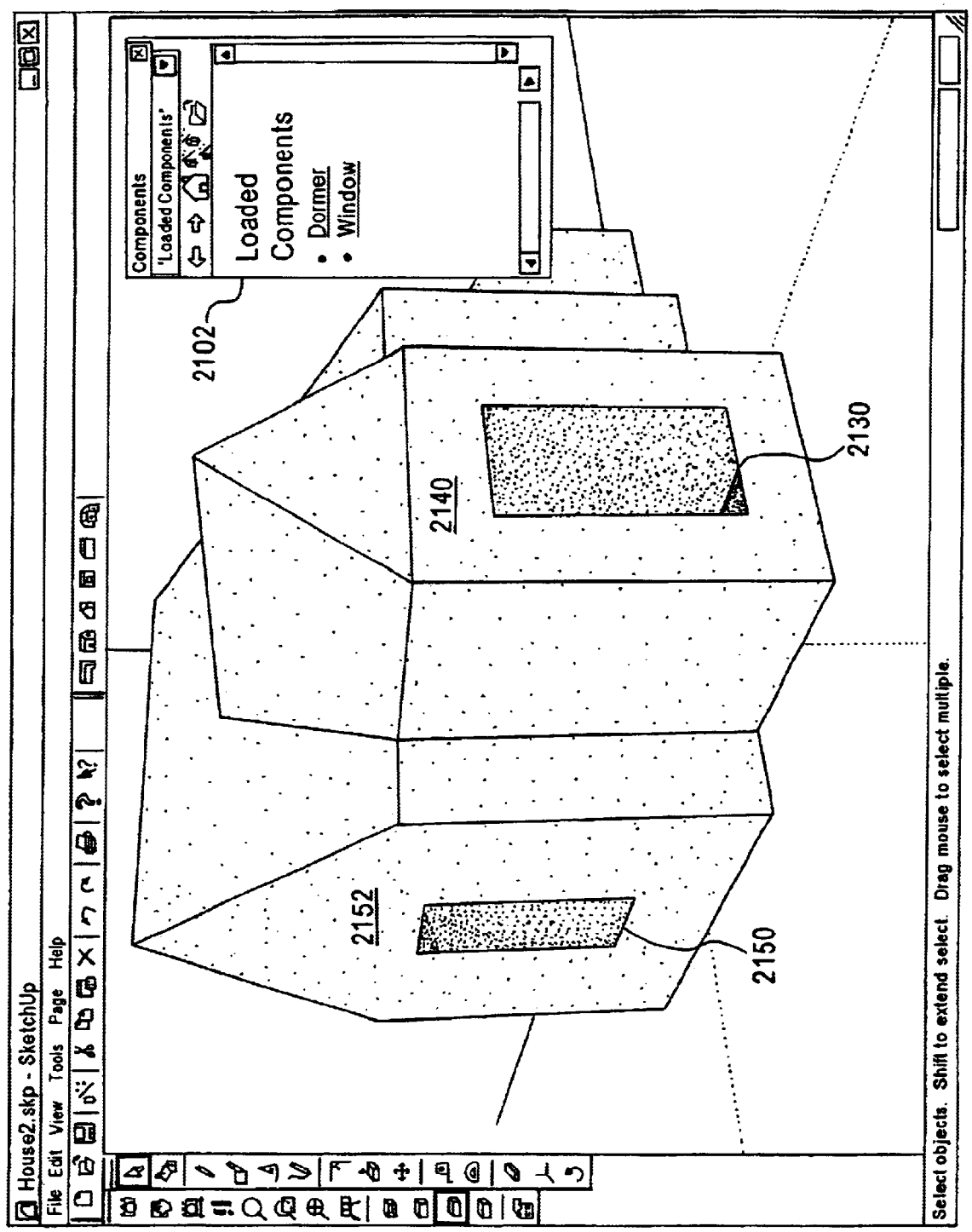

After the window 2130 is instantiated, as illustrated in FIG. 21G, the entire component 2130 can be copied, as an alternative to selecting another window component from the window 2102, to provide additional instances of the window component on vertical faces, for example the face 2152, as shown in FIG. 21H. The perimeter of the window 2130 forms a surface face separate from the surface face 2140. Accordingly, a user may expect a push/pull operation on the face 2140 to extend only the face 2140 outwards while leaving a sunken window that corresponds to the rectangle 2130. However, a component instance, for example 2130, sticks to surface face on which the instance is placed. Therefore, if the face 2140 were to be push/pulled, then the window instance 2130 would remain on the face 2140, wherever that face is ultimately positioned.

Figure 22A:
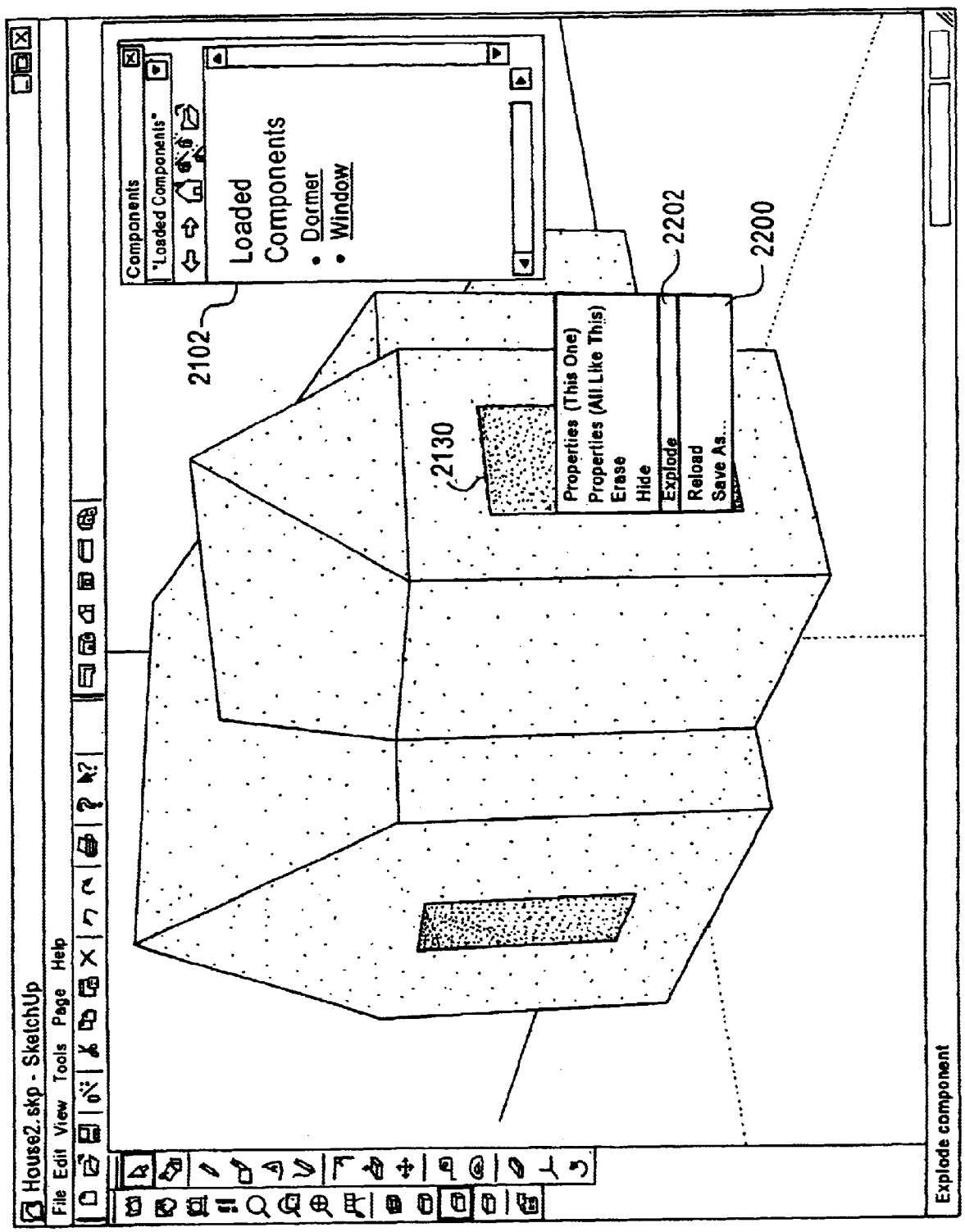
FIGS. 22A–22C illustrate the effects on subsequent move operations of exploding a component into its constituent parts.
Figure 22B:
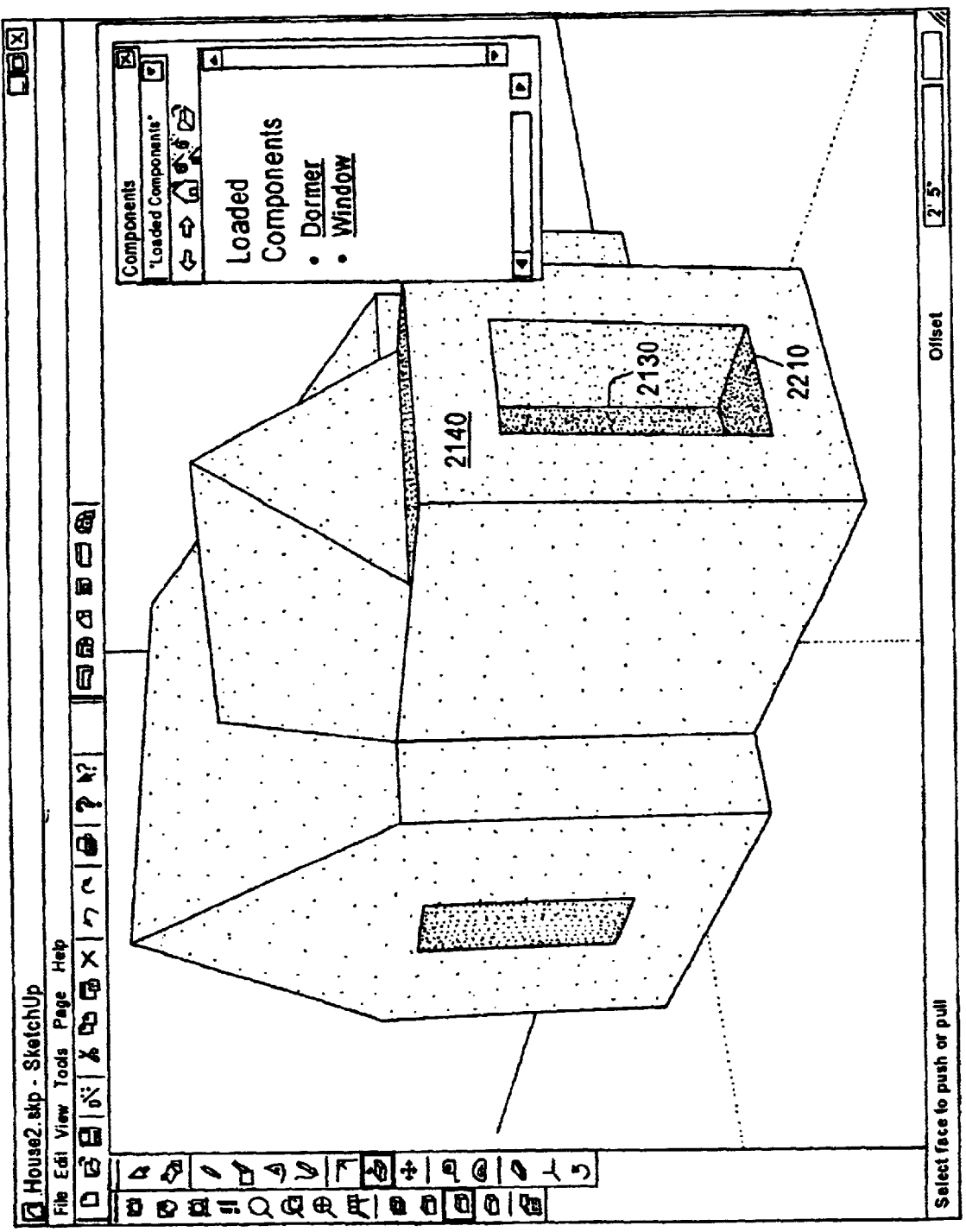

The above-described behavior of components sticking to a surface face may not be appropriate in all occasions and a user may find it beneficial to have a way of decoupling components so that they behave differently. In FIG. 22A, the component instance 2130 has been selected and a pull-down menu 2200 has been activated. The menu 2200 includes an item 2202 for exploding a component. When the menu item 2202 is chosen, the selected component instance 2130 is decoupled into its individual parts. While the visual display may not appear to change to the user, the elements that made-up the component are no longer stored as associated elements and behavioral characteristics are no longer associated with the elements. The individual elements, therefore, behave as ordinary drawn features. FIG. 22B depicts a push/pull operation on the surface 2140 after the window instance 2130 has been exploded. As a result, the rectangle 2130 remains stationary and the face 2140 is pulled outwards creating the sunken opening 2210.

Figure 22C:
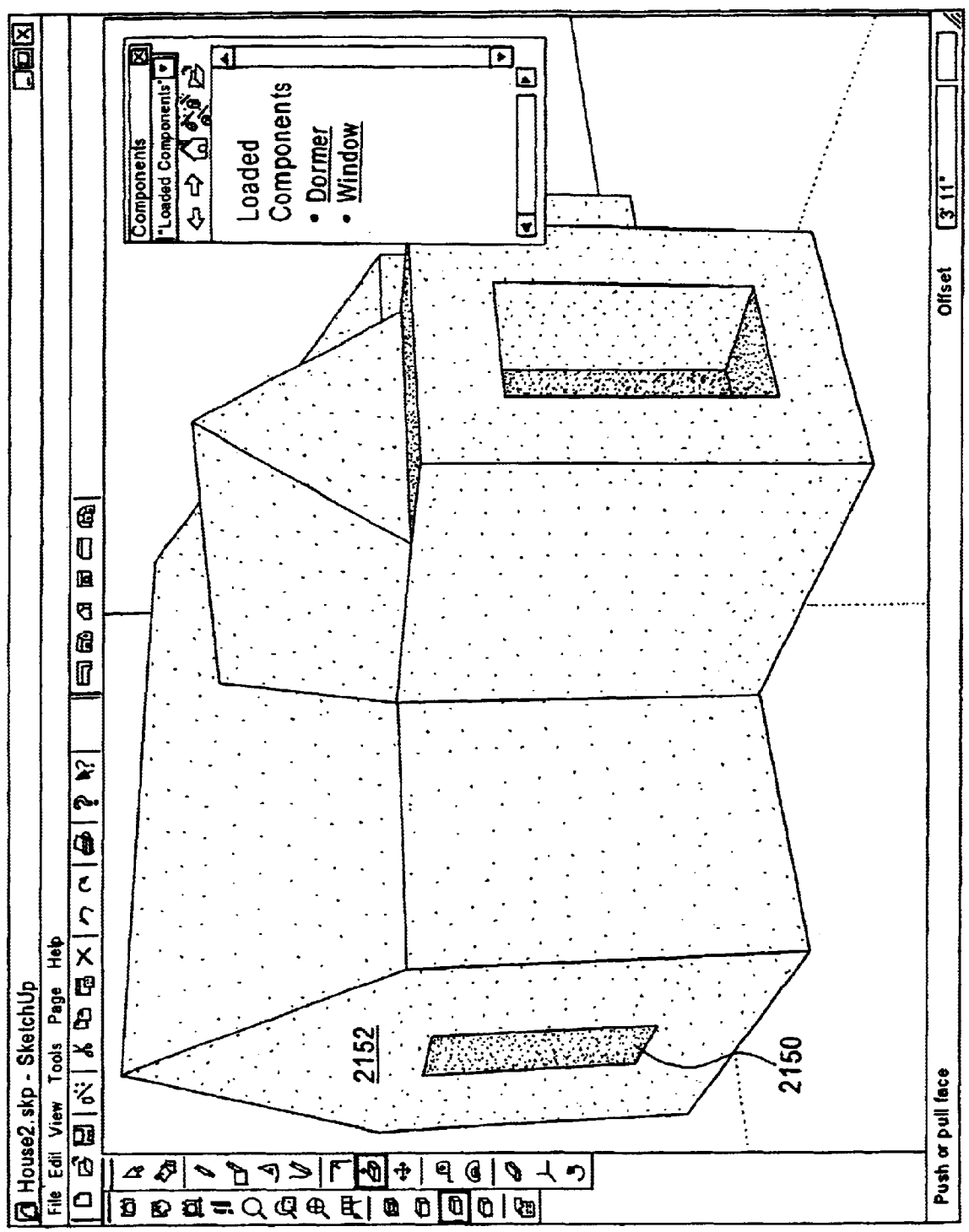

In contrast, FIG. 22C depicts a push/pull operation on the side face 2152. During this second operation, the component instance 2150, which has not been exploded, maintains its position on the surface 2152.

Rotating Components and Geometry

Figure 23A:
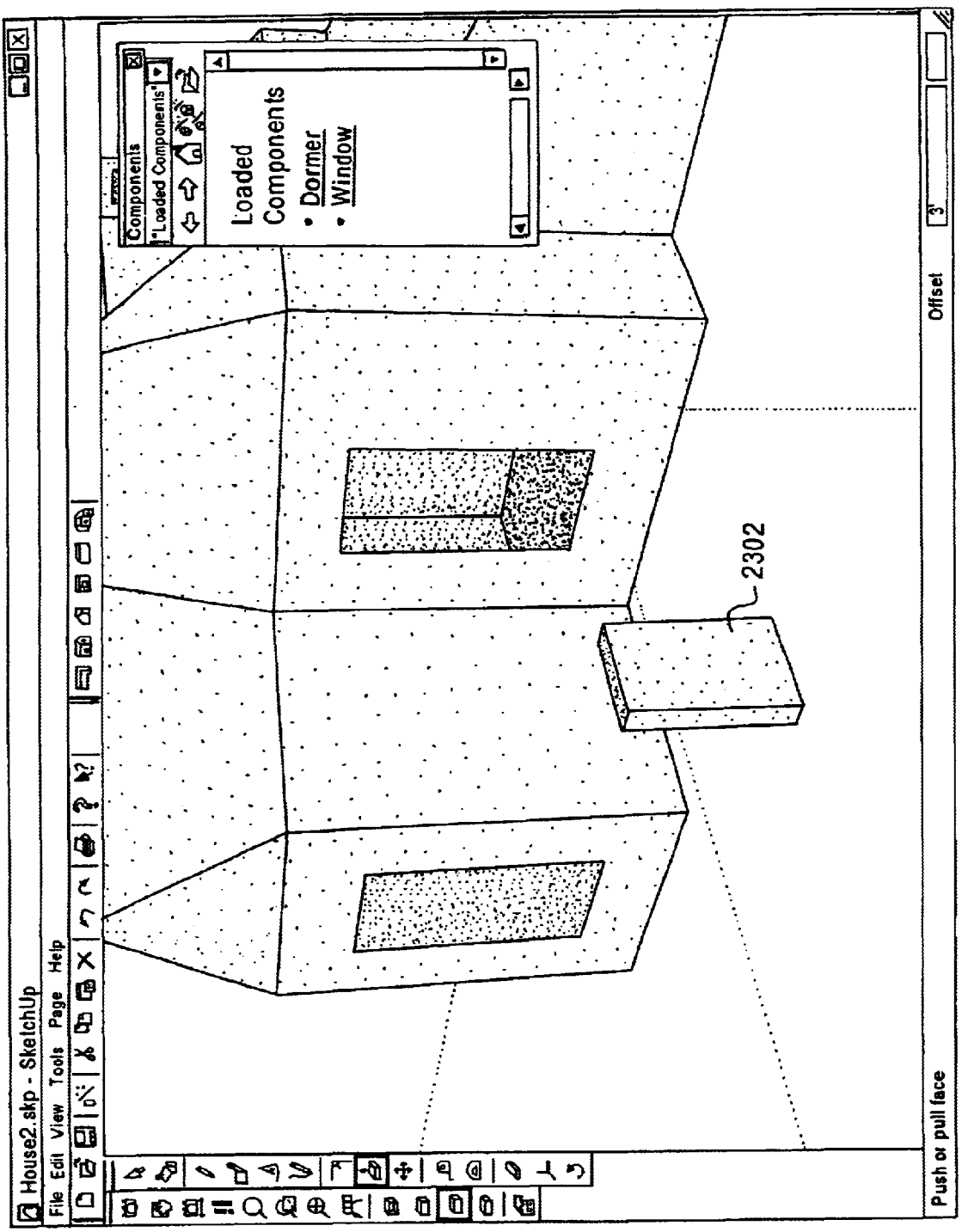
FIGS. 23A–23F illustrate a sequence of screen shots in which a user creates a component that is unconnected with the other geometry in the second exemplary house design.
Figure 23B:
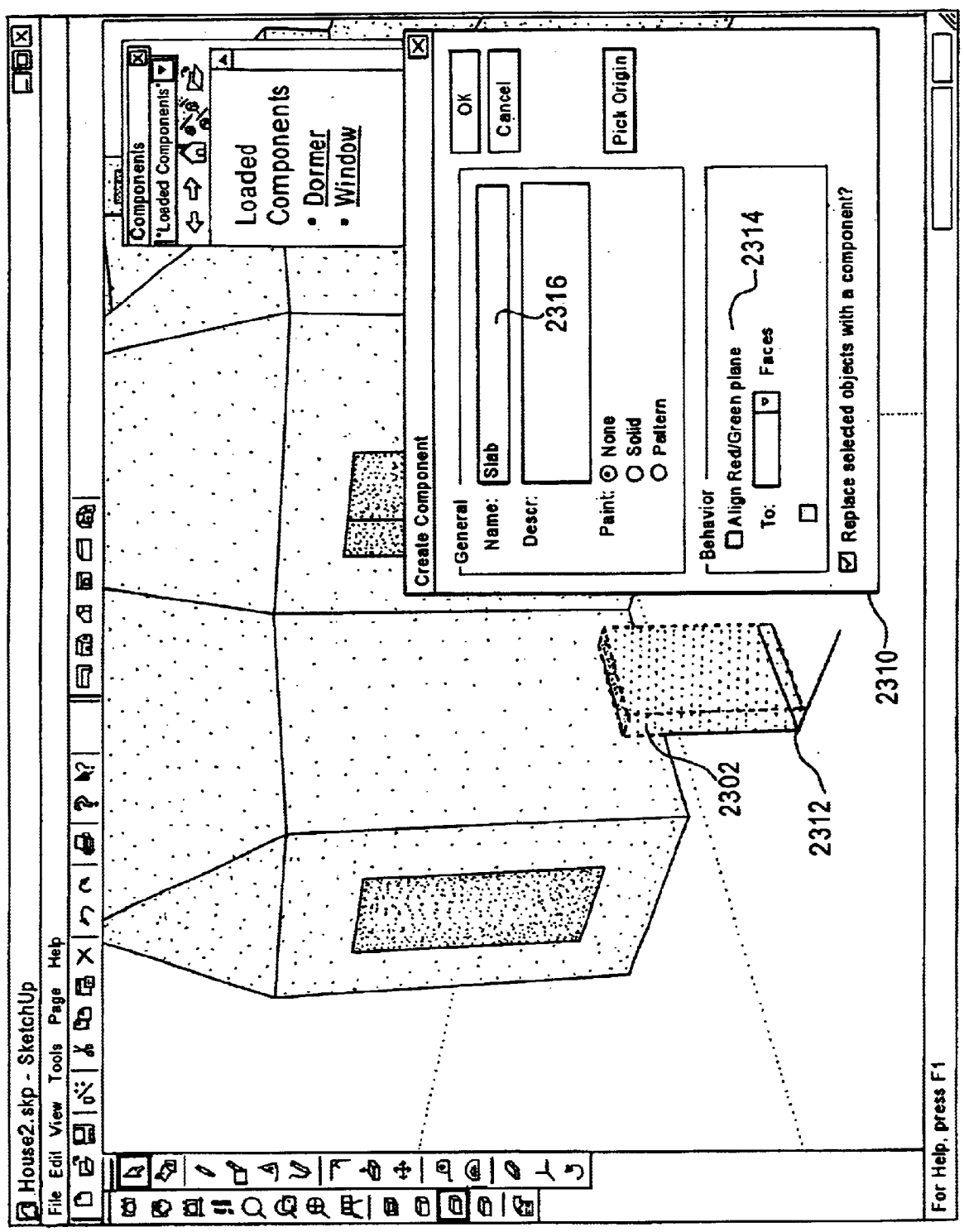

The previous examples of components have involved geometry that was connected to existing features of a model. Components can also be created from free-standing geometry. As shown in FIG. 23A, a three-dimensional slab 2302 is created in front of the second exemplary house. This slab 2302 can be selected and transformed, as depicted in FIG. 23B, into a component using the input box 2310, as described earlier. The name of the component is entered in the dialog line 2316 and the component behavior is defined using the other available options in the box 2310. One difference from earlier examples, as a result of the slab 2302 not being connected to any other geometry, the "Align Red/Green Plane" box 2314 is not selected by default. As before, though, the axes 2312 are displayed at the default origin of the slab 2302, as shown in FIG. 23B. When the user clicks on "OK" to finish defining the component, the slab 2302 is replaced, because this behavior was selected in the dialog box 2310, with the slab component instance 2320, as shown in FIG. 23C.

Figure 23C:
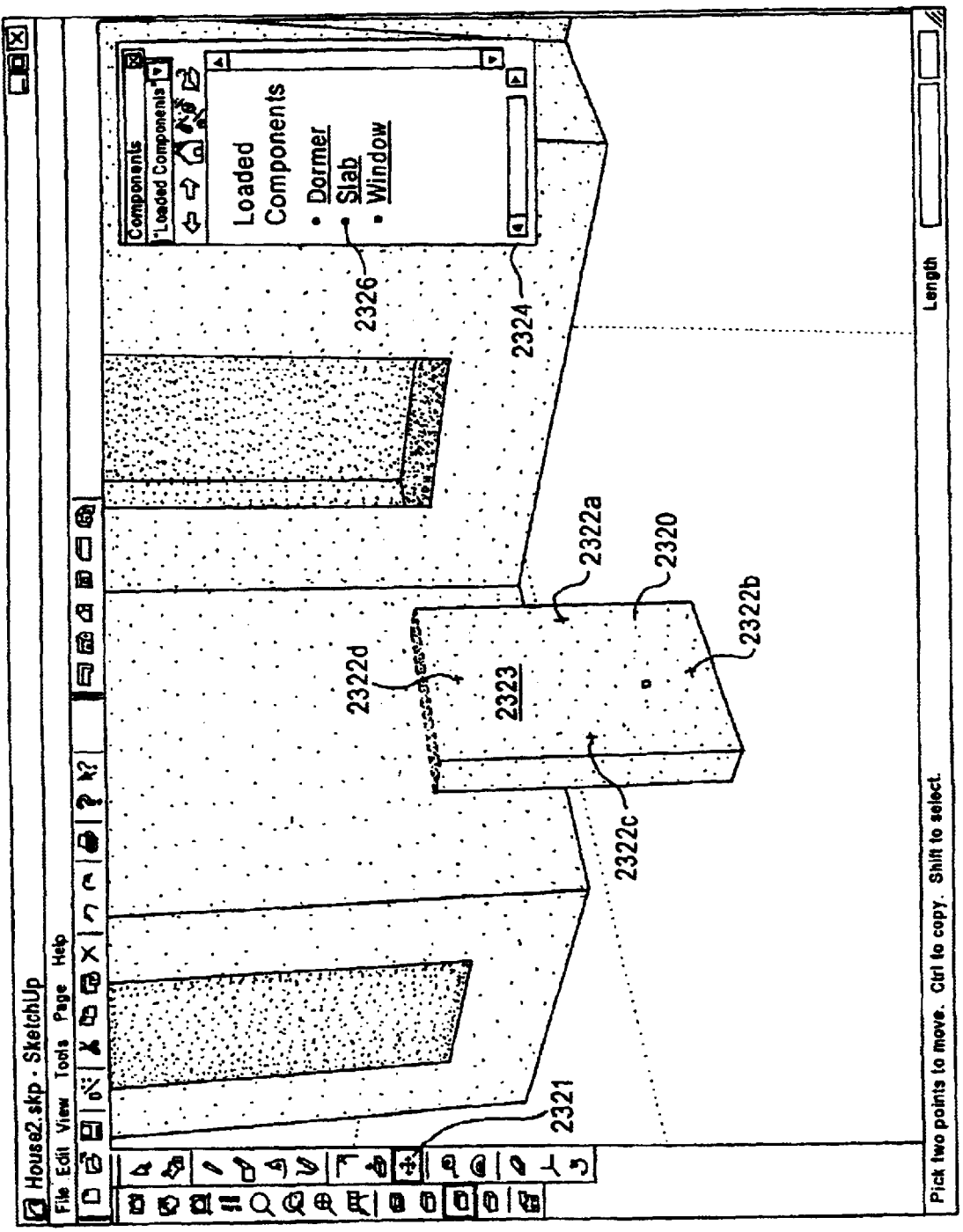
Figure 23D:
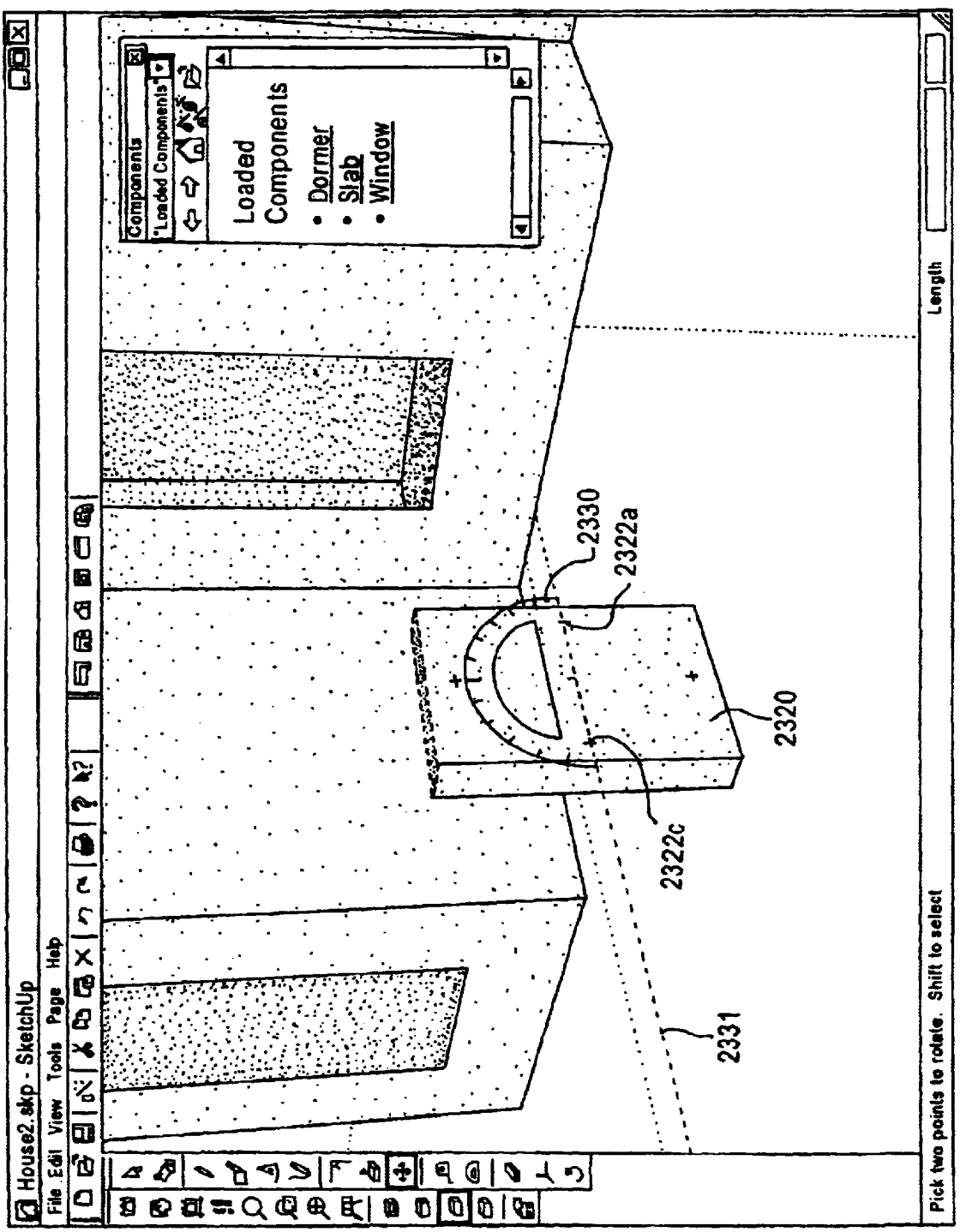
Figure 23E:
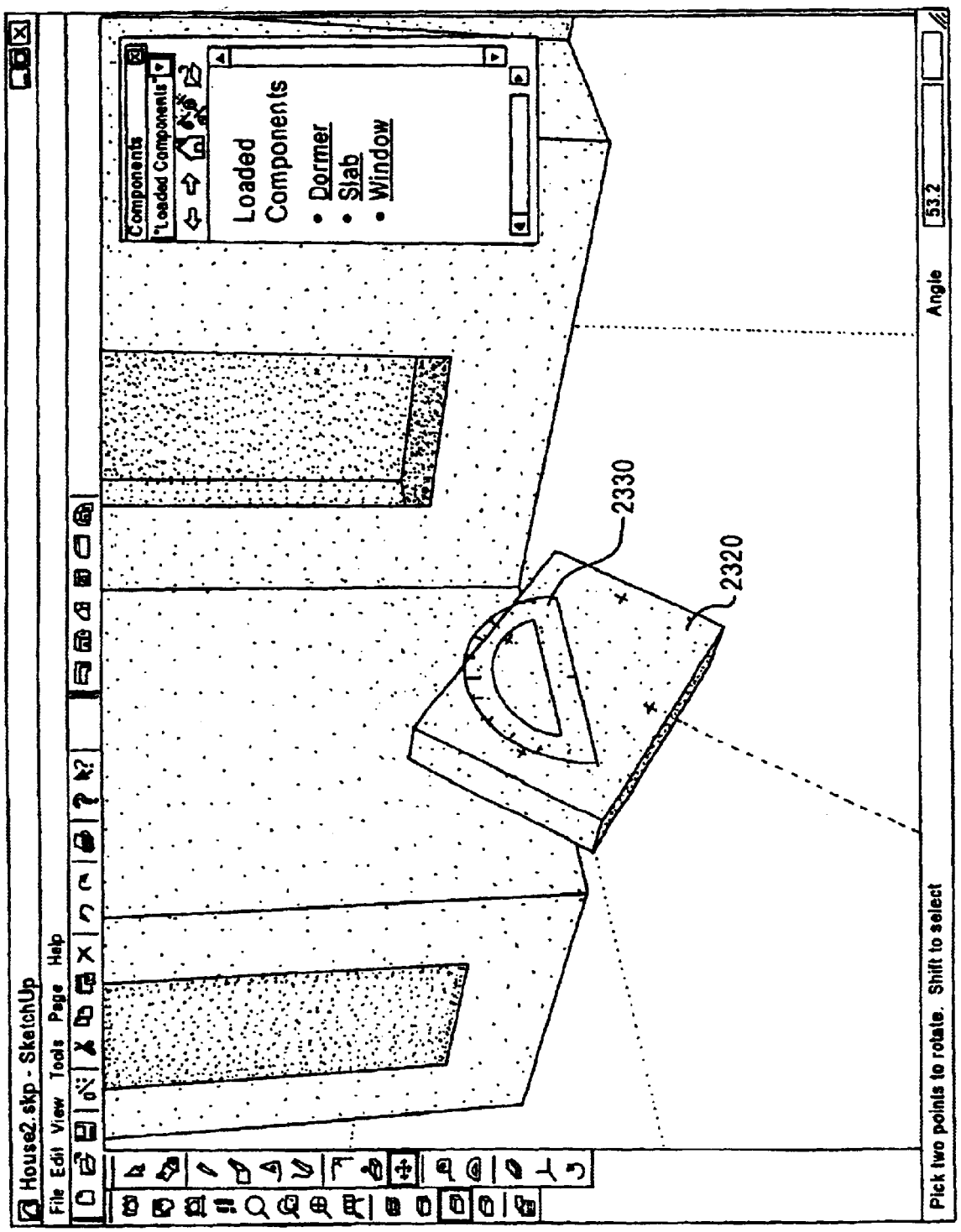
Figure 23F:
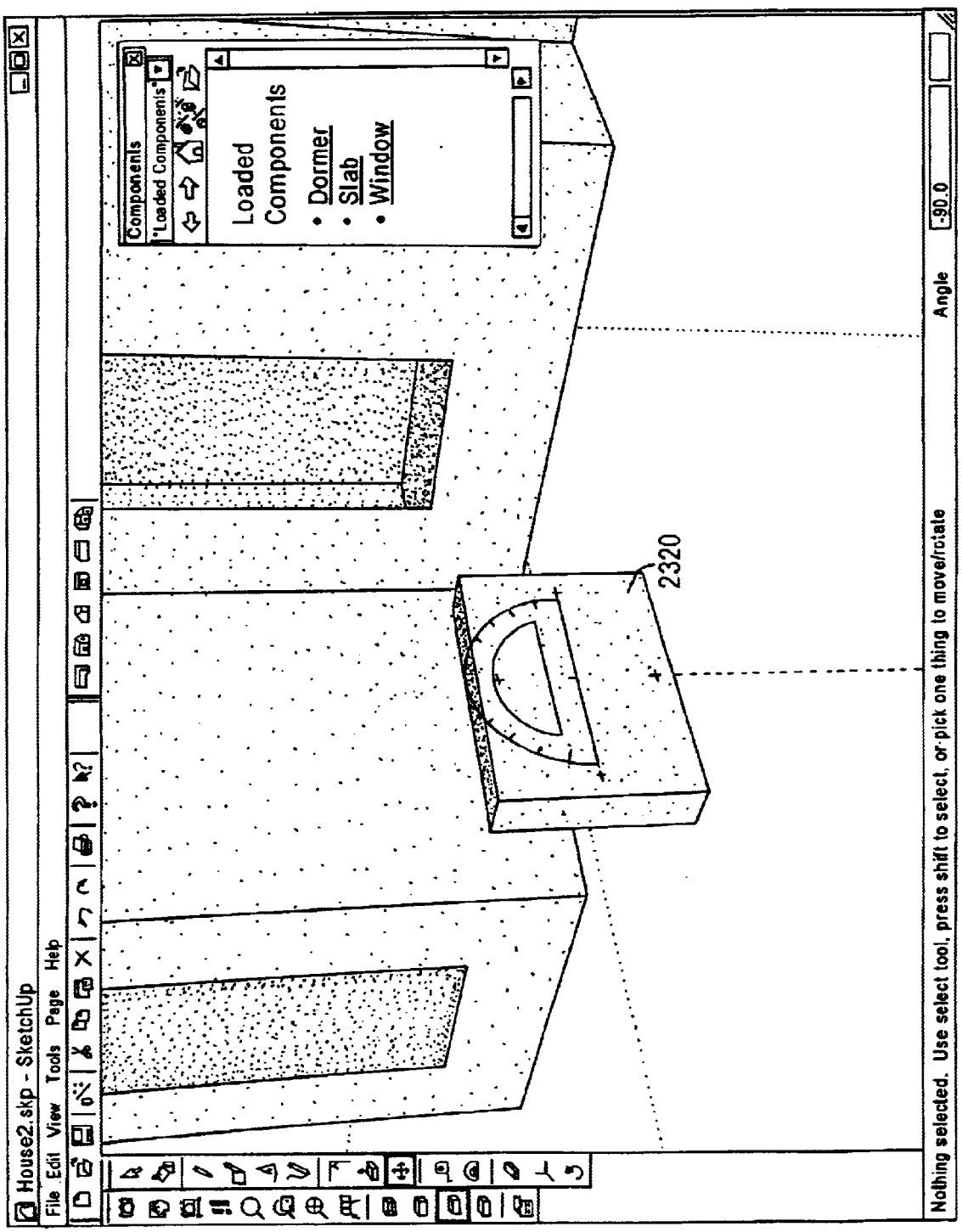

With the move tool 2321 activated, positioning the cursor over the face 2323 of the slab instance 2320 will cause the component 2320 to be highlighted and the rotation grips 2322a–d to appear on the face 2323, as shown in FIG. 23C. When the cursor is positioned over one of the rotation grips 2322a–d, then the protractor 2330 appears along with the phantom line 2331, as shown in FIG. 23D. With the protractor displayed, the user can, for example click a mouse button to activate the rotate, and move the cursor to affect a rotate operation, as shown in FIG. 23E. FIG. 23F illustrates the slab 2320 rotated 90° from its original placement (as seen in FIG. 23C).

Figure 24A:
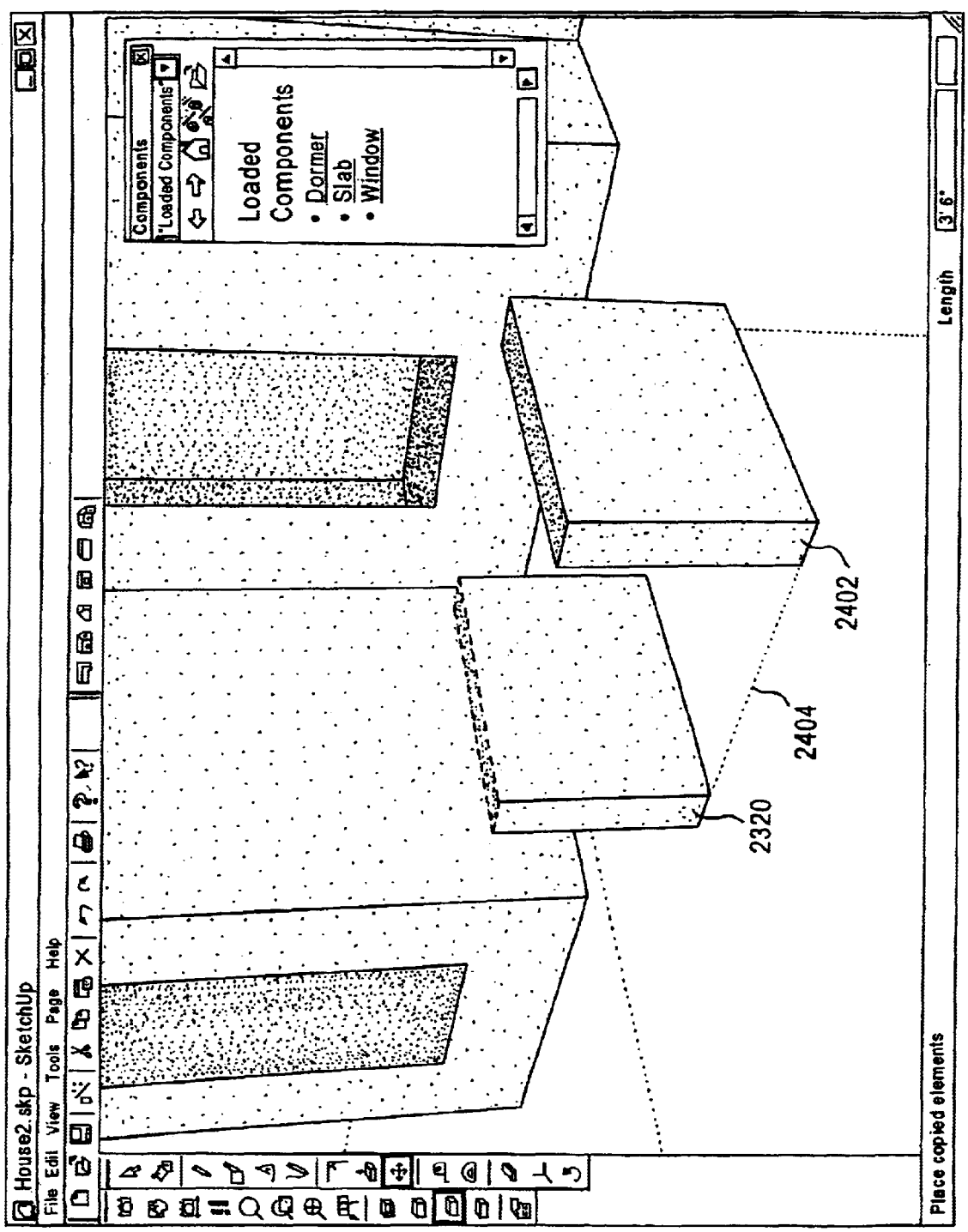
FIGS. 24A–24M illustrate a sequence of screen shots that demonstrate the use of a rotate tool to position and orient individual and composite objects.
Figure 24B:
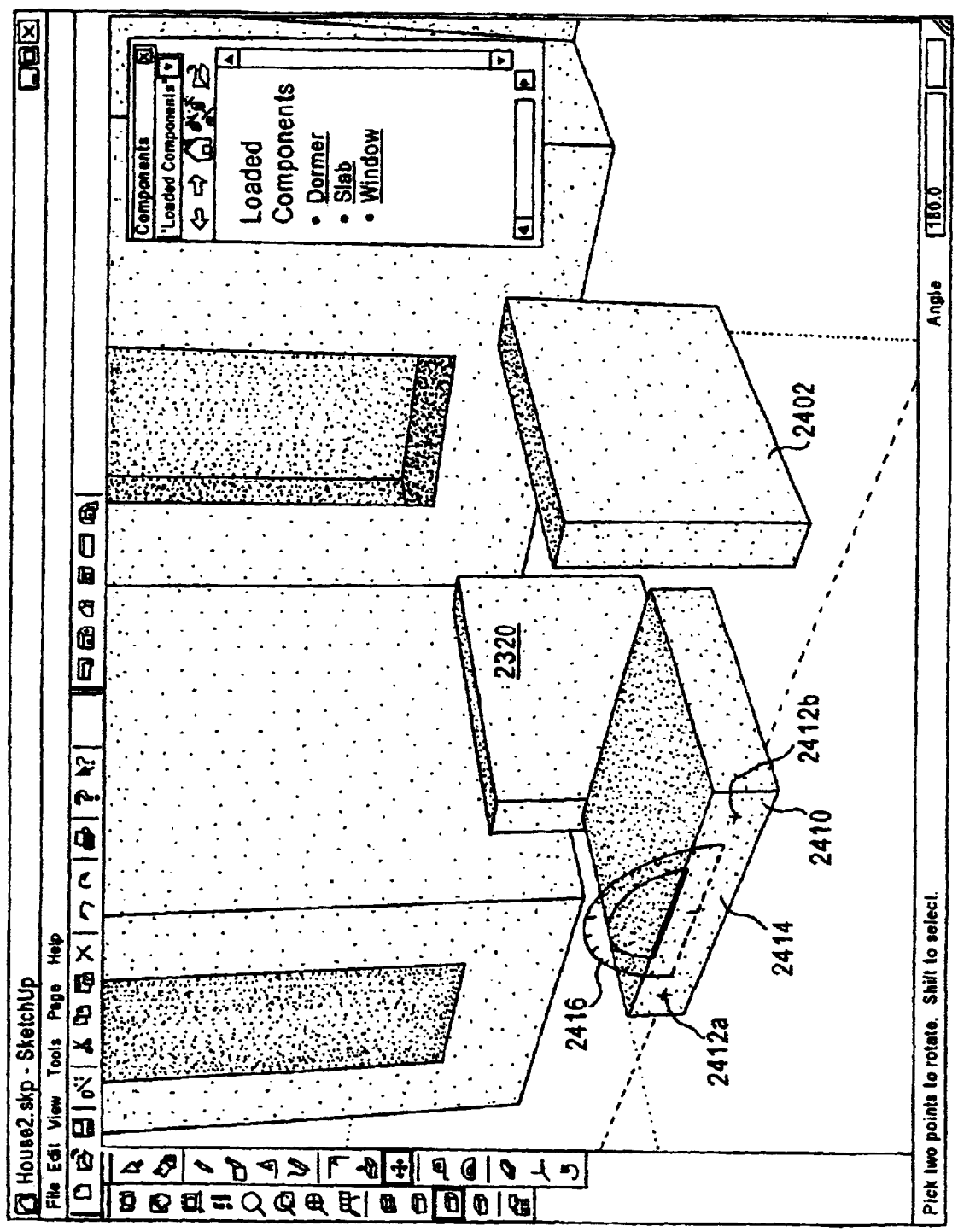
Figure 24C:
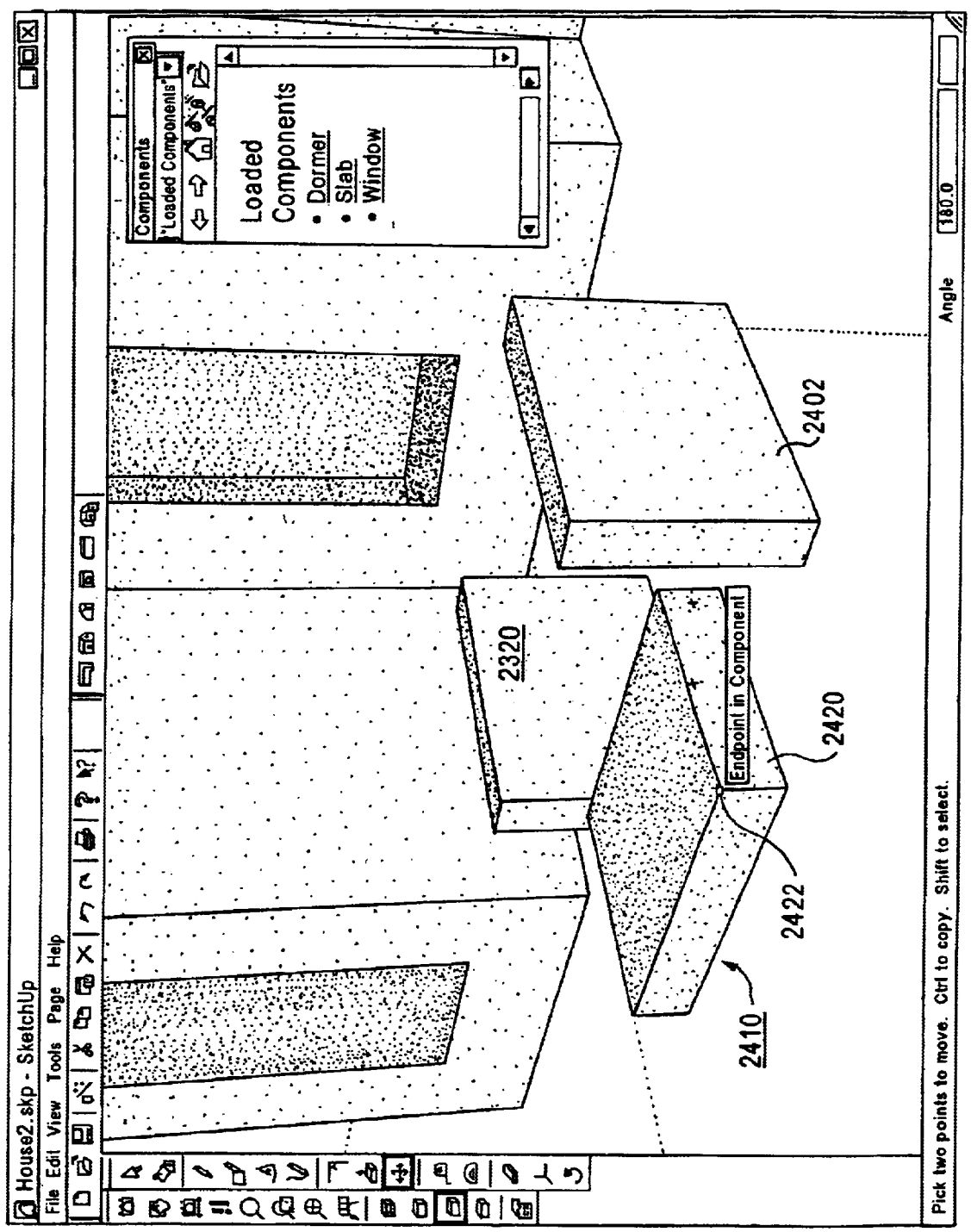
Figure 24D:
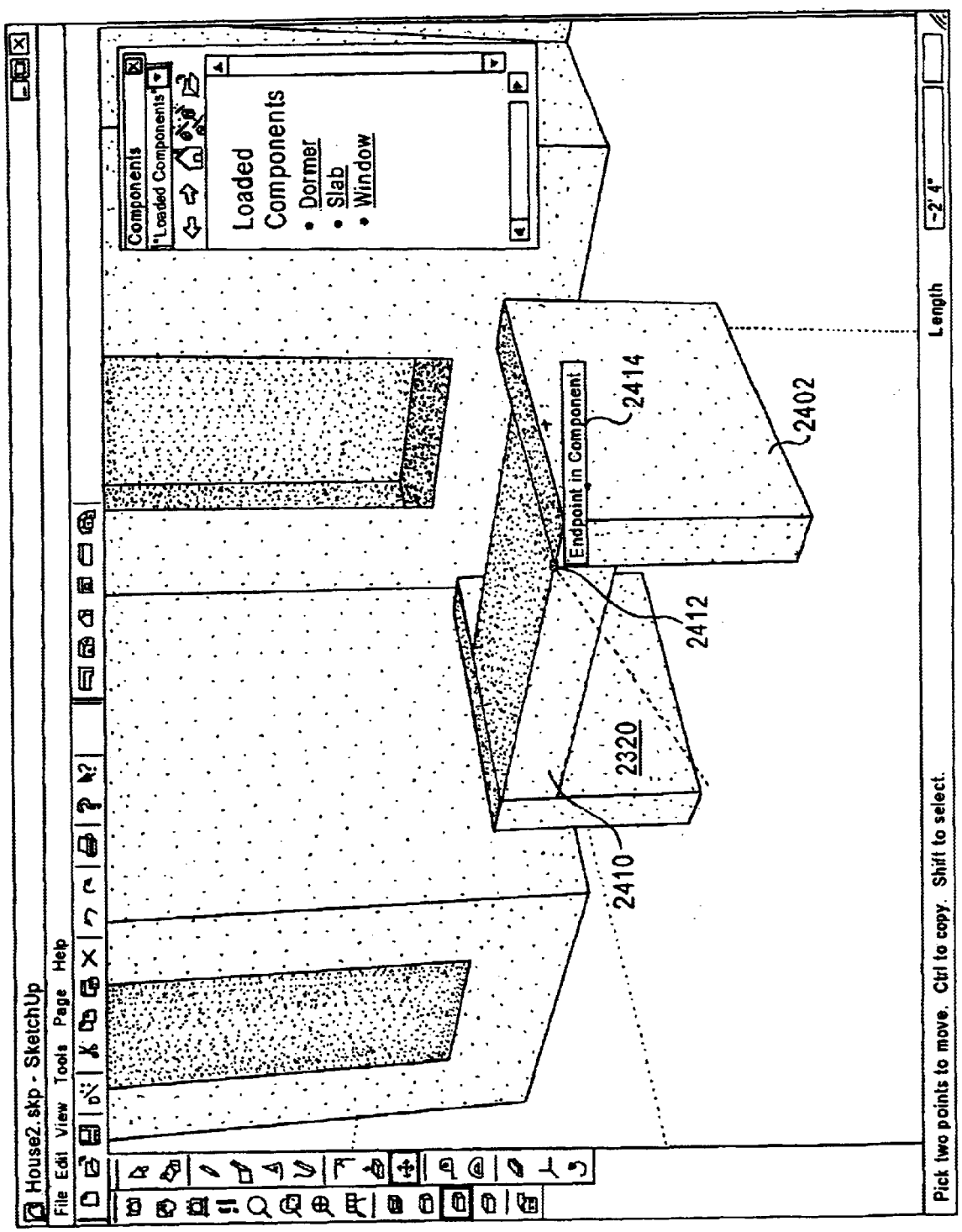

The sequence of FIGS. 24A through 24M illustrate the simplicity and variety with which components can be instantiated and positioned within a model using the movement and rotation operations introduced earlier. The slab instance 2320 is copied, for example by holding down the CTRL key while performing a move operation, to create the complementary slab instance 2402, as shown in FIG. 24A. The presence of the phantom line 2024 and its color assist the user in properly positioning the slab instance 2402. A third slab instance 2140, introduced into the scene as described with respect to FIG. 23C, is depicted in FIG. 24B. By using the rotate grips 2412a and 2412b on the face 2414 of the slab instance 2410, a user can use the protractor 2416 to rotate the slab instance 2410 to be perpendicularly oriented with respect to the other two slabs 2320 and 2402, as shown in FIG. 24B. The endpoint 2422 of the slab 2410 can be selected, as shown in FIG. 24C, as a reference point for a subsequent move operation that places the slab 2410 between the tops of the other slabs 2320 and 2402, as shown in FIG. 24D. Visual cues 2412 and 2414 are provided to assist with the proper placement of the slab 2410.

Figure 24E:
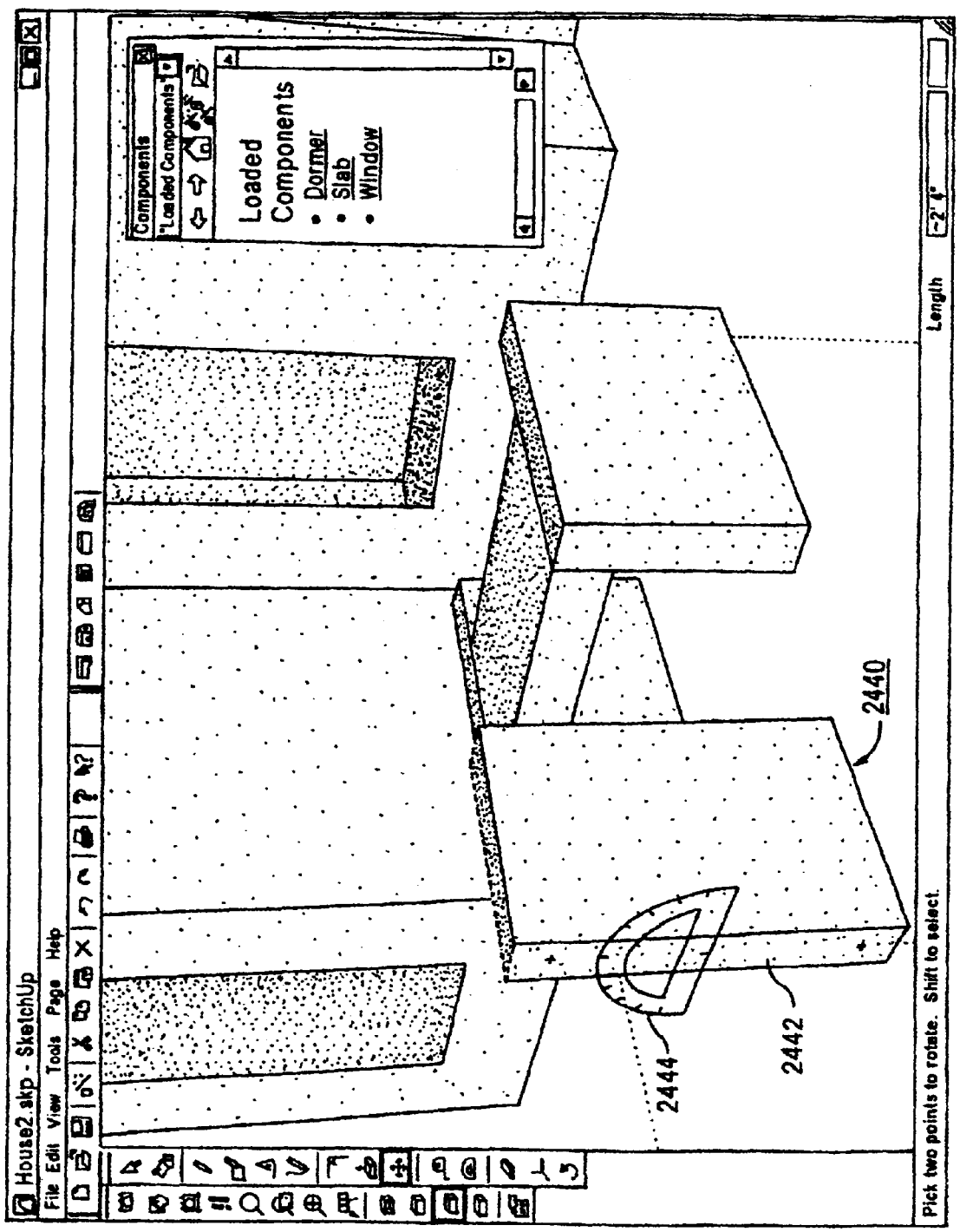
Figure 24F:
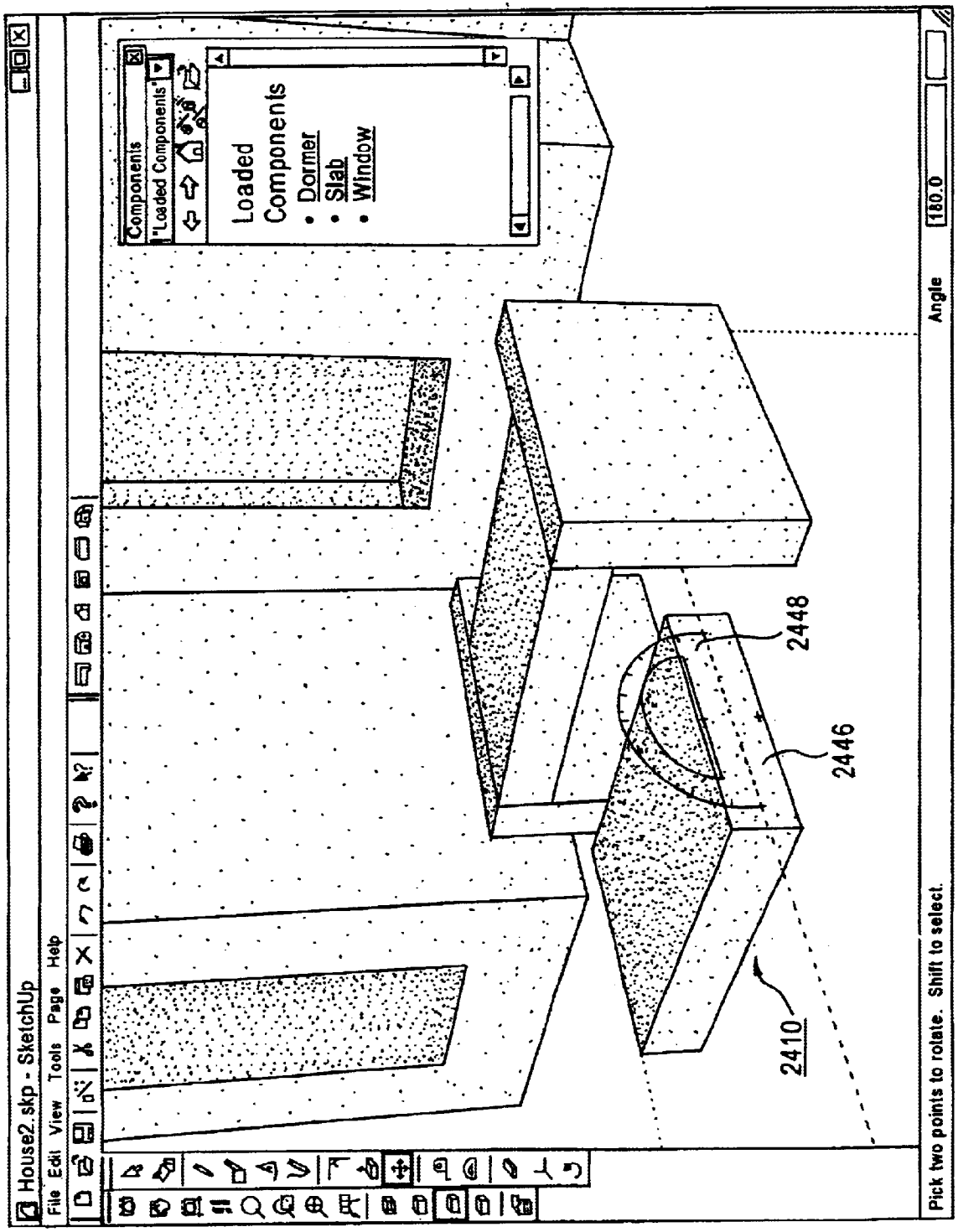
Figure 24G:
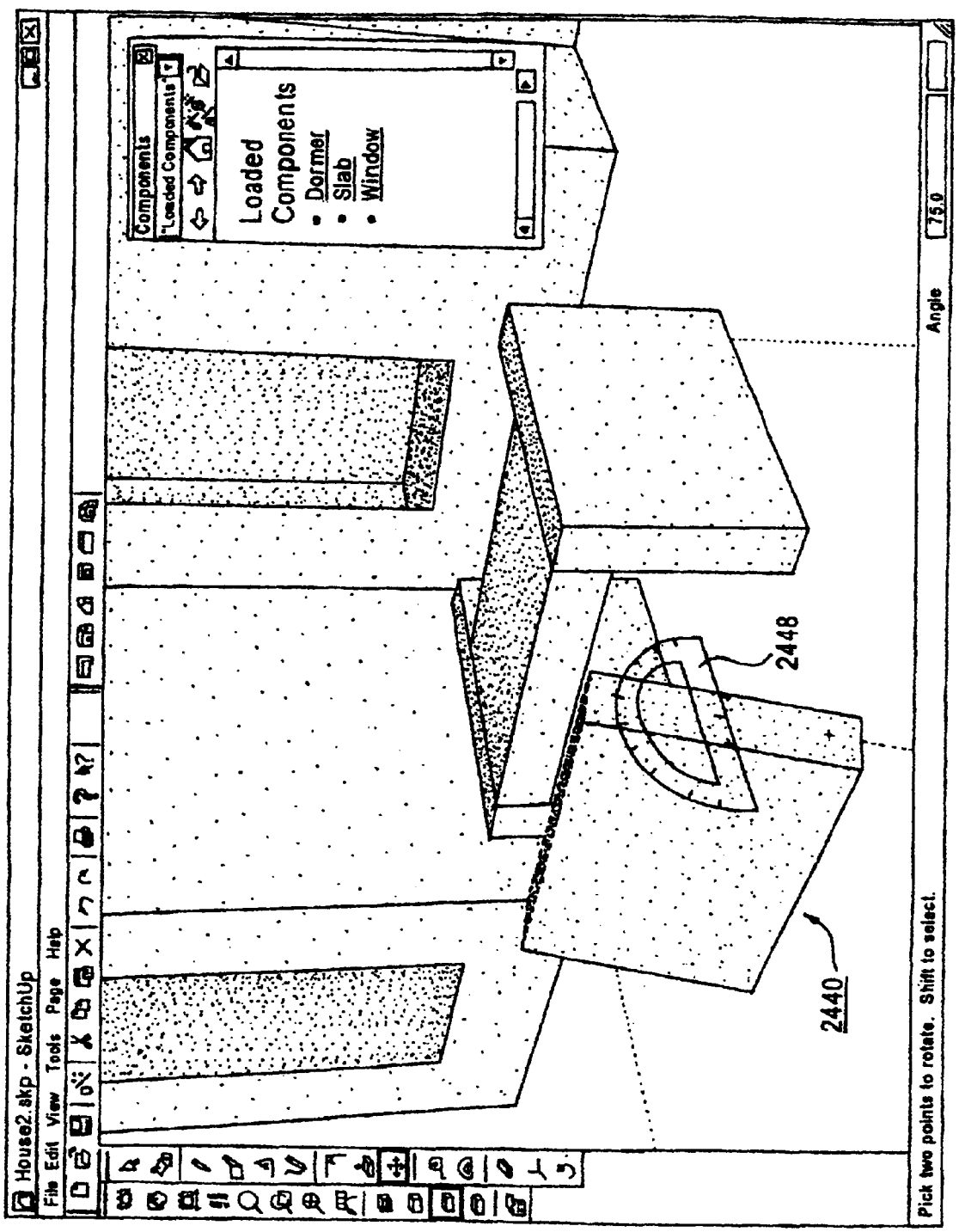
Figure 24H:
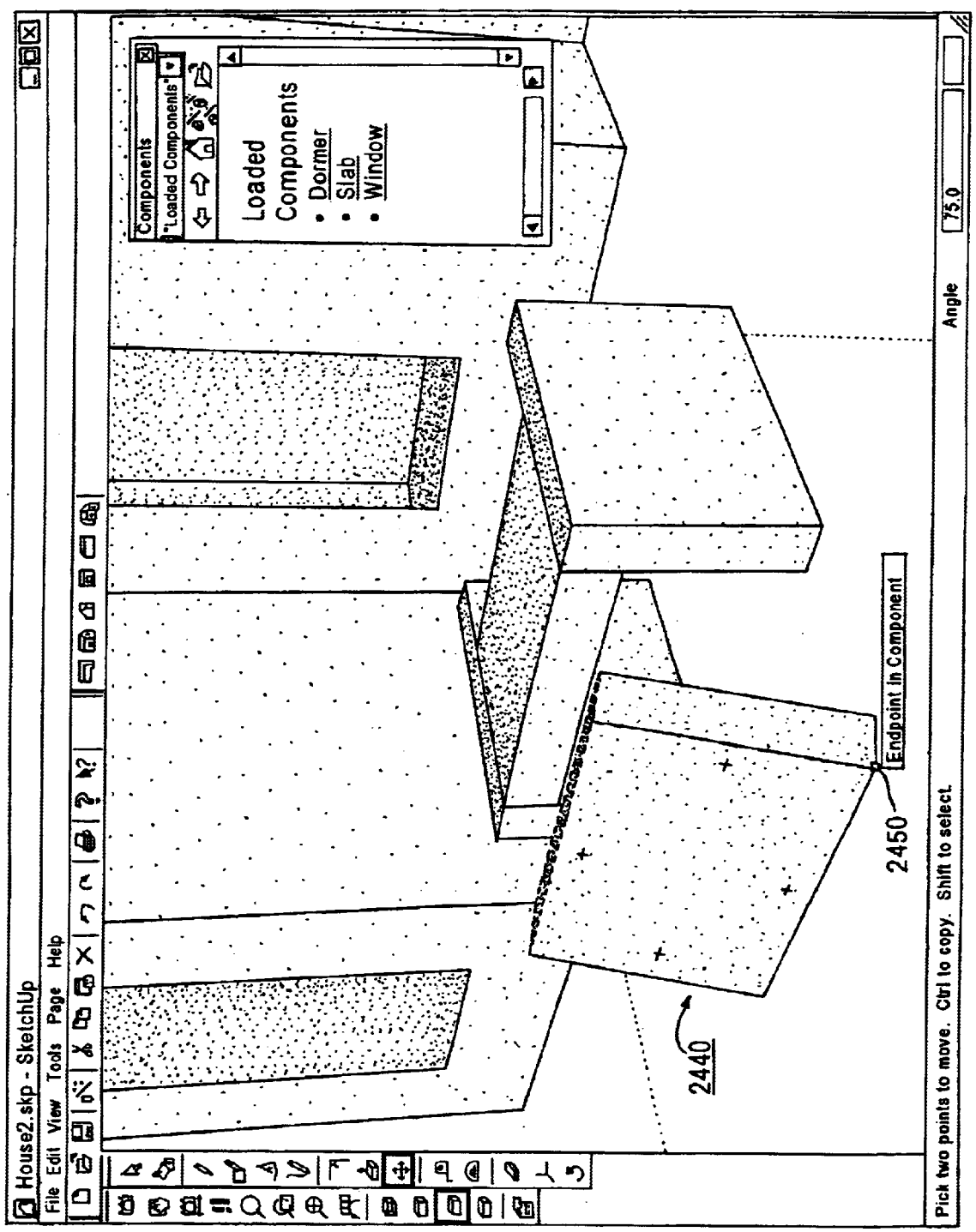
Figure 24:
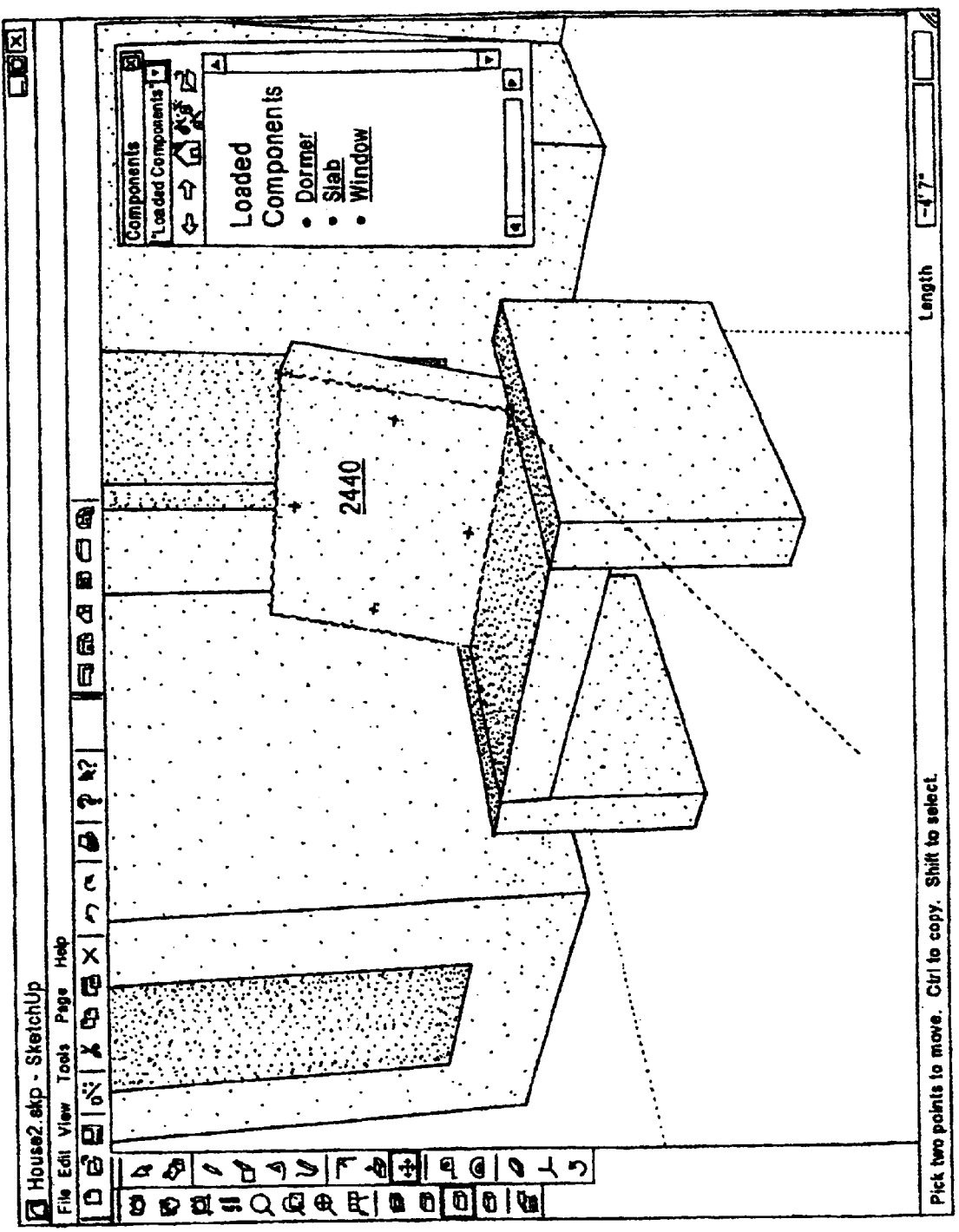

FIG. 24E depicts a fourth slab instance 2440 with an active protractor 2444 positioned over a side face 2442. The protractor 2444 allows a user to lay the slab instance 2440 down horizontally, as shown in FIG. 24F. Repositioning the cursor allows a user to select rotation grips on another side face 2446 of the slab 2440 to activate a protractor 2448 in order to perform a rotation operation around a different axis. As shown in FIG. 24G, the slab 2440 is rotated upwards at approximately 75° using the second protractor 2448. An endpoint 2450 can then be selected on the slab instance 2440, as shown in FIG. 24H, and used as a reference point when moving the slab instance 2440 to complete the bench 2460, as illustrated in FIGS. 24I and 24J.

Figure 24J:
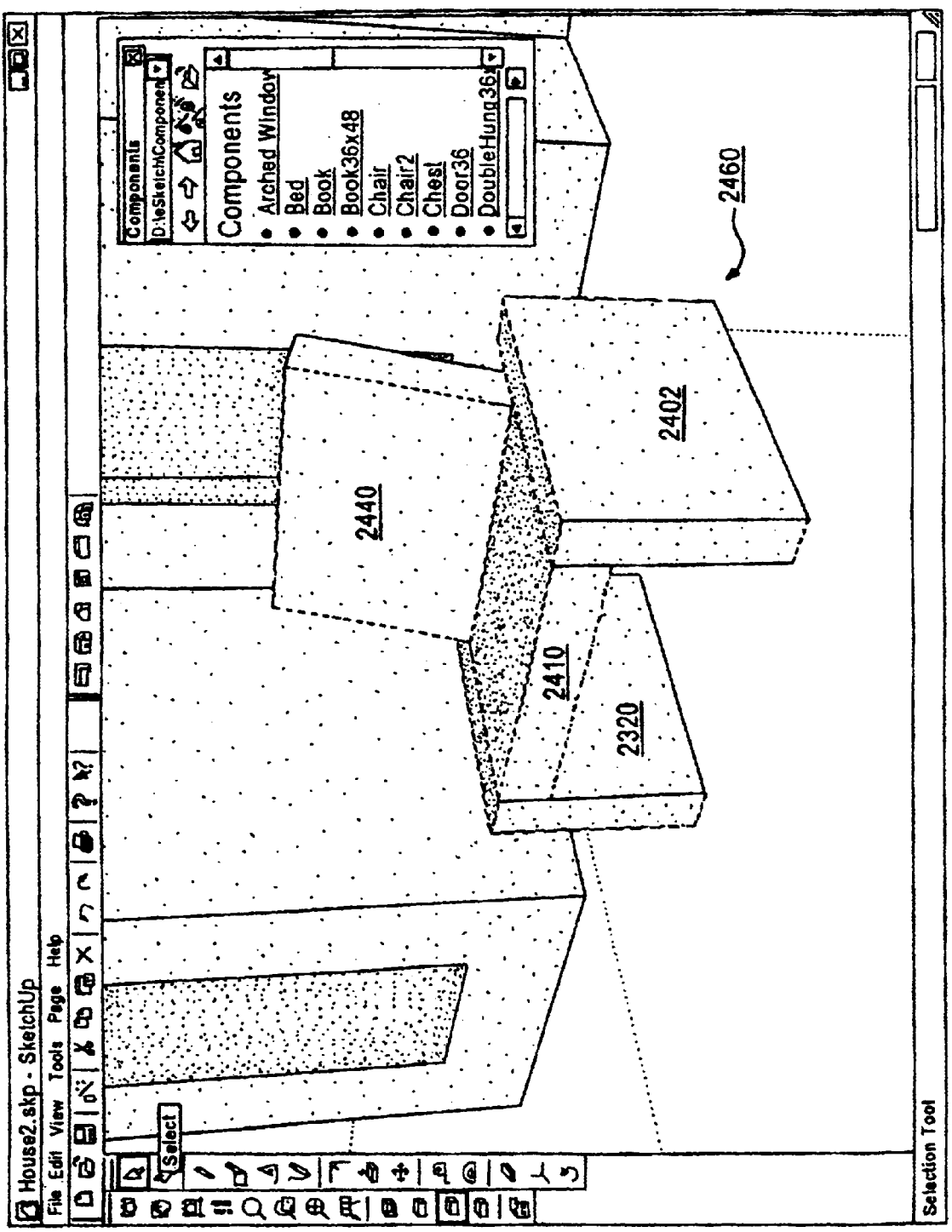
Figure 24K:
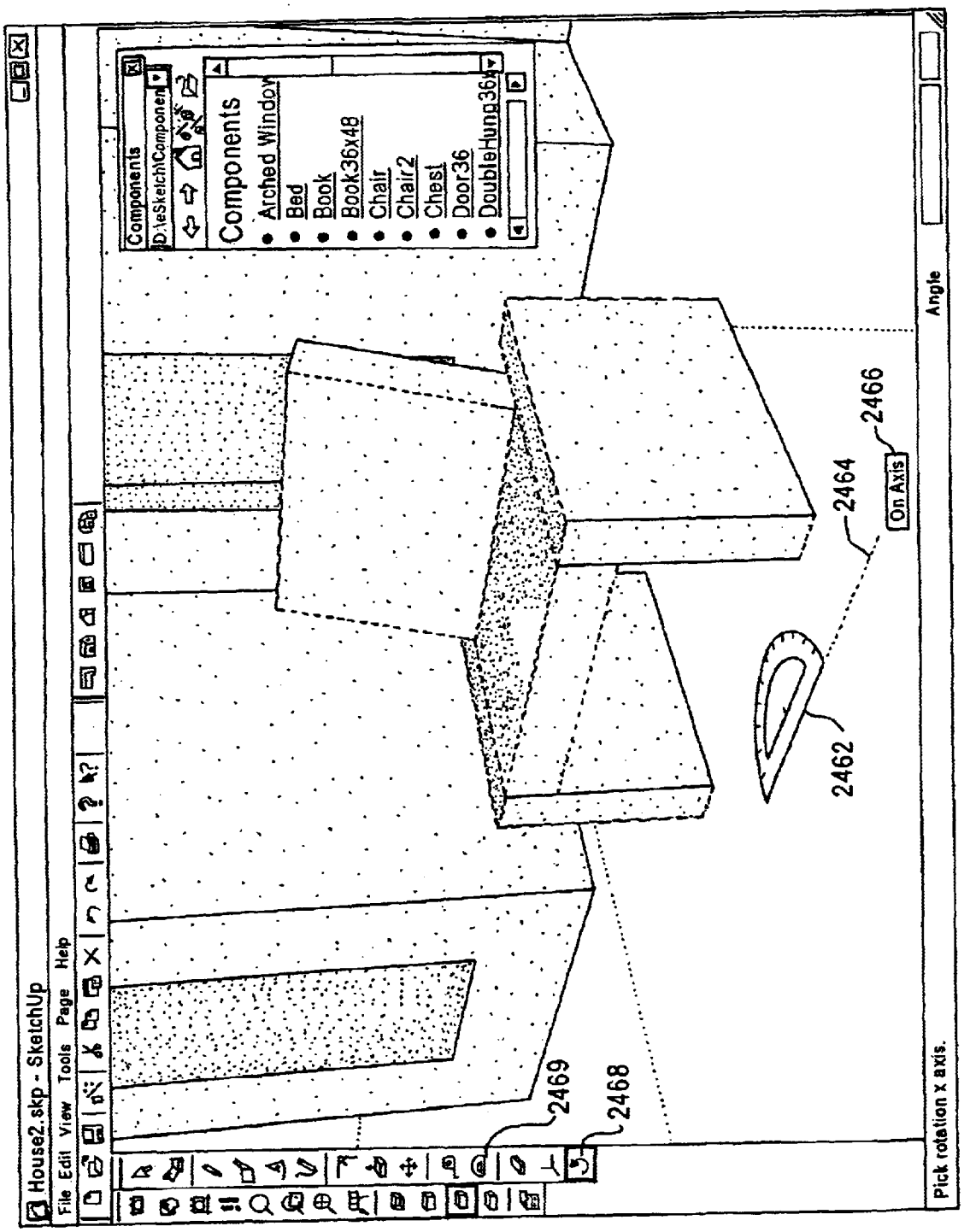

In FIG. 24J, all the slab instances 2320, 2402, 2410, and 2440 of the bench 2460 are selected, as indicated by the highlighted outlines of the individual slab instances 2320, 2402, 2410 and 2440. The rotate tool 2468 can then be selected to activate the protractor 2462 which can be positioned on a plane of the display by appropriate cursor movements. As shown in FIG. 24K, visual cues 2464 and 2466 are provided to assist a user in positioning and orienting the rotate tool's protractor 2462. Although similar in visual appearance, the protractor tool 2469 and the protractor that results from selecting the rotate tool 2468, perform different functions within the present graphical design and modeling application.

Figure 24L:
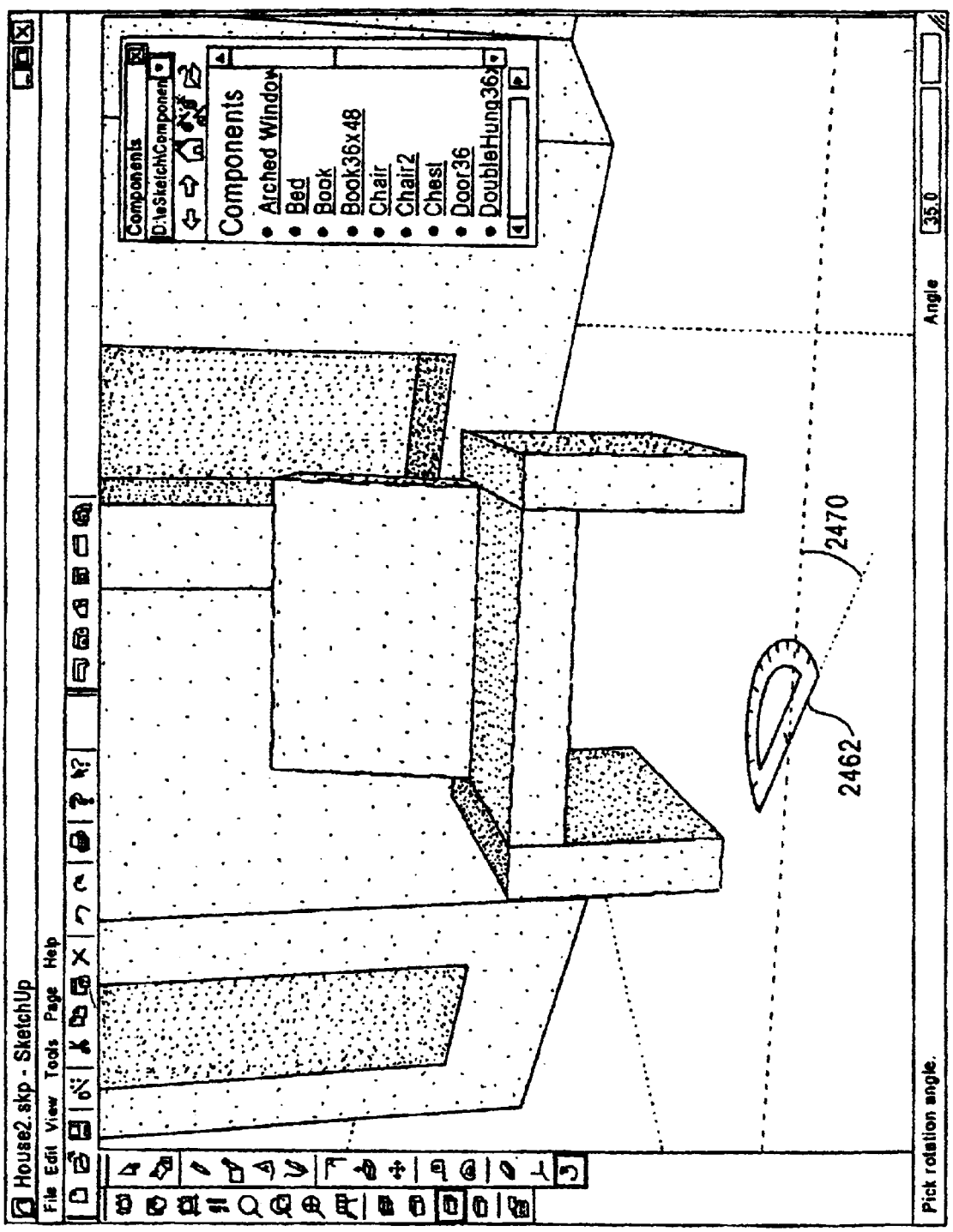
Figure 24M:
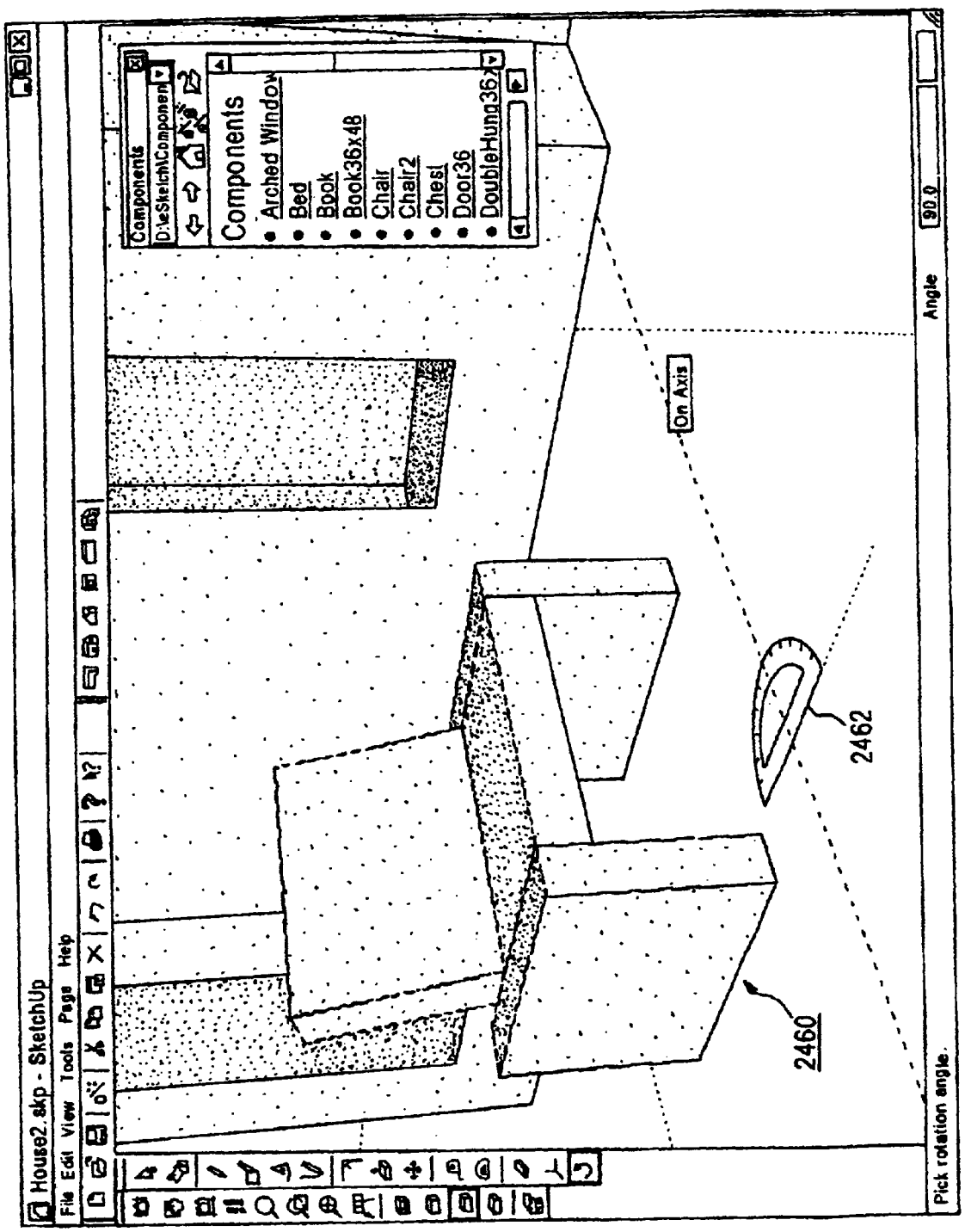

Once the rotate tool's protractor 2462 is positioned and oriented, it can be anchored in place by a mouse click, or other equivalent input. Subsequent cursor movements will rotate any selected objects around the center of the protractor 2462, as shown in FIG. 24L. FIG. 24M illustrates the bench 2460 in its final position, rotated 90° from its original orientation.

Hardware Overview

Figure 25:
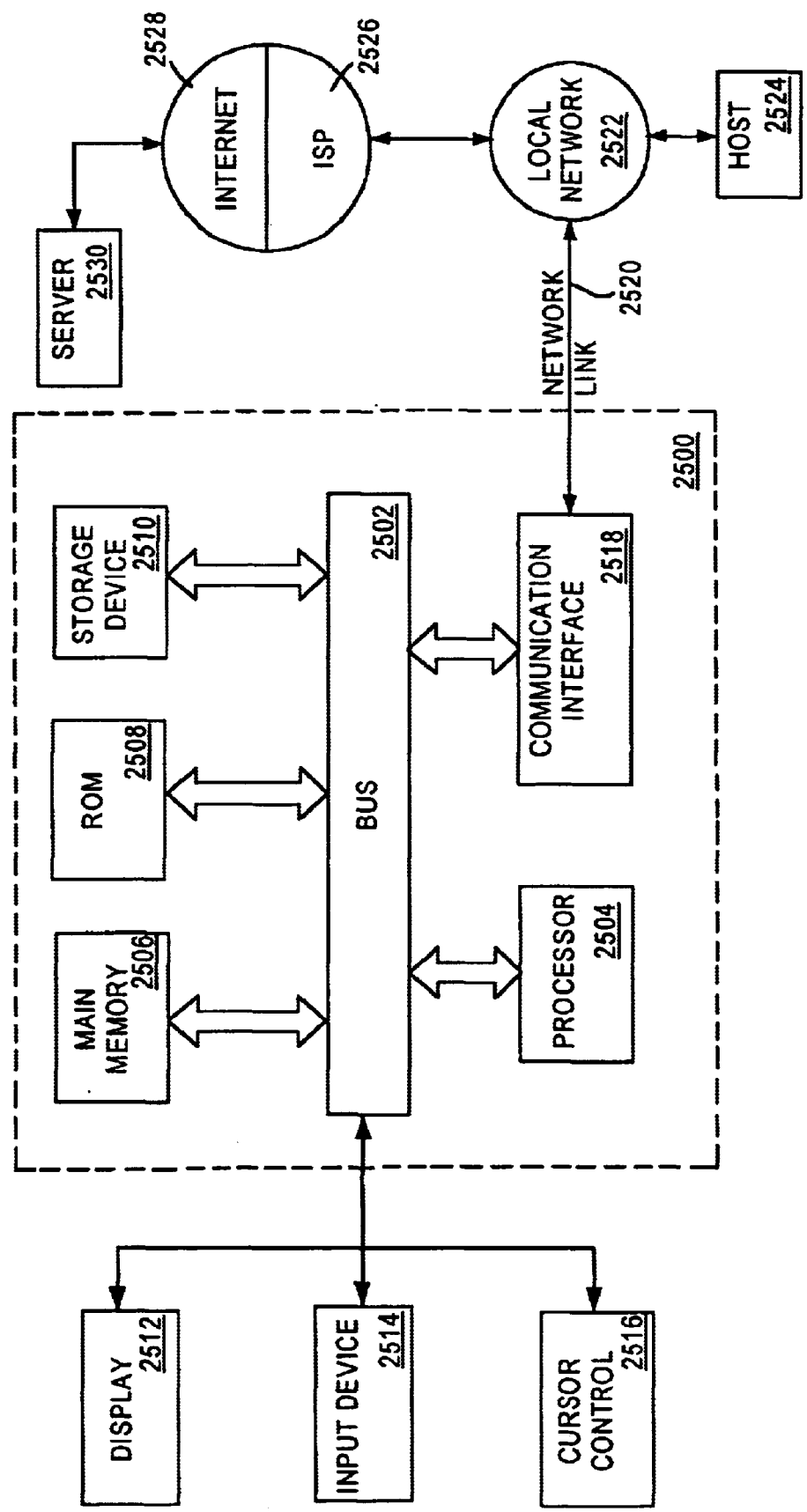
FIG. 25 illustrates an exemplary computer platform on which an embodiment of the present invention may be implemented.

FIG. 25 is a block diagram that illustrates a computer system 2500 upon which an embodiment of the invention may be implemented. Computer system 2500 includes a bus 2502 or other communication mechanism for communicating information, and a processor 2504 coupled with bus 2502 for processing information. Computer system 2500 also includes a main memory 2506, such as a random access memory (RAM) or other dynamic storage device, coupled to bus 2502 for storing information and instructions to be executed by processor 2504. Main memory 2506 also may be used for storing temporary variables or other intermediate information during execution of instructions to be executed by processor 2504. Computer system 2500 further includes a read only memory (ROM) 2508 or other static storage device coupled to bus 2502 for storing static information and instructions for processor 2504. A storage device 2510, such as a magnetic disk or optical disk, is provided and coupled to bus 2502 for storing information and instructions.

Computer system 2500 may be coupled via bus 2502 to a display 2512, such as a cathode ray tube (CRT), for displaying information to a computer user. An input device 2514, including alphanumeric and other keys, is coupled to bus 2502 for communicating information and command selections to processor 2504. Another type of user input device is cursor control 2516, such as a mouse, a trackball, or cursor direction keys for communicating direction information and command selections to processor 2504 and for controlling cursor movement on display 2512. This input device typically has two degrees of freedom in two axes, a first axis (e.g., x) and a second axis (e.g., y), that allows the device to specify positions in a plane.

The invention is related to the use of computer system 2500 for designing and modeling three-dimensional objects. According to one embodiment of the invention, a design and modeling application is provided by computer system 2500 in response to processor 2504 executing one or more sequences of one or more instructions contained in main memory 2506. Such instructions may be read into main memory 2506 from another computer-readable medium, such as storage device 2510. Execution of the sequences of instructions contained in main memory 2506 causes processor 2504 to perform the process steps described herein. One or more processors in a multi-processing arrangement may also be employed to execute the sequences of instructions contained in main memory 2506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2504 for execution. Such a medium may take many forms, including but not limited to, non-volatile media, volatile media, and transmission media. Non-volatile media include, for example, optical or magnetic disks, such as storage device 2510. Volatile media include dynamic memory, such as main memory 2506. Transmission media include coaxial cables, copper wire and fiber optics, including the wires that comprise bus 2502. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 2504 for execution. For example, the instructions may initially be borne on a magnetic disk of a remote computer. The remote computer can load the instructions into its dynamic memory and send the instructions over a telephone line using a modem. A modem local to computer system 2500 can receive the data on the telephone line and use an infrared transmitter to convert the data to an infrared signal. An infrared detector coupled to bus 2502 can receive the data carried in the infrared signal and place the data on bus 2502. Bus 2502 carries the data to main memory 2506, from which processor 2504 retrieves and executes the instructions. The instructions received by main memory 2506 may optionally be stored on storage device 2510 either before or after execution by processor 2504.

Computer system 2500 also includes a communication interface 2518 coupled to bus 2502. Communication interface 2518 provides a two-way data communication coupling to a network link 2520 that is connected to a local network 2522. For example, communication interface 2518 may be an integrated services digital network (ISDN) card or a modem to provide a data communication connection to a corresponding type of telephone line. As another example;

communication interface 2518 may be a local area network (LAN) card to provide a data communication connection to a compatible LAN. Wireless links may also be implemented. In any such implementation, communication interface 2518 sends and receives electrical, electromagnetic or optical signals that carry digital data streams representing various types of information.

Network link 2520 typically provides data communication through one or more networks to other data devices. For example, network link 2520 may provide a connection through local network 2522 to a host computer 2524 or to data equipment operated by an Internet Service Provider (ISP) 2526. ISP 2526 in turn provides data communication services through the worldwide packet data communication network, now commonly referred to as the "Internet" 2528. Local network 2522 and Internet 2528 both use electrical, electromagnetic or optical signals that carry digital data streams. The signals through the various networks and the signals on network link 2520 and through communication interface 2518, which carry the digital data to and from computer system 2500, are exemplary forms of carrier waves transporting the information.

Computer system 2500 can send messages and receive data, including program code, through the network(s), network link 2520, and communication interface 2518. In the Internet example, a server 2530 might transmit a requested code for an application program through Internet 2528, ISP 2526, local network 2522 and communication interface 2518. In accordance with the invention, one such downloaded application provides for storing and retrieving persistent objects as described herein. The received code may be executed by processor 2504 as it is received, and/or stored in storage device 2510, or other non-volatile storage for later execution. In this manner, computer system 2500 may obtain application code in the form of a carrier wave.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims. The invention is capable of other and different embodiments and its several details are capable of modifications in various obvious respects, all without departing from the invention. Accordingly, the drawings and description are to be regarded as illustrative in nature, and not as restrictive.

What is claimed is:

1. A method for three-dimensional modeling, comprising the steps of:
   receiving a first input representing a plurality of edges, which define a two-dimensional shape bounded by the edges; and
   receiving a second input indicating a push/pull operation, and in response thereto, extruding the two-dimensional shape to form a three-dimensional figure,
   wherein the step of extruding includes the step of replicating the edges to form zero-area faces along each edge of the two-dimensional shape.

2. The method according to claim 1, wherein the step of extruding includes the step of:
   extending the two-dimensional shape in a direction perpendicular to the two-dimensional shape.

3. The method according to claim 1, further comprising the step of:
   increasing the dimensions of the zero-area faces in a direction related to the push/pull operation.

4. The method according to claim 3, wherein:
   the direction is perpendicular to the two-dimensional shape.

5. The method according to claim 1, further comprising the step of:
   replicating vertices on the edges.

6. A method for three-dimensional modeling, comprising the steps of:
   maintaining a three-dimensional model including edges;
   receiving input defining a new edge and, in response thereto, performing the steps of:
      determining a first subset of the edges that share a common plane with the new edge;
      determining a second subset of edges from the first subset that form a closed perimeter with the new edge; and
      defining a first two-dimensional shape based on and bounded by the second subset of edges and the new edge;
      receiving input indicating a first push/pull operation, and in response thereto, extruding the first two-dimensional shape to form a first three-dimensional figure.

7. The method according to claim 6 further comprising the steps of:
   in response to the input defining the new edge, further performing the steps of:
      determining a third subset of edges that share a common plane with the new edge, said third subset including at least one edge not in the first subset; and
      determining a fourth subset of edges from the third subset that form a closed perimeter with the new edge; and
      defining a second two-dimensional shape based on and bounded by the fourth subset of edges and the new edge;
      receiving input indicating a second push/pull operation, and in response thereto, extruding the second two-dimensional shape to form a second three-dimensional figure.

8. A method for creating a component within a three-dimensional model, comprising the steps of:
   selecting a set of elements from the model;
   specifying a plurality of behavioral properties, wherein said behavioral properties relate to interactions between the set of elements and the model; and
   creating the component based on the set of elements and at least one of the specified behavioral properties.

9. The method according to claim 8, wherein the behavioral properties include a cutting property, said cutting property causing the component to create an opening in a surface on which the component is placed when instantiated.

10. The method according to claim 8, wherein the behavioral properties include an orienting property, said orienting property causing the component to orient itself to the plane of a surface on which the component is placed when instantiated.

11. The method according to claim 8, further comprising the step of:
    storing the component in a persistent storage repository for the component to be available to future executions of a modeling application.

12. A method for creating a component within a three-dimensional model, comprising the steps of:
    receiving first input related to selecting a plurality of elements within the model;

selecting a set of elements from the model based on the first input;

receiving second input related to specifying behavioral properties that relate to interactions between the set of elements and the model;

specifying a plurality of behavioral properties based on the second input;

creating the component based on the set of elements and at least one of the behavioral properties; and storing the component in a persistent storage repository separate from the model.

13. The method according to claim 12, wherein the behavioral properties include a cutting property indicating that an opening is created in a surface when instantiating the component thereon.

14. The method according to claim 12, wherein said set of behavioral properties includes an automatic orienting property indicating the component is oriented to the plane of a surface when instantiating the component thereon.

15. A computer readable medium bearing instructions for three-dimensional modeling, said instructions being arranged to cause one or more processors upon execution thereof to perform the steps of:

receiving input defining a plurality of edges, said edges forming a closed perimeter and sharing a common plane;

in response to receiving the input defining the edges, defining a two-dimensional shape based on and bounded by the edges; and receiving input indicating a push/pull operation, and in response thereto, extruding the two-dimensional shape to form a three-dimensional figure, wherein the step of extruding includes the step of replicating the edges to form zero-area faces along each edge of the two-dimensional shape.

16. A computer readable medium bearing instructions for a three-dimensional modeling application, said instructions being arranged to cause one or more processors upon execution thereof to perform the steps of:

maintaining a three-dimensional model including edges;

receiving input defining a new edge and in response thereto, performing the steps of:

determining a first subset of the edges that share a common plane with the new edge;

determining a second subset of edges from the first subset that form a closed perimeter with the new edge; and defining a first two-dimensional shape based on and bounded by the second subset of edges and the new edge;

receiving input indicating a first push/pull operation, and in response thereto, extruding the first two-dimensional shape to form a first three-dimensional figure.

17. A computer readable medium bearing instructions for a three-dimensional modeling application according to claim 16, said instructions further configured to implement a pencil tool for drawing edges.

18. The computer readable medium according to claim 17, said application further comprising:

a measuring tool for displaying a dimension of a model element.

19. The computer readable medium according to claim 17, said application further comprising:

a protractor tool for displaying an angular distance within a model.

20. The computer readable medium according to claim 17, said application further comprising:

instructions for providing visual cues indicating any of on-edge, on-face, on-axis, parallel-to-edge, perpendicular-to-edge, endpoint, and midpoint.

21. The computer readable medium according to claim 17, said application further comprising:

a component tool for creating an object within a model, said object comprising at least one element and at least one behavioral property.

22. The computer readable medium according to claim 21, said object further comprising:

a boundary cube bounding in three-dimensions the at least one element, said boundary cube comprising faces oriented with coordinates axes of the-model; and each face of the cube comprising one or more associated selectable rotation grips, said rotation grips, upon selection, configured to rotate the at least one element around a centerpoint of the boundary cube in a plane parallel to the associated cube face.

23. The computer readable medium according to claim 17, said application further comprising:

an erase tool for erasing selected edges and incomplete faces resulting therefrom and for reconstituting remaining co-planar faces.

24. The computer readable medium according to claim 17, said application further comprising:

a move tool for moving a vertex and for adjusting a length and a direction of edges connected to the vertex such that the adjusted edges remain connected to the moved vertex and for adjusting a dimension and orientation of surfaces connected to the edges such that the adjusted surfaces remain connected to the adjusted edges.

25. A computer readable medium bearing instructions for creating three-dimensional figure from a two-dimensional planar surface, said instructions being arranged to cause one or more processors upon execution thereof to perform the steps of:

receiving a mouse-click selecting a push/pull tool;

receiving a mouse-click selecting an interior region of the two-dimensional planar surface;

receiving a mouse-drag movement for extruding the interior region into a third dimension for a distance based on the mouse-drag, to create the three-dimensional figure, wherein the step of extruding includes the step of replicating the edges to form zero-area faces along each edge of the two-dimensional shape.

26. A computer readable medium bearing instructions for creating a component within a three-dimensional model, said instructions being arranged to cause one or more processors upon execution thereof to perform the steps of:

selecting a set of elements from the model;

specifying a plurality of behavioral properties, wherein said behavioral properties relate to interactions between the set of elements and the model; and creating the component based on the set of elements and at least one of the specified behavioral properties.

27. A computer readable medium bearing instructions for creating a component within a three-dimensional model, said instructions being arranged to cause one or more processors upon execution thereof to perform the steps of:

receiving first input related to selecting a plurality of elements within said model;

selecting a set of elements from the model based on the first input;

receiving second input related to specifying behavioral properties that relate to interactions between the set of elements and the model;

specifying a plurality of behavioral properties based on the second input;

creating the component based on the set of elements and at least one of the behavioral properties; and storing the component in a persistent storage repository.

* * * * *